US010731445B2

(12) United States Patent
Akkerman et al.

(10) Patent No.: US 10,731,445 B2
(45) Date of Patent: Aug. 4, 2020

(54) TOP-DOWN FRACTURING SYSTEM

(71) Applicants: Neil H. Akkerman, Houston, TX (US); John A. Barton, Arlington, TX (US)

(72) Inventors: Neil H. Akkerman, Houston, TX (US); John A. Barton, Arlington, TX (US)

(73) Assignee: ABD Technologies LLC, Houston, TX (US)

(*) Notice: Subject to any disclaimer, the term of this patent is extended or adjusted under 35 U.S.C. 154(b) by 376 days.

(21) Appl. No.: 15/224,345

(22) Filed: Jul. 29, 2016

(65) Prior Publication Data

US 2017/0030168 A1 Feb. 2, 2017

Related U.S. Application Data

(60) Provisional application No. 62/352,414, filed on Jun. 20, 2016, provisional application No. 62/240,819, (Continued)

(51) Int. Cl.
*E21B 43/12* (2006.01)
*E21B 43/119* (2006.01)
(Continued)

(52) U.S. Cl.
CPC ................ *E21B 43/12* (2013.01); *B23B 1/00* (2013.01); *E21B 17/22* (2013.01); *E21B 23/006* (2013.01); *E21B 23/04* (2013.01); *E21B 29/00* (2013.01); *E21B 34/063* (2013.01); *E21B 34/066* (2013.01); *E21B 34/108* (2013.01); *E21B 43/119* (2013.01); *E21B 43/14* (2013.01); *E21B 43/26* (2013.01); *E21B 47/024* (2013.01); *E21B 17/20* (2013.01); *E21B 33/12* (2013.01);
(Continued)

(58) Field of Classification Search
CPC ... E21B 2034/007; E21B 34/14; E21B 47/024
See application file for complete search history.

(56) References Cited

U.S. PATENT DOCUMENTS 3,581,819 A * 6/1971 Tamplen ................ E21B 34/14 166/332.7
3,656,562 A 4/1972 Baugh
(Continued)

OTHER PUBLICATIONS

International Search Report and Written Opinion dated Dec. 30, 2016, for International Application No. PCT/US2016/044889.
(Continued)

*Primary Examiner* — Umashankar Venkatesan
(74) *Attorney, Agent, or Firm* — Conley Rose, P.C.

(57) ABSTRACT

A valve for use in a wellbore includes a housing including a housing port, a slidable closure member disposed in a bore of the housing and including a closure member port, and a seal disposed in the housing, wherein the closure member includes a first position in the housing where fluid communication is provided between the closure member port and the housing port, and a second position axially spaced from the first position where fluid communication between the closure member port and the housing port is restricted, wherein, in response to sealing of the bore of the housing by an obturating member sealingly engaging the seal, the closure member is configured to actuate from the first position to the second position.

40 Claims, 80 Drawing Sheets

Related U.S. Application Data filed on Oct. 13, 2015, provisional application No. 62/199,750, filed on Jul. 31, 2015.

(51) Int. Cl.

| | |
|---|---|
| ***E21B 29/00*** | (2006.01) |
| ***E21B 23/00*** | (2006.01) |
| ***E21B 23/04*** | (2006.01) |
| ***E21B 34/06*** | (2006.01) |
| ***E21B 34/10*** | (2006.01) |
| ***E21B 17/22*** | (2006.01) |
| ***E21B 47/024*** | (2006.01) |
| ***E21B 43/14*** | (2006.01) |
| ***E21B 43/26*** | (2006.01) |
| ***B23B 1/00*** | (2006.01) |
| *E21B 43/116* | (2006.01) |
| *E21B 34/00* | (2006.01) |
| *E21B 33/134* | (2006.01) |
| *E21B 33/12* | (2006.01) |
| *E21B 17/20* | (2006.01) |

(52) U.S. Cl.

CPC ........... *E21B 33/134* (2013.01); *E21B 43/116* (2013.01); *E21B 43/261* (2013.01); *E21B 2034/007* (2013.01)

(56) References Cited

U.S. PATENT DOCUMENTS

| | | | | |
|---|---|---|---|---|
| 4,522,259 | A | 6/1985 | Akkerman | |
| 4,628,998 | A | 12/1986 | Akkerman | |
| 5,513,703 | A | 5/1996 | Mills et al. | |
| 6,012,527 | A | 1/2000 | Nitis et al. | |
| 6,032,735 | A | 3/2000 | Echols | |
| 6,513,595 | B1 | 2/2003 | Freiheit et al. | |
| 6,755,249 | B2 | 6/2004 | Robison et al. | |
| 6,763,892 | B2 | 7/2004 | Kaszuba | |
| 8,276,675 | B2 | 10/2012 | Williamson et al. | |
| 8,613,321 | B2 | 12/2013 | Ravensbergen et al. | |
| 8,844,634 | B2 | 9/2014 | Clausen et al. | |
| 9,238,953 | B2 | 1/2016 | Fleming et al. | |
| 2003/0019630 | A1* | 1/2003 | Freiheit | E21B 34/14 166/332.4 |
| 2003/0056951 | A1* | 3/2003 | Kaszuba | E21B 34/101 166/250.01 |
| 2009/0084553 | A1 | 4/2009 | Rytlewski et al. | |
| 2009/0308588 | A1 | 12/2009 | Howell et al. | |
| 2010/0089587 | A1 | 4/2010 | Stout | |
| 2012/0085548 | A1 | 4/2012 | Fleckenstein et al. | |
| 2013/0206402 | A1* | 8/2013 | Coon | E21B 23/08 166/255.1 |
| 2014/0048271 | A1* | 2/2014 | Coon | E21B 34/102 166/308.1 |
| 2015/0218916 | A1* | 8/2015 | Richards | E21B 34/14 166/278 |

OTHER PUBLICATIONS

Chinese Office Action dated Sep. 18, 2019, for Application No. CN 201680054632.3 and English summary.

* cited by examiner 610
612
612a
612b
612c
612d
612e
612f
614
615
616
618
620a
620b
620c
620d
620e
621
622
624
624s
626a
626b
626c
630
18
20
20s
24
26
30
32
39
40
42
44
46
48
50
52
54
56
58
59
60
62
64

FIG. 53D
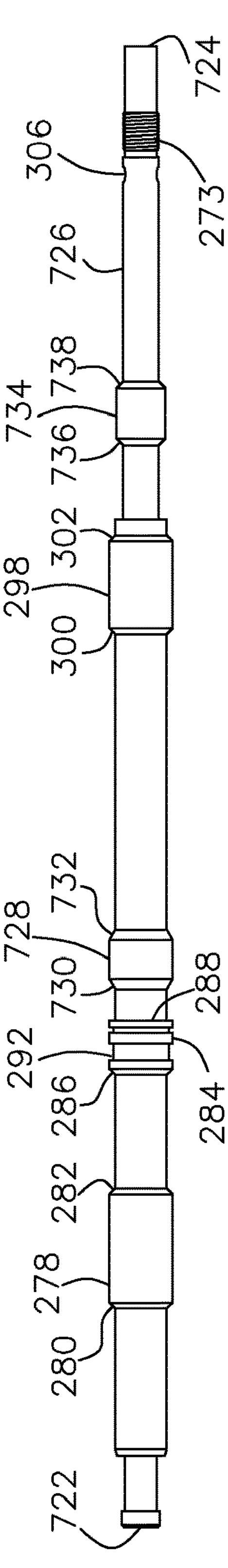
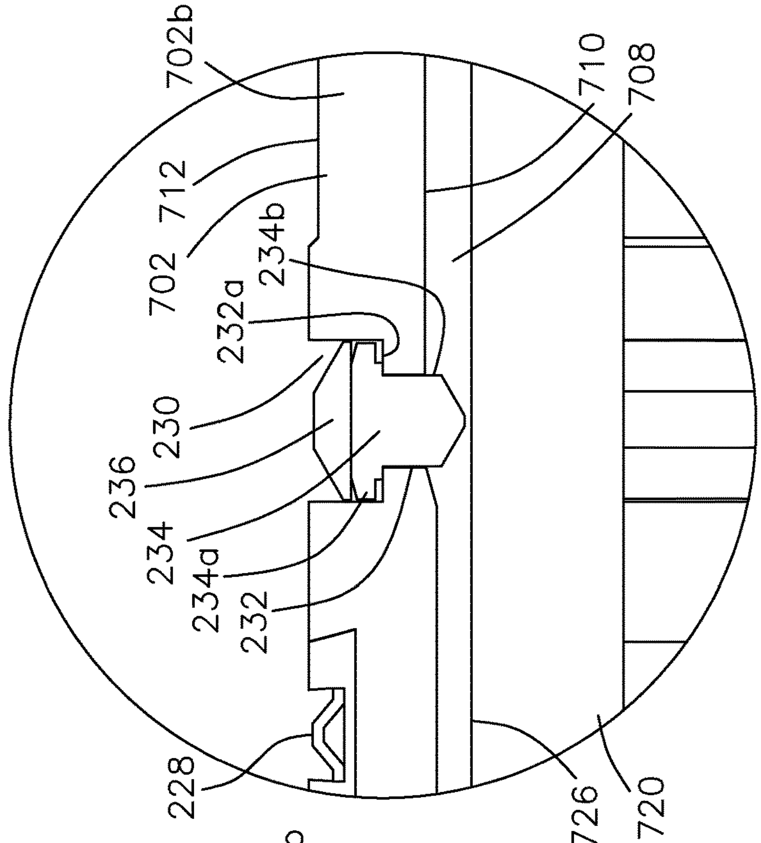
FIG. 53F
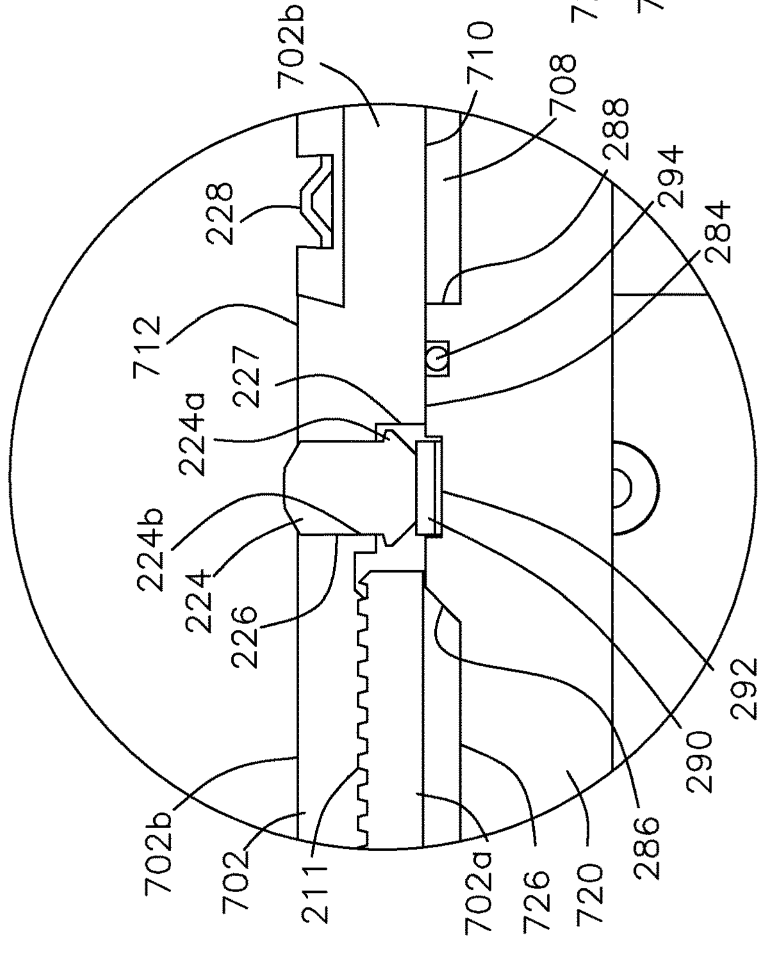
FIG. 53E

TOP-DOWN FRACTURING SYSTEM

CROSS-REFERENCE TO RELATED APPLICATIONS

This application claims benefit of U.S. provisional patent application Ser. No. 62/199,750 filed Jul. 31, 2015, and entitled "Top-Down Fracturing System," U.S. provisional patent application Ser. No. 62/240,819 filed Oct. 13, 2015, and entitled "Top-Down Fracturing System," and U.S. provisional patent application Ser. No. 62/352,414 filed Jun. 20, 2016, and entitled "Top-Down Fracturing System," each of which is hereby incorporated herein by reference in its entirety.

STATEMENT REGARDING FEDERALLY SPONSORED RESEARCH OR DEVELOPMENT

Not applicable.

BACKGROUND

This disclosure relates generally to well servicing and completion systems for the production of hydrocarbons. More particularly, the disclosure relates to actuatable downhole tools including slideable sleeves for providing selectable access to open (uncased) and cased wellbores during completion, wellbore servicing, and production operations, such as hydraulically fracturing open and cased wellbores and perforating cased wellbores. The disclosure also relates to tools for selectively actuating slideable sleeves of downhole tools for providing selectable access to open and cased wellbores in wellbore servicing and production operations. Further, the disclosure regards tools for hydraulically fracturing a subterranean formation from multiple zones of a wellbore extending through the formation. The disclosure also relates to tools for selectably perforating components of a well string in preparation for hydraulically fracturing a subterranean formation.

Hydraulic fracturing and stimulation may improve the flow of hydrocarbons from one or more production zones of a wellbore extending into a subterranean formation. Particularly, formation stimulation techniques such as hydraulic fracturing may be used with deviated or horizontal wellbores that provide additional exposure to hydrocarbon bearing formations, such as shale formations. The horizontal wellbore includes a vertical section extending from the surface to a "heel" where the wellbore transitions to a horizontal or deviated section that extends horizontally through a hydrocarbon bearing formation, terminating at a "toe" of the horizontal section of the wellbore.

An array of completion strategies and systems that incorporate hydraulic fracturing operations have been developed to economically enhance production from subterranean formations. In particular, a "plug and perf" completion strategy has been developed that includes pumping a bridge plug tethered through a wellbore (typically having a cemented liner) along with one or more perforating tools to a desired zone near the toe of the wellbore. The plug is set and the zone is perforated using the perforating tools. Subsequently, the tools are removed and high pressure fracturing fluids are pumped into the wellbore and directed against the formation by the set plug to hydraulically fracture the formation at the selected zone through the completed perforations. The process may then be repeated moving in the direction of the heel of the horizontal section of the wellbore (i.e., moving "bottom-up"). Thus, although plug and perf operations provide for enhanced flow control into the wellbore and the creation of a large number of discrete production zones, extensive time and a high volume of fluid is required to pump down and retrieve the various tools required to perform the operation.

Another completion strategy incorporating hydraulic fracturing includes ball-actuated sliding sleeves (also known as "frac sleeves") and isolation packers run inside of a liner or in an open hole wellbore. Particularly, this system includes ported sliding sleeves installed in the wellbore between isolation packers on a single well string. The isolation packers seal against the inner surface of the wellbore to segregate the horizontal section of the wellbore into a plurality of discrete production zones, with one or more sliding sleeves disposed in each production zone. A ball is pumped into the well string from the surface until it seats within the sliding sleeve nearest the toe of the horizontal section of the wellbore. Hydraulic pressure acting against the ball causes hydraulic pressure to build behind the seated ball, causing the sliding sleeve to shift into an open position to hydraulically fracture the formation at the production zone of the actuated sliding sleeve via the high pressure fluid pumped into the well string.

The process may be subsequently repeated moving towards the heel of the horizontal section of the wellbore (i.e., moving "bottom-up") using progressively larger-sized balls to actuate the remaining sliding sleeves nearer the heel of the horizontal section of the wellbore. The balls and ball seats of the sliding sleeves may be drilled out using coiled tubing. The use of sliding sleeves and isolation packers disposed along a well string may streamline the hydraulic fracturing operation compared with the plug-and-perf system, but the use of varying size balls and ball seats to actuate the plurality of sliding sleeves may limit the total number of production zones while restricting the flow of fluid to the formation during fracturing, necessitating the use of high pressure and low viscosity fluids to provide adequate flow rates to the formation. Moreover, the use of multiple balls of varying sizes may also complicate the fracturing operation and increase the possibility of issues in performing the operation, such as balls getting stuck during pumping and failing to successfully actuate their intended sliding sleeve.

SUMMARY OF THE DISCLOSURE

An embodiment of a valve for use in a wellbore comprises a housing comprising a housing port, a slidable closure member disposed in a bore of the housing and comprising a closure member port, and a seal disposed in the housing, wherein the closure member comprises a first position in the housing where fluid communication is provided between the closure member port and the housing port, and a second position axially spaced from the first position where fluid communication between the closure member port and the housing port is restricted, wherein, in response to sealing of the bore of the housing by an obturating member sealingly engaging the seal, the closure member is configured to actuate from the first position to the second position. In some embodiments, the closure member comprises a sleeve. In some embodiments, the closure member comprises a third position in the housing axially spaced from the first position and the second position where fluid communication between the closure member port and the housing port is restricted. In certain embodiments, the first position of the closure member is disposed axially between the second position and the third position. In certain embodiments, in response to sealing of the bore of the housing by the obturating member sealingly engaging the seal, the closure member is configured to actuate from the third position to the first position. In some embodiments, the valve further comprises a first shoulder configured to physically engage the obturating member such that the obturating member maintains sealing engagement with the seal as the closure member is actuated from the first position to the second position. In some embodiments, the first shoulder extends radially inwards from an inner surface of the housing. In certain embodiments, the first shoulder extends radially inwards from an inner surface of the closure member. In certain embodiments, an inner surface of the housing comprises the seal. In some embodiments, an inner surface of the closure member comprises the seal. In some embodiments, the valve further comprises a first lock ring disposed radially between the housing and the closure member, wherein the first lock ring comprises a first position permitting relative axial movement between the housing and the closure member, and a second position radially spaced from the first position that restricts relative axial movement between the housing and the closure member in both a first direction and a second direction opposite the first direction. In certain embodiments, the closure member comprises a radially translatable actuator configured to actuate the first lock ring between the first position and the second position. In some embodiments, when the first lock ring is disposed in the second position, the closure member is locked in the first position. In some embodiments, the valve further comprises a second lock ring disposed radially between the housing and the closure member and axially spaced from the first lock ring, wherein the second lock ring comprises a first position permitting relative axial movement between the housing and the closure member, and a second position radially spaced from the first position that restricts relative axial movement between the housing and the closure member in both the first and second directions. In certain embodiments, when the second lock ring is disposed in the second position, the closure member is locked in the second position. In certain embodiments, the valve further comprises a third lock ring disposed radially between the housing and the closure member and axially spaced from the first lock ring and the second lock ring, wherein the third lock ring comprises a first position permitting relative axial movement between the housing and the closure member, and a second position radially spaced from the first position that restricts relative axial movement between the housing and the closure member in both the first and second directions, wherein the closure member comprises a third position in the housing axially spaced from the first position and the second position where fluid communication between the closure member port and the housing port is restricted, wherein, when the third lock ring is disposed in the second position, the closure member is locked in the third position.

An embodiment of a valve for use in a wellbore comprises a housing comprising a housing port, and a slidable closure member disposed in a bore of the housing and comprising closure member port, wherein the closure member comprises a first position in the housing where fluid communication is provided between the closure member port and the housing port, a second position axially spaced from the first position where fluid communication between the closure member port and the housing port is restricted, and a third position axially spaced from the first position and the second position where fluid communication between the closure member port and the housing port is restricted. In some embodiments, an inner surface of the closure member comprises a first shoulder and a second shoulder axially spaced from the first shoulder, in response to physical engagement between an obturating member and the first shoulder, relative axial movement between the obturating member and the closure member is restricted in a first direction, and in response to physical engagement between the obturating member and the second shoulder, relative axial movement between the obturating member and the closure member is restricted in a second direction opposite the first direction. In some embodiments, the inner surface of the closure member comprises a sealing surface disposed axially between the first shoulder and the second shoulder, and in response to sealing of the bore of the housing by the obturating member sealingly engaging the sealing surface, the closure member is configured to actuate from the first position to the second position. In certain embodiments, the first position of the closure member is disposed axially between the second position and the third position. In certain embodiments, the valve further comprises a sealing surface disposed in the bore of the housing, wherein, in response to sealing of the bore of the housing by the obturating member sealingly engaging the sealing surface, the closure member is configured to actuate from the third position to the first position, wherein an inner surface of the housing comprises a first shoulder, wherein, when the closure member is actuated from the third position to the first position, the first shoulder is configured to physically engage the obturating member to prevent actuation of the closure member from the first position to the second position. In some embodiments, the valve further comprises a first shear groove extending laterally through the housing, a first pair of shear pins disposed in the first shear groove, wherein the first pair of shear pins is biased into physical engagement by a first pair of biasing members. In some embodiments, the valve further comprises a pin slot extending axially along an inner surface of the housing, wherein the pin slot intersects the first shear groove, and an engagement pin extending from an outer surface of the closure member, wherein the engagement pin is disposed in the pin slot, wherein, in response to the application of an axial force to the closure member, the closure member is actuated from the first position to the second position and the engagement pin shears a terminal end of each shear pin of the first pair of shear pins. In certain embodiments, in response to the shearing of the terminal end of each shear pin of the first pair of shear pins, the first pair of biasing members displaces the first pair of shear pins into physical engagement. In certain embodiments, the valve further comprises a second shear groove extending laterally through the housing and axially spaced from the first shear groove, and a second pair of shear pins disposed in the second shear groove, wherein the second pair of shear pins are biased into physical engagement by a second pair of biasing members, wherein, in response to the application of the axial force to the closure member, the closure member is actuated from the third position to the first position and the engagement pin shears a terminal end of each shear pin of the second pair of shear pins. In some embodiments, the valve further comprises a seal cap comprising a bore disposed in an inner surface of the housing, wherein the seal cap comprises a sealing surface and the bore of the seal cap is in fluid communication with the housing port, and an elongate seal member disposed on an outer surface of the closure member, wherein the elongate seal member comprises a sealing surface, wherein, in response to physical engagement between the sealing surfaces of the seal cap and the elongate seal member, a metal-to-metal seal is formed between the seal cap and the seal member. In certain embodiments, the elongate seal member does not extend around the circumference of the closure member. In certain embodiments, the closure member comprises a sleeve.

An embodiment of a flow transported obturating tool for actuating a valve in a wellbore comprises a housing comprising a first engagement member and a second engagement member, wherein the first and second engagement members each comprise an unlocked and a locked position, and a core disposed in the housing, wherein the core is configured to actuate both the first engagement member and the second engagement member between the unlocked and locked positions, wherein, when the first engagement member is in the locked position, the first engagement member is configured to locate the obturating tool at a predetermined axial position in the valve, wherein, when the second engagement member is in the locked position, the second engagement member is configured to shift the valve from an open position to a closed position. In some embodiments, the obturating tool further comprises a seal disposed in the outer surface of the core and in sealing engagement with an inner surface of the housing, wherein, in response to the application of a fluid pressure to a first end of the core, the core is configured to actuate both the first engagement member and the second engagement member between the unlocked and locked positions. In some embodiments, the first engagement member comprises a first key comprising a radially expanded position corresponding to the locked position and a radially retracted position corresponding to the unlocked position, the second engagement member comprises a second key comprising a radially expanded position corresponding to the locked position and a radially retracted position corresponding to the unlocked position, the core comprises a first cam surface extending radially outwards from an outer surface of the core, the core comprises a first position in the housing and a second position axially spaced from the first position, and when the core is disposed in the first position, the first key is disposed in the radially expanded position and is physically engaged by the first cam surface. In certain embodiments, the second key is axially spaced from the first key, the core comprises a second cam surface extending radially outwards from the outer surface of the core, in response to displacement of the core from the first position to the second position, the second key is physically engaged by the second cam surface and displaced from the radially retracted position to the radially expanded position. In certain embodiments, when the core is disposed in the second position, the first key is disposed in the radially retracted position within a first groove extending into the outer surface of the core. In certain embodiments, when the first key is disposed in the radially expanded position, the first key is configured to physically engage a shoulder of the valve to restrict relative axial movement between the obturating tool and the valve. In some embodiments, the housing comprises a third engagement member comprising an unlocked position and a locked position, the core is configured to actuate the third engagement member between the unlocked and locked positions, and when the third engagement member is in the locked position, the third engagement member is configured to restrict the obturating tool from being displaced uphole relative to the valve. In some embodiments, the third engagement member comprises a third key comprising a radially expanded position corresponding to the locked position and a radially retracted position corresponding to the unlocked position, wherein the core comprises a third position in the housing that is axially spaced from the first position and the second position, wherein, when the core is disposed in the third position, the third key is disposed in the radially expanded position and is physically engaged by a third cam surface extending radially outwards from the outer surface of the core. In some embodiments, the second position of the core in the housing is disposed axially between the first and third positions of the core. In certain embodiments, the obturating tool further comprises a carrier disposed radially between the housing and the core, wherein the third engagement member comprises a third key comprising a radially expanded position corresponding to the locked position and a radially retracted position corresponding to the unlocked position, wherein the carrier is configured to actuate the third key between the radially expanded position and the radially retracted position in response to axial displacement of the carrier in the housing. In certain embodiments, the obturating tool further comprises a biasing member configured to bias the core towards the first position. In certain embodiments, the biasing member comprises a pin slidably disposed in an atmospheric chamber, wherein the pin is coupled to the housing and the atmospheric chamber is coupled to the core, and a seal coupled to an outer surface of the pin and in sealing engagement with an inner surface of the atmospheric chamber to seal the atmospheric chamber, wherein the atmospheric chamber is filled with a compressible fluid. In certain embodiments, a volume of the atmospheric chamber increases in response to the displacement of the core from the first position to the second position. In certain embodiments, the obturating tool further comprises an actuation assembly coupled to a lower end of the core, wherein the actuation assembly is configured to control the displacement of the core between the first position and the second position. In some embodiments, the actuation assembly comprises a solenoid valve, wherein, when the core is disposed in the first position, the solenoid valve is disposed in the closed position, and an electronics module in signal communication with the solenoid valve, and wherein the electronics module is configured to actuate the solenoid valve from the closed position to the open position to displace the core from the first position to the second position. In some embodiments, the electronics module comprises a timer configured to be initiated for a predetermined period of time in response to the application of a threshold fluid pressure applied to a first end of the core, and the electronics module is configured to actuate the solenoid valve from the closed position to the open position once the timer reaches zero. In some embodiments, the actuation assembly comprises a valve body coupled to a lower end of the core and comprising a first seal in physical engagement with an inner surface of the housing, and a groove disposed in the inner surface of the housing, wherein the groove is configured to provide fluid communication across the first seal of the valve body when the groove axially overlaps the first seal, wherein the groove of the housing axially overlaps with the first seal of the valve body when the core is disposed in the first position, wherein, when the core is disposed in the second position, the first seal is axially spaced from the groove in the housing. In certain embodiments, when the core is disposed in the second position, the first seal sealingly engages the inner surface of the housing to form a hydraulic lock within a sealed chamber disposed in the housing. In certain embodiments, the actuation assembly further comprises a valve assembly in fluid communication with the chamber of the housing, wherein, in response to the application of a threshold fluid pressure applied to the upper end of the core, the valve assembly is actuated from a closed position to an open position eliminating the hydraulic lock formed in the chamber of the housing. In certain embodiments, the obturating tool further comprises a seal disposed in an outer surface of the housing, wherein the seal of the housing is configured to sealingly engage an inner surface of the valve. In some embodiments, the obturating tool further comprises a lock ring disposed radially between the housing and the core, wherein the lock ring comprises a first position permitting relative axial movement between the housing and the core, and a second position radially spaced from the first position that restricts relative axial movement between the housing and the core, and a radially translatable bore sensor disposed in the housing and configured to actuate the lock ring between the first and second positions. In certain embodiments, the core comprises a first segment coupled to a second segment at a shearable coupling, wherein, in response to the application of a force to a first end of the first segment of the core, the shearable coupling is configured to shear to permit relative axial movement between the first segment of the core and the second segment of the core.

An embodiment of a method for orientating a perforating tool in a wellbore comprises providing an orienting sub in the wellbore, providing a perforating tool in the wellbore, and engaging a retractable key of the perforating tool with a helical engagement surface of the orienting sub to rotationally and axially align a charge of the perforating tool with a predetermined axial and rotational location in the wellbore. In some embodiments, the method further comprises retracting the retractable key to allow the perforating tool to pass through the orienting sub. In some embodiments, the method further comprises biasing the retractable key of the perforating tool into a radially expanded position to engage the retractable key with the helical engagement surface of the orienting sub. In certain embodiments, the method further comprises engaging the retractable key of the perforating tool with the helical engagement surface of the orienting sub to rotationally and axially align the charge of the perforating tool with an indentation formed on the orienting sub. In certain embodiments, the method further comprises firing the charge through the indentation of the orienting sub to perforate a casing disposed in the wellbore.

BRIEF DESCRIPTION OF THE DRAWINGS

For a more detailed description of embodiments of the invention, reference will now be made to the accompanying drawings, wherein:

FIG. 50B is a schematic, cross-sectional view of a lowermost end of the coiled tubing actuation tool shown in FIGS. 41A-41C in the fifth position;

FIG. 51A is a schematic, cross-sectional view of an uppermost end of the coiled tubing actuation tool shown in FIGS. 41A-41C in a sixth position;

FIG. 51B is a schematic, cross-sectional view of a lowermost end of the coiled tubing actuation tool shown in FIGS. 41A-41C in the sixth position;

FIG. 52A is a schematic, cross-sectional view of an uppermost end of the coiled tubing actuation tool shown in FIGS. 41A-41C in a seventh position;

FIG. 52B is a schematic, cross-sectional view of a lowermost end of the coiled tubing actuation tool shown in FIGS. 41A-41C in the seventh position;

FIG. 53A is a section view of the uppermost end of an embodiment of a flow transported obturating tool for actuating the sliding sleeve valve shown in FIGS. 32A-40 in accordance with principles disclosed herein;

FIG. 53B is a section view of a middle section of the obturating tool shown in FIG. 53A;

FIG. 53C is a section view of a lowermost end of the obturating tool shown in FIG. 53A;

FIG. 53D is a side view of an inner core of the obturating tool shown in FIGS. 53A-53C in accordance with principles disclosed herein;

FIG. 53E is a zoomed-in view of an embodiment of a bore sensor of the obturating tool shown in FIGS. 53A-53C;

FIG. 53F is a zoomed-in view of an embodiment of a lock ring of the obturating tool shown in FIGS. 53A-53C;

FIG. 53G is a schematic, cross-sectional view of an embodiment of the obturating tool shown in FIGS. 53A-53C in a first position;

Figure 53A:
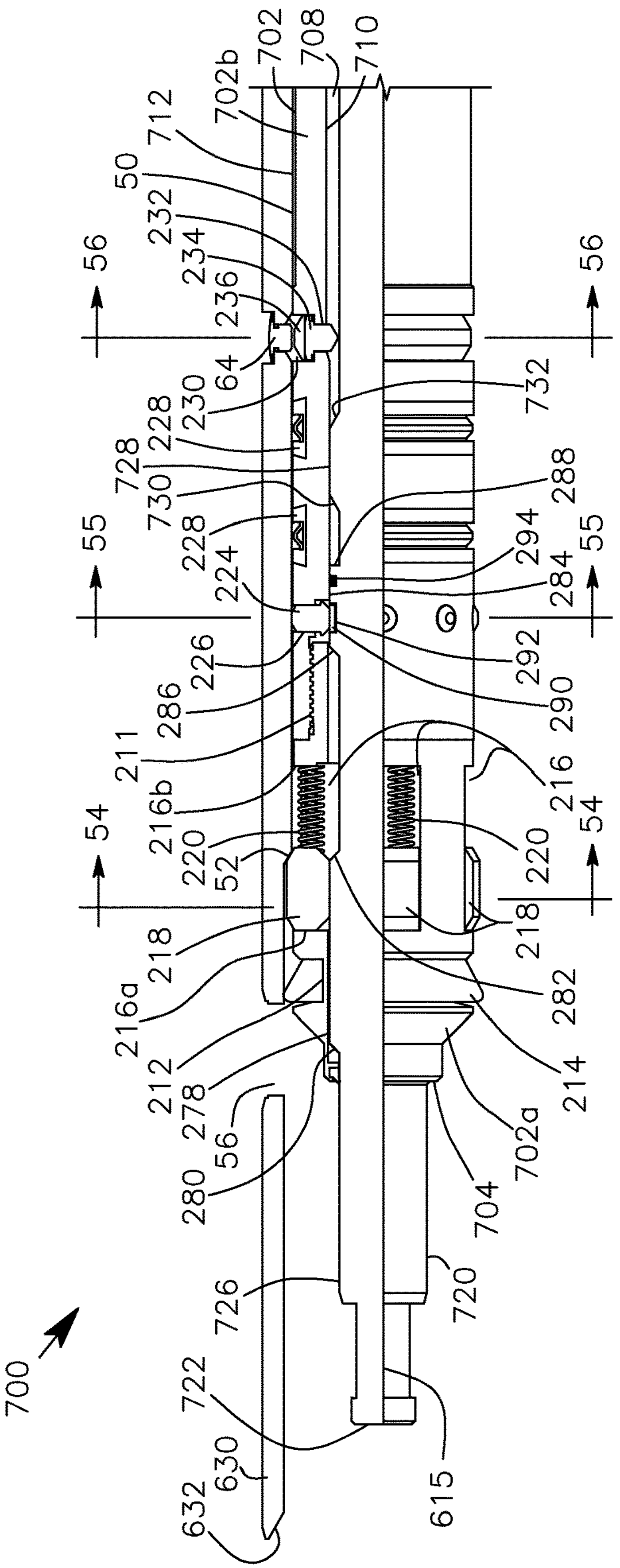
Figure 53B:
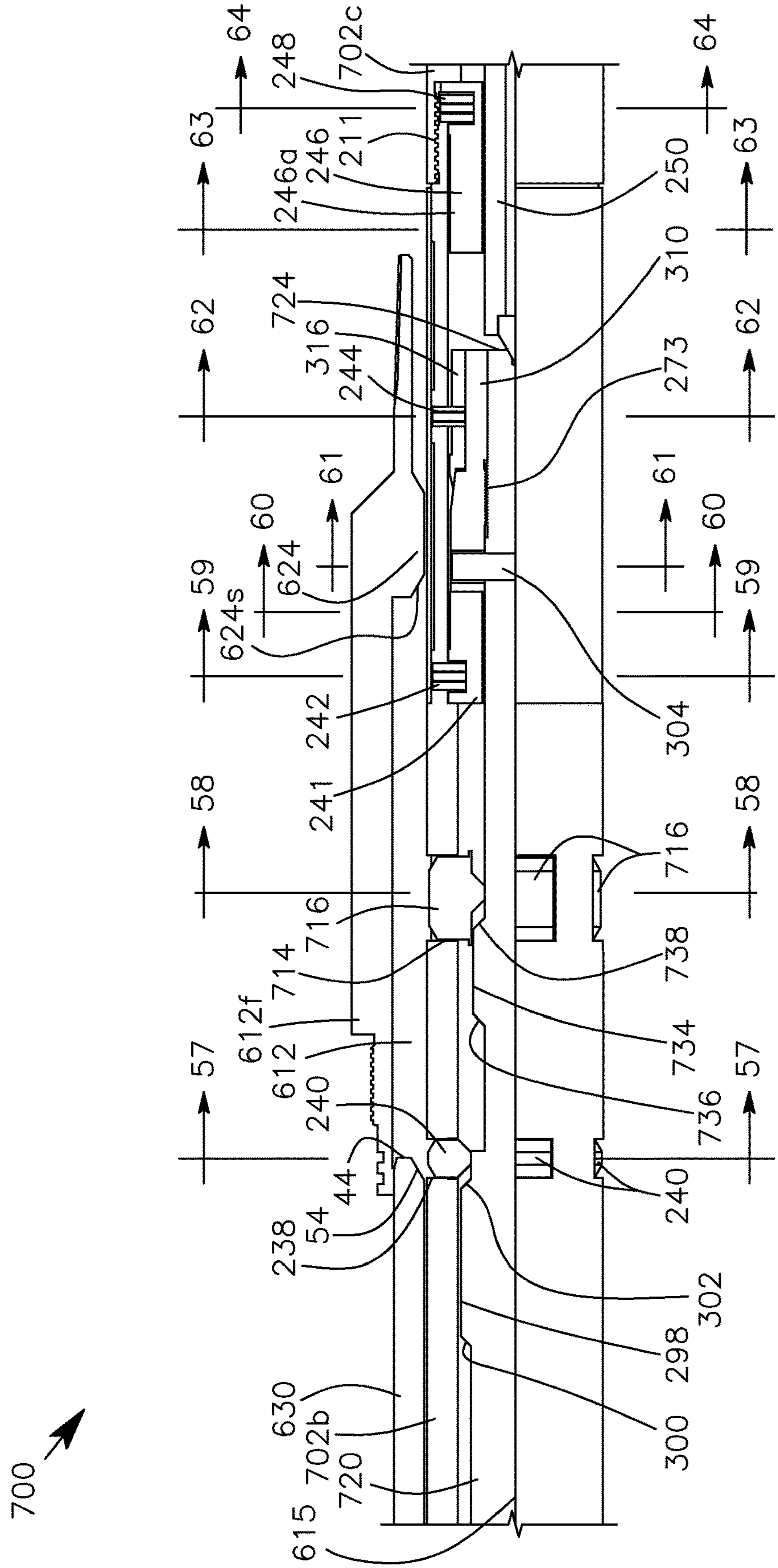
Figure 53C:
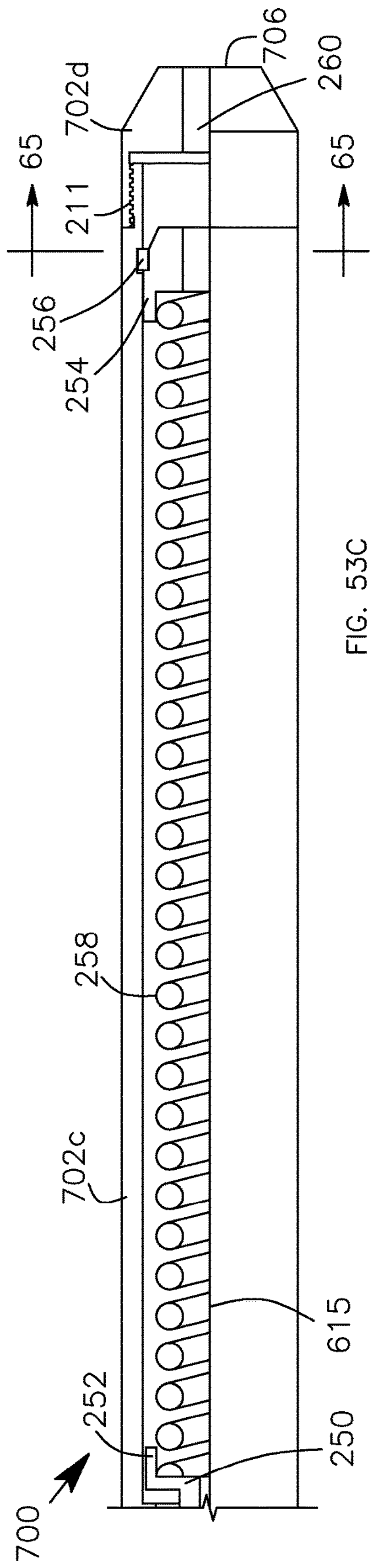
Figure 57:
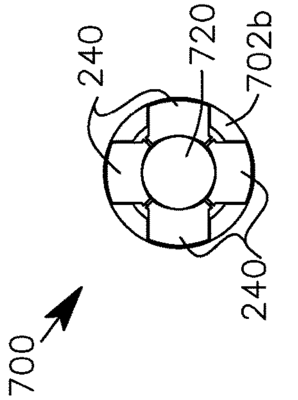
Figure 56:
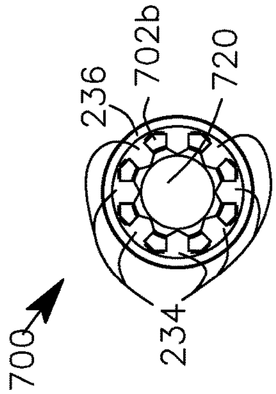
Figure 55:
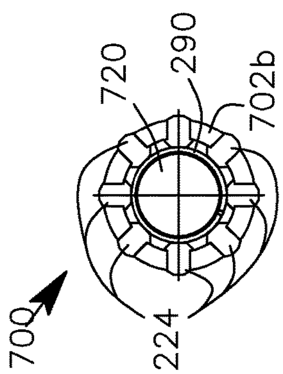
Figure 54:
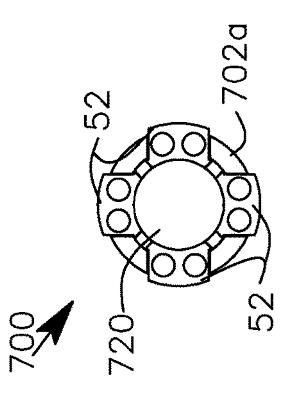
Figure 61:
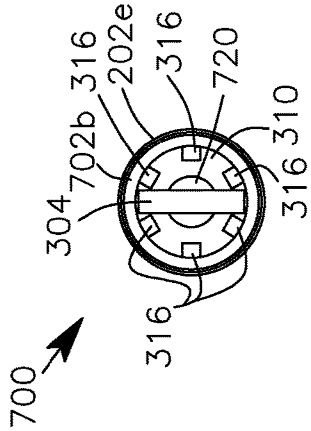
Figure 60:
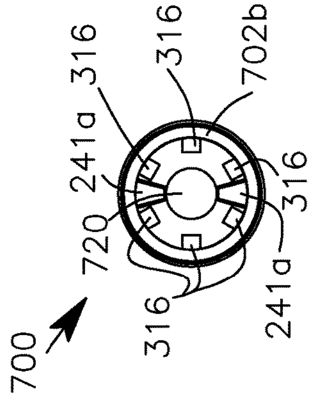
Figure 59:
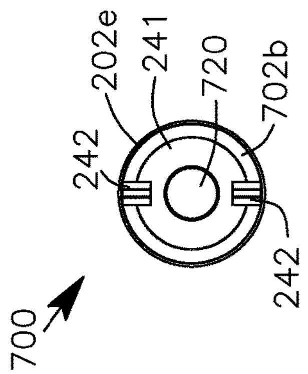
Figure 58:
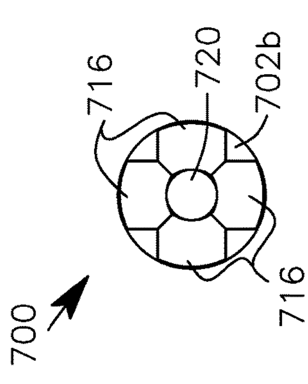
Figures 53G, 53H, 53I, 53J, 53K, 53L:
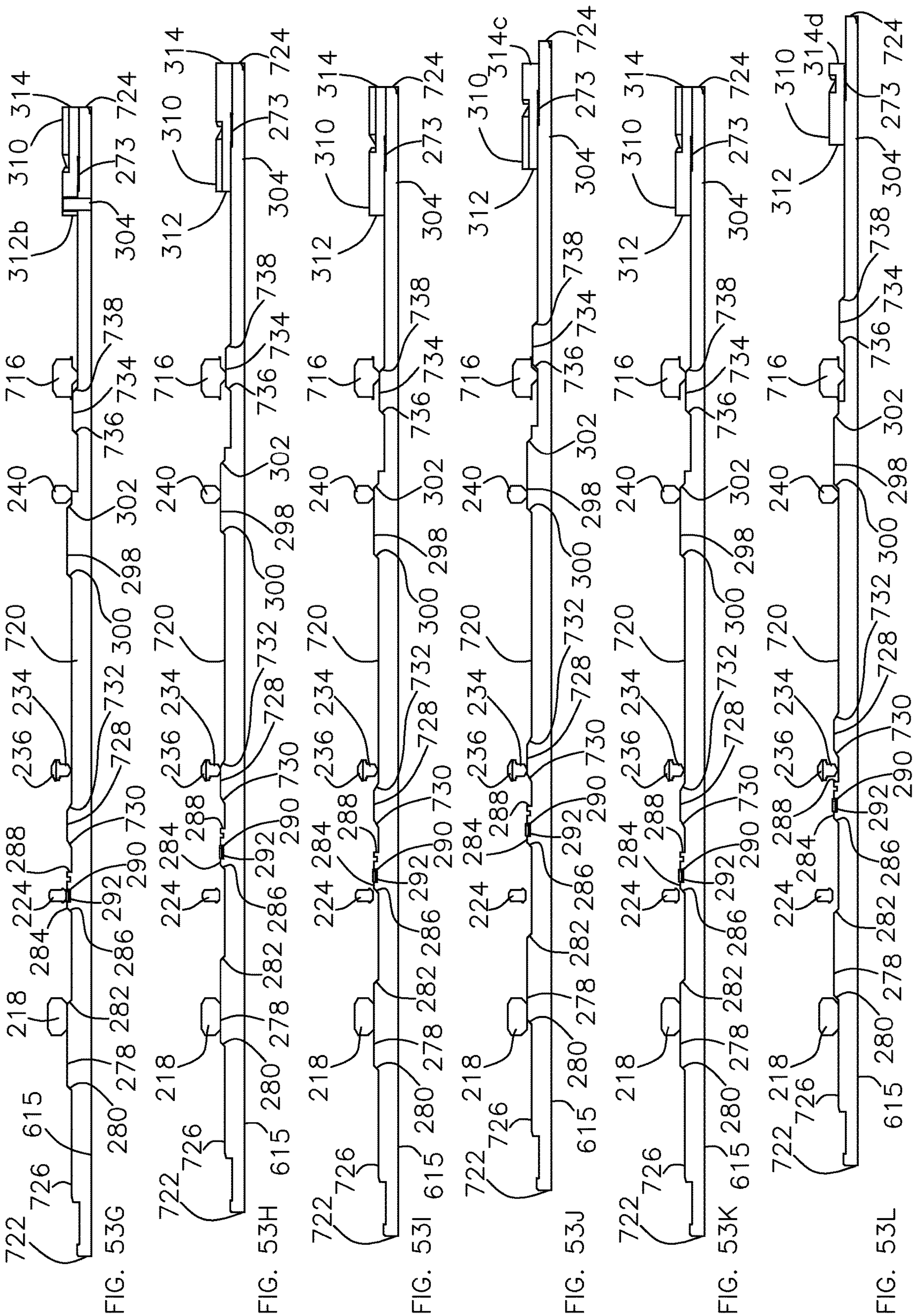
Figure 65:
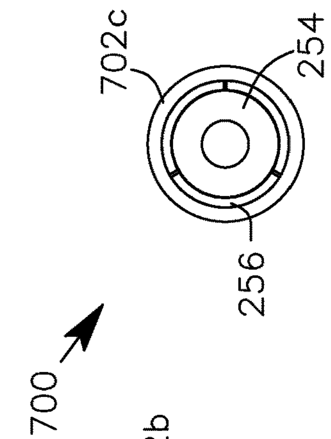
Figure 64:
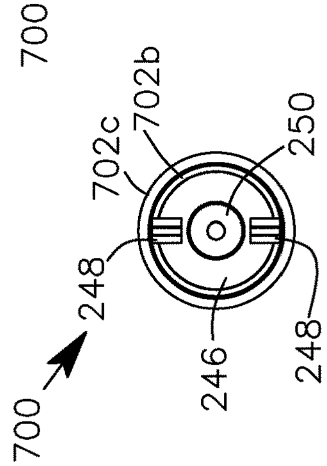
Figure 63:
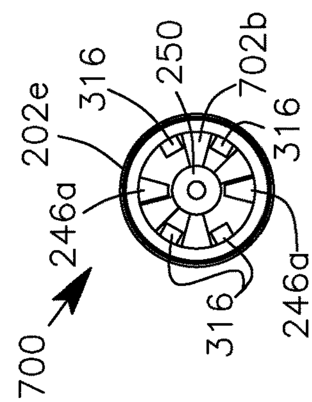
Figure 62:
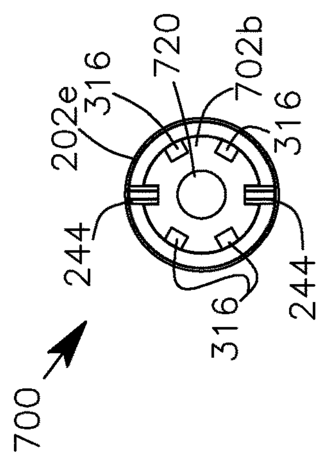
Figure 66A:
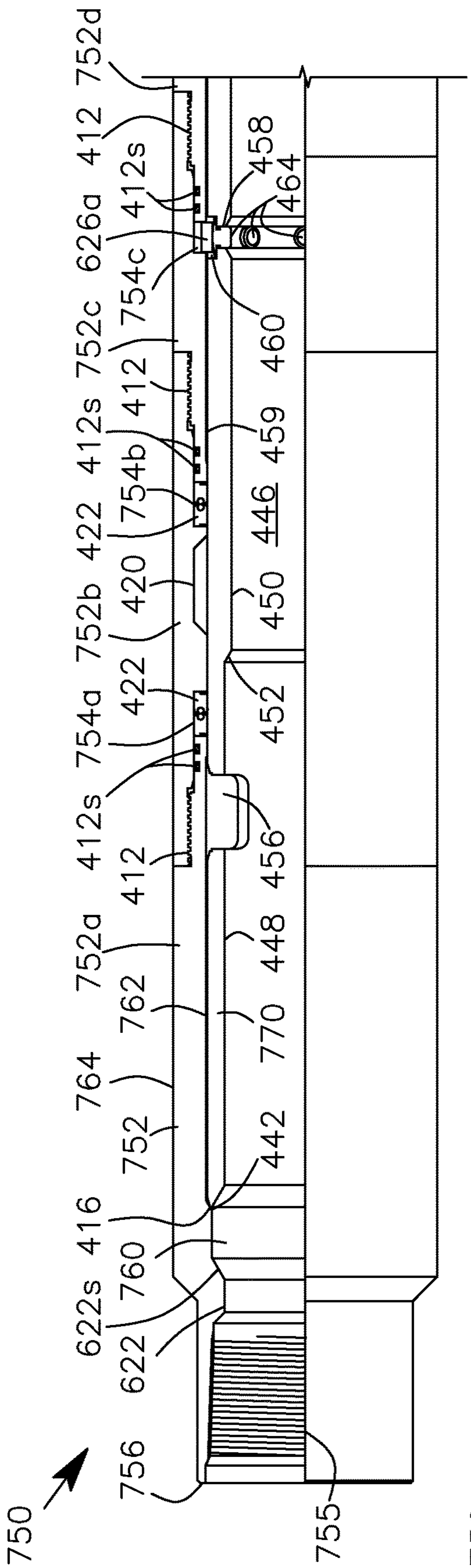
Figure 66B:
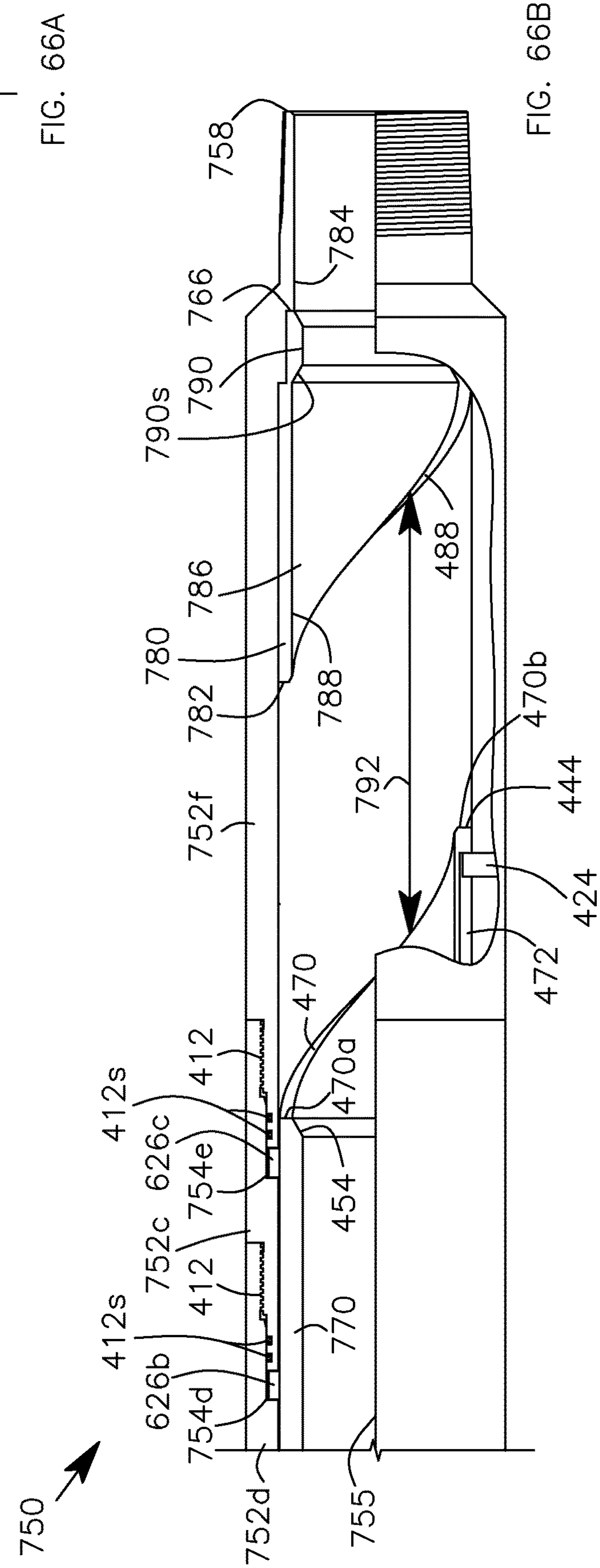
Figure 66E:
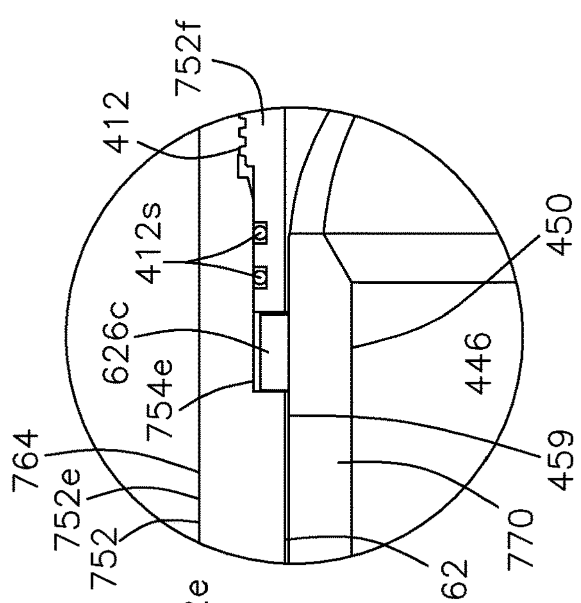
Figure 66D:
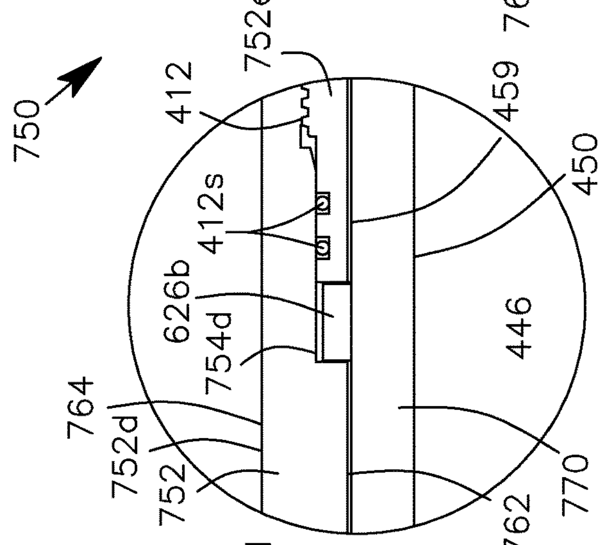
Figure 66C:
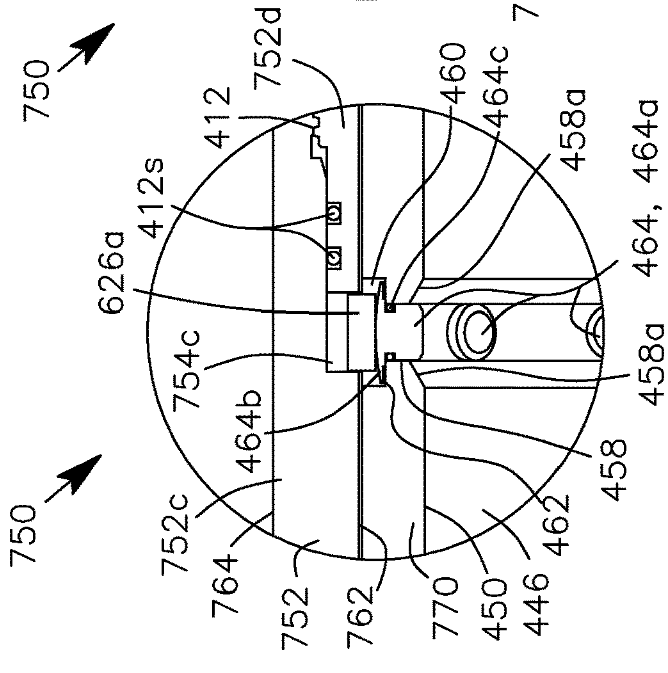
Figure 67A:
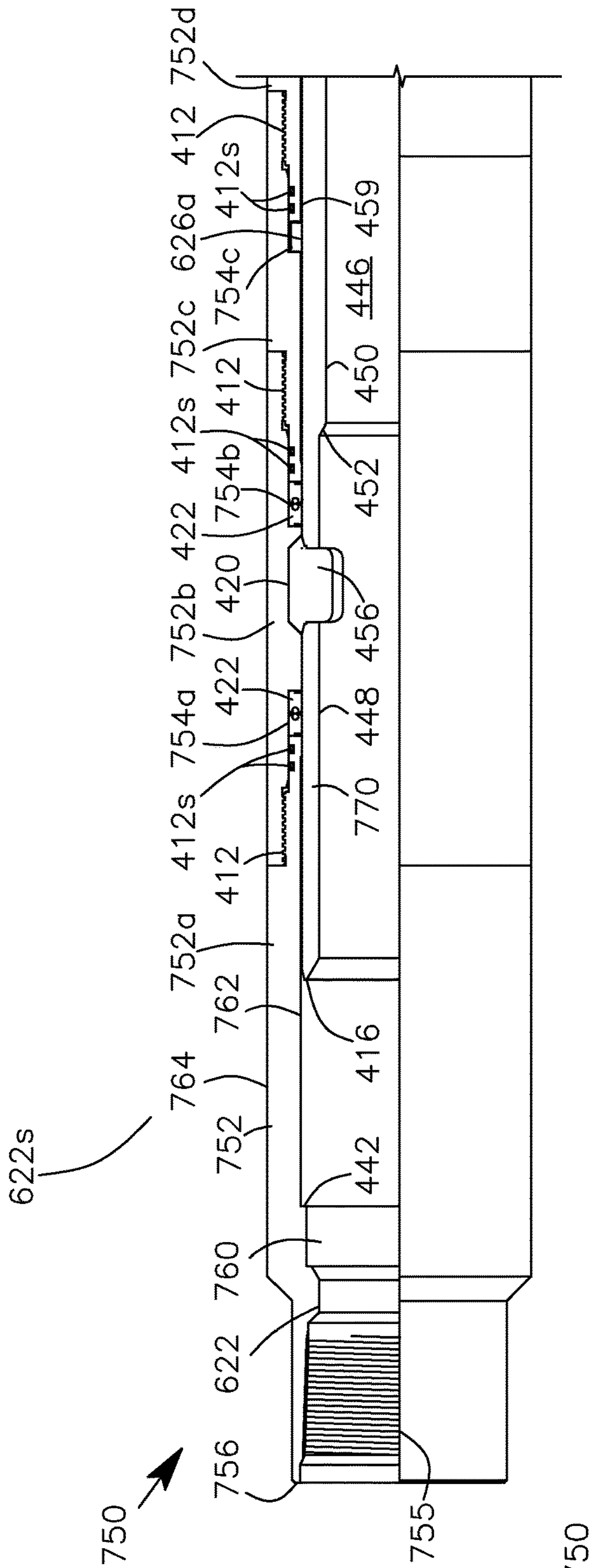
Figure 67B:
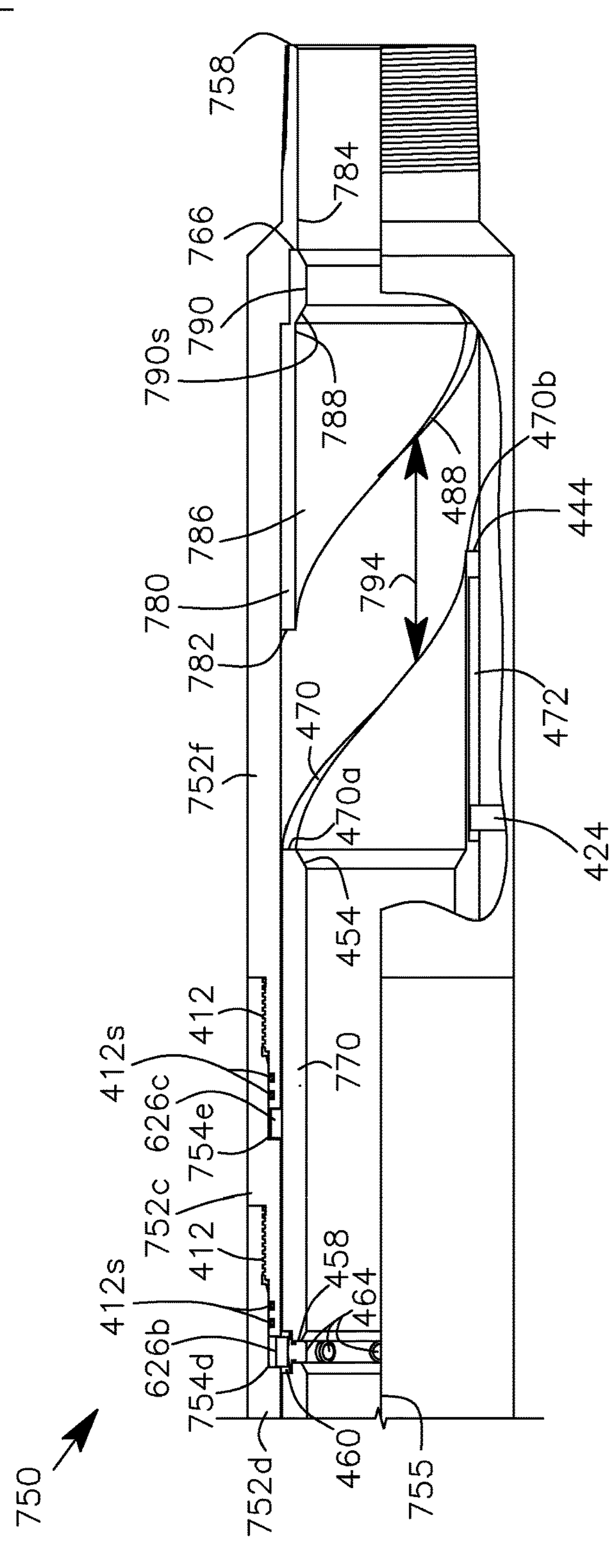
Figures 67C, 67D, 67E:
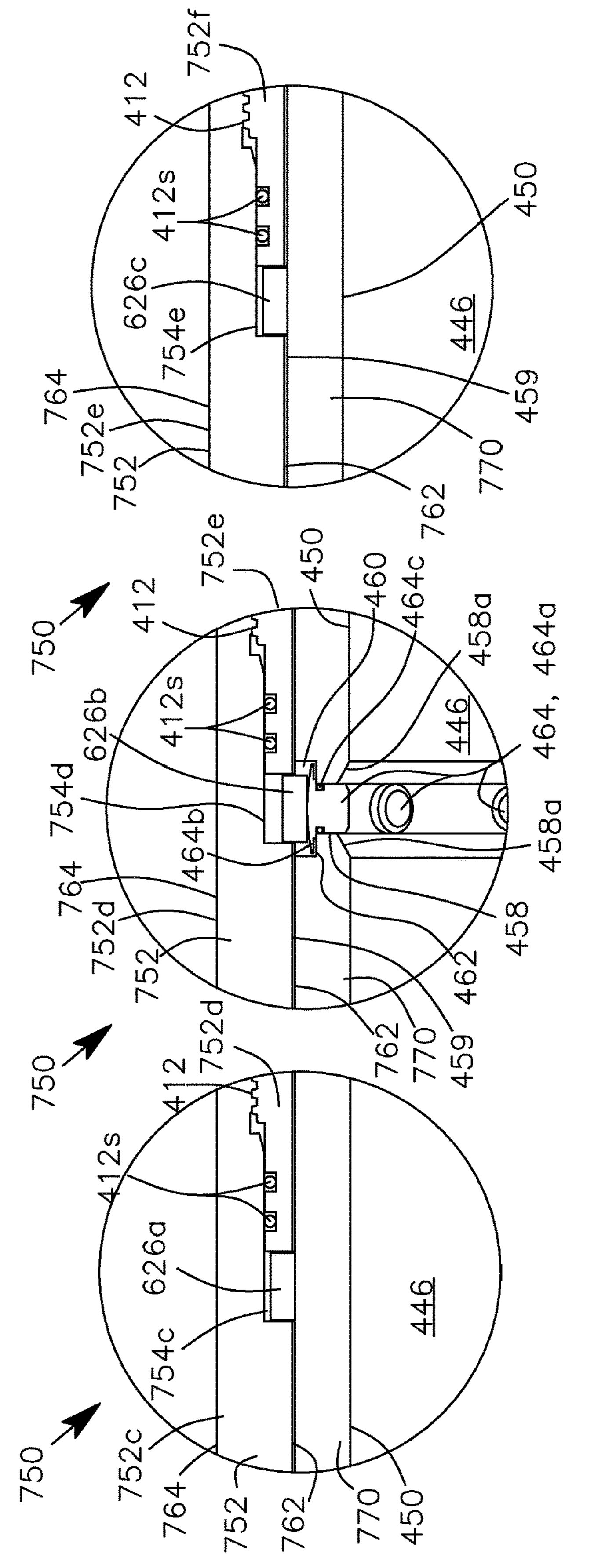
Figures 68A, 68B:
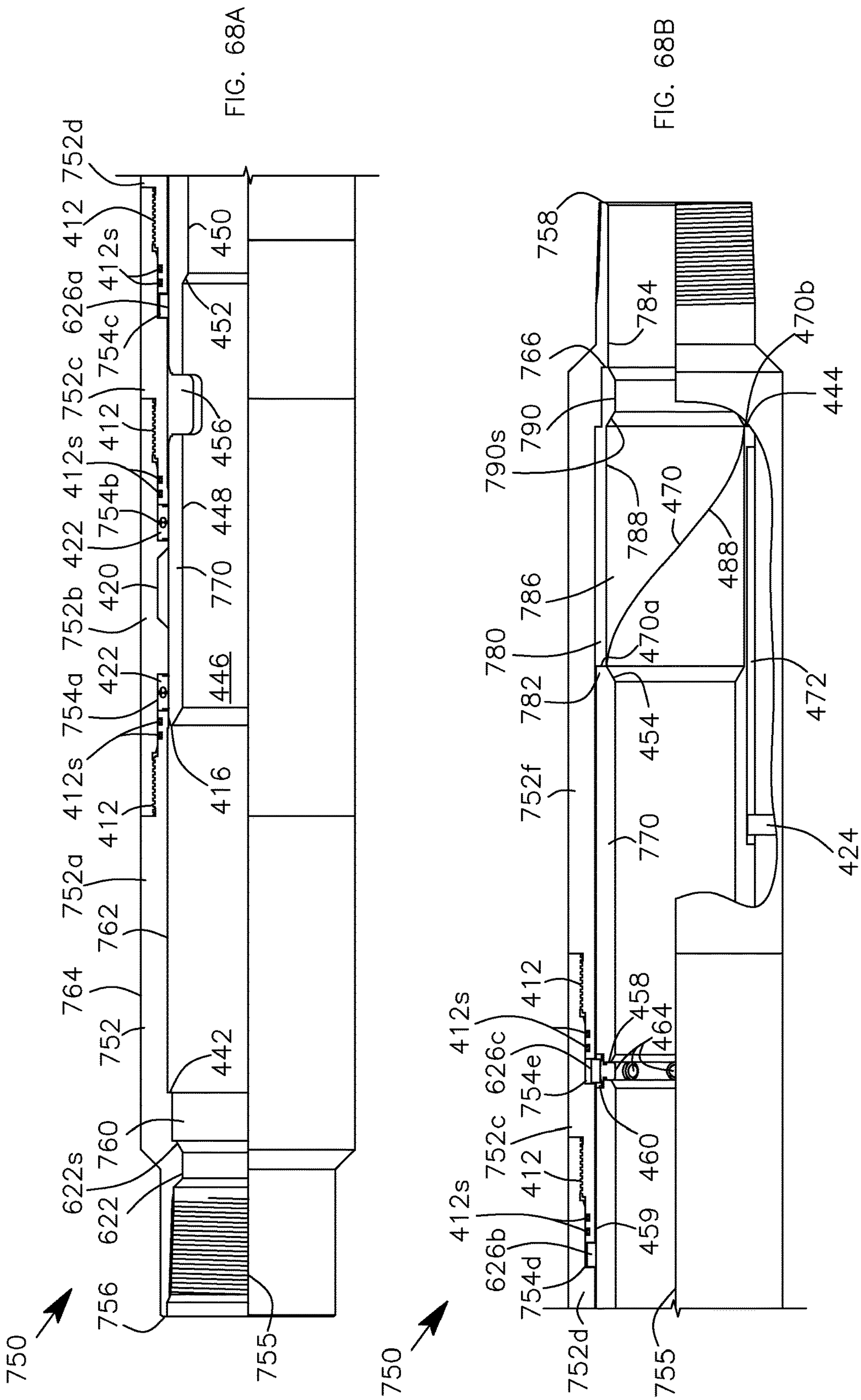
Figures 68C, 68D, 68E:
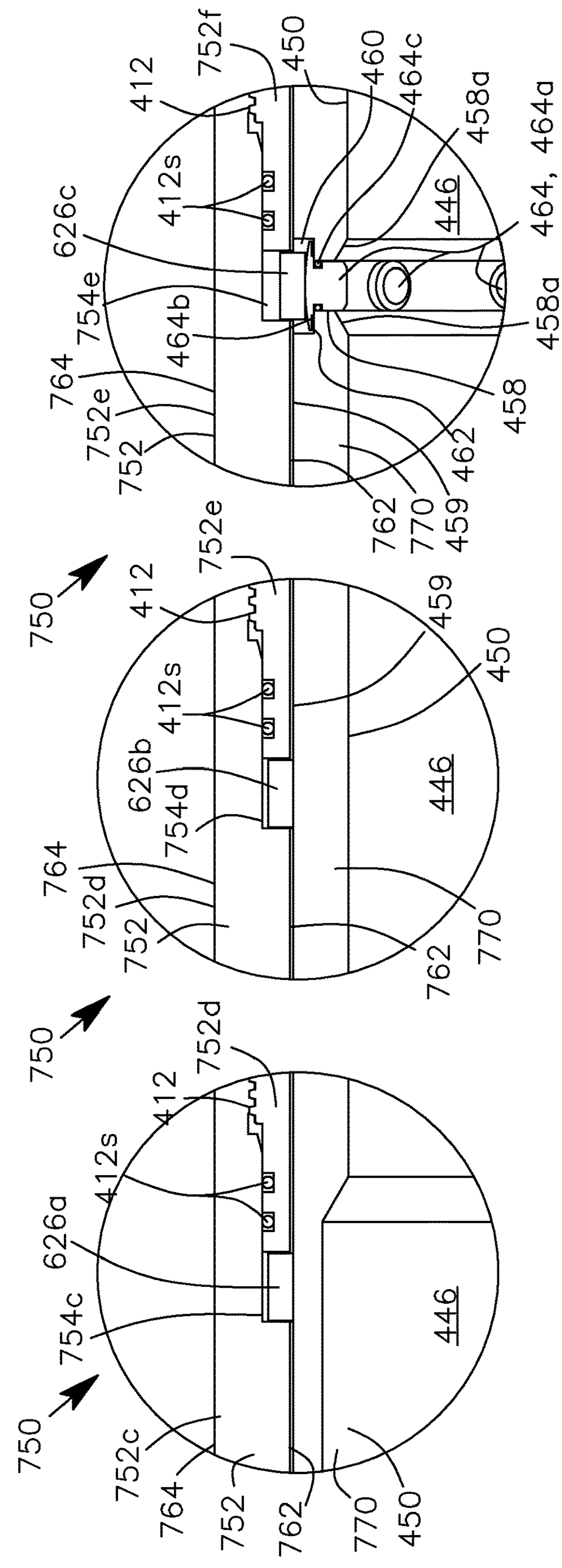
Figure 69A:
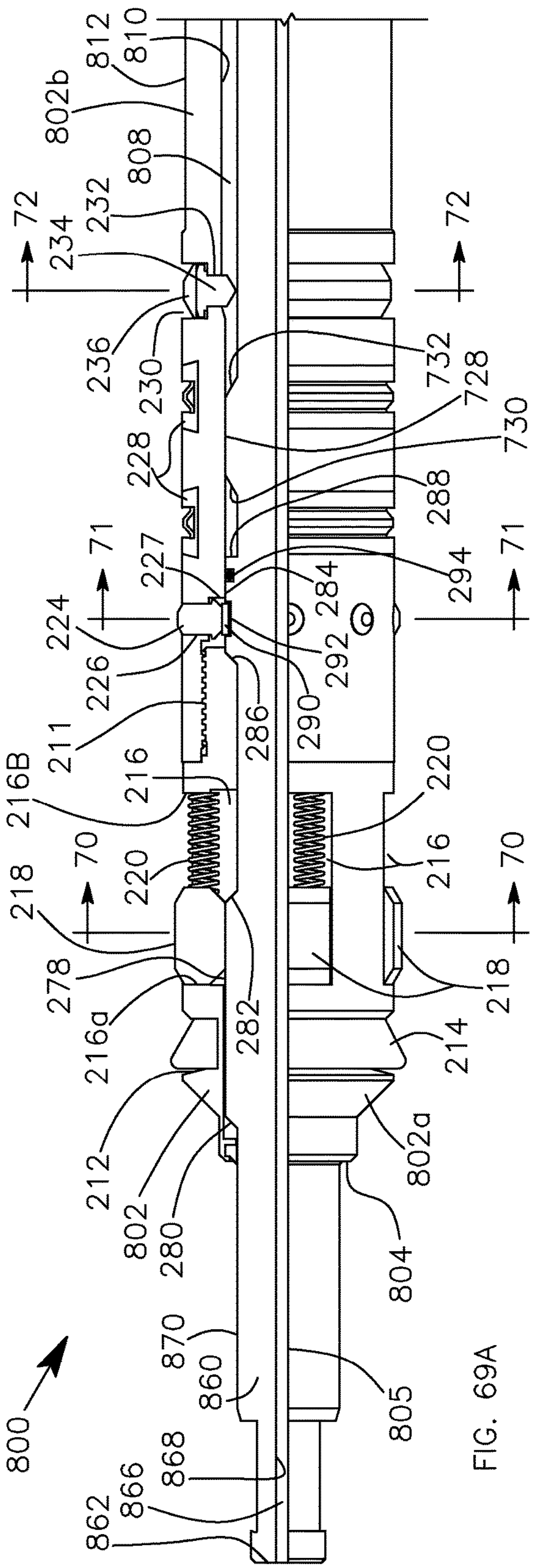
Figure 69B:
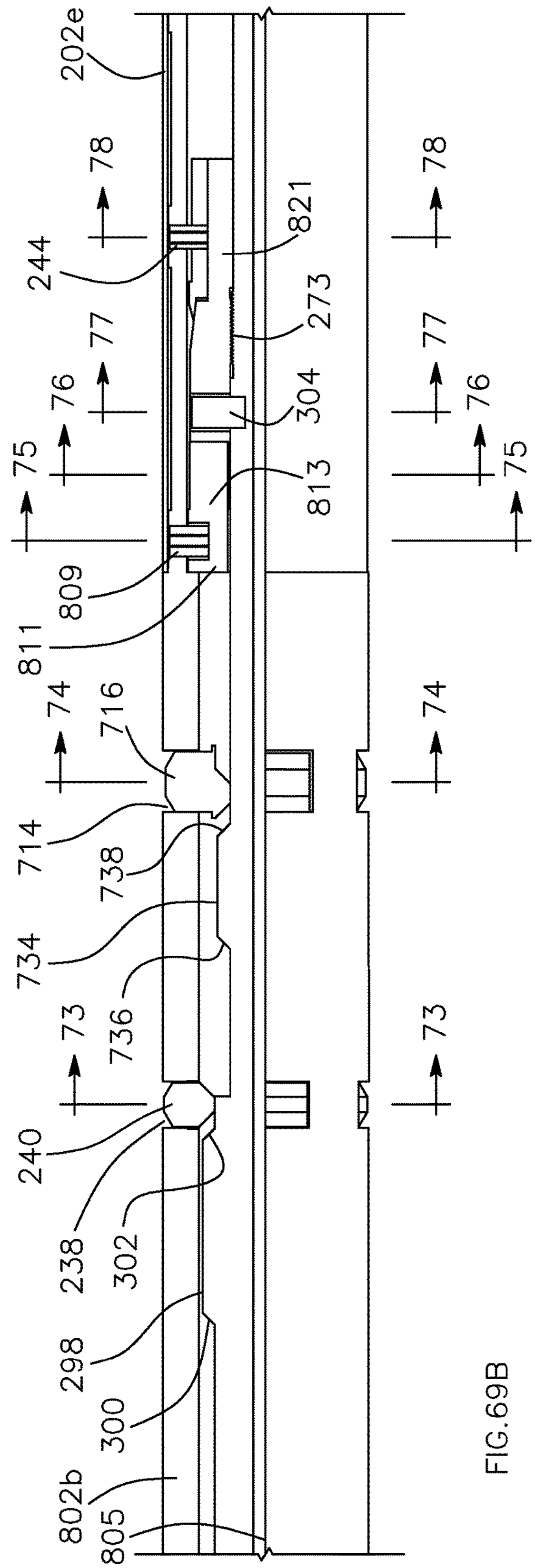
Figures 69C, 69D:
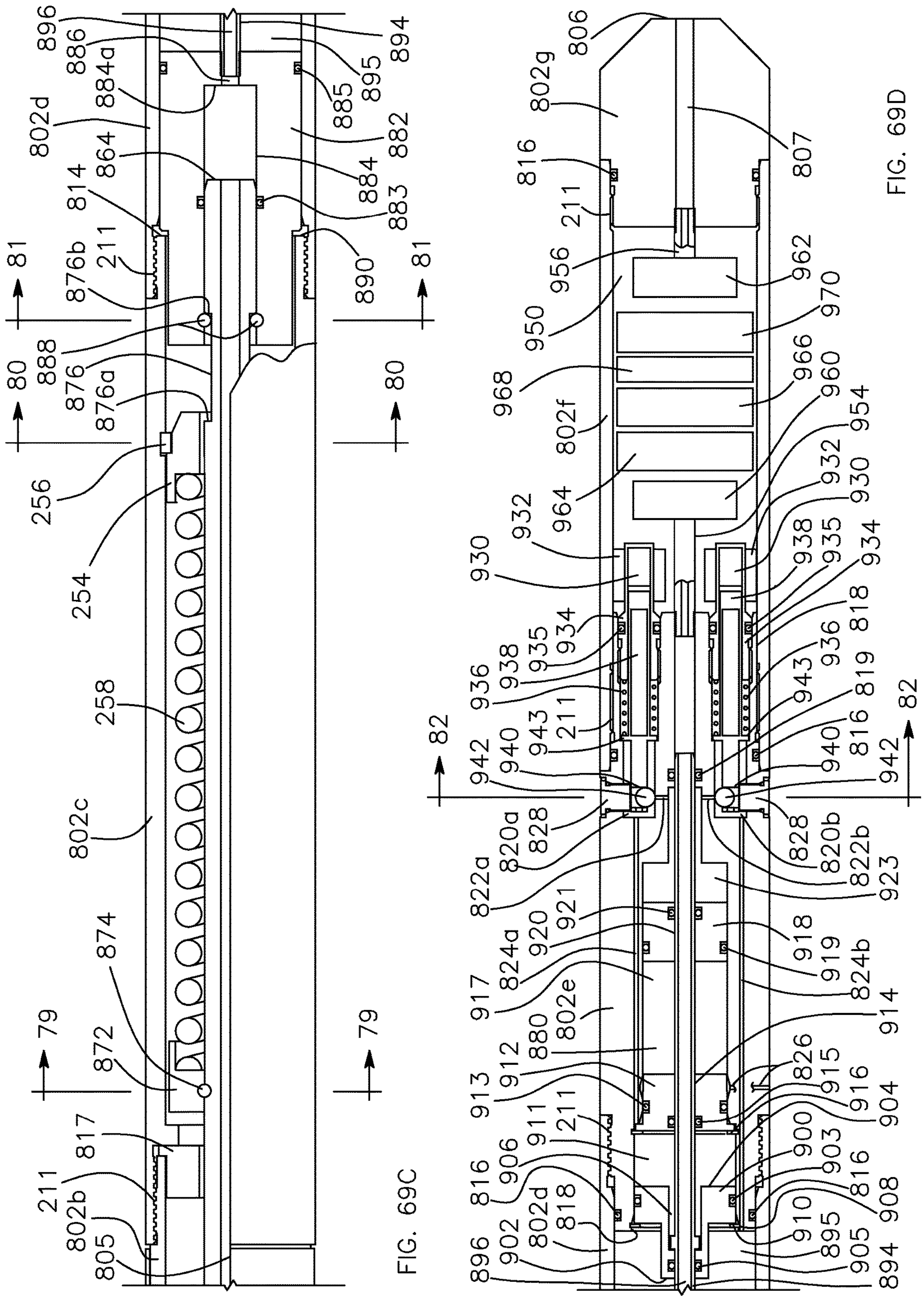
Figure 69F:
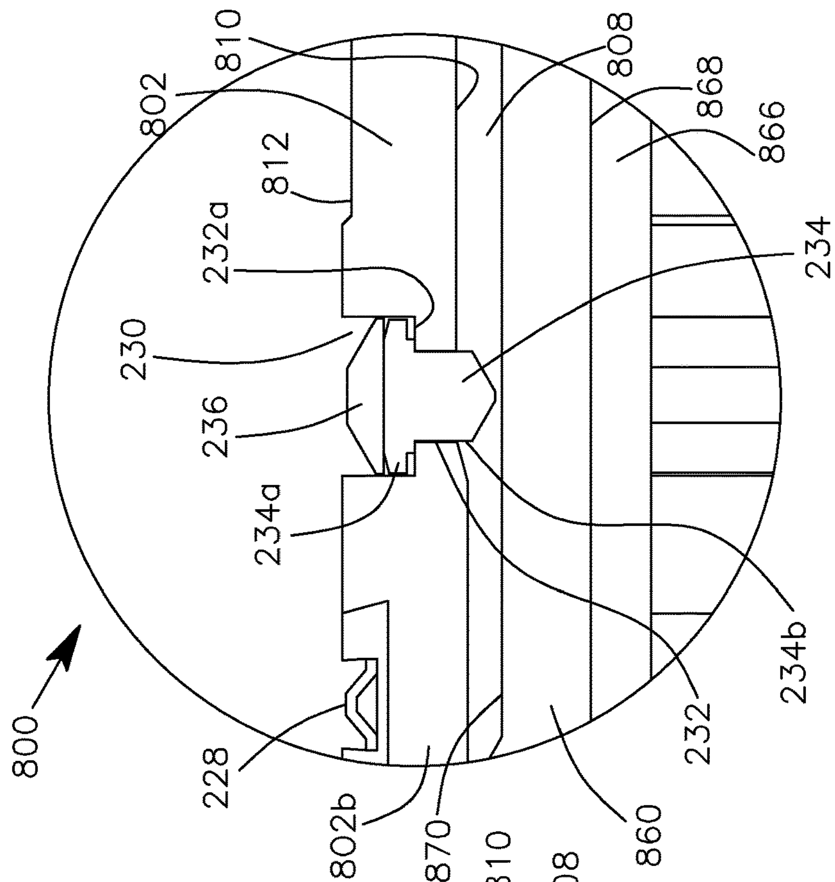
Figure 69E:
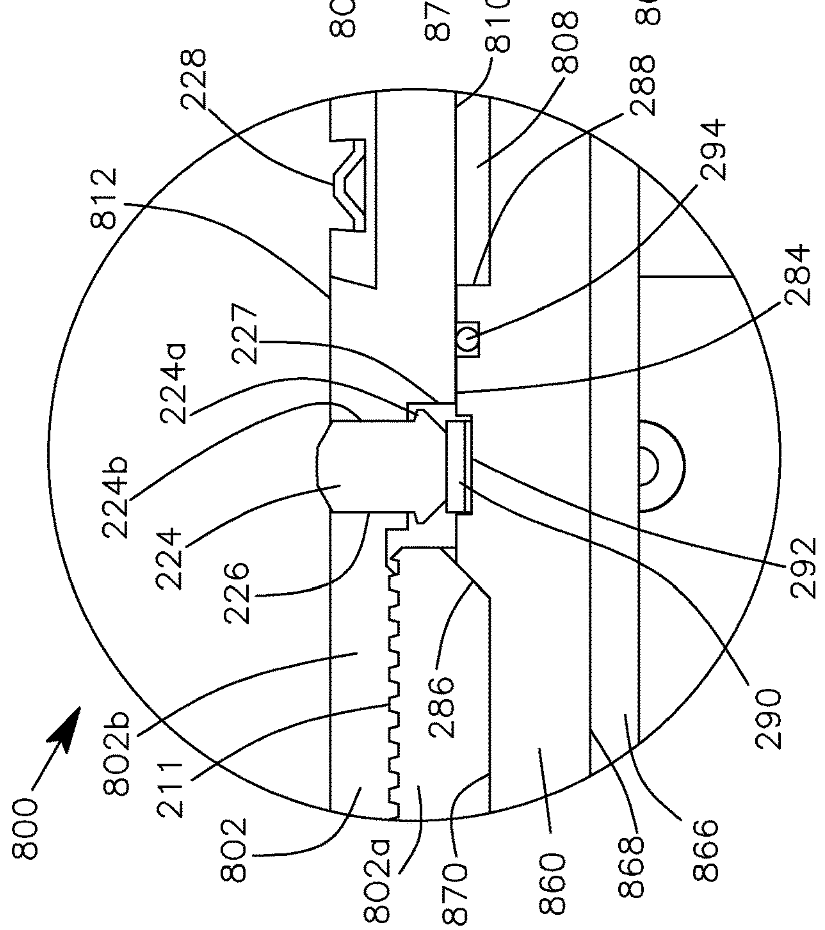
Figure 70:
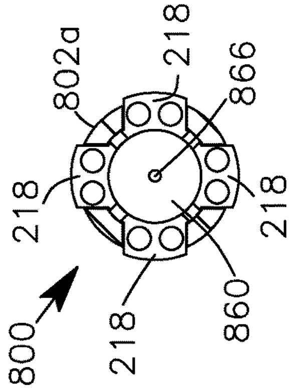
Figure 71:
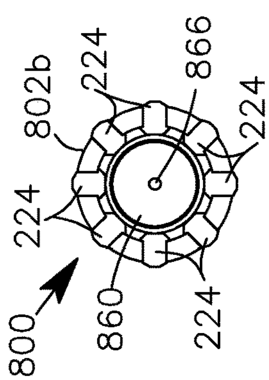
Figure 72:
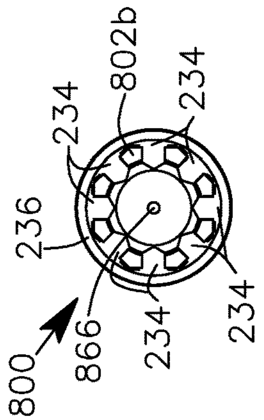
Figure 73:
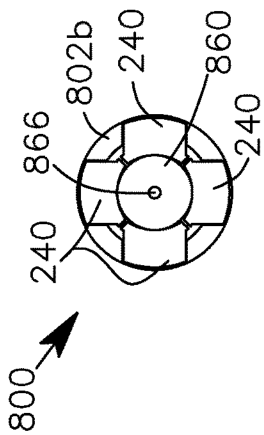
Figure 74:
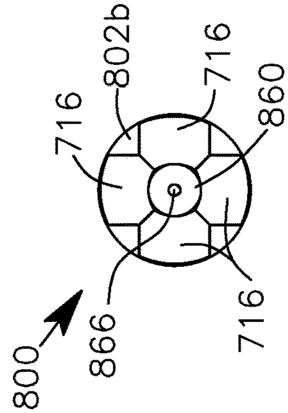
Figure 75:
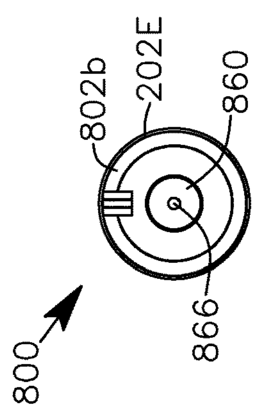
Figure 76:
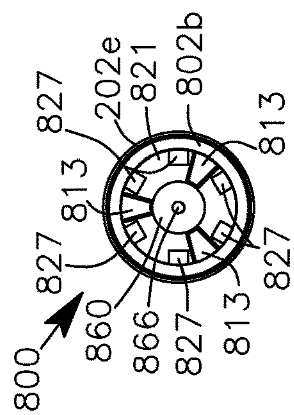
Figure 77:
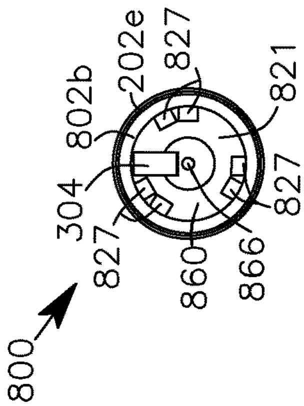
Figure 78:
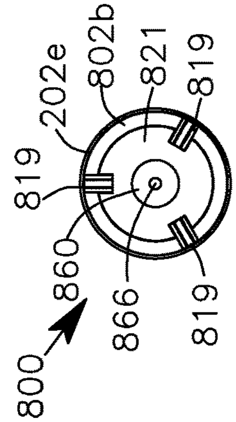
Figure 79:
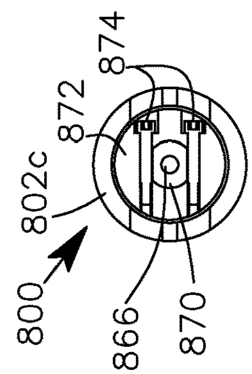
Figure 80:
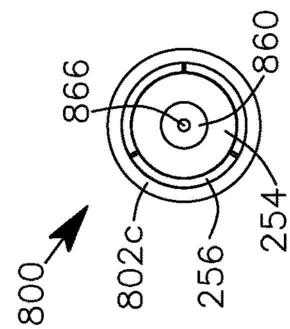
Figure 82:
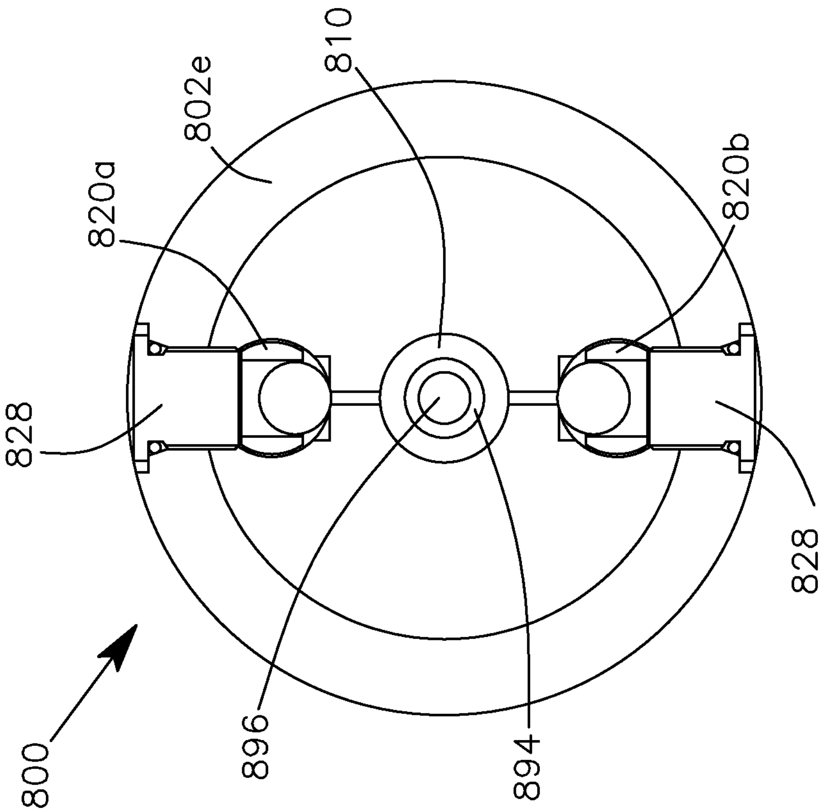
Figure 81:
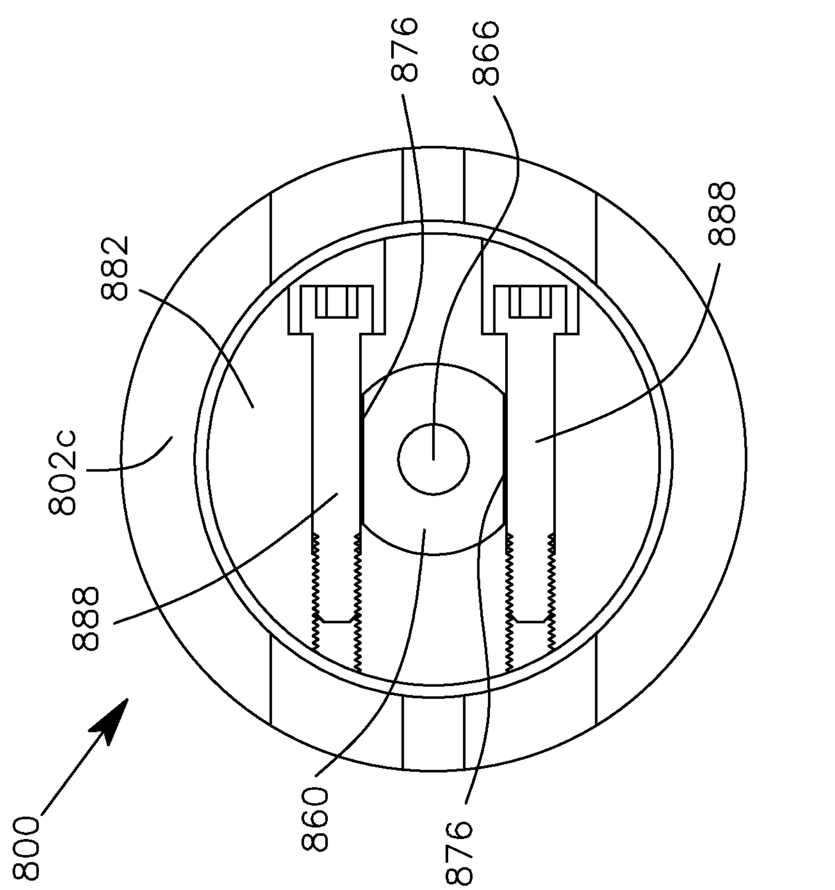
Figure 83A:
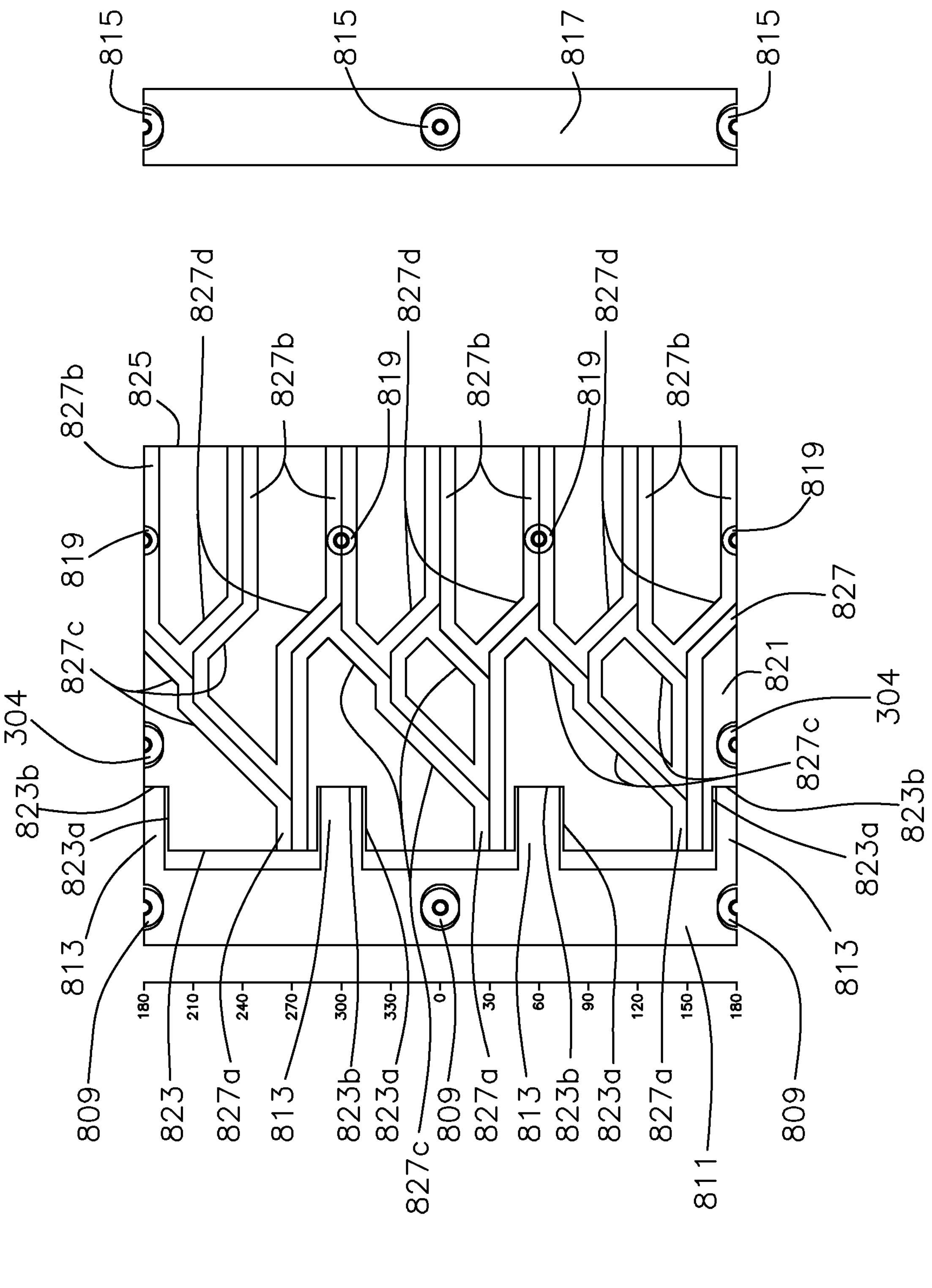
Figure 83B:
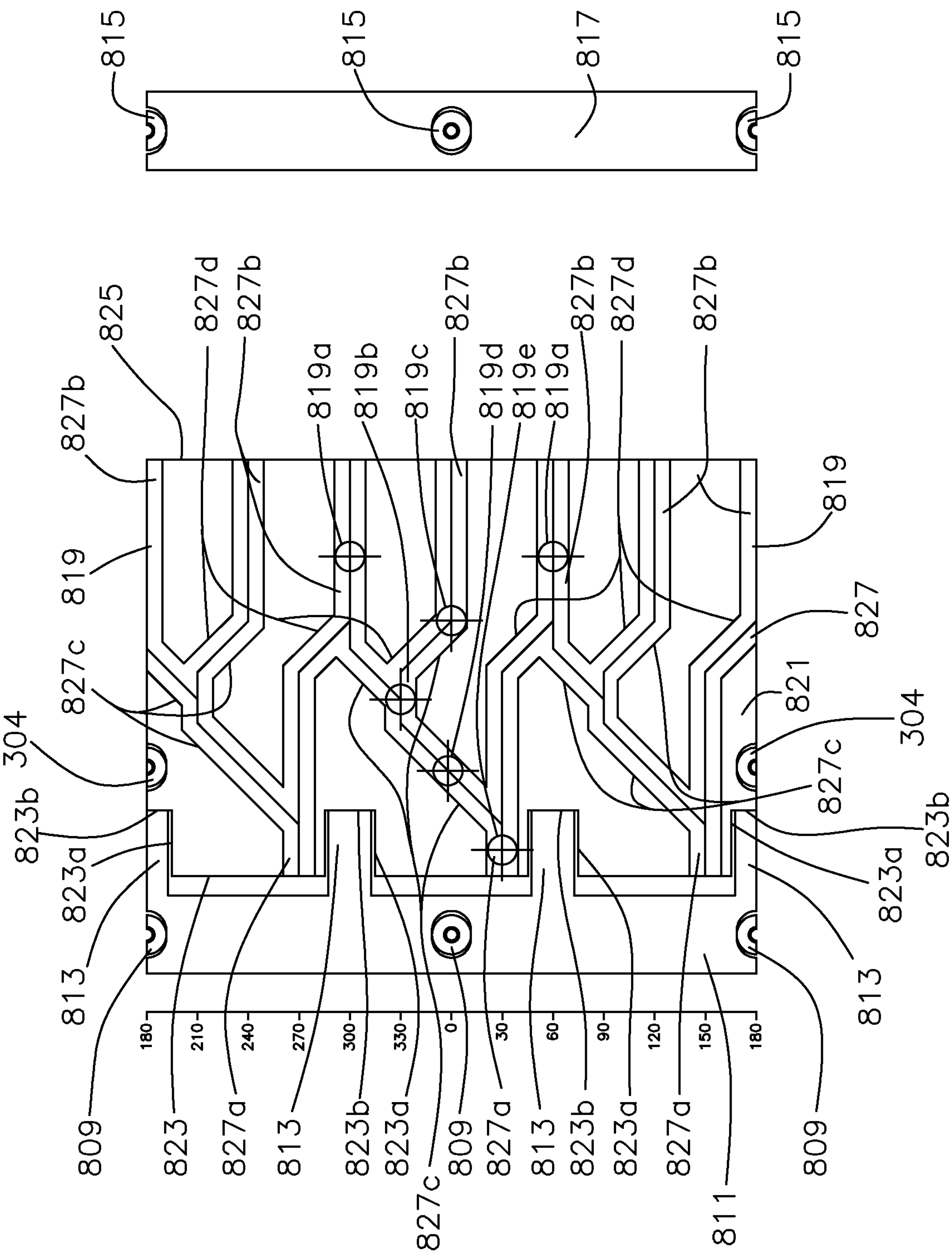
Figures 84A, 84B, 84C:
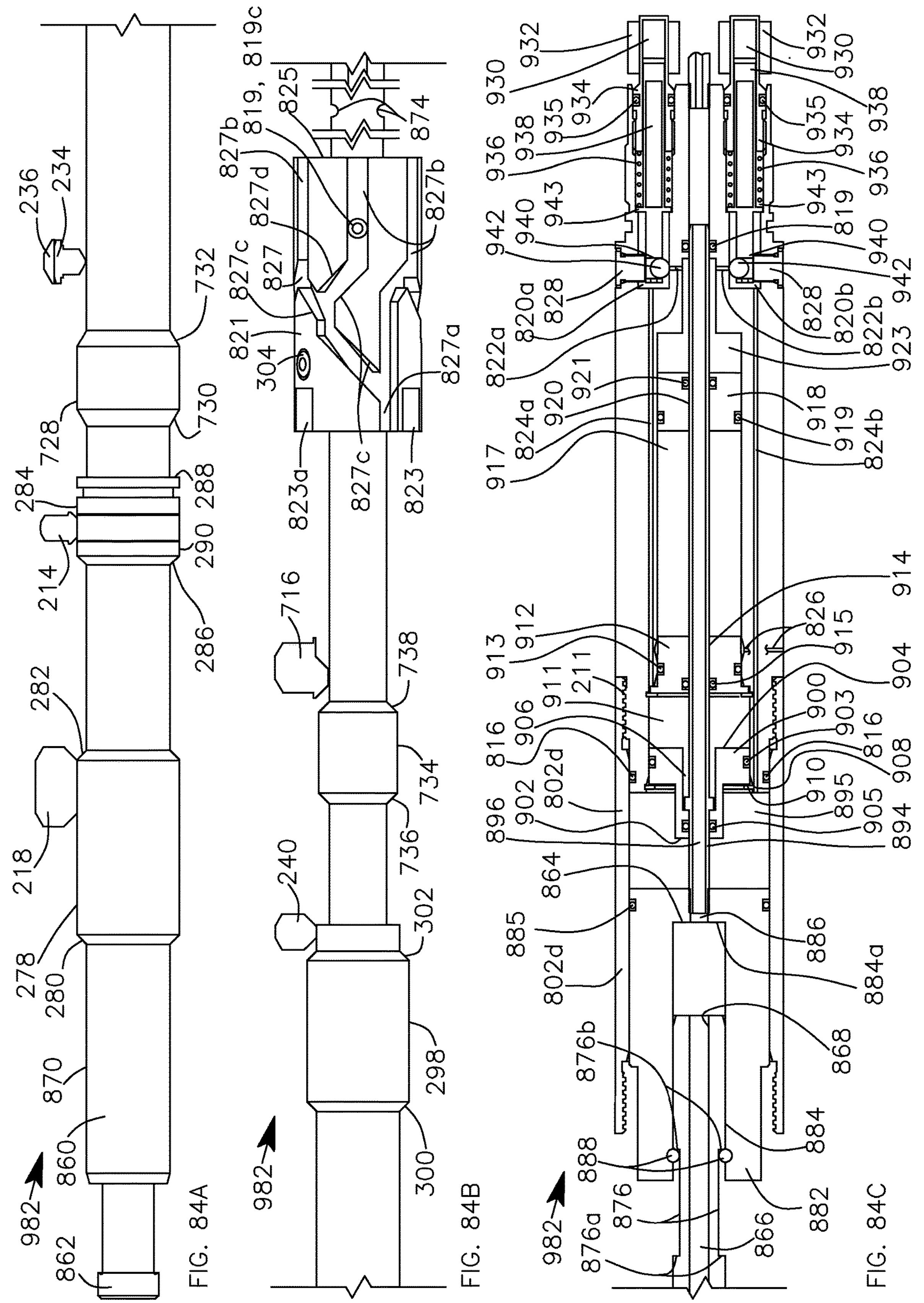
Figure 85A:
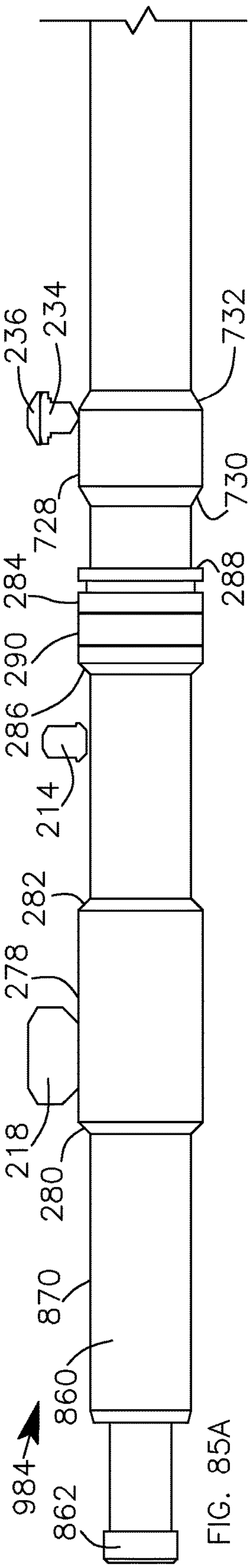
Figure 85B:
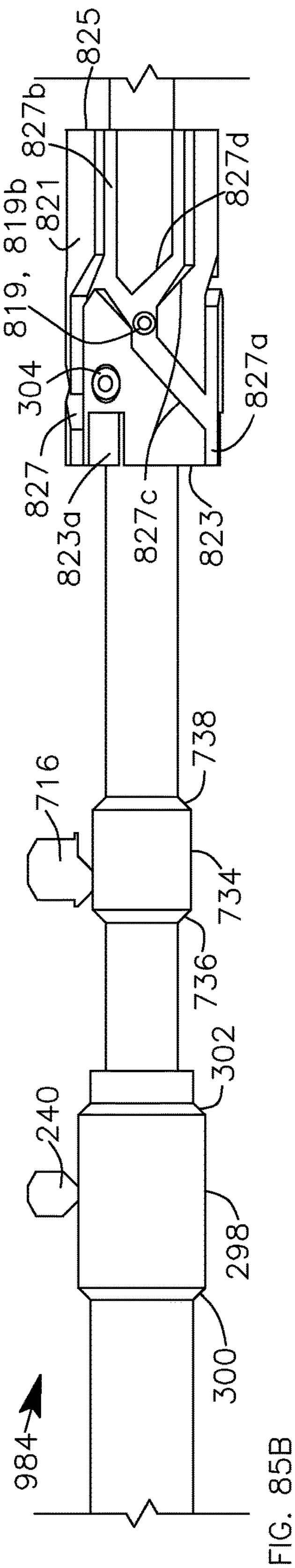
Figure 85C:
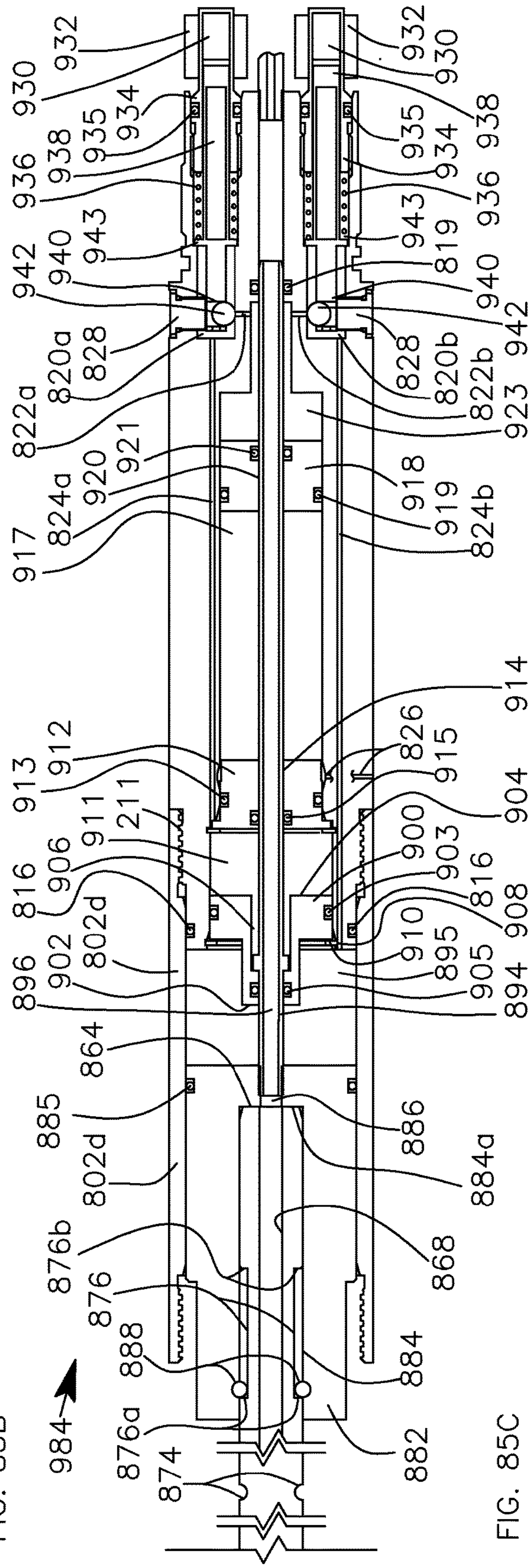
Figure 86A:
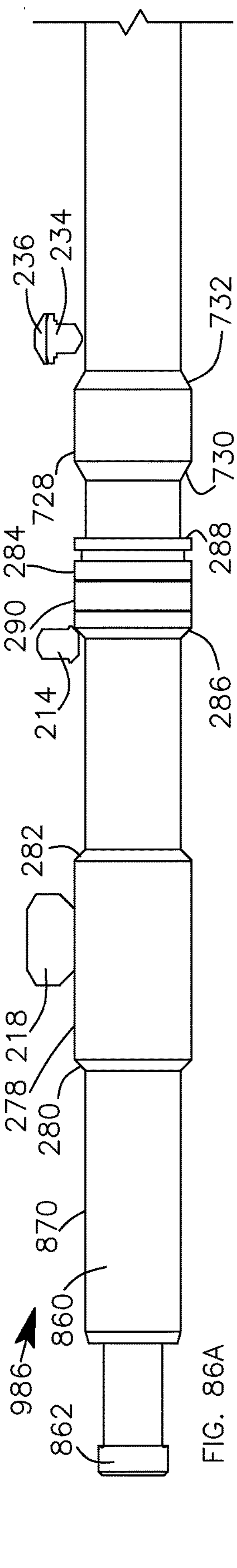
Figure 86B:
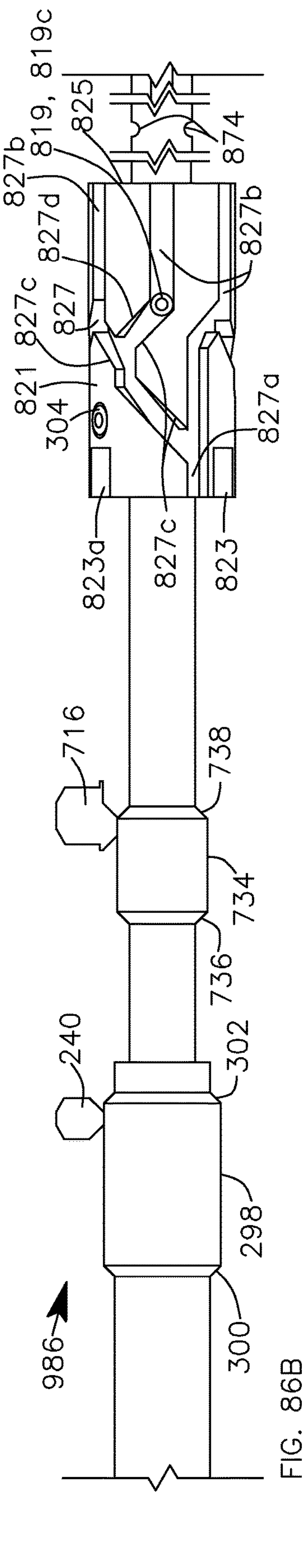
Figure 86C:
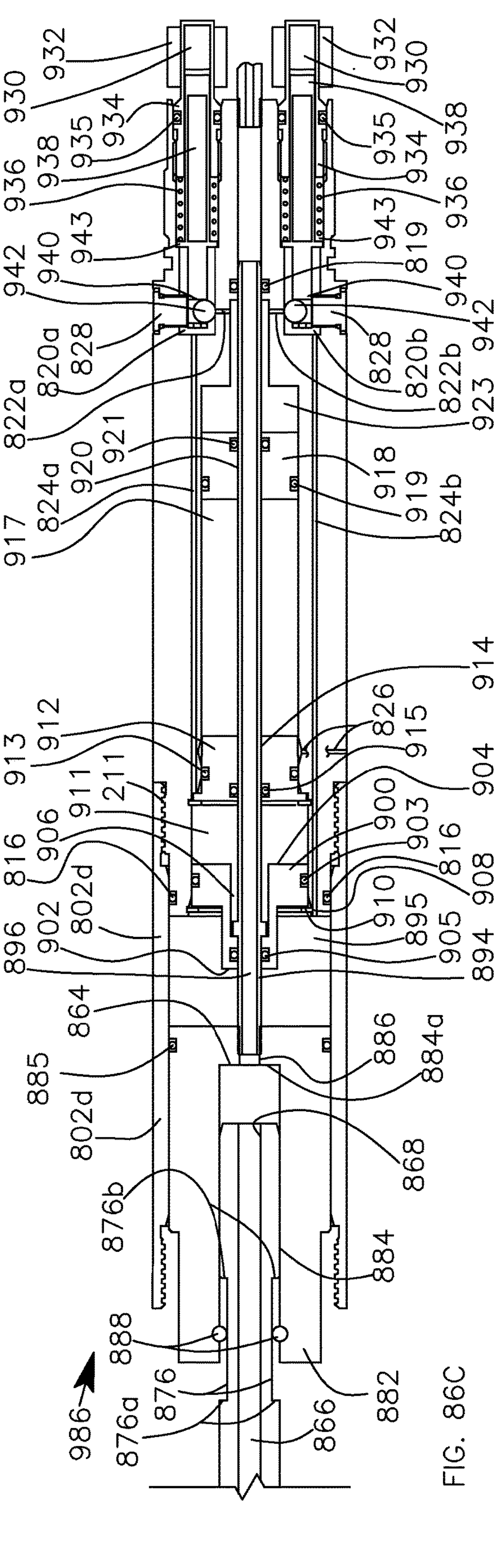
Figures 87A, 87B, 87C:
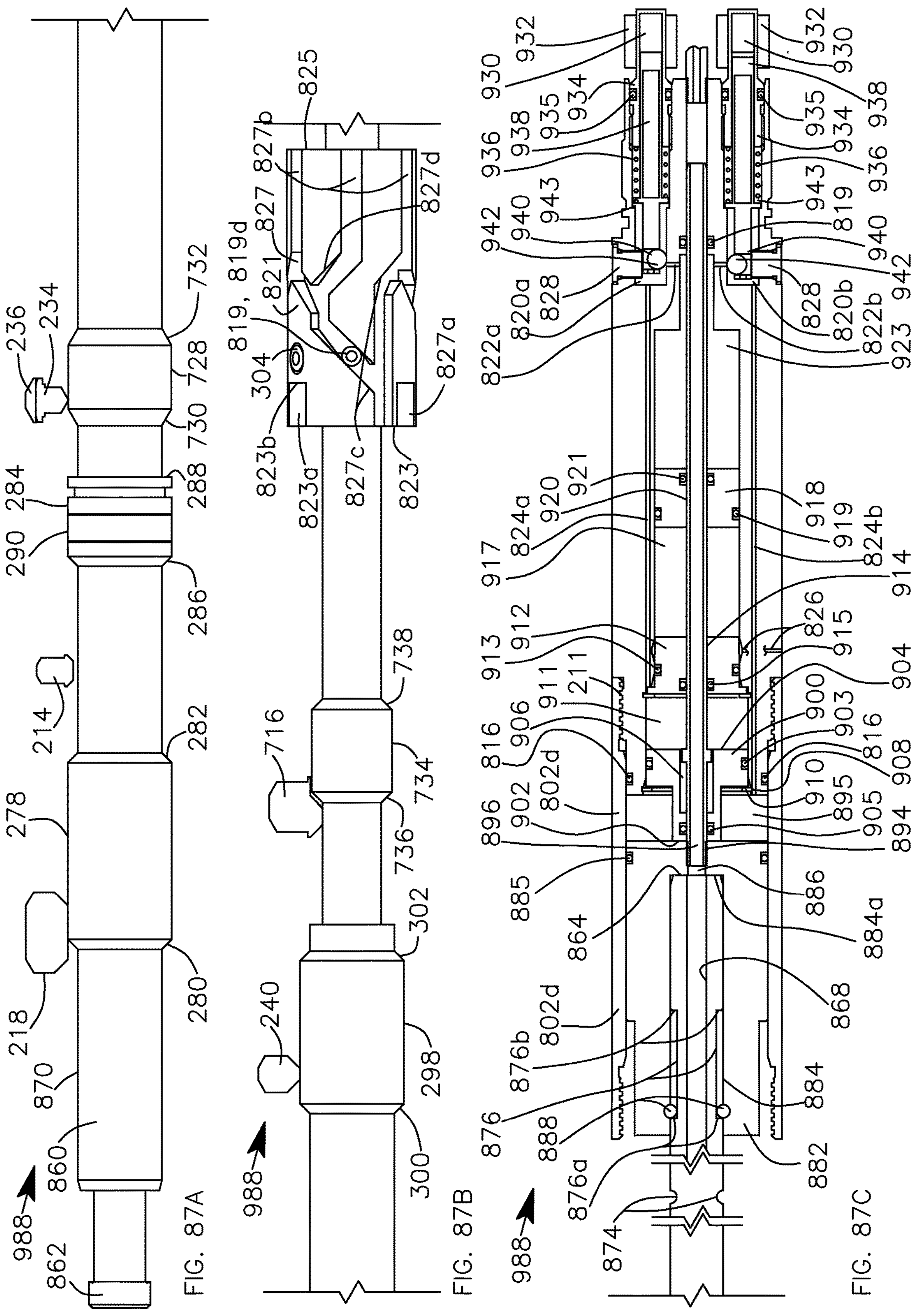
Figures 88A, 88B, 88C:
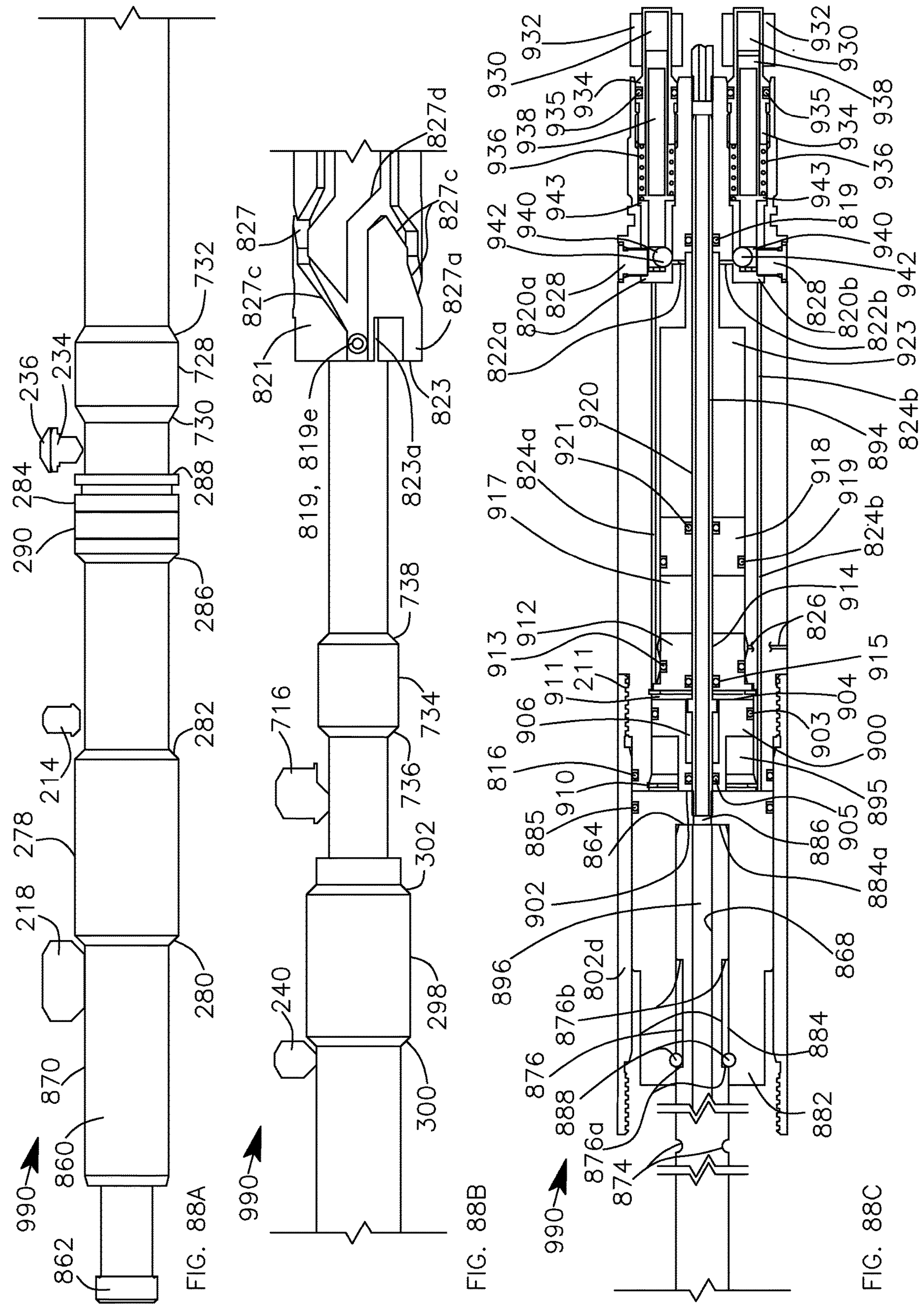
Figure 89A:
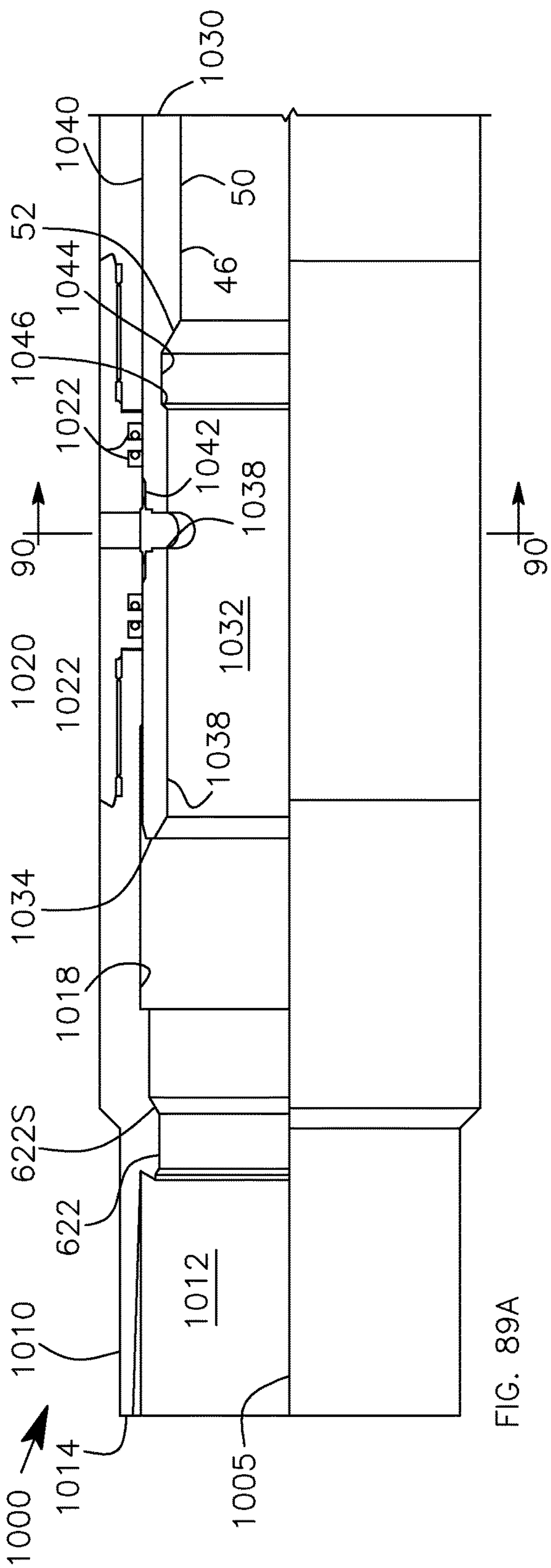
Figure 89B:
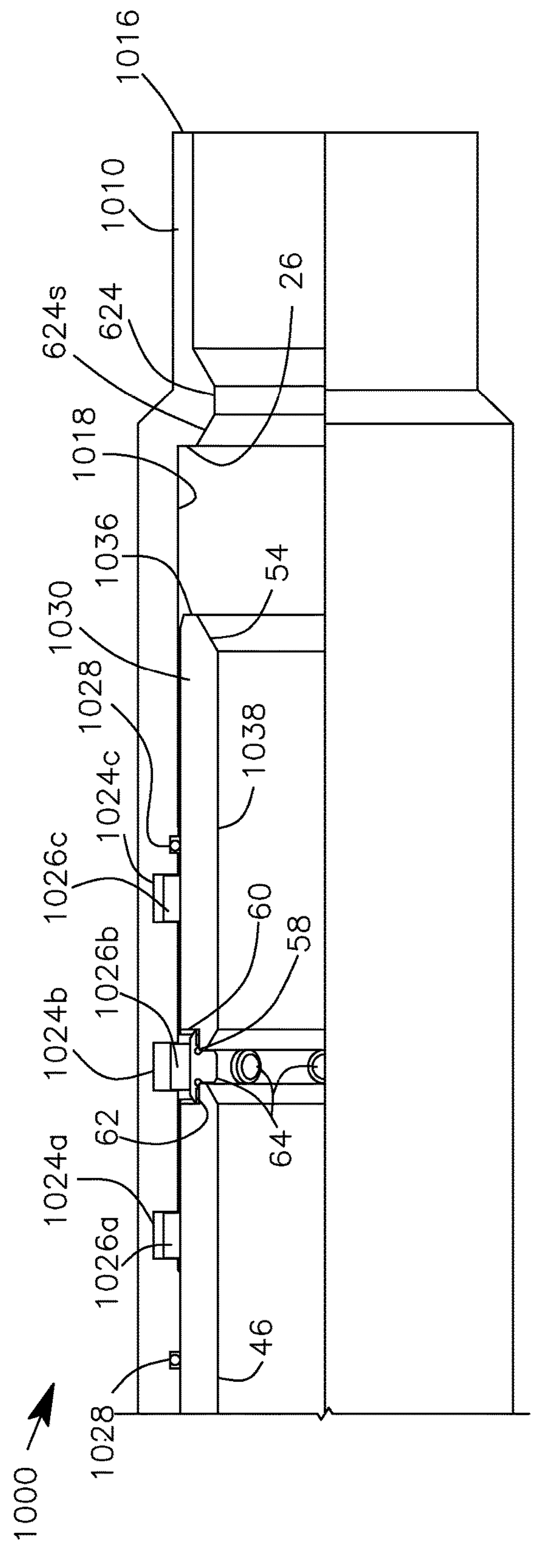
Figure 92:
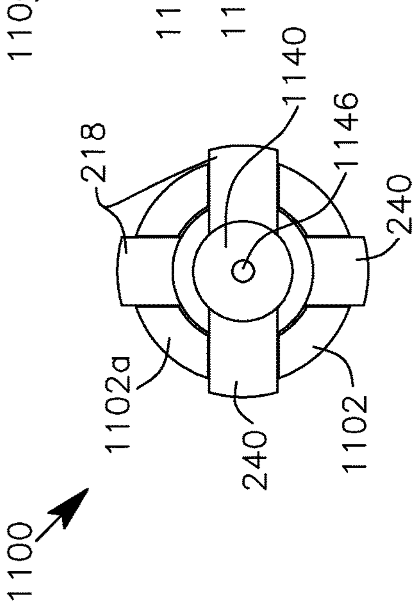
Figure 93:
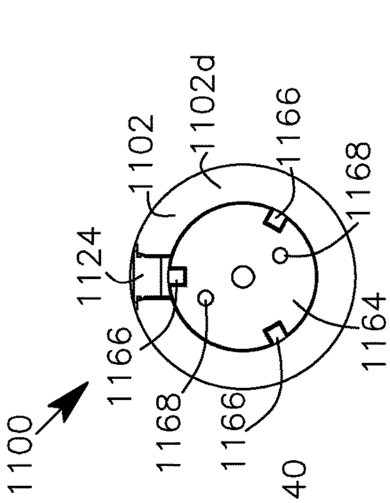
Figure 94:
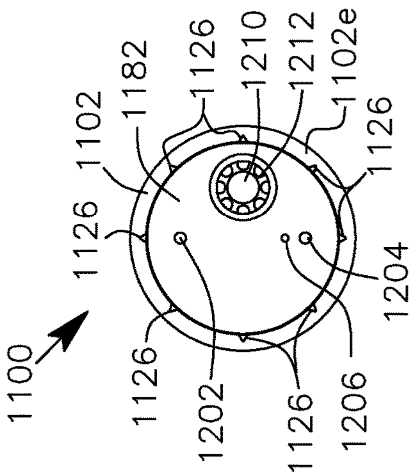
Figure 90:
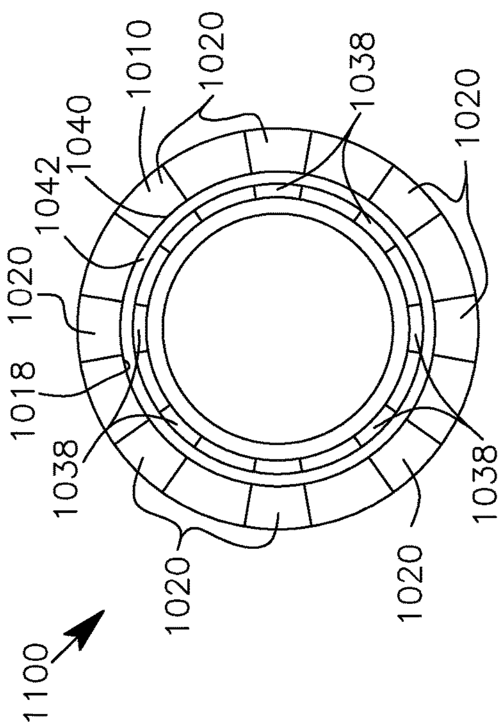
Figure 91A:
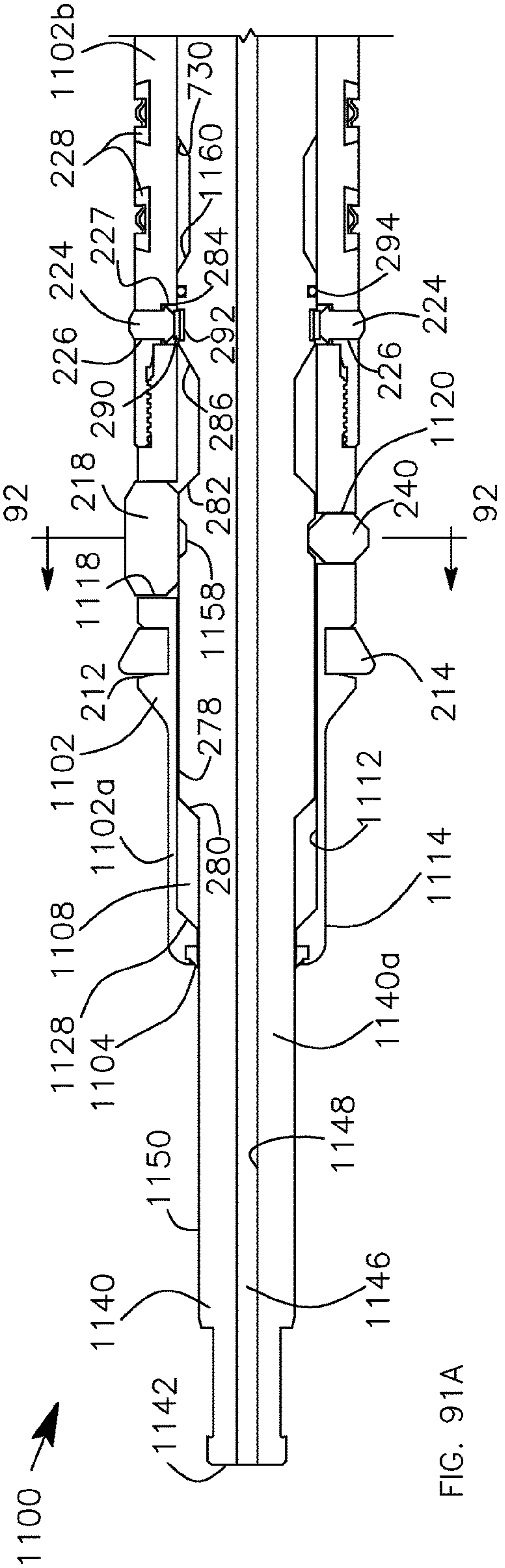
Figure 91B:
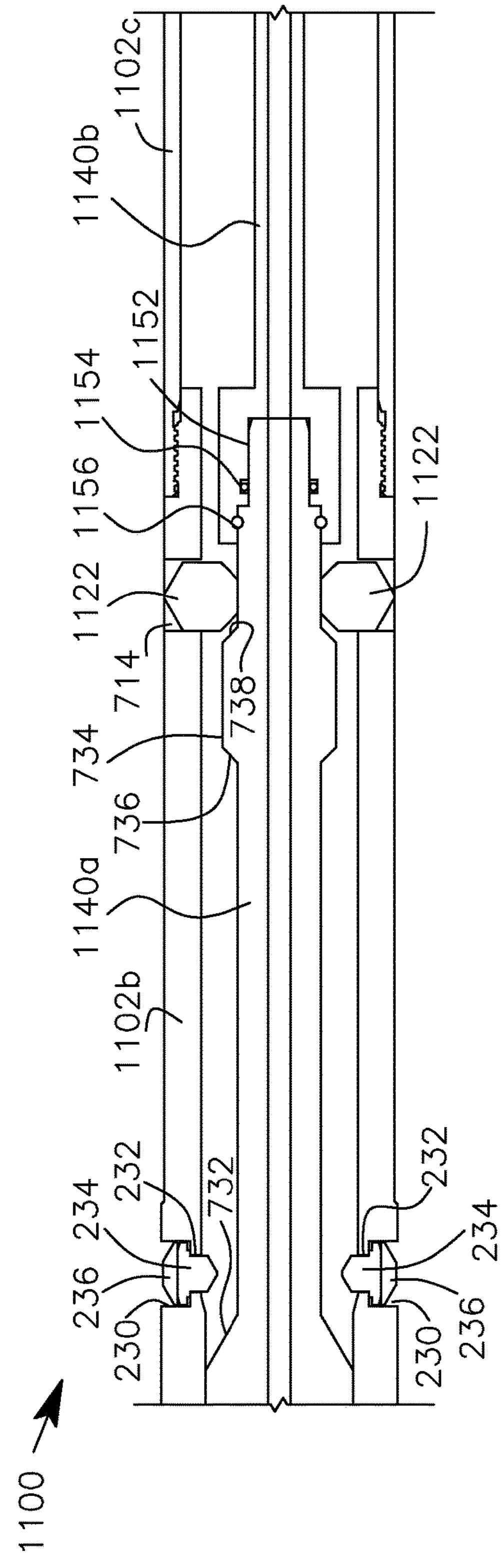
Figure 91C:
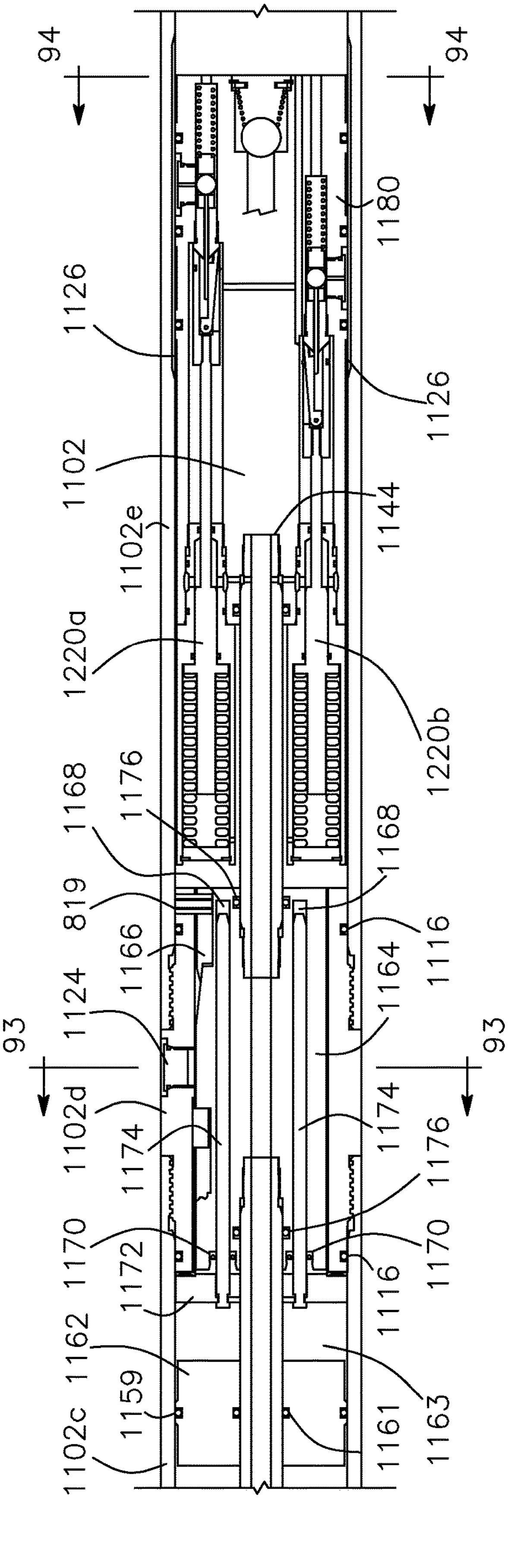
Figure 91D:
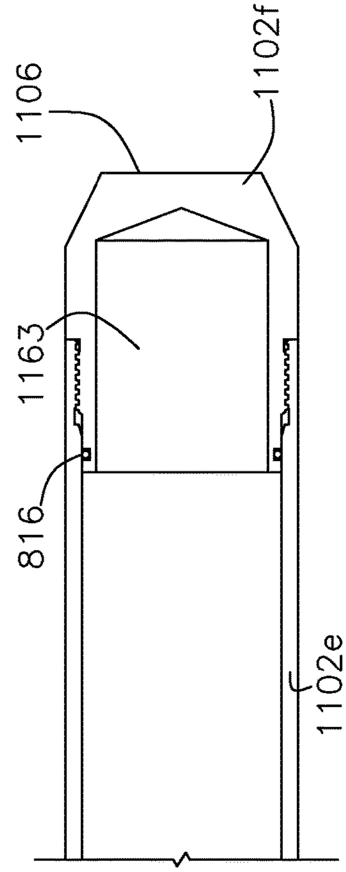
Figure 95:
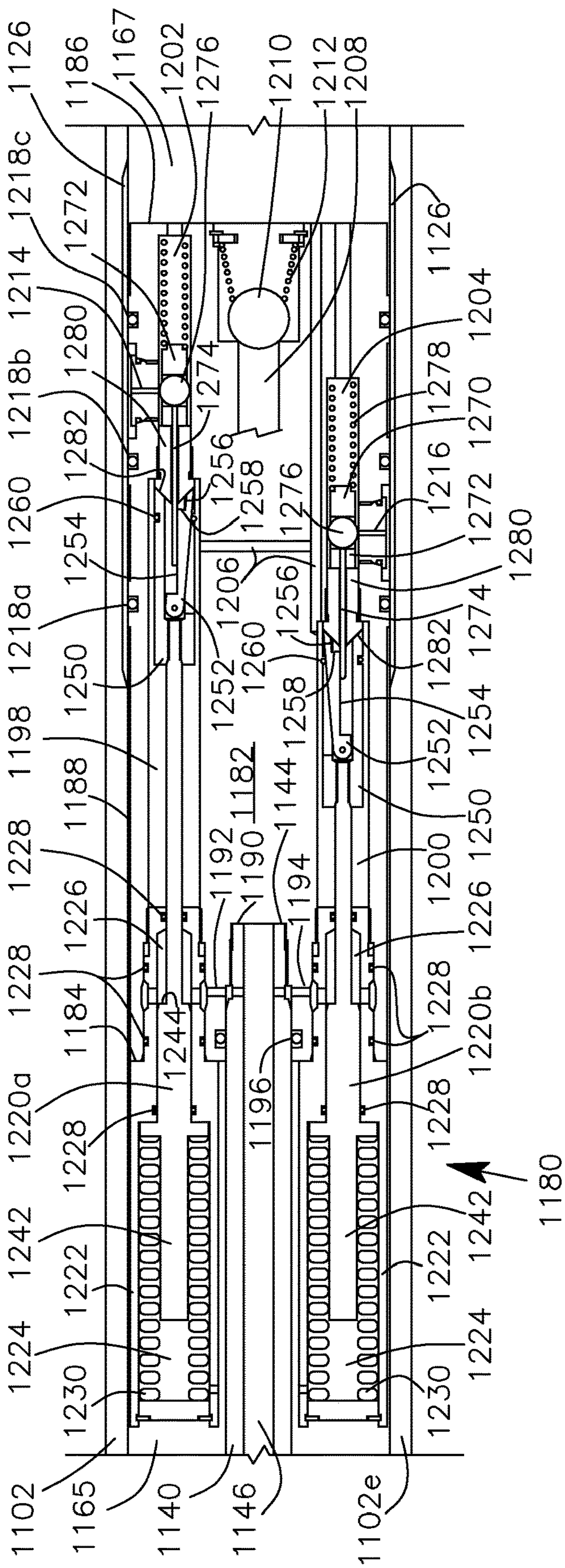
Figure 96A:
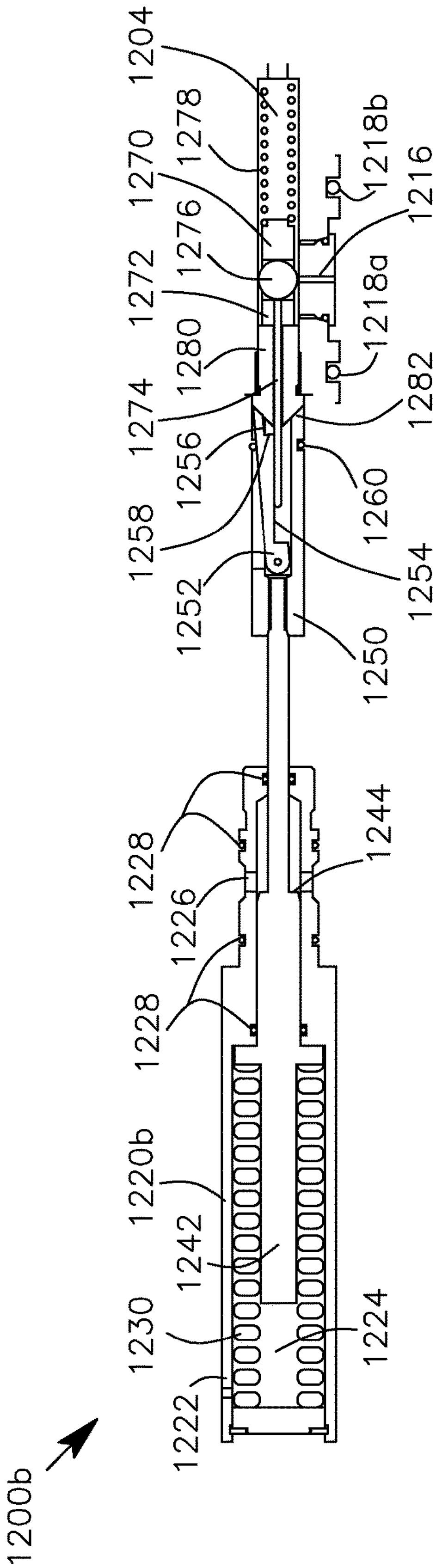
Figure 96B:
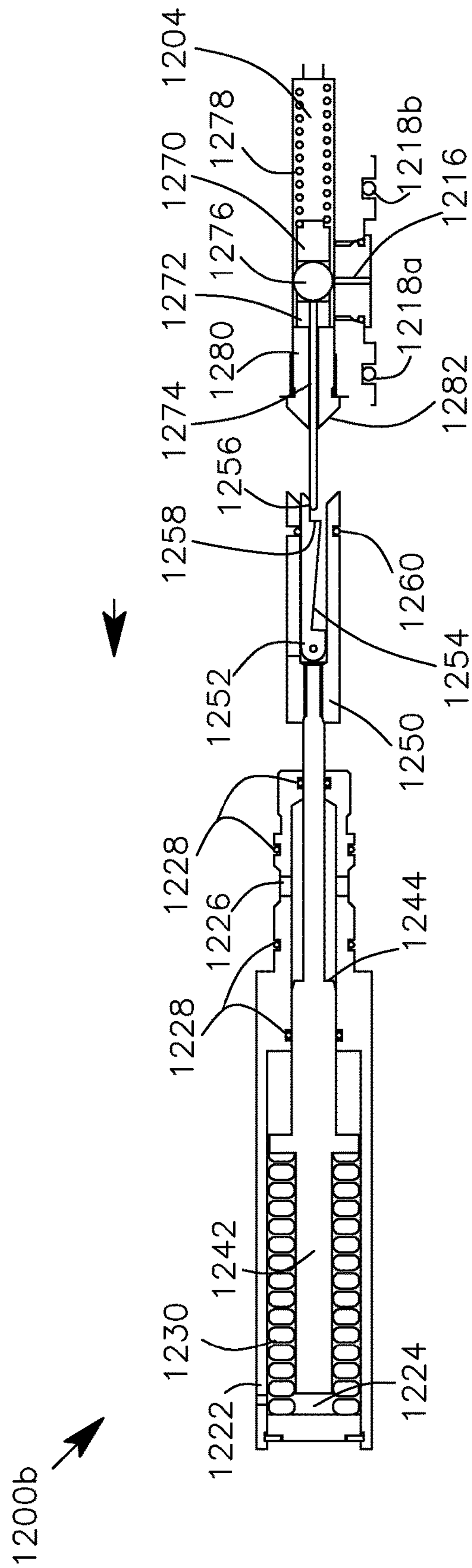
Figure 96C:
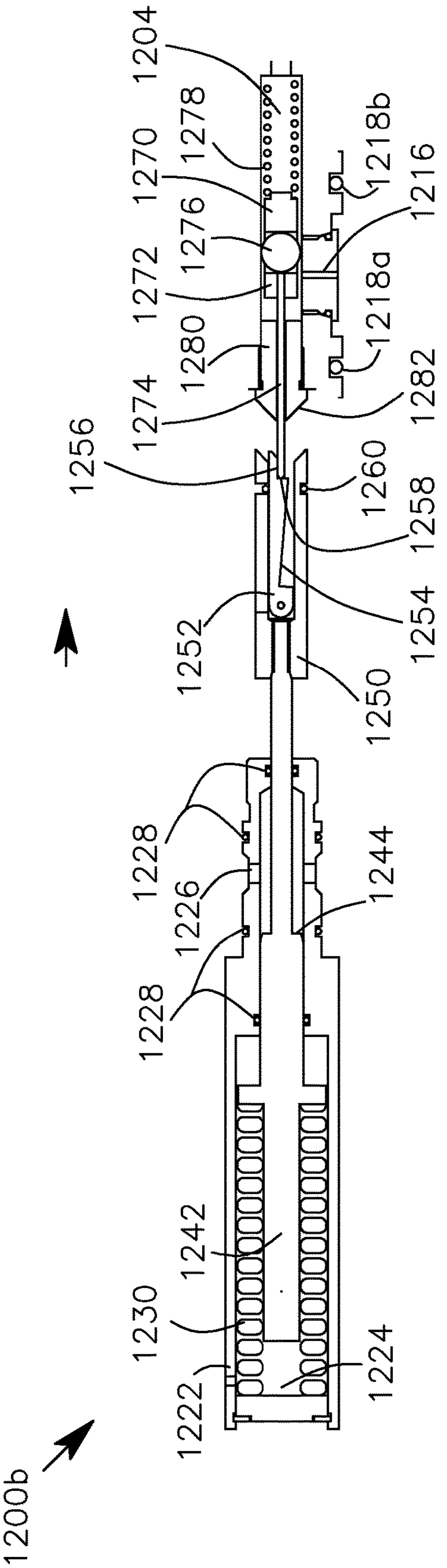
Figure 96D:
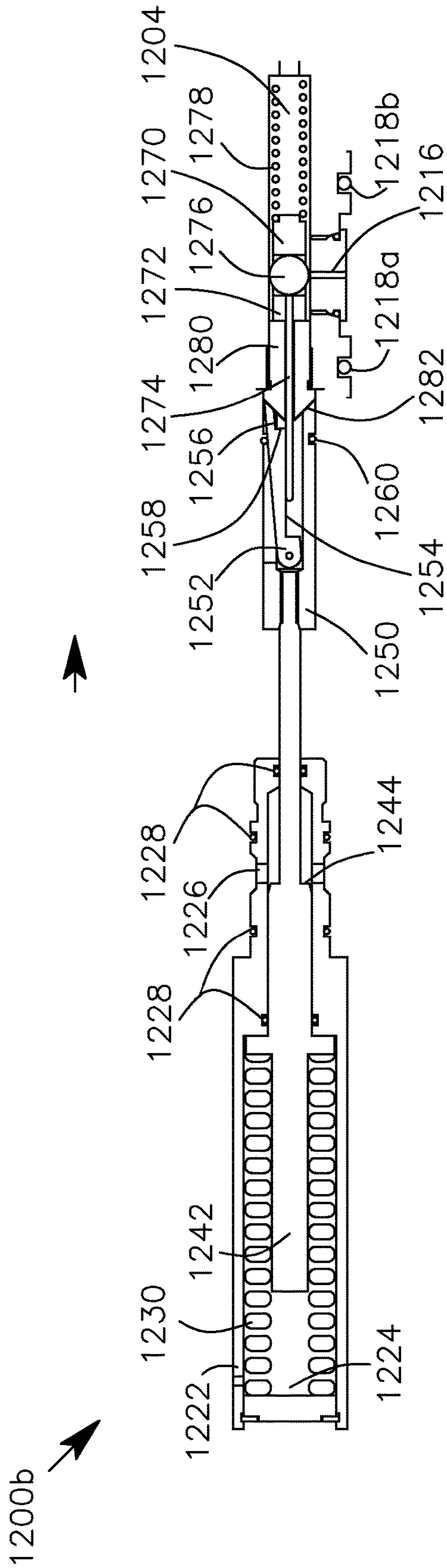
Figures 97A, 97B:
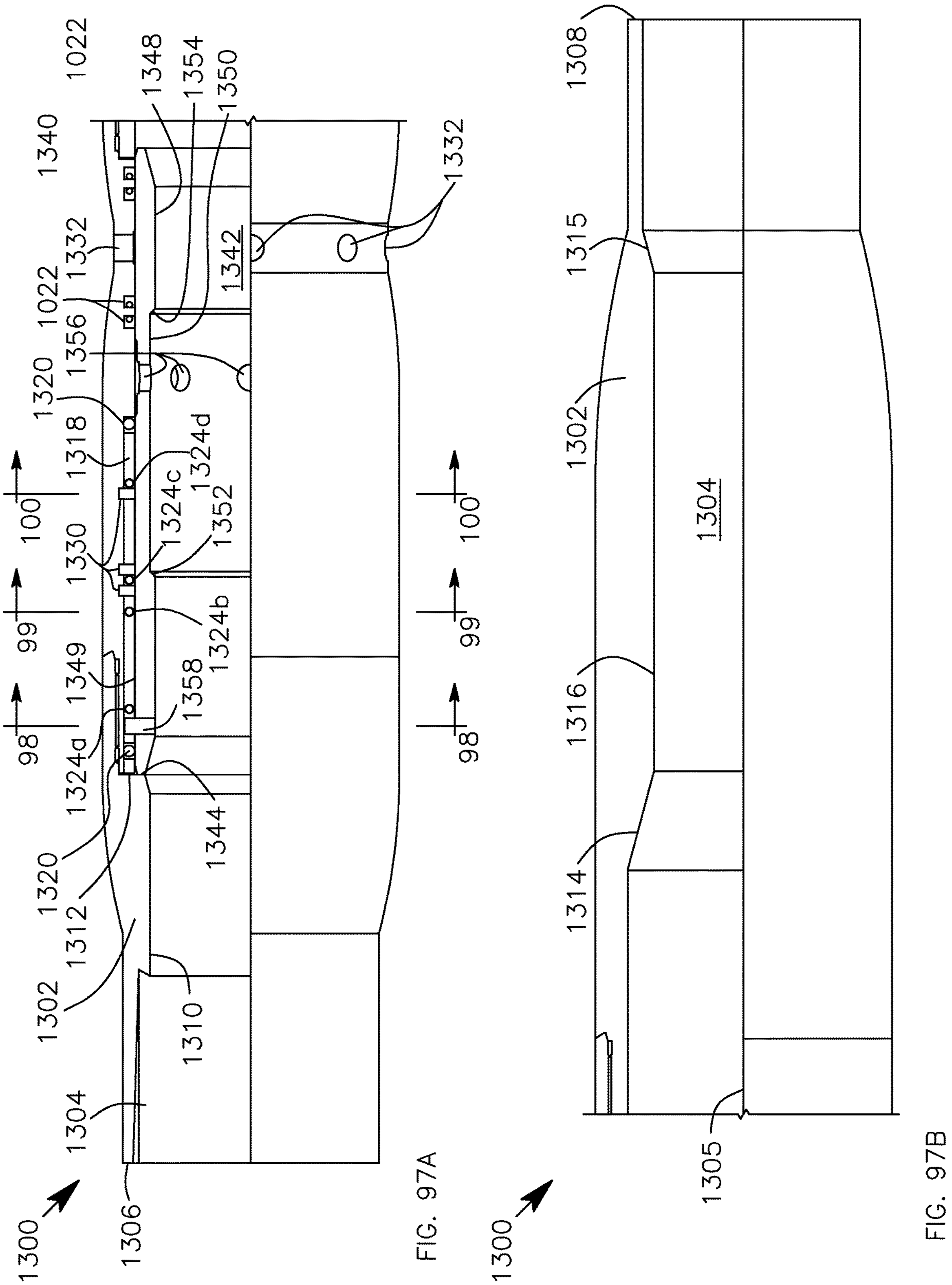
Figure 100:
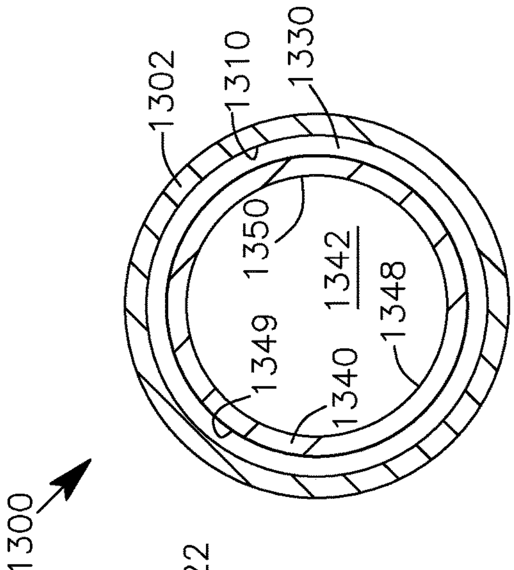
Figure 99:
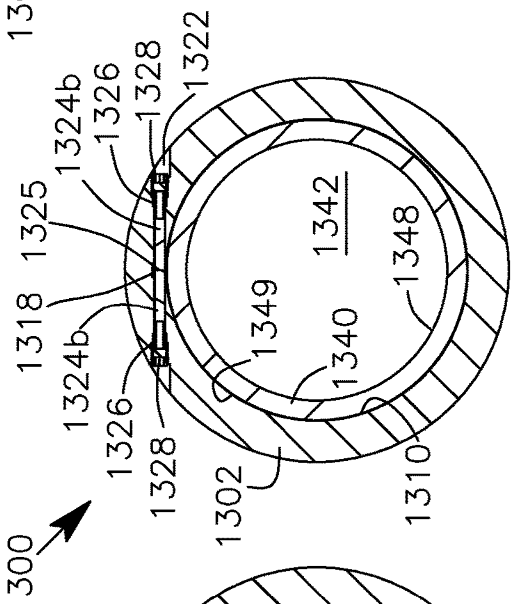
Figure 98:
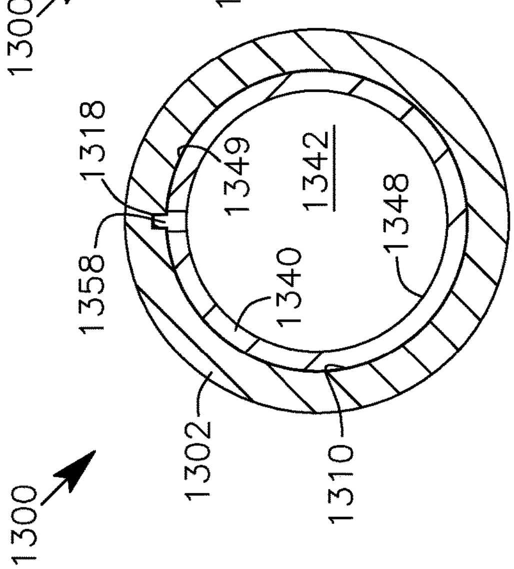
Figure 110:
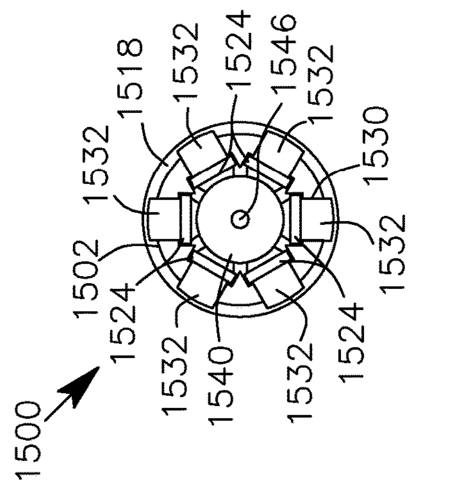
Figure 109:
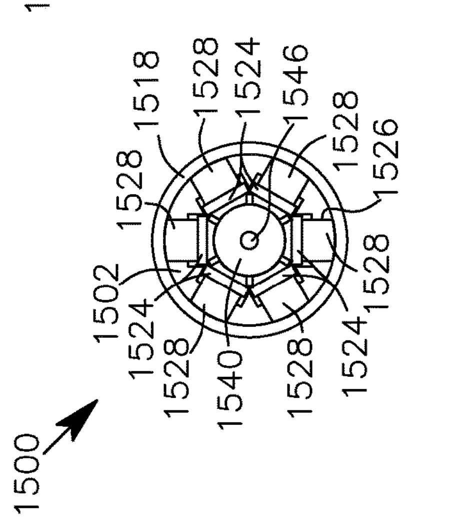
Figure 108:
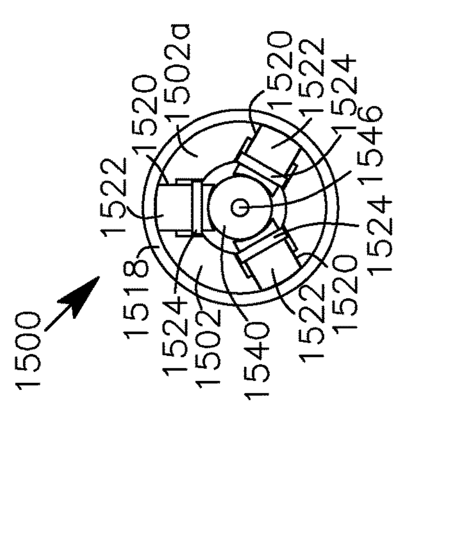
Figure 101A:
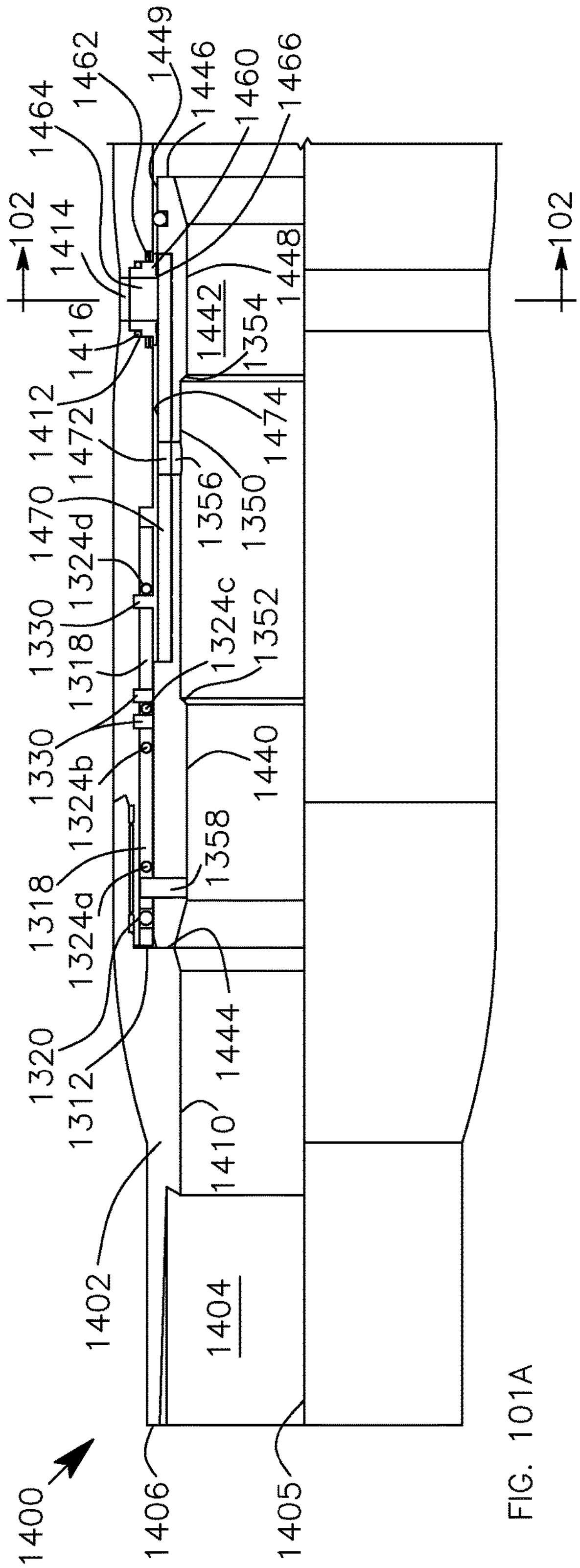
Figure 101B:
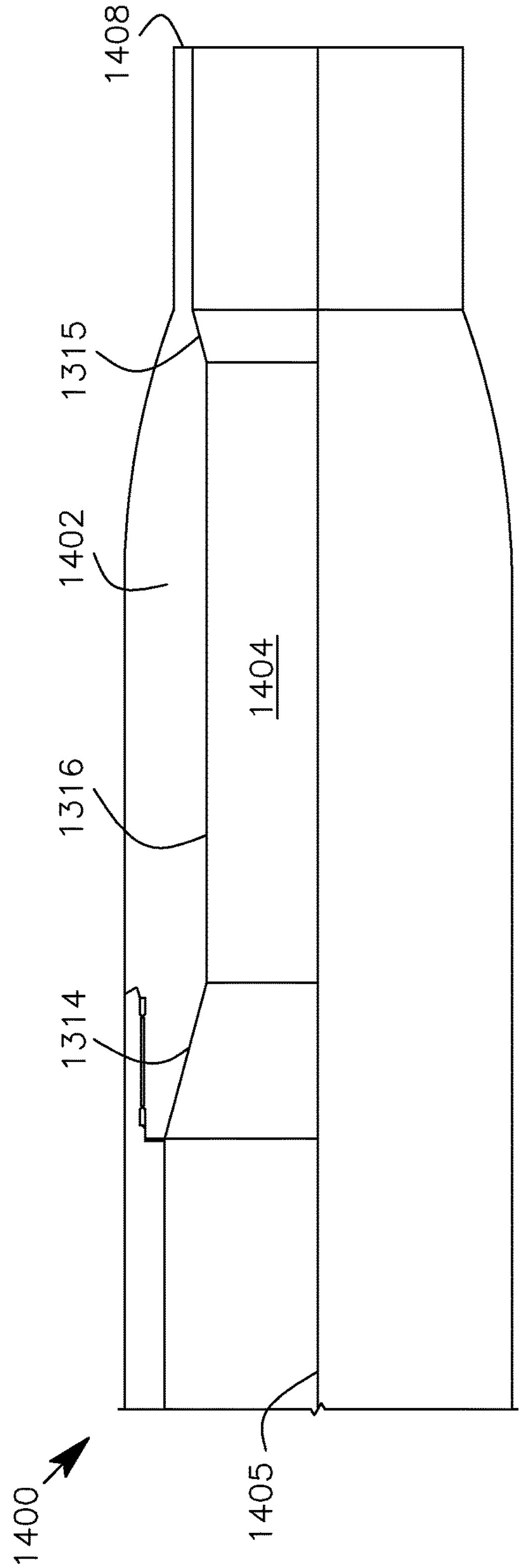
Figure 102:
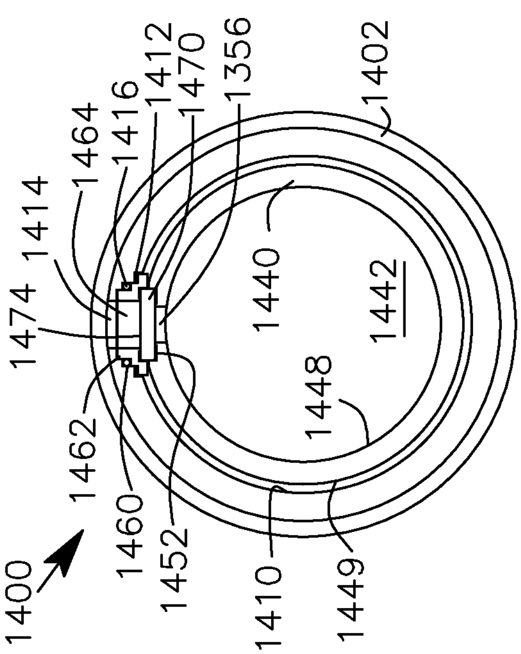
Figure 103:
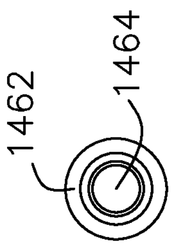
Figure 104:
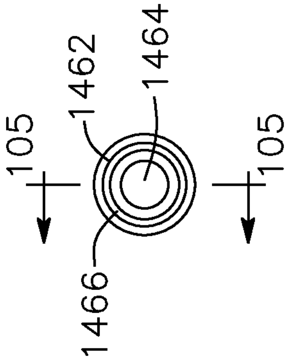
Figure 105:
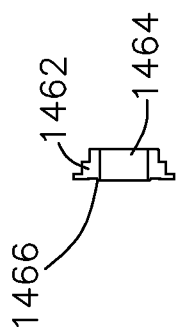
Figure 106:
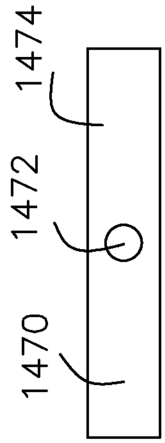
Figure 107A:
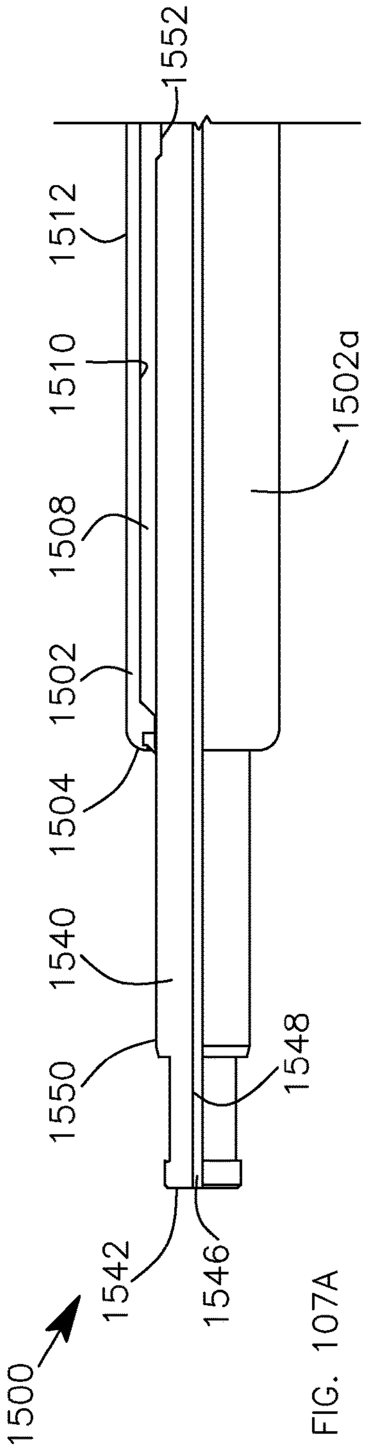
Figure 107B:
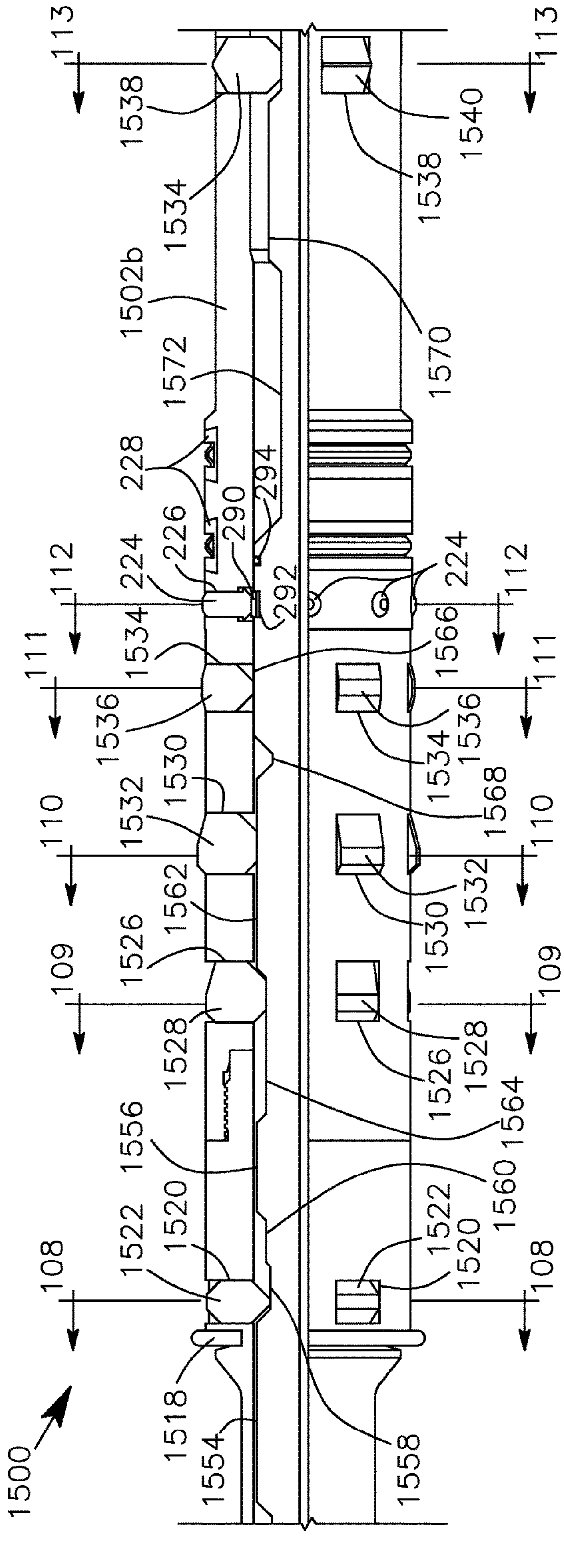
Figure 107C:
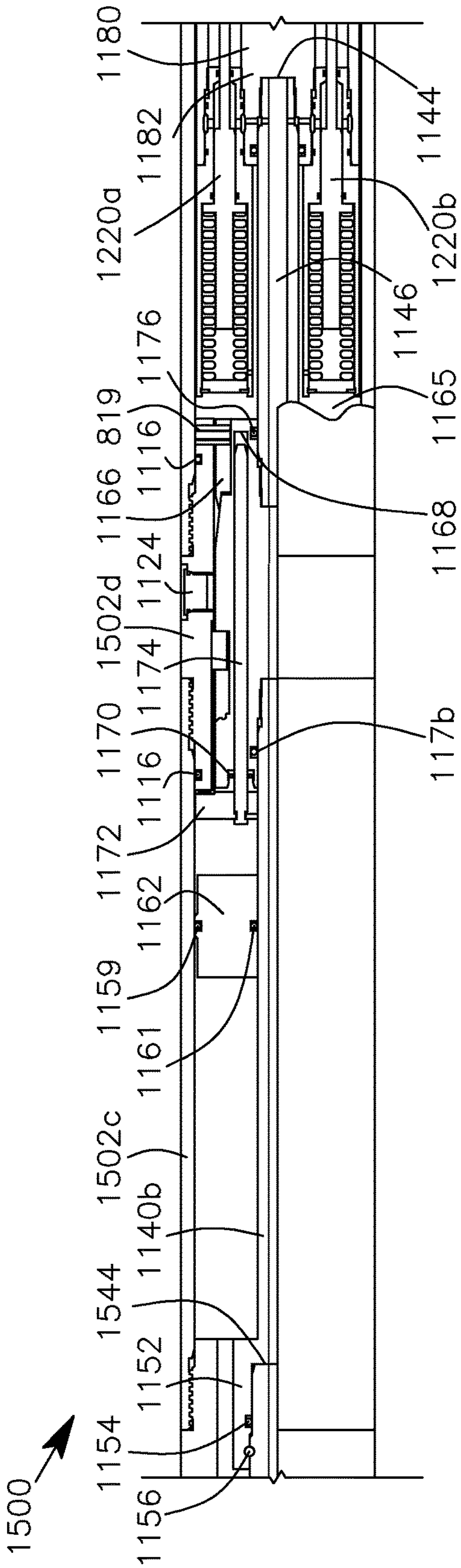
Figure 107D:
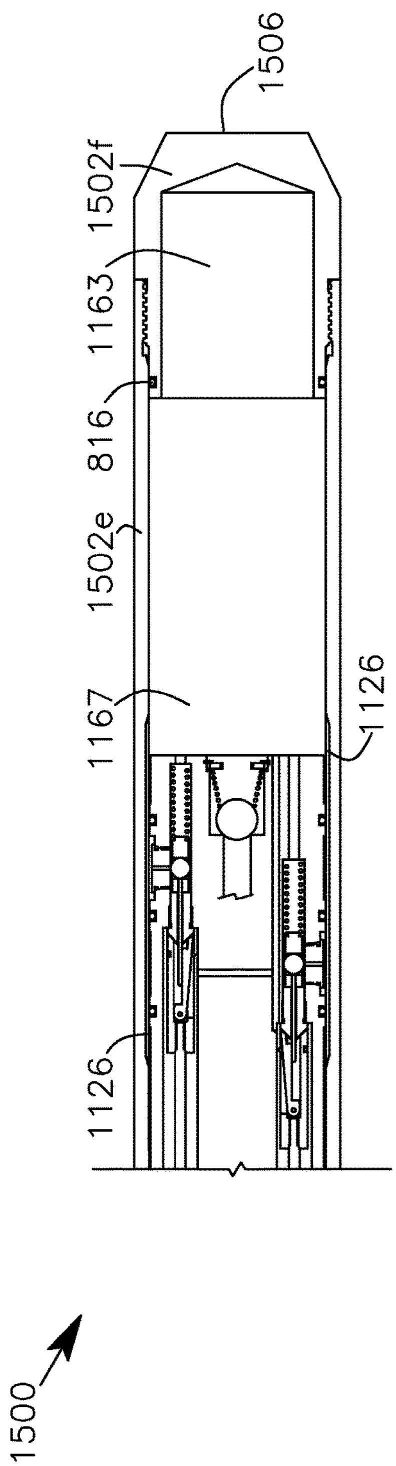
Figure 117B:
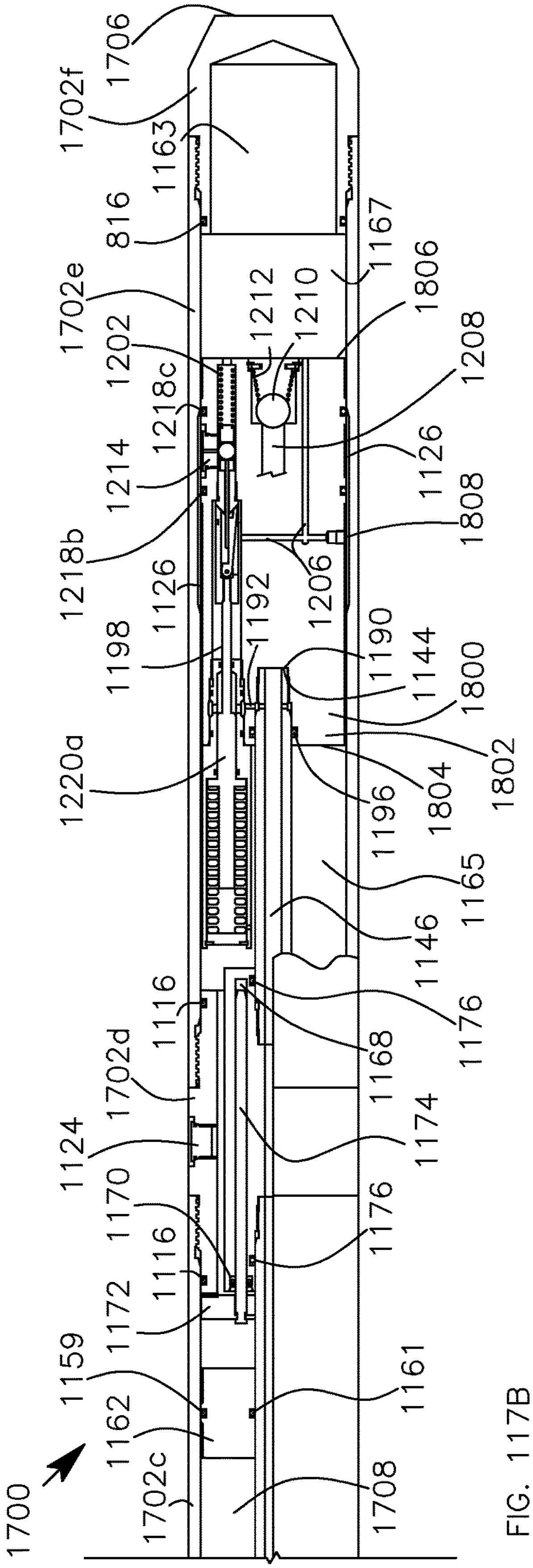
Figure 111:
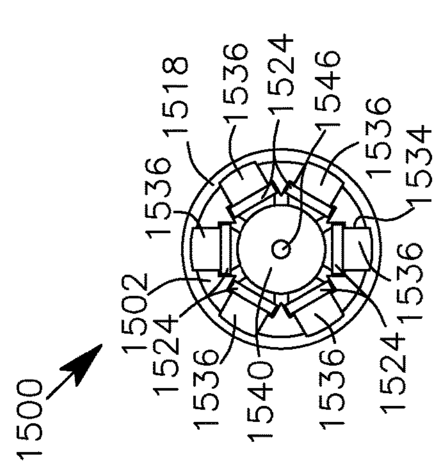
Figure 112:
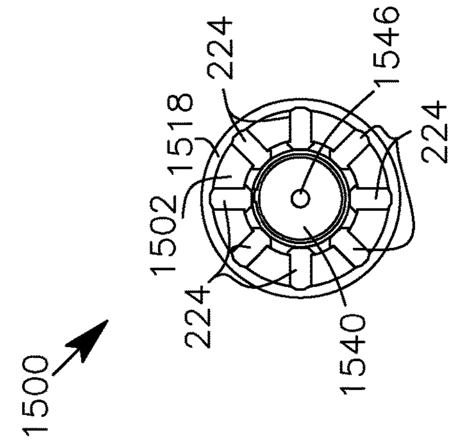
Figure 113:
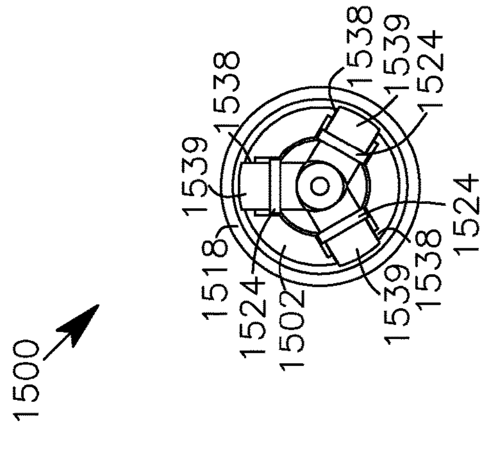
Figure 114:
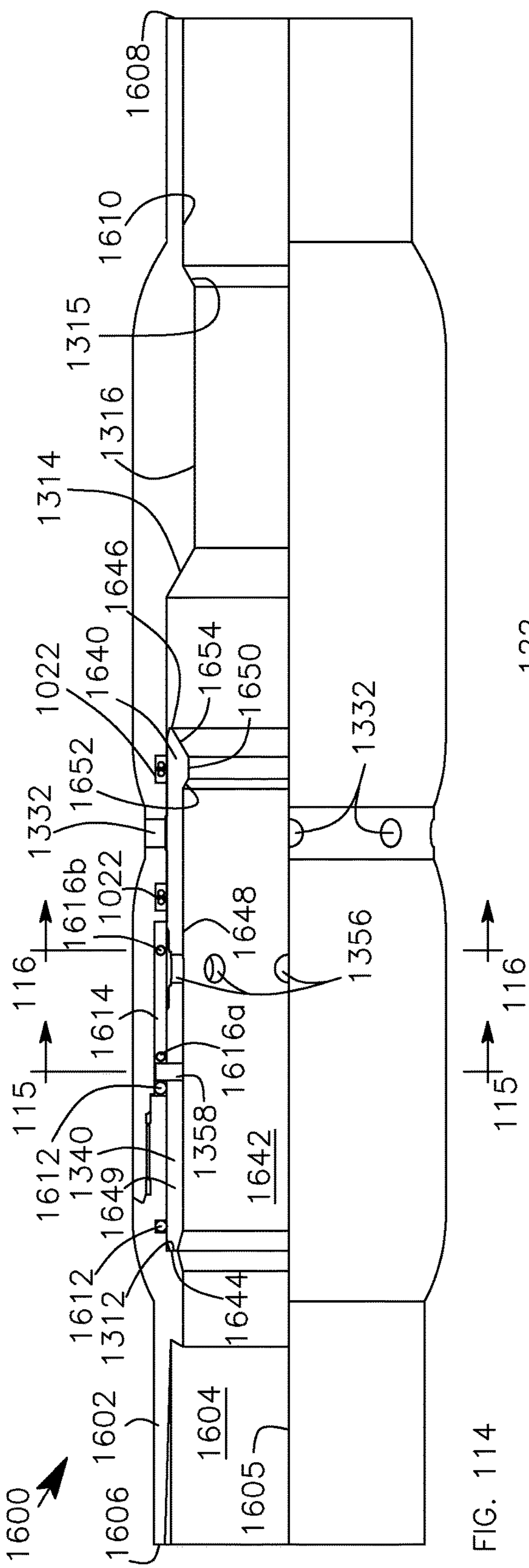
Figure 117A:
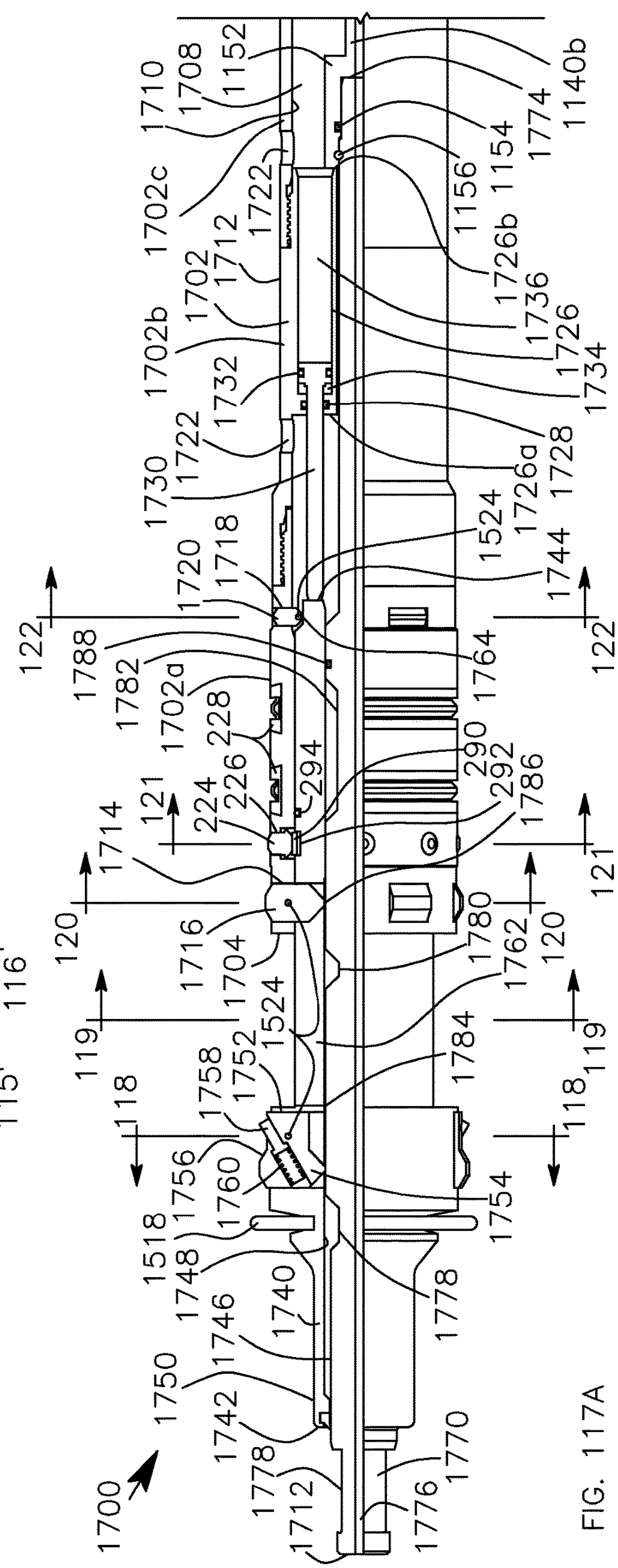
Figure 118:
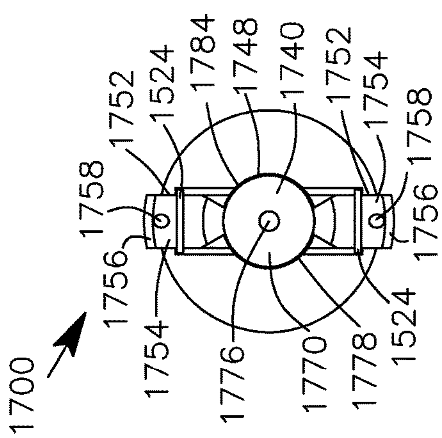
Figure 116:
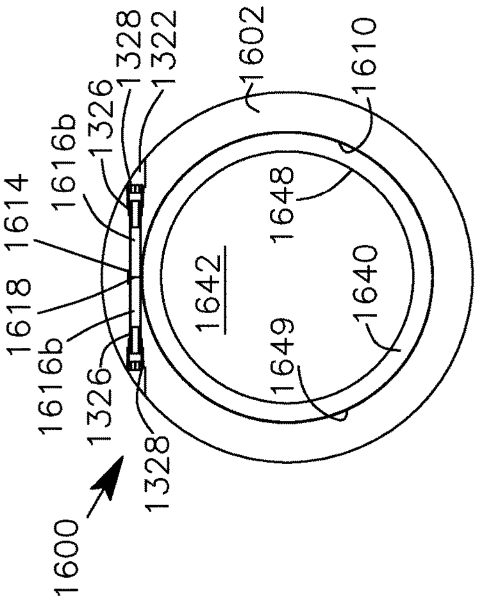
Figure 115:
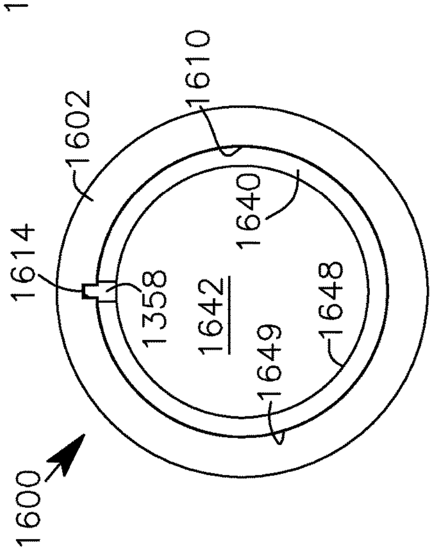
Figure 122:
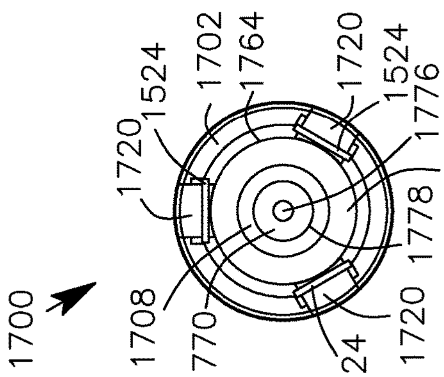
Figure 121:
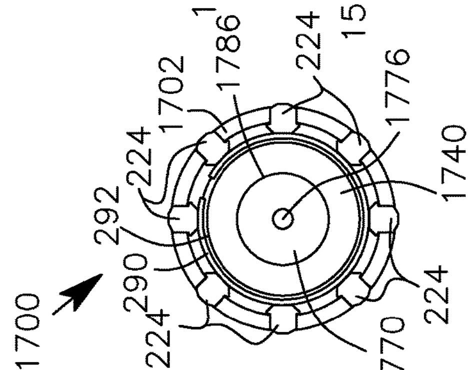
Figure 120:
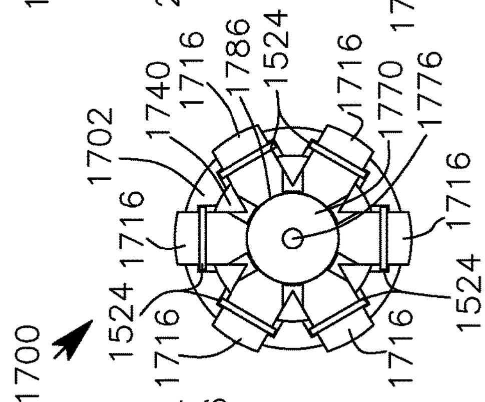
Figure 119:
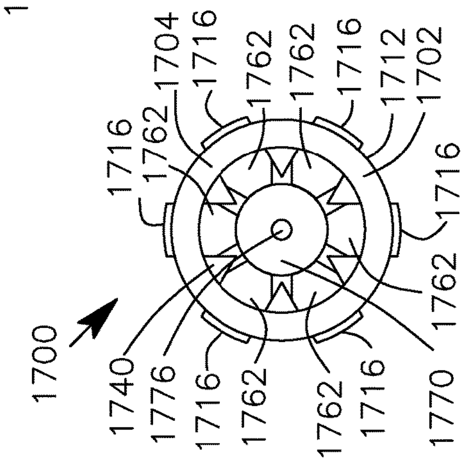

FIG. 53H is a schematic, cross-sectional view of an embodiment of the obturating tool shown in FIGS. 53A-53C in a second position;

FIG. 53I is a schematic, cross-sectional view of an embodiment of the obturating tool shown in FIGS. 53A-53C in a third position;

FIG. 53J is a schematic, cross-sectional view of an embodiment of the obturating tool shown in FIGS. 53A-53C in a fourth position;

FIG. 53K is a schematic, cross-sectional view of an embodiment of the obturating tool shown in FIGS. 53A-53C in the third position shown in FIG. 53I;

FIG. 53L is a schematic, cross-sectional view of an embodiment of the obturating tool shown in FIGS. 53A-53C in a fifth position;

FIG. 54 is a section view along lines 54-54 of the obturating tool shown in FIG. 53A;

FIG. 55 is a section view along lines 55-55 of the obturating tool shown in FIG. 53A;

FIG. 56 is a section view along lines 56-56 of the obturating tool shown in FIG. 53A;

FIG. 57 is a section view along lines 57-57 of the obturating tool shown in FIG. 53B;

FIG. 58 is a section view along lines 58-58 of the obturating tool shown in FIG. 53B;

FIG. 59 is a section view along lines 59-59 of the obturating tool shown in FIG. 53B;

FIG. 60 is a section view along lines 60-60 of the obturating tool shown in FIG. 53B;

FIG. 61 is a section view along lines 61-61 of the obturating tool shown in FIG. 53B;

FIG. 62 is a section view along lines 62-62 of the obturating tool shown in FIG. 53B;

FIG. 63 is a section view along lines 63-63 of the obturating tool shown in FIG. 53B;

FIG. 64 is a section view along lines 64-64 of the obturating tool shown in FIG. 53B;

FIG. 65 is a section view along lines 65-65 of the obturating tool shown in FIG. 53C;

FIG. 66A is a section view of the uppermost end of an embodiment of a perforating valve, shown in an upper-closed position, in accordance with principles disclosed herein;

FIG. 66B is a section view of the lowermost end of the perforating valve shown in FIG. 66A;

FIG. 66C is a zoomed-in view of an embodiment of an upper lock ring of the sliding sleeve valve shown in FIGS. 66A and 66B;

FIG. 66D is a zoomed-in view of an embodiment of a middle lock ring of the sliding sleeve valve shown in FIGS. 66A and 66B;

FIG. 66E is a zoomed-in view of an embodiment of a lower lock ring of the sliding sleeve valve shown in FIGS. 66A and 66B;

FIG. 67A is a section view of the uppermost end of an embodiment of a perforating valve, shown in an open position, in accordance with principles disclosed herein;

FIG. 67B is a section view of the lowermost end of the perforating valve shown in FIG. 67A;

FIG. 67C is a zoomed-in view of an embodiment of an upper lock ring of the sliding sleeve valve shown in FIGS. 67A and 67B;

FIG. 67D is a zoomed-in view of an embodiment of a middle lock ring of the sliding sleeve valve shown in FIGS. 67A and 67B;

FIG. 67E is a zoomed-in view of an embodiment of a lower lock ring of the sliding sleeve valve shown in FIGS. 67A and 67B;

FIG. 68A is a section view of the uppermost end of an embodiment of a perforating valve, shown in a lower-closed position, in accordance with principles disclosed herein;

FIG. 68B is a section view of the lowermost end of the perforating valve shown in FIG. 68A;

FIG. 68C is a zoomed-in view of an embodiment of an upper lock ring of the sliding sleeve valve shown in FIGS. 68A and 68B;

FIG. 68D is a zoomed-in view of an embodiment of a middle lock ring of the sliding sleeve valve shown in FIGS. 68A and 68B;

FIG. 68E is a zoomed-in view of an embodiment of a lower lock ring of the sliding sleeve valve shown in FIGS. 68A and 68B;

FIG. 69A is a section view of the uppermost end of another embodiment of a flow transported obturating tool for actuating the sliding sleeve valve shown in FIGS. 32A-40 in accordance with principles disclosed herein;

FIG. 69B is a section view of a first intermediate section of the obturating tool shown in FIG. 69A;

FIG. 69C is a section view of a second intermediate section of the obturating tool shown in FIG. 69A;

FIG. 69D is a section view of a lowermost end of the obturating tool shown in FIG. 69A;

FIG. 69E is a side view of a bore sensor of the obturating tool shown in FIGS. 69A-69D in accordance with principles disclosed herein;

FIG. 69F is a zoomed-in view of an embodiment of a lock ring of the obturating tool shown in FIGS. 69A-69D;

FIG. 70 is a section view along lines 70-70 of the obturating tool shown in FIG. 69A;

FIG. 71 is a section view along lines 71-71 of the obturating tool shown in FIG. 69A;

FIG. 72 is a section view along lines 72-72 of the obturating tool shown in FIG. 69A;

FIG. 73 is a section view along lines 73-73 of the obturating tool shown in FIG. 69B;

FIG. 74 is a section view along lines 74-74 of the obturating tool shown in FIG. 69B;

FIG. 75 is a section view along lines 75-75 of the obturating tool shown in FIG. 69B;

FIG. 76 is a section view along lines 76-76 of the obturating tool shown in FIG. 69B;

FIG. 77 is a section view along lines 77-77 of the obturating tool shown in FIG. 69B;

FIG. 78 is a section view along lines 78-78 of the obturating tool shown in FIG. 69B;

FIG. 79 is a section view along lines 79-79 of the obturating tool shown in FIG. 69C;

FIG. 80 is a section view along lines 80-80 of the obturating tool shown in FIG. 69C;

FIG. 81 is a section view along lines 81-81 of the obturating tool shown in FIG. 69C;

FIG. 82 is a section view along lines 82-82 of the obturating tool shown in FIG. 69D;

FIG. 83A is a top view of an indexer (shown as unrolled for clarity) of the obturating tool of FIGS. 69A-69D;

FIG. 83B is a top view of the indexer (shown as unrolled for clarity) of FIG. 83A schematically illustrating the circuit of a pin of the indexer of FIG. 83A;

FIG. 84A is a schematic, cross-sectional view of an upper section of the obturating tool shown in FIGS. 69A-69D in a first position;

FIG. 84B is a schematic, cross-sectional view of an intermediate section of the obturating tool shown in FIGS. 69A-69D in the first position;

FIG. 84C is a schematic, cross-sectional view of a lower section of the obturating tool shown in FIGS. 69A-69D in the first position;

FIG. 85A is a schematic, cross-sectional view of an upper section of the obturating tool shown in FIGS. 69A-69D in a second position;

FIG. 85B is a schematic, cross-sectional view of an intermediate section of the obturating tool shown in FIGS. 69A-69D in the second position;

FIG. 85C is a schematic, cross-sectional view of a lower section of the obturating tool shown in FIGS. 69A-69D in the second position;

FIG. 86A is a schematic, cross-sectional view of an upper section of the obturating tool shown in FIGS. 69A-69D in a third position;

FIG. 86B is a schematic, cross-sectional view of an intermediate section of the obturating tool shown in FIGS. 69A-69D in the third position;

FIG. 86C is a schematic, cross-sectional view of a lower section of the obturating tool shown in FIGS. 69A-69D in the third position;

FIG. 87A is a schematic, cross-sectional view of an upper section of the obturating tool shown in FIGS. 69A-69D in a fourth position;

FIG. 87B is a schematic, cross-sectional view of an intermediate section of the obturating tool shown in FIGS. 69A-69D in the fourth position;

FIG. 87C is a schematic, cross-sectional view of a lower section of the obturating tool shown in FIGS. 69A-69D in the fourth position;

FIG. 88A is a schematic, cross-sectional view of an upper section of the obturating tool shown in FIGS. 69A-69D in a fifth position;

FIG. 88B is a schematic, cross-sectional view of an intermediate section of the obturating tool shown in FIGS. 69A-69D in the fifth position;

FIG. 88C is a schematic, cross-sectional view of a lower section of the obturating tool shown in FIGS. 69A-69D in the fifth position;

FIG. 89A is a section view of the uppermost end of another embodiment of a sliding sleeve valve, shown in an open position, in accordance with principles disclosed herein;

FIG. 89B is a section view of the lowermost end of the sliding sleeve valve shown in FIG. 89A;

FIG. 90 is a section view along lines 90-90 of the segment of the sliding sleeve valve shown in FIG. 89A;

FIG. 91A is a section view of the uppermost end of another embodiment of a flow transported obturating tool for actuating a sliding sleeve valve in accordance with principles disclosed herein;

FIG. 91B is a section view of a first middle section of the obturating tool shown in FIG. 91A;

FIG. 91C is a section view of a second middle section of the obturating tool shown in FIG. 91A;

FIG. 91D is a section view of a lowermost end of the obturating tool shown in FIG. 91A;

FIG. 92 is a section view along lines 92-92 of the segment of the obturating tool shown in FIG. 91A;

FIG. 93 is a section view along lines 93-93 of the segment of the obturating tool shown in FIG. 91C;

FIG. 94 is a section view along lines 94-94 of the segment of the obturating tool shown in FIG. 91C;

FIG. 95 is a zoomed-in side cross-sectional view of an embodiment of an actuation assembly of the obturating tool shown in FIG. 91C in accordance with principles disclosed herein;

FIG. 96A is a side view of an embodiment of a valve assembly, shown in a first position, of the actuation assembly of FIG. 95 in accordance with principles disclosed herein;

FIG. 96B is a side view of the valve assembly of FIG. 96A shown in a second position;

FIG. 96C is a side view of the valve assembly of FIG. 96A shown in a third position;

FIG. 96D is a side view of the valve assembly of FIG. 96A shown in a fourth position;

FIG. 97A is a section view of the uppermost end of another embodiment of a sliding sleeve valve, shown in a closed position, in accordance with principles disclosed herein;

FIG. 97B is a section view of the lowermost end of the sliding sleeve valve shown in FIG. 97A;

FIG. 98 is a section view along lines 98-98 of the segment of the sliding sleeve valve shown in FIG. 97A;

FIG. 99 is a section view along lines 99-99 of the segment of the sliding sleeve valve shown in FIG. 97A;

FIG. 100 is a section view along lines 100-100 of the segment of the sliding sleeve valve shown in FIG. 97A;

FIG. 101A is a section view of the uppermost end of another embodiment of a sliding sleeve valve, shown in a closed position, in accordance with principles disclosed herein;

FIG. 101B is a section view of the lowermost end of the sliding sleeve valve shown in FIG. 101A;

FIG. 102 is a section view along lines 102-102 of the segment of the sliding sleeve valve shown in FIG. 101A;

FIG. 103 is a bottom view of a first valve member of the sliding sleeve valve shown in FIGS. 101A and 101B in accordance with principles disclosed herein;

FIG. 104 is a top view of the first valve member shown in FIG. 103;

FIG. 105 is a section view along lines 105-105 of the first valve member shown in FIG. 103;

FIG. 106 is a top view of a second valve member of the sliding sleeve valve shown in FIGS. 101A and 101B in accordance with principles disclosed herein;

FIG. 107A is a section view of the uppermost end of another embodiment of a flow transported obturating tool for actuating a sliding sleeve valve in accordance with principles disclosed herein;

FIG. 107B is a section view of a first middle section of the obturating tool shown in FIG. 107A;

FIG. 107C is a section view of a second middle section of the obturating tool shown in FIG. 107A;

FIG. 107D is a section view of a lowermost end of the obturating tool shown in FIG. 107A;

FIG. 108 is a section view along lines 108-108 of the segment of the obturating tool shown in FIG. 107B;

FIG. 109 is a section view along lines 109-109 of the segment of the obturating tool shown in FIG. 107B;

FIG. 110 is a section view along lines 110-110 of the segment of the obturating tool shown in FIG. 107B;

FIG. 111 is a section view along lines 111-111 of the segment of the obturating tool shown in FIG. 107B;

FIG. 112 is a section view along lines 112-112 of the segment of the obturating tool shown in FIG. 107B;

FIG. 113 is a section view along lines 113-113 of the segment of the obturating tool shown in FIG. 107B;

FIG. 114 is a section view of another embodiment of a sliding sleeve valve, shown in a closed position, in accordance with principles disclosed herein;

FIG. 115 is a section view along lines 115-115 of the sliding sleeve valve shown in FIG. 114;

FIG. 116 is a section view along lines 116-116 of the sliding sleeve valve shown in FIG. 114;

FIG. 117A is a section view of the uppermost end of another embodiment of a flow transported obturating tool for actuating a sliding sleeve valve in accordance with principles disclosed herein;

FIG. 117B is a section view of a lowermost end of the obturating tool shown in FIG. 117A;

FIG. 118 is a section view along lines 118-118 of the segment of the obturating tool shown in FIG. 117A;

FIG. 119 is a section view along lines 119-119 of the segment of the obturating tool shown in FIG. 117A;

FIG. 120 is a section view along lines 120-120 of the segment of the obturating tool shown in FIG. 117A;

FIG. 121 is a section view along lines 121-122 of the segment of the obturating tool shown in FIG. 117A; and FIG. 122 is a section view along lines 122-122 of the segment of the obturating tool shown in FIG. 117A.

DETAILED DESCRIPTION

The following description is exemplary of embodiments of the disclosure. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment. The drawing figures are not necessarily to scale. Certain features and components disclosed herein may be shown exaggerated in scale or in somewhat schematic form, and some details of conventional elements may not be shown in the interest of clarity and conciseness. In some of the figures, one or more components or aspects of a component may be not displayed or may not have reference numerals identifying the features or components that are identified elsewhere in order to improve clarity and conciseness of the figure.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. If the connection transfers electrical power or signals, the coupling may be through wires or through one or more modes of wireless electromagnetic transmission, for example, radio frequency, microwave, optical, or another mode. In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis.

Referring to FIGS. 1A-1D, an embodiment of a well system 1 is schematically illustrated. Well system 1 generally includes a wellbore 3 extending through a subterranean formation 6, where the wellbore 3 includes a generally cylindrical inner surface 3*s*, a vertical section 3*v* extending from the surface (not shown) and a deviated section 3*d* extending horizontally through the formation 6. The deviated section 3*d* of wellbore 3 extends from a heel 3*h* disposed at the lower end of vertical section 3*v* and a toe (not shown) disposed at a terminal end of wellbore 3. In the embodiment of well system 1, the wellbore 3 is an open hole wellbore, and thus, the inner surface 3*s* of wellbore 3 is not lined with a cemented casing or liner, allowing for fluid communication between formation 6 and wellbore 3.

Well system 1 also includes a well string 4 disposed in wellbore 3 having a bore 4*b* extending therethrough. Well string 4 includes a plurality of isolation packers 5 and sliding sleeve valves 10. Specifically, each sliding sleeve 10 of well string 4 is disposed between a pair of isolation packers 5. Each isolation packer 5 is configured to seal against the inner surface 3*s* of the wellbore 3, forming discrete production zones 3*e* and 3*f* in wellbore 3, where fluid communication between production zones 3*e* and 3*f* is restricted. Although not shown in FIGS. 1A-1C, well string 4 includes additional isolation packers 5, sliding sleeve valves 10, and discrete production zones extending to the toe of the deviated section 3*d* of the wellbore 3. As will be described further herein, sliding sleeve valves 10 are configured to provide selectable fluid communication to the wellbore 3 via a plurality of circumferentially spaced ports 30 in response to actuation from an actuation or obturating tool.

Figures 1A, 1B, 1C:
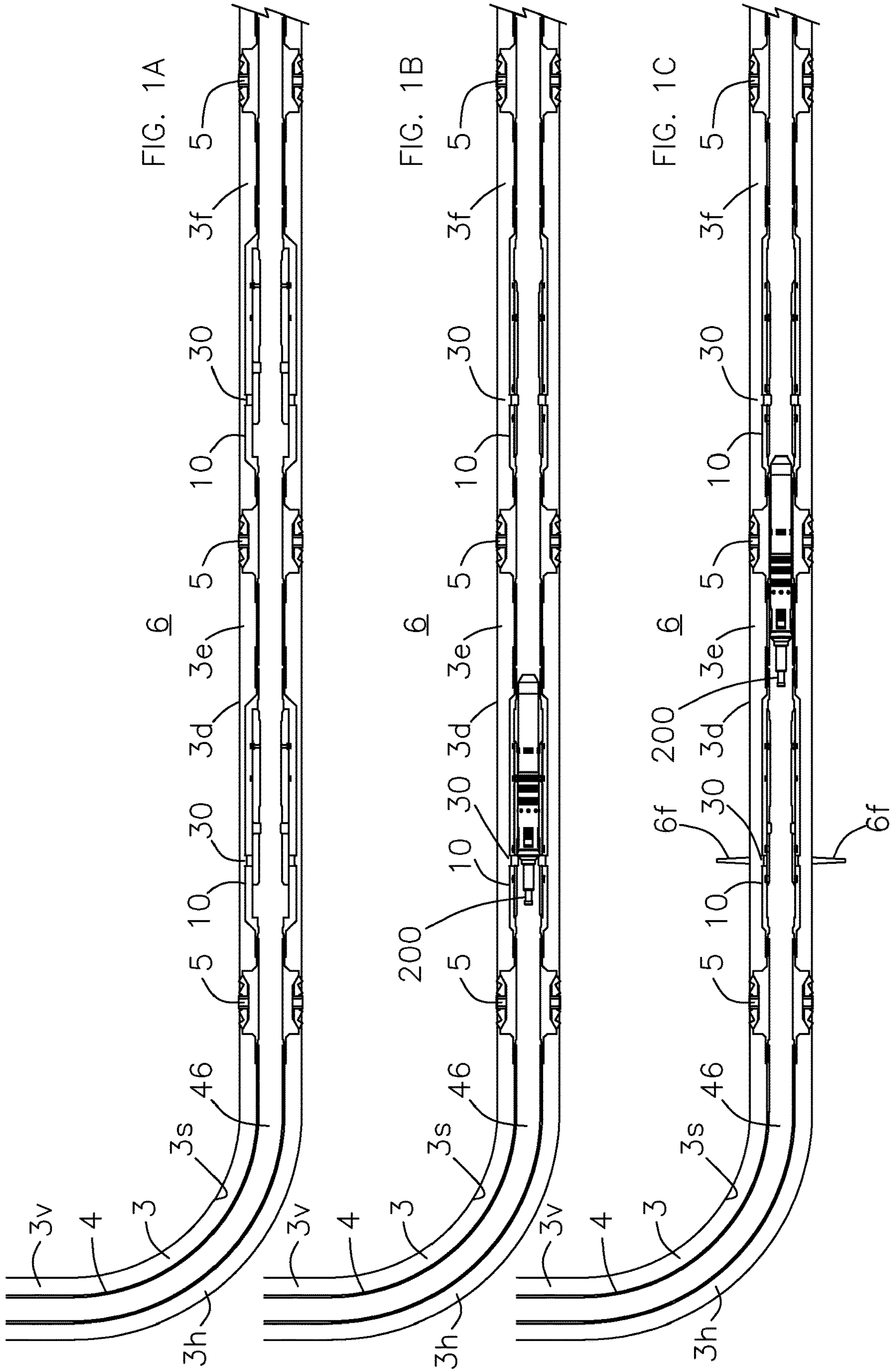
FIG. 1A is a schematic view of an embodiment of a well system having an open hole wellbore in a first position in accordance with principles disclosed herein.
FIG. 1B is a schematic view of the well system shown in FIG. 1A in a second position in accordance with principles disclosed herein.
FIG. 1C is a schematic view of the well system shown in FIG. 1A in a third position in accordance with principles disclosed herein.

FIG. 1A illustrates well system 1 following installation of the well string 4 within the wellbore 3, with each sliding sleeve valve 10 disposed in a closed position restricting fluid communication between bore 4*b* of well string 4 and the wellbore 3. FIG. 1B illustrates well system 1 following preparation for the commencement of a hydraulic fracturing operation of the formation 6. Particularly, the bore 4*b* of well string 4 has been washed and jetted and each of the sliding sleeve valves 10 have been actuated into an open position permitting fluid communication between bore 4*b* of well string 4 and the wellbore 3 using a coiled tubing actuation tool, as will be discussed further herein. FIG. 1B also illustrates an embodiment of an untethered, flow transported obturating tool 200 for hydraulically fracturing the formation 6 at each production zone (e.g., production zones 3*e*, 3*f*, etc.) of wellbore 3, as will be discussed further herein. In FIG. 1B the obturating tool 200 is shown disposed within the sliding sleeve valve 10 proximal the heel 3*h* of wellbore 3 prior to the hydraulic fracturing of the formation 6 at production zone 3*e*.

Figure 1D:
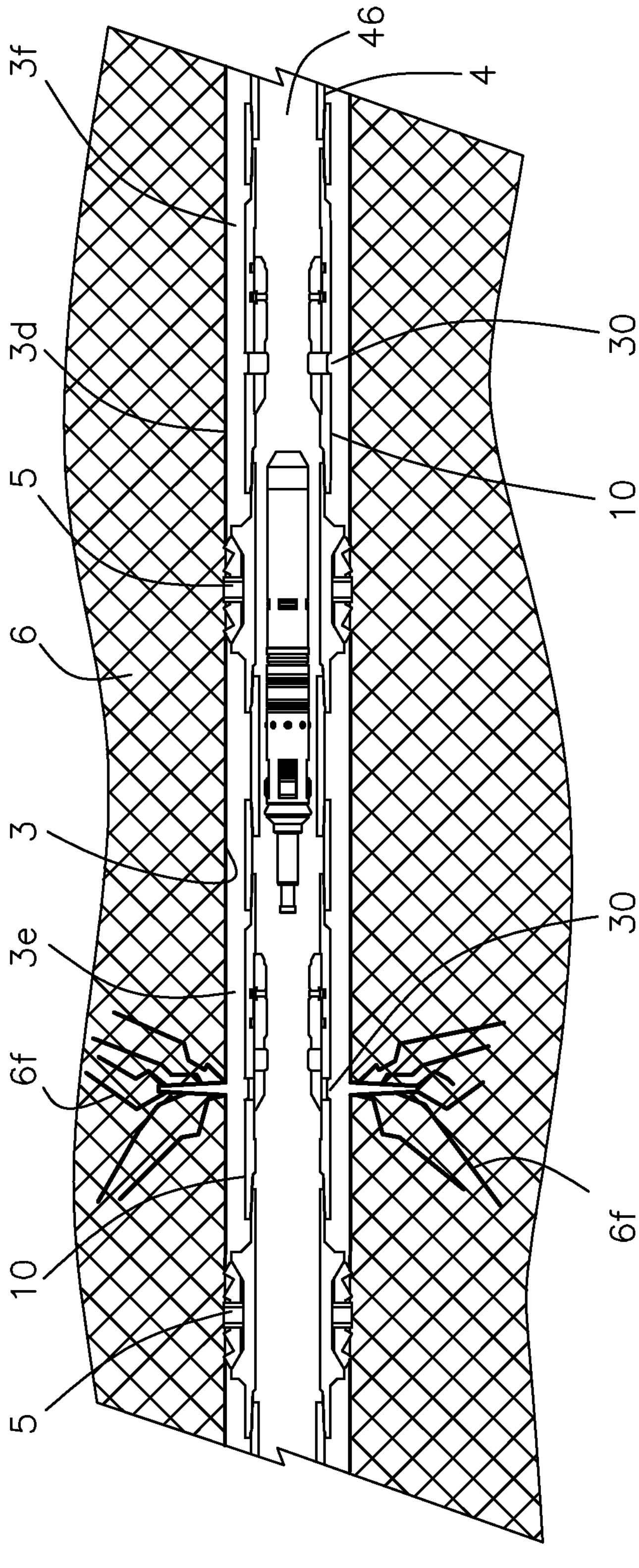
FIG. 1D is a zoomed-in view of an embodiment of a flow transported obturating tool of the well system shown in FIG. 1C in accordance with principles disclosed herein.

FIGS. 1C and 1D illustrate well system 1 following the production of fractures 6*f* in formation 6 at production zone 3*e* via obturating tool 200. FIGS. 1C and 1D also illustrate the sliding sleeve valve 10 of production zone 3*e* actuated into the closed position by obturating tool 200, and the obturating tool 200 displaced from the sliding sleeve valve 10 of production zone 3*e* towards the sliding sleeve valve 10 of production zone 3*f* In this manner, the formation 6 at production zone 3*f* may be hydraulically fractured, and each production zone proceeding towards the toe of wellbore 3 may be successively fractured. Once the formation 6 at each production zone (e.g., production zones 3*e*, 3*f*, etc.) has been hydraulically fractured using obturating tool 200, and the obturating tool 200 is disposed proximal the toe of wellbore 3, the obturating tool 200 may be fished and removed from the wellbore 3.

Figures 2A, 2B, 2C:
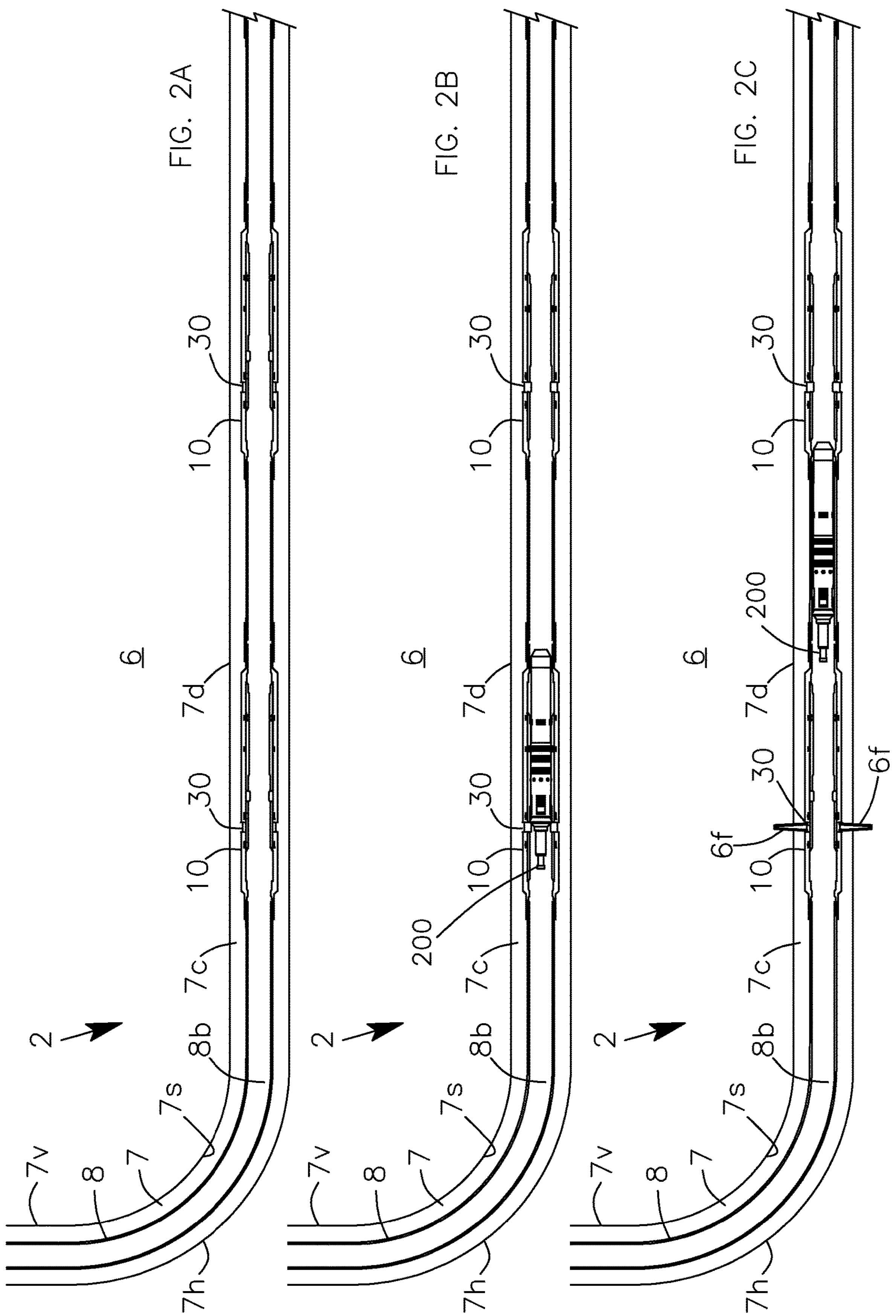
FIG. 2A is a schematic view of an embodiment of a well system having a cased wellbore in a first position in accordance with principles disclosed herein.
FIG. 2B is a schematic view of the well system shown in FIG. 2A in a second position in accordance with principles disclosed herein.
FIG. 2C is a schematic view of the well system shown in FIG. 2A in a third position in accordance with principles disclosed herein.

Referring to FIGS. 2A-2C, an embodiment of a well system 2 is schematically illustrated. Well system 2 generally includes a wellbore 7 extending through the formation 6, where the wellbore 7 includes a generally cylindrical inner surface 7*s*, a vertical section 7*v* extending from the surface (not shown) and a deviated section 7*d* extending horizontally through the formation 6. The deviated section 7*d* of wellbore 7 extends from a heel 7*h* disposed at the lower end of vertical section 7*v* and a toe (not shown) disposed at a terminal end of wellbore 7. Well system 2 also includes a well string 8 disposed in wellbore 7 having a bore 8*b* extending therethrough, and a plurality of sliding sleeve valves 10. Although not shown in FIGS. 2A-2C, well string 8 includes additional sliding sleeve valves 10 extending to the toe of the deviated section 7*d* of the wellbore 7. In the embodiment of well system 2, the wellbore 7 is a cased wellbore, and thus, well string 8 is cemented into position within wellbore 7 by cement 7*c* that lines the inner surface 7*s* of wellbore 7. In this arrangement, fluid communication between formation 6 and wellbore 7 is restricted by the cement 7*c*.

FIG. 2A illustrates well system 2 following installation of the well string 8 within the wellbore 7, with each sliding sleeve valve 10 disposed in a closed position restricting fluid communication between bore 4*b* of well string 4 and the wellbore 7, similar to the configuration of sliding sleeve valves 10 in FIG. 1A. FIG. 2B illustrates well system 2 following preparation for the commencement of a hydraulic fracturing operation of the formation 6. Particularly, the bore 8*b* of well string 8 has been washed and jetted, and each of the sliding sleeve valves 10 have been actuated into an open position permitting fluid communication between bore 8*b* of well string 8 and the wellbore 7 using a coiled tubing actuation tool, as will be discussed further herein. In FIG. 2B the obturating tool 200 is shown disposed within the sliding sleeve valve 10 proximal the heel 7*h* of wellbore 7 prior to the hydraulic fracturing of the formation 6.

FIG. 2C illustrates well system 2 following the production of fractures 6*f* in formation 6 via obturating tool 200 at the sliding sleeve valve 10 nearest the heel 7*h* of wellbore 7. In the embodiment of well system 2, fractures 6*h* extend both through the cement 7*c* disposed in wellbore 7, and into the formation 6, allowing for fluid communication between the formation 6 and wellbore 7. FIG. 2C also illustrates the sliding sleeve valve 10 nearest the heel 7*h* of wellbore 7 actuated into the closed position by obturating tool 200, and the obturating tool 200 displaced from the sliding sleeve valve 10 nearest the heel 7*h* of wellbore 7 towards the next successive sliding sleeve valve 10 moving towards the toe of the deviated section 7*d* of wellbore 7. In this manner, the formation 6 may be hydraulically fractured at each successive sliding sleeve valve 10 proceeding towards the toe of the deviated section 7*c* of wellbore 7. Once the formation 6 at each sliding sleeve valve 10 of well string 8 has been hydraulically fractured using obturating tool 200, and the obturating tool 200 is disposed proximal the toe of wellbore 7, the obturating tool 200 may be fished and removed from the wellbore 7.

Referring collectively to FIGS. 3A-8, an embodiment of a lockable sliding sleeve valve 10 is illustrated. Lockable sliding sleeve valve 10 is generally configured to provide selectable fluid communication to a desired portion of a wellbore. For instance, in a hydraulic fracturing operation a plurality of sliding sleeve valves 10 may be incorporated into a completion string disposed in an open hole wellbore, where one or more sliding sleeve valves 10 are isolated via a plurality set packers in a series of discrete production zones. In this arrangement, sliding sleeve valve 10 is configured to provide selective fluid communication with a chosen production zone of the wellbore, thereby allowing the chosen production zone to be individually hydraulically fractured or produced.

In the embodiment of FIGS. 3A-8, sliding sleeve valve 10 comprises a selectably lockable sliding sleeve valve, where the term "lockable sliding sleeve valve," is defined herein as a sliding sleeve valve that requires a key, engagement member, or input to unlock a sliding sleeve of the sliding sleeve valve, other than the axial force necessary to displace the sliding sleeve between open and closed positions once the sliding sleeve has been unlocked. In this manner, the lockable sliding sleeve valve 10 is configured for use in horizontal or deviated sections of a wellbore, where tools being displaced through sliding sleeve valve 10 may inadvertently impact or land against an inner surface or profile of sliding sleeve valve 10. For instance, in a horizontal section of wellbore, the weight of the tool directs the tool against an inner surface of sliding sleeve valve 10 as it passes therethrough, in contrast to a vertical portion of the wellbore, where the weight of the tool directs the tool through the central throughbore of sliding sleeve valve 10. Sliding sleeve valve 10 is particularly configured to prevent against, or mitigate the possibility of, a premature actuation of sliding sleeve valve 10 between closed and open positions in response to an inadvertent impact or contact between sliding sleeve valve 10 and a tool passing therethrough. Further, sliding sleeve valve 10 is configured, through the use of a single actuation or obturating tool, to obviate the use of a plurality of obturating members for actuating a plurality of sliding sleeve valves between open and closed positions, where the use of a large number of obturating members may complicate and increase both the complexity and costs of a hydraulic fracturing operation. In this manner, sliding sleeve valve 10 may increase the effectiveness of a hydraulic fracturing operation, while reducing the costs and complexity of such an operation.

In this embodiment, sliding sleeve valve 10 has a central or longitudinal axis 15, and includes a generally tubular housing 12 and a sliding sleeve or closure member 40 disposed therein. Tubular housing 12 includes a first or upper box end 14, a second or lower pin end 16, and a bore 18 extending between first end 14 and second end 16, where bore 18 is defined by a generally cylindrical inner surface 21. Housing 12 is made up of a series of segments including a first or upper segment 12*a*, intermediate segments 12*b*-12*d*, and a lower segment 12*e*, where segments 12*a*-12*e* are releasably coupled together via a series of threaded couplers or joints 20. In order to seal the bore 18 from the surrounding environment, each threaded coupler 20 is equipped with a pair of O-ring seals 20*s* to restrict fluid communication between each of the segments 12*a*-12*e* that form housing 12. Also, an annular groove 22*a-d* is disposed between each pair of segments 12*a*-12*e* of housing 12. Particularly, annular groove 22*a* is disposed between upper segment 12*a* and intermediate segment 12*b*, annular groove 22*b* is disposed between intermediate segments 12*b* and 12*c*, annular groove 22*c* is disposed between intermediate segments 12*c* and 12*d*, and annular groove 22*d* is disposed between intermediate segment 12*d* and lower segment 12*e*.

The inner surface 21 of housing 12 includes a downward facing first or annular upper shoulder 24 proximal first end 14 and an upward facing second or annular lower shoulder 26 proximal second end 16. Inner surface 21 of housing 12 also includes a plurality of circumferentially spaced ports 30 that extend radially through intermediate segment 12*b* of housing 12. As shown particularly in FIG. 4, in this embodiment housing 12 includes four ports 30 circumferentially spaced approximately 90° apart; however, in other embodiments housing 12 may include varying numbers of ports 30 circumferentially spaced at varying angles. To seal ports 30 when sliding sleeve valve 10 is in the closed position (shown in FIGS. 6A and 6B), an annular seal 32 is disposed proximal each axial end of circumferentially spaced ports 30. Particularly, one annular seal 32 is disposed in annular groove 22*a* located between upper segment 12*a* and intermediate segment 12*b* and a second annular seal 32 is disposed in annular groove 22*b* located between intermediate segments 12*b* and 12*c*. In the embodiment of FIGS. 3A-12, annular seals 32 comprise PolyPak® seals provided by the Parker Hannifin Corporation at 4900 Blaffer St, Houston, Tex. 77026. However, in other embodiments annular seals 32 may comprise other kinds of annular seals known in the art.

Sliding sleeve 40 is disposed coaxially within housing 12 and includes a first end 42 and a second end 44. Particularly, sliding sleeve 40 is disposed between upper shoulder 24 and lower shoulder 26 of the inner surface 21 of housing 12. Sliding sleeve 40 is generally tubular having a throughbore 46 extending between first end 42 and second end 44, where throughbore 46 is defined by a generally cylindrical inner surface 48. The inner surface 48 of sliding sleeve 40 includes a reduced diameter section or sealing surface 50 that extends circumferentially inward towards longitudinal axis 15 and forms a pair of annular shoulders: a first or annular upper shoulder 52 facing first end 42 and a second or annular lower shoulder 54 facing second end 44. In some embodiments, upper shoulder 52 comprises a no-go shoulder, where the term “no-go shoulder” is defined herein as a non-retractable shoulder or restriction used to facilitate arresting downward travel of a tool conveyed in a wellbore. Sliding sleeve 40 also includes a plurality of circumferentially spaced ports 56. As shown particularly in FIG. 4, in this embodiment sliding sleeve 40 includes five ports 56 circumferentially equidistantly spaced; however, in other embodiments sliding sleeve 40 may include varying numbers of ports 56 circumferentially spaced at varying angles. In this embodiment, the greater number of ports 56 of sliding sleeve 40 respective the number of ports 30 of housing 12 allows for fluid communication between ports 56 and ports 30 irrespective of circumferential alignment between housing 12 and sliding sleeve 40.

Sliding sleeve 40 further includes a plurality of circumferentially spaced apertures 58 that extend radially through the reduced diameter section 50 of inner surface 48. As shown particularly in FIG. 5, in this embodiment sliding sleeve 40 includes eight beveled apertures 58 circumferentially spaced approximately 45° apart; however, in other embodiments sliding sleeve 40 may include varying numbers of apertures 58 circumferentially spaced at varying angles. Each circumferentially spaced aperture 58 is bounded by a radially annular outer groove 60 that extends into an outer cylindrical surface 59 of sliding sleeve 40. The radially inward end of each circumferentially spaced aperture 58 comprises an opening in the reduced diameter surface 50 of sliding sleeve 40 that is shorter in axial width than the corresponding keys or engagement members of tools for actuating sliding sleeve valve 10, as will be explained further herein, for preventing the actuating keys or engagement members of the actuation or obturating tools from inadvertently engaging or becoming lodged in annular grooves 22*a*-22*d*, or other, similar grooves included in well string 4. In other embodiments, the radially inward end of each circumferentially spaced aperture 58 comprises an opening in the reduced diameter surface 50 of sliding sleeve 40 that is the same length as, or is greater in length than, the corresponding keys or engagement members of tools for actuating sliding sleeve vale 10.

Figures 3A, 3B, 4, 5:
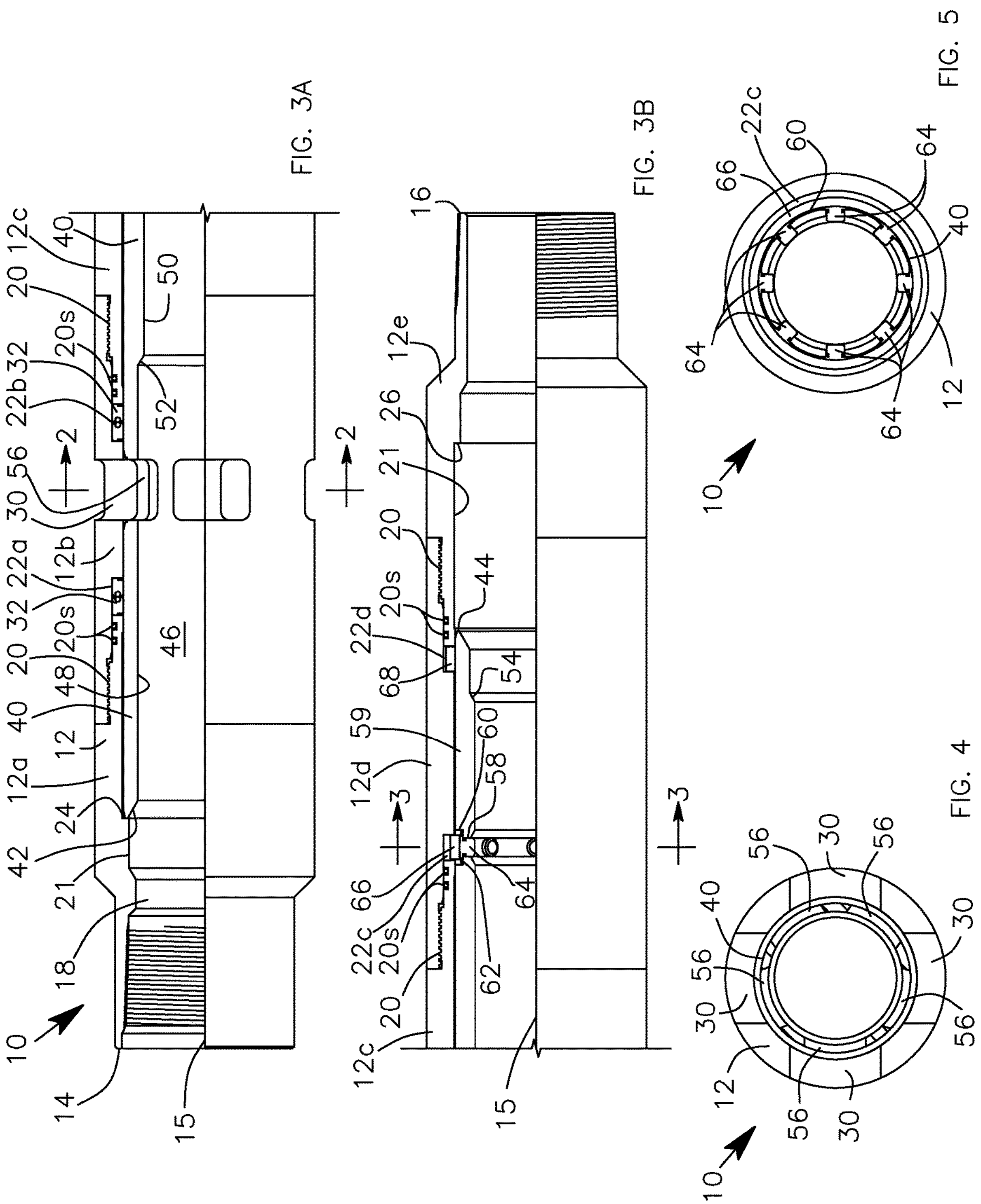
FIG. 3A is a section view of the uppermost end of an embodiment of a sliding sleeve valve, shown in an open position, in accordance with principles disclosed herein.
FIG. 3B is a section view of the lowermost end of the sliding sleeve valve shown in FIG. 3A.
FIG. 4 is a section view along lines 2-2 of the segment of the sliding sleeve valve shown in FIG. 3A.
FIG. 5 is a section view along lines 3-3 of the segment of the sliding sleeve valve shown in FIG. 3B.
Figure 3D:
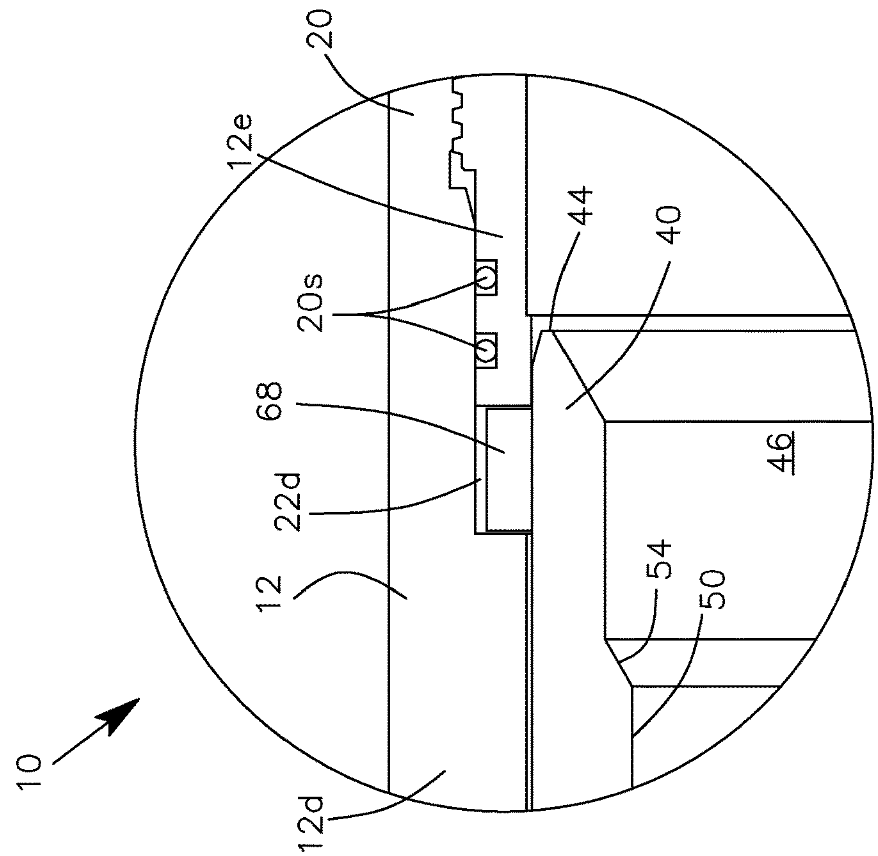
FIG. 3D is a zoomed-in view of an embodiment of a lower lock ring of the sliding sleeve valve shown in FIGS. 3A and 3B in accordance with principles disclosed herein.
Figure 3C:
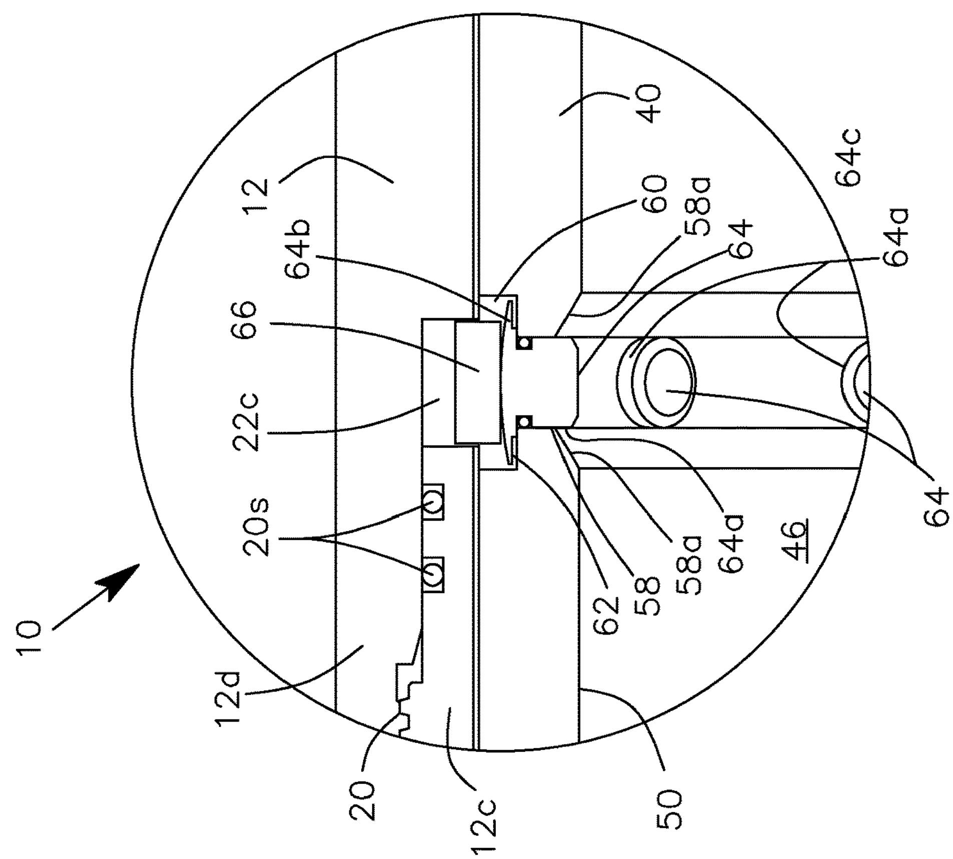
FIG. 3C is a zoomed-in view of an embodiment of an upper lock ring of the sliding sleeve valve shown in FIGS. 3A and 3B in accordance with principles disclosed herein.

The interface between each circumferentially spaced aperture 58 and the outer groove 60 forms a generally annular shoulder 62. Disposed within each aperture 58 is a radially translatable member or button 64 that can be radially displaced within a corresponding aperture 58. As shown particularly to FIG. 3C, each button 64 comprises a radially inner generally cylindrical body 64*a* and a radially outer flanged section 64*b*. Buttons 64 are shown in a radially inwards position in FIGS. 3A-5, where engagement between flanged section 64*b* and annular shoulder 62 restricts further radially inward displacement of button 64. Buttons 64 each include an annular seal 64*c* disposed in a groove extending radially into the body 64*a* of button 64. Seal 64*c* seals against an inner surface of aperture 58 to prevent an influx of sand or other particulates in the wellbore (e.g., wellbores 3 or 7) from entering the throughbore 46 of sliding sleeve valve 10. Also shown in FIG. 3C is a pair of annular bevels 58*a* extending between the reduced diameter section 50 of inner surface 48 and each aperture 58 to engage a corresponding member, such as a lock ring, of an actuation or obturating tool into and out of engagement with buttons 64 of sliding sleeve valve 10. Further, the radially inwards end of body 64*a* of each button 64 is disposed radially outwards from the reduced diameter section 50 of inner surface 48, and thus, body 64*a* of each button 64 does not project into throughbore 46 respective the reduced diameter section 50. Sliding sleeve valve 10 further includes a first or upper lock ring or c-ring 66 disposed in the annular groove 22*c* located between intermediate segments 12*c* and 12*d*, and a second or lower lock ring or c-ring 68 disposed in the annular groove 22*d* located between intermediate segment 12*d* and lower segment 12*e*. Both upper c-ring 66 and lower c-ring 68 are biased radially inward towards longitudinal axis 15.

As shown particularly in FIGS. 3A-5, sliding sleeve valve 10 includes a first or open position providing fluid communication between bore 18 of housing 12 and the surrounding environment (e.g., wellbore 3). In other words, when sliding sleeve 40 is disposed in the upper position shown in FIGS. 3A and 3B, fluid communication is provided between ports 30 and ports 56. In the open position the first end 42 of sliding sleeve 40 engages (or is disposed adjacent) upper shoulder 24 of housing 12 while second end 44 is distal lower shoulder 26. In this arrangement, ports 56 of sliding sleeve 40 axially align with ports 30 of housing 12, providing for fluid communication between the surrounding environment and throughbore 46 of sliding sleeve 40. Also, in the open position, outer groove 60 and circumferentially spaced apertures 58 axially align with annular groove 22*c*, with buttons 64 in physical engagement with an inner surface of upper c-ring 66, which is disposed in a radially contracted position. In the radially contracted position, the radially inward bias of upper c-ring 66 disposes upper c-ring 66 in both annular groove 22*c* of housing 12 and outer groove 60 of sliding sleeve 40, thereby restricting relative axial movement between housing 12 and sliding sleeve 40. In this arrangement, sliding sleeve 40 is locked from being displaced axially within housing 12, even if an axial force is applied against sliding sleeve 40. Also in this arrangement, lower c-ring 68 is disposed about outer surface 59 of sliding sleeve 40 in a radially expanded position.

Sliding sleeve valve 10 also includes a second or closed position, shown particularly in FIGS. 6A-8, restricting fluid communication between bore 18 of housing 12 and the surrounding environment (e.g., a wellbore). In other words, when sliding sleeve 40 is disposed in the lower position shown in FIGS. 6A and 6B, fluid communication is restricted between ports 30 and ports 56. In the closed position the first end 42 of sliding sleeve 40 is distal upper shoulder 24 of housing 12 while second end 44 engages (or is disposed adjacent) lower shoulder 26. In this arrangement, ports 56 of sliding sleeve 40 do not axially align with ports 30 of housing 12 and annular seals 32 provide sealing engagement against the outer surface 59 of sliding sleeve 40 to restrict fluid communication between ports 30 and bore 18. Also, in the closed position, outer groove 60 and circumferentially spaced apertures 58 axially align with annular groove 22*d*, with buttons 64 in physical engagement with an inner surface of lower c-ring 68, with lower c-ring 68 disposed in a radially contracted position. In the radially contracted position, the radially inward bias of lower c-ring 68 disposes lower c-ring 68 in both annular groove 22*d* of housing 12 and outer groove 60 of sliding sleeve 40, thereby restricting relative axial movement between housing 12 and sliding sleeve 40. Also in this arrangement, upper c-ring 66 is disposed about outer surface 59 of sliding sleeve 40 in a radially expanded position. As will be discussed further herein, sliding sleeve valve 10 may be transitioned between the open and closed positions an unlimited number of times via an appropriate actuation or obturating tool.

Figure 3F:
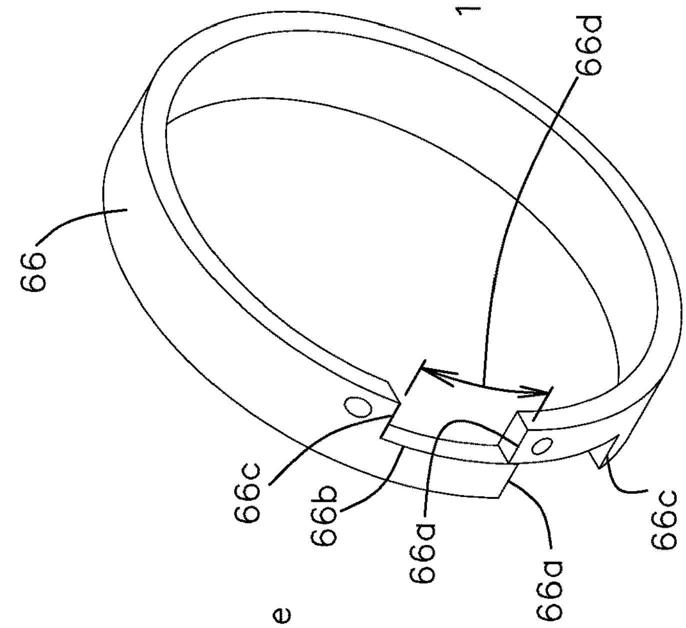
FIG. 3F is a perspective view of the upper lock ring of FIG. 3C in an expanded position in accordance with principles disclosed herein.
Figure 3E:
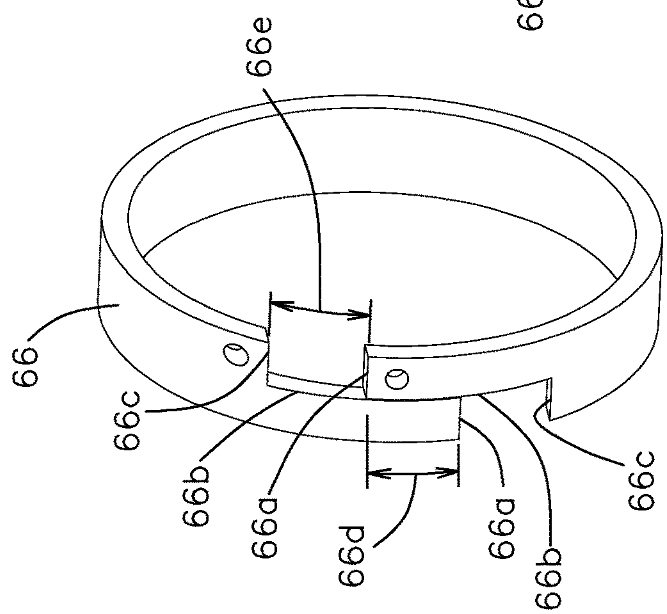
FIG. 3E is a perspective view of the upper lock ring shown in FIG. 3C.
Figures 6A, 6B, 7, 8:
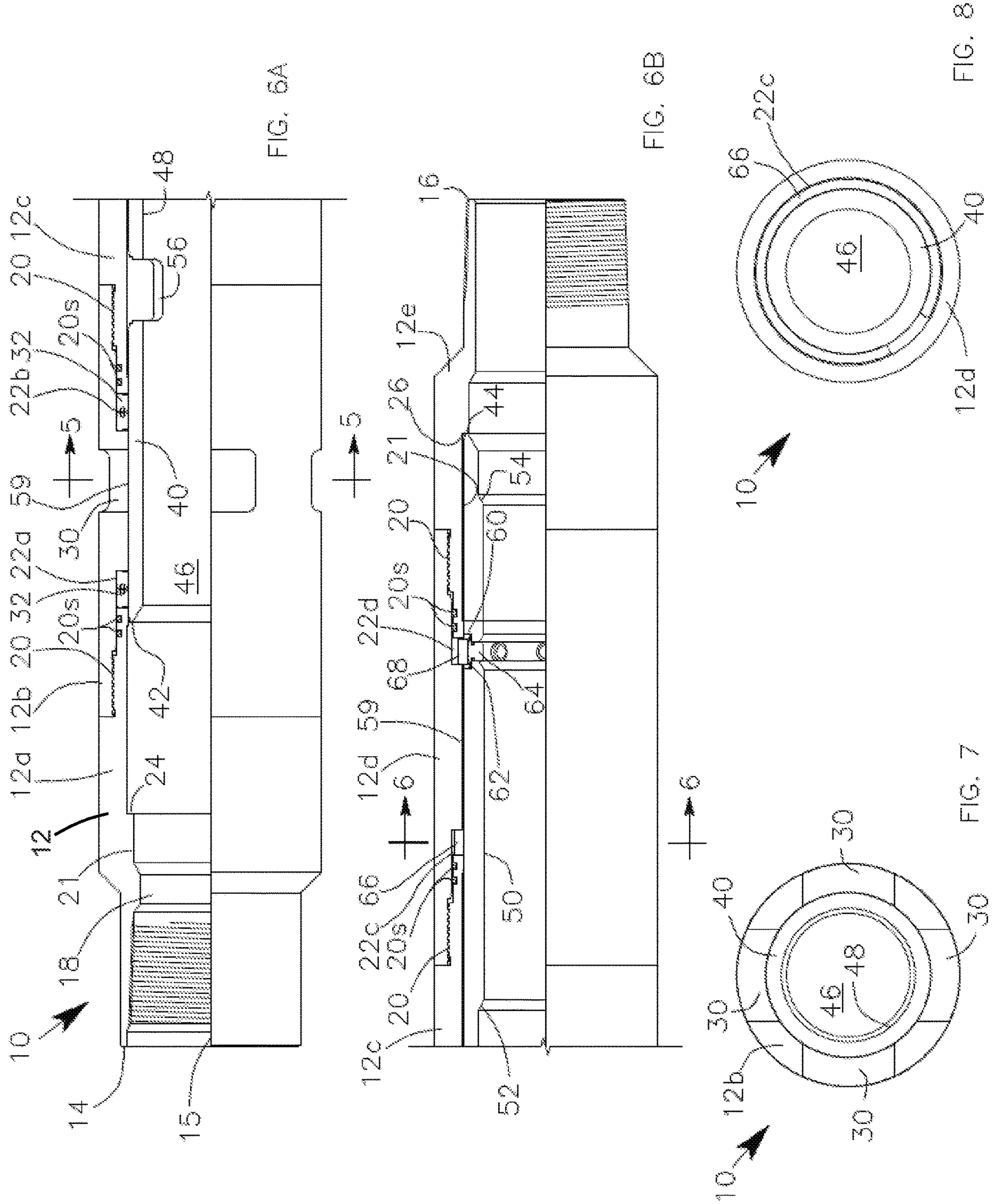
FIG. 6A is a section view of the uppermost end of the sliding sleeve valve shown in FIG. 3A, shown in a closed position, in accordance with principles disclosed herein.
FIG. 6B is a section view of the lowermost end of the sliding sleeve valve shown in FIG. 3B, shown in a closed position, in accordance with principles disclosed herein.
FIG. 7 is a section view along lines 5-5 of the segment of the sliding sleeve valve shown in FIG. 6A.
FIG. 8 is a section view along lines 6-6 of the segment of the sliding sleeve valve shown in FIG. 6B.
Figure 6D:
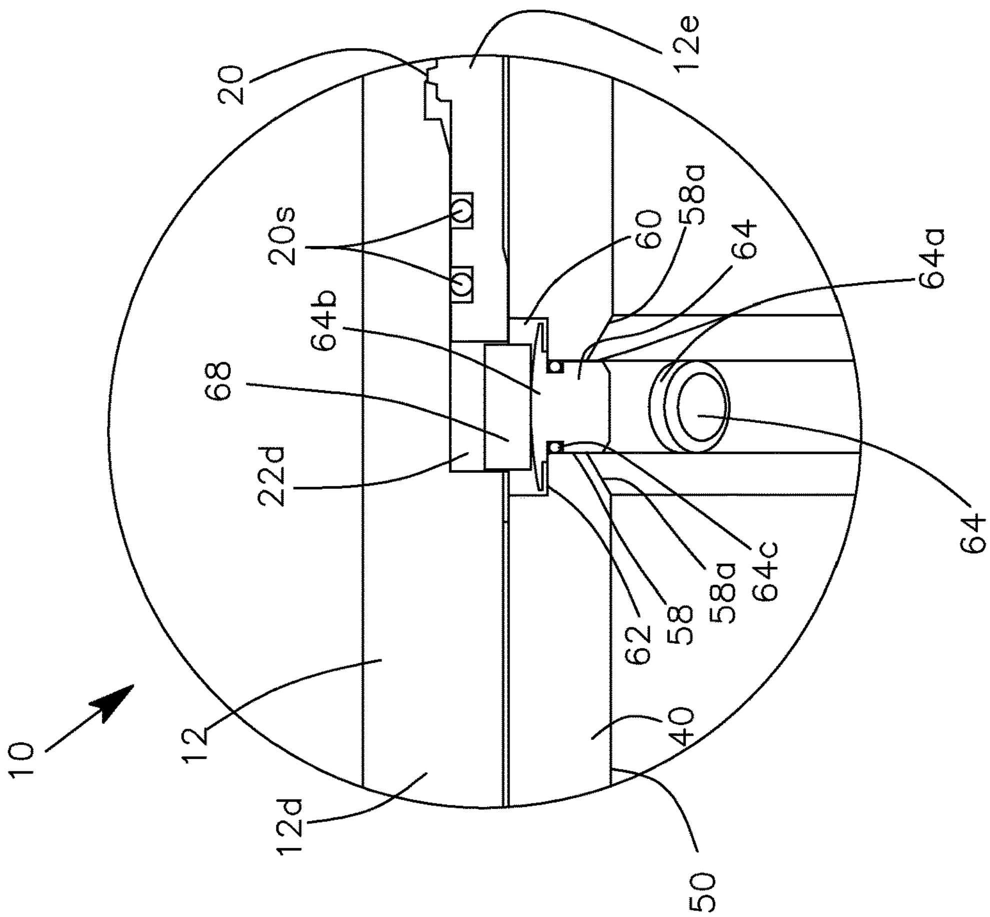
FIG. 6D is a zoomed-in view of an embodiment of a lower lock ring of the sliding sleeve valve shown in FIGS. 6A and 6B in accordance with principles disclosed herein.
Figure 6C:
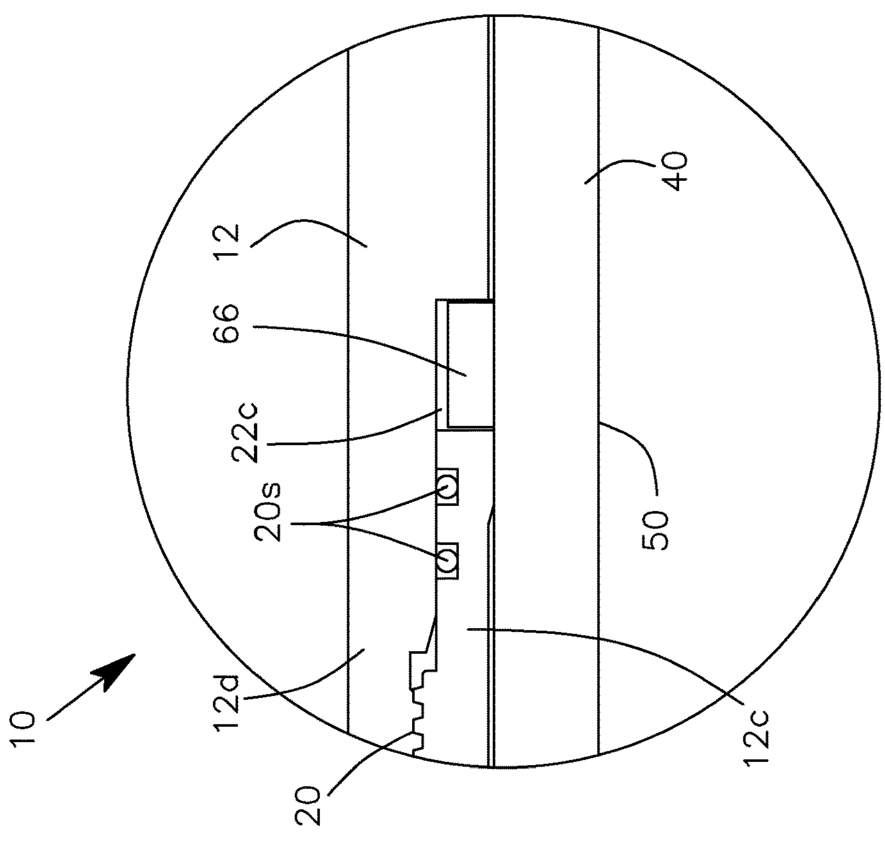
FIG. 6C is a zoomed-in view of an embodiment of an upper lock ring of the sliding sleeve valve shown in FIGS. 6A and 6B in accordance with principles disclosed herein.
Figure 12:
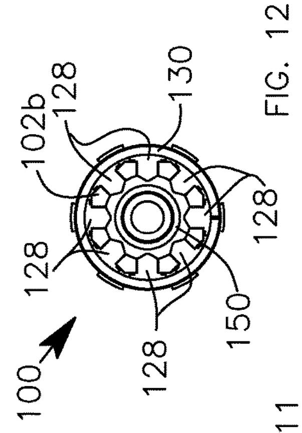
FIG. 12 is a section view along lines 10-10 of the coiled tubing actuation tool shown in FIG. 9A.
Figure 11:
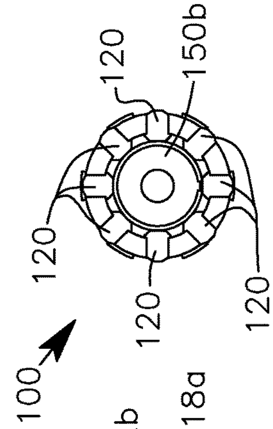
FIG. 11 is a section view along lines 9-9 of the coiled tubing actuation tool shown in FIG. 9A.
Figure 10:
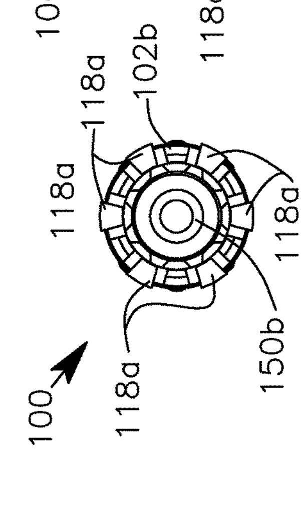
FIG. 10 is a section view along lines 8-8 of the coiled tubing actuation tool shown in FIG. 9A.

Referring to FIGS. 3E and 3F, upper c-ring 66 includes a pair of terminal ends 66*a*, where each terminal end 66*a* includes a notch 66*b* extending therein to a ledge 66*c*. When upper c-ring 66 is in the radially contracted position illustrated in FIGS. 3A-5, terminal ends 66*a* of upper c-ring 66 have an overlap 66*d*, preventing a circumferential gap from forming between the terminal ends 66*a*. In this arrangement, the overlap 66*d* of terminal ends 66*a* prevent buttons 64 from becoming wedged or stuck between terminal ends 66*a*, inhibiting the proper actuation of sliding sleeve valve 10. Further, in the radially contracted position a gap 66*e* is disposed between each ledge 66*c* and each terminal end 66*a* of upper c-ring 66, allowing upper c-ring 66 to further radially contract. When upper c-ring 66 is in the radially expanded position shown in FIGS. 6A-8, the gap 66*e* is expanded and the overlap 66*d* between terminal ends 66*a* is reduced, but no substantial circumferential gap is formed between terminal ends 66*a* to allow a button 64 to become wedged between terminal ends 66*a* of upper c-ring 66. Further, while FIGS. 3E and 3F illustrate upper c-ring 66, lower c-ring 68 is configured similarly as upper c-ring 66.

Referring collectively to FIGS. 9A-12, an embodiment of a coiled tubing actuation tool 100 is illustrated along with a schematic illustration of the sliding sleeve 40 of sliding sleeve valve 10 for additional clarity. Coiled tubing actuation tool 100 is generally configured to provide selectable fluid communication to a desired portion of a wellbore. More particularly, coiled tubing actuation tool 100 is configured to selectably actuate sliding sleeve valve 10 between the open position shown in FIGS. 3A-5, and the closed position shown in FIGS. 6A-8. Further, coiled tubing actuation tool 100 is configured to cycle the sliding sleeve valve 10 an unlimited number of times between the open and closed positions. The coiled tubing actuation tool 100 may be incorporated into a coiled tubing string displaced into a completion string (including one or more sliding sleeve valves 10) extending into a wellbore as part of a well servicing operation.

As will be explained further herein, coiled tubing actuation tool 100 is further configured to clean and prepare the inner surface of a completion string for hydraulic fracturing using a hydraulic fracturing tool. Thus, coiled tubing actuation tool 100 may be used in conjunction with a hydraulic fracturing tool, where coiled tubing actuation tool 100 is used first to clean the completion string, and actuate each sliding sleeve valve 10 into the open position; after which time, coiled tubing actuation tool 100 may be pulled out of the wellbore, and a hydraulic fracturing tool may be inserted to hydraulically fracture each isolated production zone of the wellbore, moving from a first or upper production zone distal the bottom or toe of the well, to a last or lower production zone proximal the toe of the well.

In this embodiment, coiled tubing actuation tool 100 is disposed coaxially with longitudinal axis 15 and includes a generally tubular engagement housing 102, and a piston 150 disposed therein. Tubular engagement housing 102 includes a first or upper end 104, a second or lower end 106, and a throughbore 108 extending between upper end 104 and lower end 106 defined by a generally cylindrical inner surface 110. Tubular engagement housing 102 also includes a generally cylindrical outer surface 109. Tubular engagement housing 102 is made up of a series of segments including a first or upper segment 102*a*, intermediate segments 102*b* and 102*c*, and a lower segment 102*d*, where segments 102*a*-102*d* are releasably coupled together via a series of threaded couplers 111. The inner surface 110 of upper segment 102*a* includes an upper shoulder 112.

Intermediate segment 102*b* of tubular engagement housing 102 includes a first or upper collet 116 comprising a plurality of circumferentially spaced collet fingers 118, where each collet finger 118 extends towards upper end 104 of tubular engagement housing 102 and terminates in an engagement portion 118*a* having an outer surface with an enlarged diameter (respective the diameter of outer surface 109 of tubular engagement housing 102) for engaging the inner surface 48 of sliding sleeve 40, as will be explained further herein. Intermediate segment 102*b* also includes a plurality of circumferentially spaced radially translatable members or bore sensors 120 disposed in a corresponding first or upper plurality of cylindrical apertures 122 extending radially through intermediate segment 102*b* for engaging the reduced diameter section 50 of the inner surface 48 of sliding sleeve 40. As shown particularly in FIG. 9C, each bore sensor 120 includes a radially outer generally cylindrical body 120*a* disposed in an aperture 122 and projecting radially outward respective outer surface 109 of tubular engagement housing 102, and a radially inner flanged section 120*b* for limiting the radially outward displacement of each bore sensor 120 via engagement with inner surface 110 of tubular engagement housing 102. The inner surface 110 of intermediate segment 102*b* also includes an annular intermediate shoulder 121 facing upper end 104 of tubular engagement housing 102.

The outer surface 109 of intermediate segment 102*b* includes an annular groove 124 extending therein and a second or lower plurality of cylindrical apertures 126 for housing a plurality of radially translatable members or buttons 128 disposed therein. As shown particularly in FIG. 9D, each button 128 includes a radially outer flanged section 128*a* limiting radial inward displacement of each button 128 via physical engagement with a seat 126*a* formed between annular groove 124 and the circumferentially spaced apertures 126. Also disposed in annular groove 124 is a radially inwards biased lock ring or c-ring 130 that engages the flanged section 128*a* of each button 128.

Figure 9E:
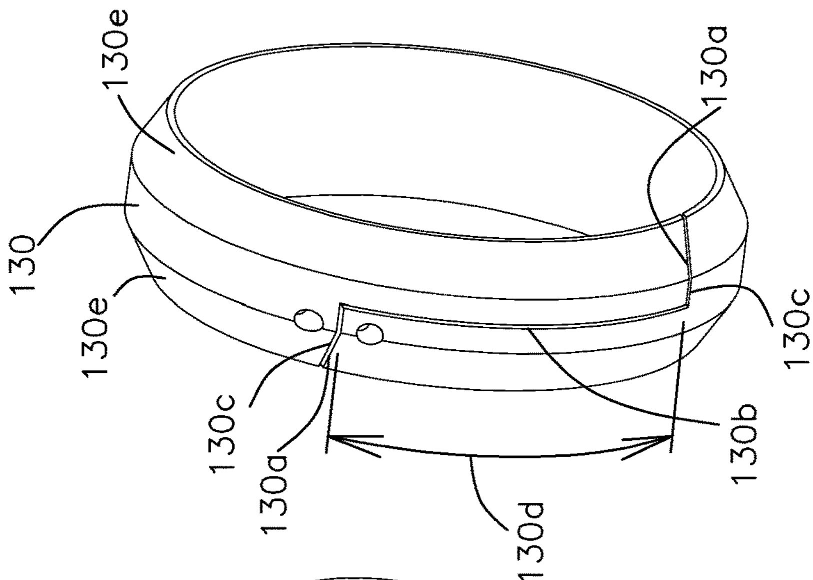
FIG. 9E is a perspective view of the lock ring shown in FIG. 9D.

As shown particularly in FIG. 9E, c-ring 130 includes a pair of terminal ends 130*a*, where each terminal end 130*a* includes a notch 130*b* extending therein to a ledge 130*c*. When c-ring 130 is in the radially contracted position illustrated in FIGS. 9A-12, terminal ends 130*a* of c-ring 130 have an overlap 130*d* allowing each terminal end 130*a* to engage a corresponding ledge 130*c* and preventing a circumferential gap from forming between the terminal ends 130*a*. In this arrangement, the overlap 130*d* of terminal ends

130*a* prevent bore sensors 128 from becoming wedged or stuck between terminal ends 130*a*, thereby inhibiting the proper actuation of coiled tubing actuation tool 100. When upper c-ring 66 is in a radially expanded position (as will be discussed further herein), the overlap 130*d* between terminal ends 130*a* is reduced, but no circumferential gap is formed between terminal ends 130*a* to allow a bore sensor 128 to become wedged between terminal ends 130*a* of c-ring 130. C-ring 130 further includes a pair of annular bevels 130*e* that extend into a radially outer surface of c-ring 130. Bevels 130*e* of c-ring 130 correspond with bevels 58*a* of sliding sleeve 40 to guide c-ring 130 into engagement with buttons 64 of sliding sleeve valve 10, as will be discussed further herein.

Intermediate segment 102*b* of tubular engagement housing 102 further includes a second or lower collet 132 comprising a plurality of circumferentially spaced collet fingers 134, where each collet finger 134 extends towards lower end 106 of tubular engagement housing 102 and terminates in an engagement portion 134*a* having an outer surface with an enlarged diameter for engaging the inner surface 48 of sliding sleeve 40, as will be explained further herein.

The inner surface 110 of intermediate segment 102*c* of tubular engagement housing 102 includes a reduced diameter section 136 for engaging and guiding piston 150. Intermediate segment 102*c* also includes an annular first flange 138 free to move axially respective tubular engagement housing 102, and an annular second flange 140 axially fixed to tubular engagement housing 102 via an engagement ring 142. First flange 138 and second flange 140 house a biasing member 144 extending therebetween, with the biasing member 144 providing a biasing force or pre-load against first flange 138 in the direction of the upper end 104 of tubular engagement housing 102. In the embodiment shown in FIGS. 9A-12, biasing member 144 comprises a coiled spring; however, in other embodiments biasing member 144 may comprise other kinds of biasing members known in the art. Lower segment 102*d* of tubular engagement housing 102 includes a plurality of circumferentially spaced jet subs 146 for directing jets of fluid at an oblique angle relative coiled tubing actuation tool 100. Particularly, jet subs 146 are configured to direct a fluid flow at an angle of approximately 30° from longitudinal axis 15 in the direction of upper end 104; however, in other embodiments jet subs 146 may direct a fluid flow at varying angles respective longitudinal axis 15. In this arrangement, jet subs 146 of tubular engagement housing 102 may be used to wash the inner surface 48 of sliding sleeve 40 and the inner surface 21 of housing 12 of sliding sleeve valve 10 prior to actuating engagement between sliding sleeve valve 10 and coiled tubing actuation tool 100. Jet subs 146 of coiled tubing actuation tool 100 may also be used to clean or wash the inner surface of other components of a completion string prior to insertion of a hydraulic fracturing tool for fracturing the isolated production zones, access to which is selectably provided by sliding sleeve valves, such as sliding sleeve valve 10.

In the embodiment of FIGS. 9A-12, piston 150 is disposed coaxially with longitudinal axis 15 and includes an upper end 152, a lower end 154, and a throughbore 156 extending between upper end 152 and lower end 154, where throughbore 156 is defined by a generally cylindrical inner surface 158. Piston 150 also includes a generally cylindrical outer surface 159. Piston 150 is made up of a series of segments including a first or upper segment 150*a*, an intermediate segment 150*b*, and a lower segment 150*c*, where segments 150*a*-150*c* are releasably coupled together via a series of threaded couplers 151. Upper segment 150*a* of piston 150 includes an annular groove 160 at upper end 152. Annular groove 160 provides for or augments a pressure differential between upper end 152 and lower end 154 of piston 150 in response to a fluid flow through throughbore 108, as will be explained further herein. A lower terminal end of upper segment 150*a* also includes a lower shoulder 162 facing lower end 154 of piston 150.

Intermediate segment 150*b* of piston 150 includes a first or upper locking sleeve 164 disposed about outer surface 159 of intermediate segment 150*b* between lower shoulder 162 of upper segment 150*a* and a first intermediate shoulder 166 of intermediate segment 150*b* facing upper end 152 of piston 150. In this arrangement, upper locking sleeve 164 may move axially relative piston 150 between engagement with lower shoulder 162 of upper segment 150*a* and first intermediate shoulder 166 of intermediate segment 150*b*. As shown particularly in FIG. 9A, upper locking sleeve 164 is biased into engagement with lower shoulder 162 by a biasing member 168 that extends between, and acts against, upper locking sleeve 164 and a second annular intermediate shoulder 170 extending radially outward from outer surface 159 of piston 150 and facing upper end 152 of piston 150.

Figure 9A:
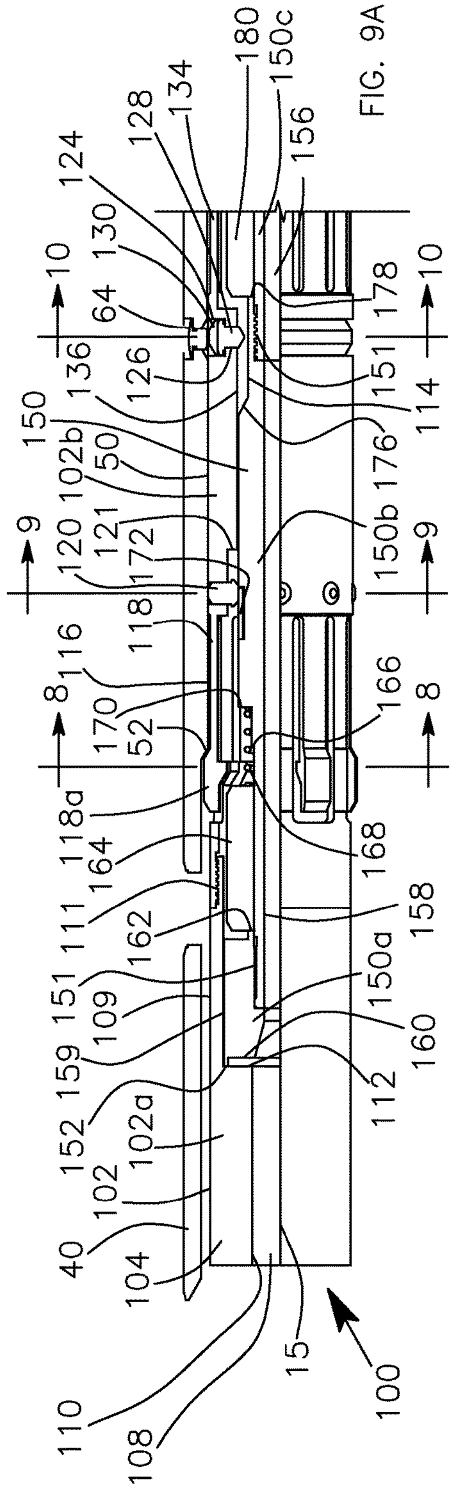
FIG. 9A is a section view of the uppermost end of an embodiment of a coiled tubing actuation tool for actuating the sliding sleeve valve shown in FIGS. 3A-8 between the open and closed positions in accordance with principles disclosed herein.
Figure 9B:
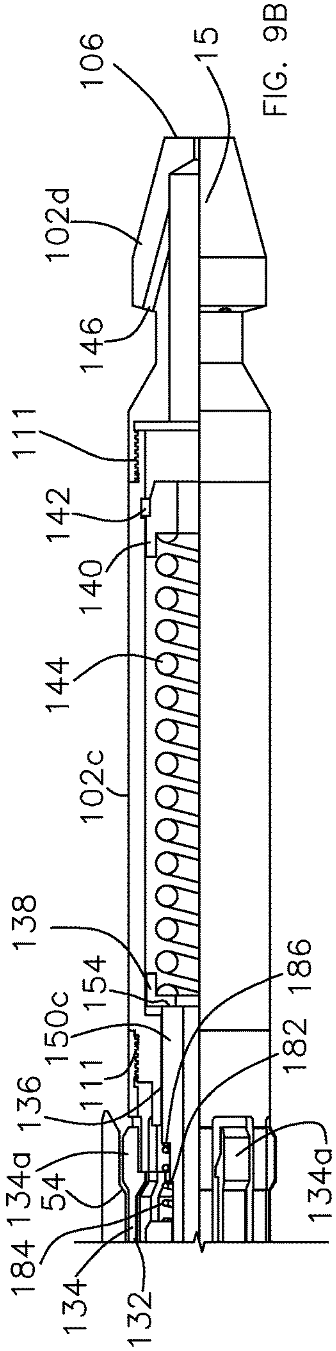
FIG. 9B is a section view of the lowermost end of the coiled tubing actuation tool shown in FIG. 9A.
Figure 9D:
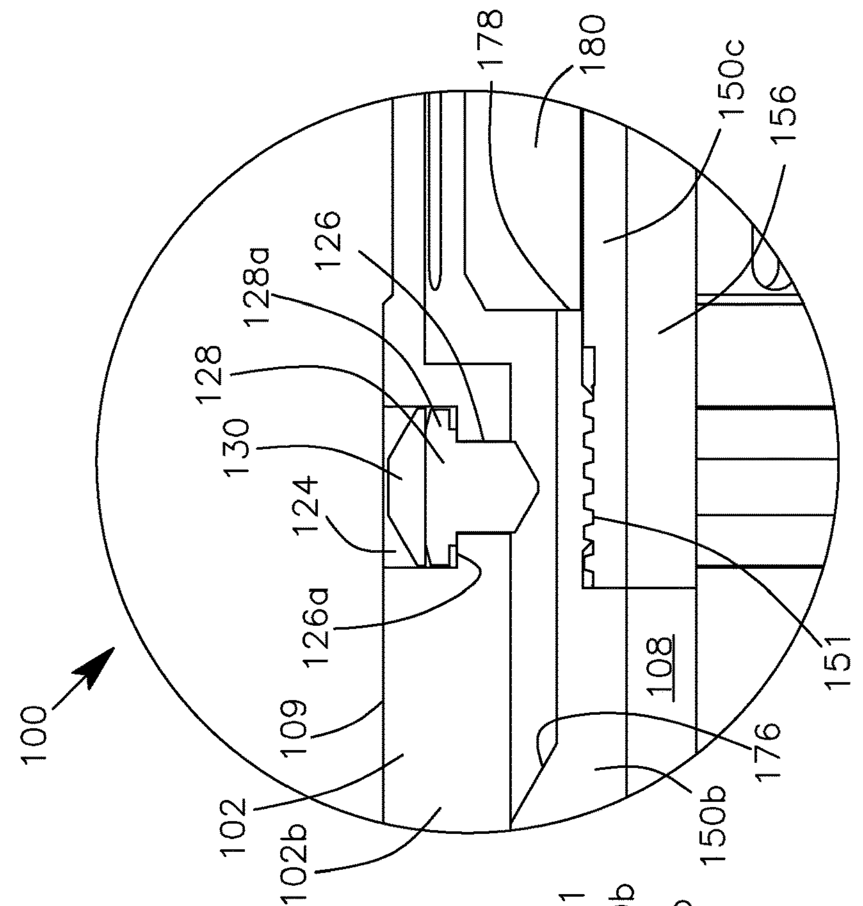
FIG. 9D is a zoomed-in view of an embodiment of a lock ring of the coiled tubing actuation tool shown in FIGS. 9A and 9B in accordance with principles disclosed herein.
Figure 9C:
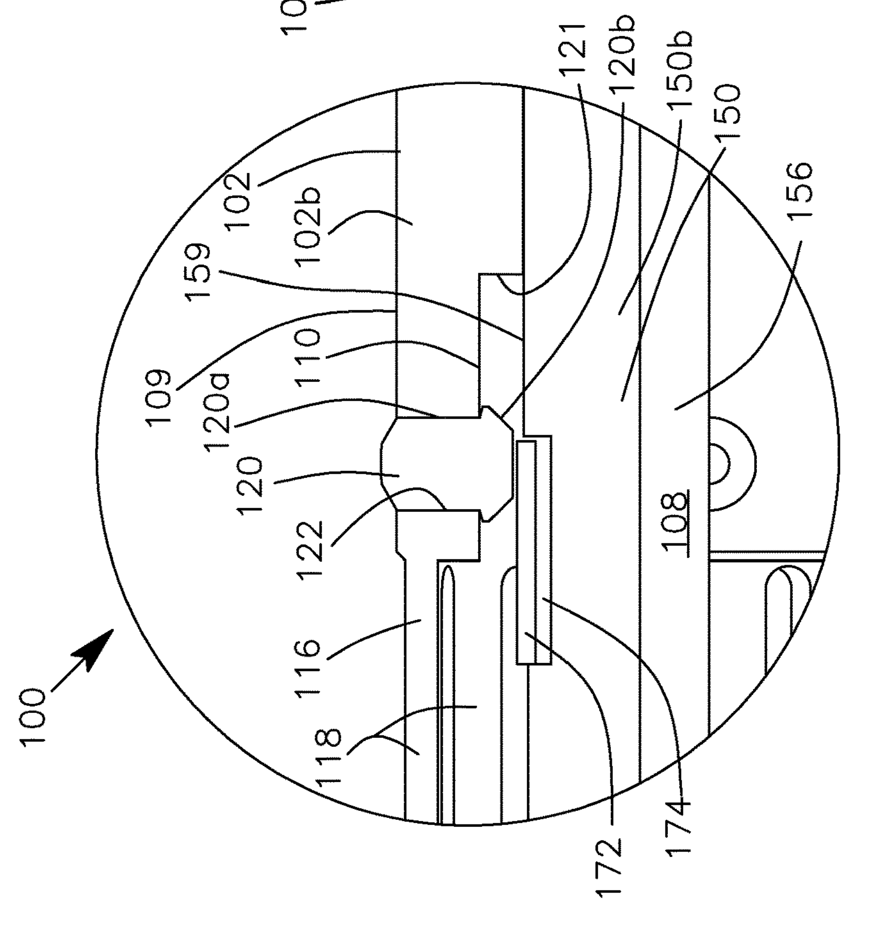
FIG. 9C is a zoomed-in view of an embodiment of a bore sensor of the coiled tubing actuation tool shown in FIGS. 9A and 9B in accordance with principles disclosed herein.
Figure 9F:
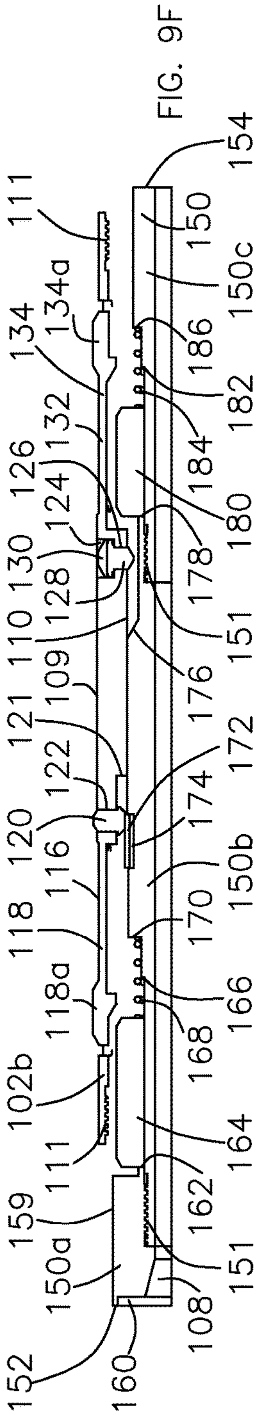
FIG. 9F is a schematic, cross-sectional view of the coiled tubing actuation tool shown in FIGS. 9A and 9B in a first position in accordance with principles disclosed herein.

As shown particularly in FIG. 9C, intermediate segment 150*b* also includes a radially outwards biased lock ring or c-ring 172 disposed in an annular groove 174 extending into the outer surface 159 of piston 150. C-ring 172, in conjunction with bore sensors 120, act to selectably restrict relative axial movement between piston 150 and tubular engagement housing 102. Specifically, when the radially outer end of bore sensor 120 is not engaged by the reduced diameter section 50 of sliding sleeve 40, the radially outward biased c-ring 172 acts against bore sensor 120 to displace bore sensor 120 radially outward to the most radially outward position permitted by the flanged section of bore sensor 120, allowing radially outward biased c-ring 172 to displace radially outward from annular groove 174 such that c-ring 172 protrudes from the outer surface 159 of piston 150. The radially outward protrusion of c-ring 172 from outer surface 159 restricts c-ring 172 from being displaced axially past intermediate shoulder 121 of tubular engagement housing 102, and instead, causes c-ring 172 to physically engage intermediate shoulder 121 in response to sufficient relative axial movement between tubular engagement housing 102 and piston 150, thereby preventing further relative axial movement between tubular engagement housing 102 and piston 150. In this arrangement, a fluid flow having a high fluid flow rate may be flowed through throughbore 108 of tubular engagement housing 102 for cleaning the inner surface of well string 4 without causing an inadvertent actuation of coiled tubing actuation tool 100. Conversely, when the radially outer end of bore sensor 120 engages the reduced diameter section 50 of sliding sleeve 40, the radially inner flanged section of bore sensor physically engages an outer surface of c-ring 172, displacing c-ring 172 radially inward into annular groove 174. In this position, c-ring 172 does not substantially protrude from outer surface 159 of piston 150, allowing c-ring 172 to be displaced axially past and radially within intermediate shoulder 121 towards lower end 106 of tubular engagement housing 102. Intermediate segment 150*b* of piston 150 further includes a second intermediate shoulder 176 having an angled or chamfered surface facing the lower end 154 of piston 150 for engaging the radially inner end of button 128, and a third intermediate shoulder 178 at a lower terminal end of intermediate segment 150*b* also facing the lower end 154 of piston 150.

Lower segment 150*c* of piston 150 includes a second or lower locking sleeve 180 disposed about outer surface 159 of lower segment 150*c* between third intermediate shoulder 178 of intermediate segment 150*b* and an annular first lower shoulder 182 of lower segment 150*c* facing upper end 152 of piston 150. In this arrangement, lower locking sleeve 180 may move axially relative piston 150 between engagement with the third intermediate shoulder 178 of intermediate segment 150*b* and the first lower shoulder 182 of lower segment 150*c*. As shown particularly in FIGS. 9A and 9B, lower locking sleeve 180 is biased into engagement with third intermediate shoulder 178 by a biasing member 184 that extends between, and acts against, lower locking sleeve 180 and an annular second lower shoulder 186 extending radially outward from outer surface 159 of piston 150 and facing the upper end 152 of piston 150.

Referring to FIGS. 1A-1C, 9A, 9B, and 9F-9M, in an embodiment coiled tubing actuation tool 100 may comprise a terminal end of a coiled tubing reel injected into the bore 4*b* of well string 4. In a first position of coiled tubing actuation tool 100 shown in FIG. 9F, the fluid flow rate through throughbore 108 does not exceed the threshold level to compress biasing member 144 and shift piston 150. In this position, the engagement portions 118*a* of upper collet 116 and the engagement portions 134*a* of lower collet 132 are each unsupported by upper locking sleeve 164 and lower locking sleeve 180, respectively, allowing fingers 118 of upper collet 116 and fingers 134 of lower collet 132 to flex radially relative the rest of tubular engagement housing 102. Thus, in the position shown in FIG. 9F, coiled tubing actuation tool 100 may be displaced through one or more sliding sleeve valves 10 of well string 4 without actuating the sliding sleeve valves 10.

For example, as the coiled tubing actuation tool 100 is displaced through the sliding sleeve valve 10 of production zone 3*e* in this position, the engagement portions 134*a* of lower collet 132, upon contacting upper shoulder 52 of sliding sleeve 40, will flex radially inwards allowing fingers 134 of lower collet 132 to be displaced through the reduced diameter section 50 of sliding sleeve 40. Similarly, upon contacting upper shoulder 52 of sliding sleeve 40, the engagement portions 118*a* of upper collet 118 will flex radially inwards allowing fingers 118 of upper collet 116 to be displaced through the reduced diameter section 50 of sliding sleeve 40. In this manner, coiled tubing actuation tool 100 may pass through one or more sliding sleeve valves 10 without inadvertently actuating a sliding sleeve valve 10, or becoming stuck within a sliding sleeve valve 10, as the coiled tubing actuation tool 100 passes through bore 4*b* of well string 4 towards the toe of wellbore 3.

Figure 9G:
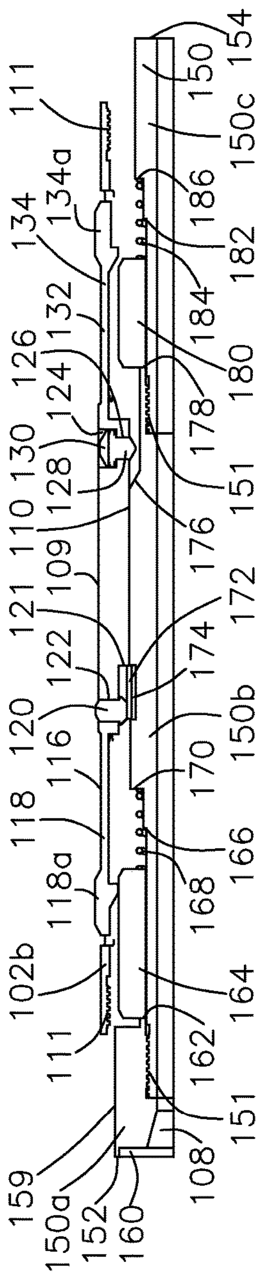
FIG. 9G is a schematic, cross-sectional view of the coiled tubing actuation tool shown in FIGS. 9A and 9B in a second position in accordance with principles disclosed herein.

FIG. 9G illustrates coiled tubing actuation tool 100 in a second position when the flow rate through throughbore 108 has reached a threshold level sufficient to compress biasing member 144 and shift piston 150 (including upper locking sleeve 164 and lower locking sleeve 180) downwards relative tubular engagement housing 102, but where the coiled tubing actuation tool 100 is not disposed within the reduced diameter section 50 of a sliding sleeve 40. In this position, the downwards shift of piston 150 causes upper locking sleeve 164, which is engaged against lower shoulder 162, to engage and radially support the engagement portions 118*a* of upper collect 116, preventing fingers 118 of upper collect 116 from flexing radially inwards relative the rest of tubular engagement housing 102. Also, because the coiled tubing actuation tool 100 is not disposed within the reduced diameter section 50 of a sliding sleeve 40, bore sensors 120 are in a radially outward position, allowing the radially outwards biased c-ring 172 to project radially outwards from annular groove 174 in a radially expanded position.

As shown in FIG. 9G, with c-ring 172 in a radially expanded position, the downwards shifting of piston 150 causes c-ring 172 to engage intermediate shoulder 121 of tubular engagement housing 102, restricting further downwards travel of piston 150 within tubular engagement housing 102. With piston 150 in the position illustrated in FIG. 9G, engagement portions 134*a* of lower collet 132 remain unsupported by lower locking sleeve 180, allowing fingers 134 of lower collet 132 to flex radially inwards relative the rest of tubular engagement housing 102. Thus, although piston 150 has shifted downwards in response to a threshold level of flow through throughbore 108, engagement between c-ring 172 and intermediate shoulder 121 restrict piston 150 from shifting downwards to the extent necessary for lower locking sleeve 180 to support engagement portions 134*a* of lower collet 132, thereby allowing engagement portions 134*a* to be displaced into the reduced diameter section 50 of a sliding sleeve 40 by flexing radially inwards.

Figure 9H:
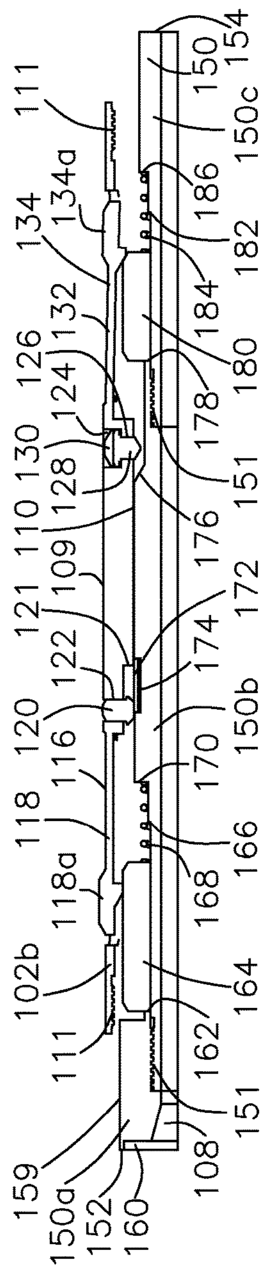
FIG. 9H is a schematic, cross-sectional view of the coiled tubing actuation tool shown in FIGS. 9A and 9B in a third position in accordance with principles disclosed herein.

FIG. 9H illustrates coiled tubing actuation tool 100 in a third position where the threshold level of fluid flow passes through throughbore 108, and a portion of tubular engagement housing 102 has entered the reduced diameter section 50 of a sliding sleeve 40. Particularly, lower collet 132 is shown disposed in the reduced diameter section 50 of a sliding sleeve 40, with engagement portions 134*a* of collet 132 flexed radially inwards respective the rest of tubular engagement housing 102. Bore sensors 120 are also disposed within the reduced diameter section 50, and in response, have been displaced into a radially inwards position, forcing c-ring 172 fully into annular groove 174 such that c-ring 172 is disposed in a radially contracted position allowing c-ring 172 to be displaced downwards past intermediate shoulder 121 of tubular engagement housing 102. With c-ring 172 disposed in a radially contracted position within annular groove 174, piston 150 is permitted to shift further downwards in response to the threshold level of fluid flow through throughbore 108. However, downwards movement of piston 150 within tubular engagement housing 102 is arrested by engagement between a lower end of lower locking sleeve 180 and the engagement portions 134*a* lower collet 132, which are flexed into a radially inwards position within the reduced diameter section 50 of sliding sleeve 40. In the position illustrated in FIG. 9H, buttons 128 have not engaged second intermediate shoulder 176, and thus, remain in a radially inwards position with radially inwards biased c-ring 130 correspondingly disposed in a radially contracted position within annular groove 124, preventing c-ring 130 from engaging buttons 64 of sliding sleeve 40.

Figure 9I:
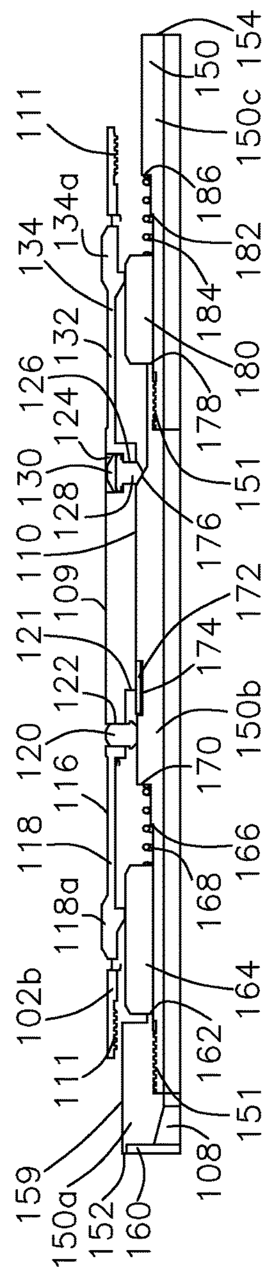
FIG. 9I is a schematic, cross-sectional view of the coiled tubing actuation tool shown in FIGS. 9A and 9B in a fourth position in accordance with principles disclosed herein.

FIG. 9I illustrates coiled tubing actuation tool 100 in a fourth position, with an above threshold level of fluid flow through throughbore 108, once it has been displaced downwards in the direction of the toe of wellbore 3 such that coiled tubing actuation tool 100 is disposed within the sliding sleeve valve 10 of production zone 3*e*. Specifically, engagement portions 134*a* of lower collet 132 are no longer disposed within reduced diameter section 50, and instead, are allowed to flex radially outwards such that engagement portions 134*a* are disposed adjacent lower shoulder 54 of sliding sleeve 40. In this arrangement, engagement portions 118*a* of upper collet 116 are disposed directly adjacent upper shoulder 52 of sliding sleeve 40, and c-ring 130 is disposed directly adjacent bevel 58*a* (shown in FIG. 3C). With c-ring 130 disposed adjacent bevels 58*a*, c-ring 130 is prohibited from expanding into the radially outwards position due to physical engagement from the reduced diameter section 50 of sliding sleeve 40 restricting radially outwards expansion of c-ring 130. In turn, buttons 128 remain in the radially inwards position, preventing further downwards displacement of piston 150 relative tubular engagement housing 102 due to physical engagement between buttons 128 and second intermediate shoulder 176 of piston 150.

Figures 9J, 9K, 9L, 9M:
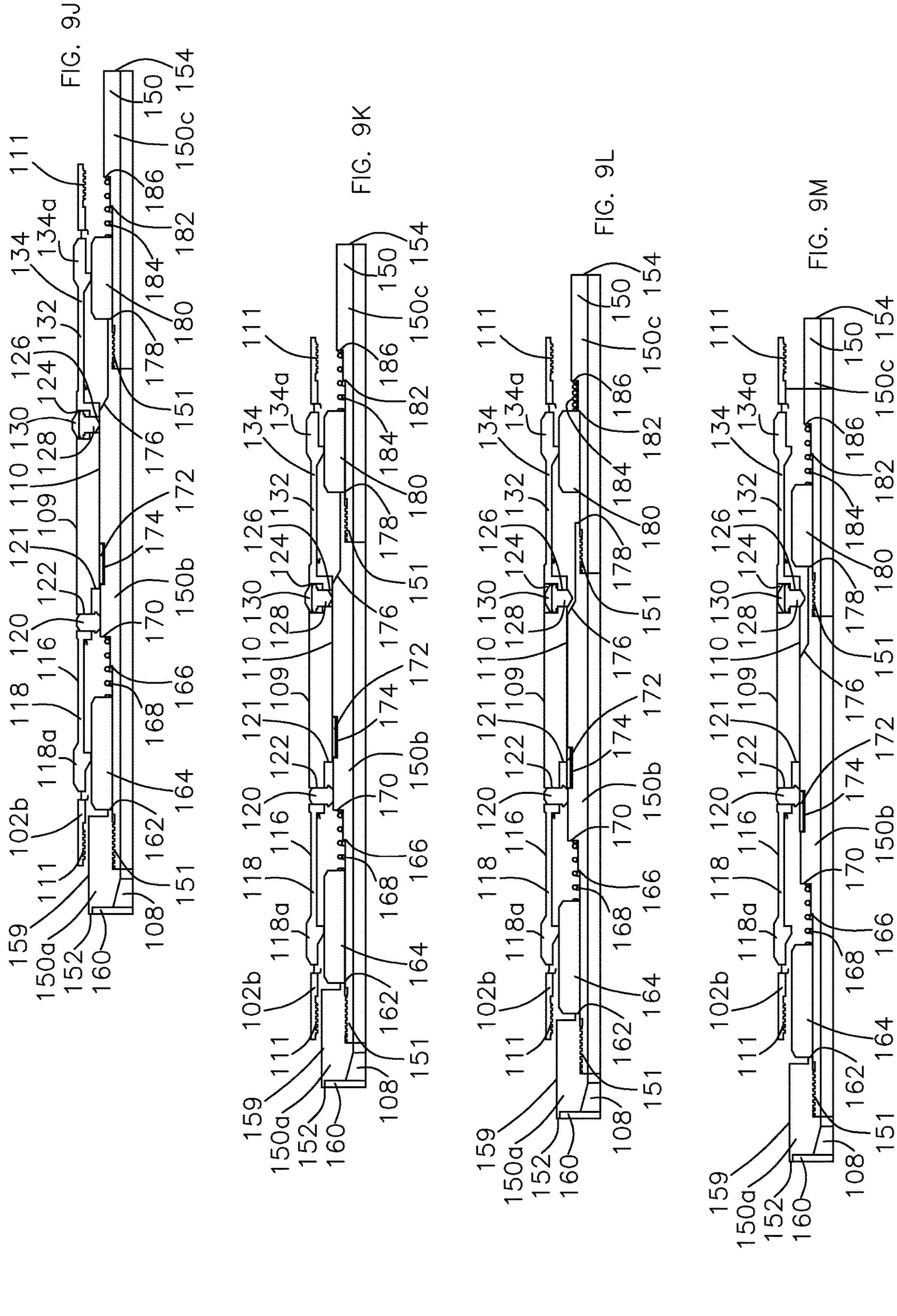
FIG. 9J is a schematic, cross-sectional view of the coiled tubing actuation tool shown in FIGS. 9A and 9B in a fifth position in accordance with principles disclosed herein.
FIG. 9K is a schematic, cross-sectional view of the coiled tubing actuation tool shown in FIGS. 9A and 9B in a sixth position in accordance with principles disclosed herein.
FIG. 9L is a schematic, cross-sectional view of the coiled tubing actuation tool shown in FIGS. 9A and 9B in a seventh position in accordance with principles disclosed herein.
FIG. 9M is a schematic, cross-sectional view of the coiled tubing actuation tool shown in FIGS. 9A and 9B in the first position shown in FIG. 9F.

FIG. 9J illustrates coiled tubing actuation tool 100 in a fifth position with an above threshold level of fluid flow through throughbore 108 while grappling and unlocking sliding sleeve 40 of the sliding sleeve valve 10 of production zone 3*e*. Particularly, coiled tubing actuation tool 100 is positioned within sliding sleeve 40 such that the engagement portions 118*a* of upper collet 116 engage or grapple the upper shoulder 52 of sliding sleeve 40 and the engagement portions 134*a* of lower collet 132 engage or grapple the lower shoulder 54 of sliding sleeve 40. In this position, c-ring 130 is axially aligned with buttons 64 of sliding sleeve 40, allowing c-ring 130 to expand into the radially outwards position in response to physical engagement from buttons 128, which are in turn engaged by the second intermediate shoulder 176 of piston 150. The radial expansion of c-ring 130 and buttons 128, urged by the physical engagement between buttons 64 and second intermediate shoulder 176 in response to the threshold level of fluid flow through throughbore 108, acts to shift piston 150 further downwards respective tubular engagement housing 102 such that engagement portions 134*a* of lower collet 132 are now fully supported or engaged by the lower locking sleeve 180. In other words, the radial expansion of the engagement portions 134*a* of lower collet 132 allows lower locking sleeve 180 to be displaced axially within engagement portions 134*a* of lower collet 132.

FIG. 9K shows coiled tubing actuation tool 100 in a sixth position similar to the position shown in FIG. 9J, except that coiled tubing actuation tool 100 has been displaced upwards (i.e., in the direction of heel 3*h* of wellbore 3) within the bore 4*b* of well string 4. With engagement portions 118*a* of upper collet 116 supported by upper locking sleeve 164, and engagement portions 134*a* of lower collet 132 supported by lower locking sleeve 180, sliding sleeve 40 is locked to coiled tubing actuation tool 100. Further, because c-ring 130 is disposed in a radially expanded position displacing buttons 64 of sliding sleeve 40 into the radially outwards position, sliding sleeve 40 is unlocked from the housing 12 of the sliding sleeve valve 10 of production zone 3*e*. Therefore, in the position shown in FIG. 9K, sliding sleeve 40 is displaced upward within housing 12 of sliding sleeve valve 10 by displacing the coiled tubing actuation tool 100 within bore 4*b* of well string 4. Particularly, by displacing coiled tubing actuation tool 100 within bore 4*b* of well string 4 when coiled tubing actuation tool 100 is in the position shown in FIG. 9K, sliding sleeve valve 10 is actuated from the closed position shown schematically in FIGS. 6A and 6B, to the open position shown schematically in FIGS. 3A and 3B. Moreover, with coiled tubing actuation tool 100 in the position shown in FIG. 9K, the sliding sleeve valve 10 may be actuated back into the closed position by displacing the coiled tubing actuation tool 100 downwards in the direction of the toe of wellbore 3.

FIG. 9L illustrates coiled tubing actuation tool 100 in a seventh position following the actuation of sliding sleeve valve 10 from the closed position to the open position, and subsequent to the decrease of fluid flow through throughbore 108 below the threshold level, allowing biasing member 144 to shift piston 150 upwards relative tubular engagement housing 102. Further, although sliding sleeve valve 10 has been actuated into the open position, an upwards force remains applied against coiled tubing actuation tool 100 in the direction of the heel 3*h* of wellbore 3. Specifically, with sliding sleeve valve 10 in the closed position, first end 42 of sliding sleeve 40 engages upper shoulder 24 of housing 12, preventing further upward travel of sliding sleeve 40. With sliding sleeve 40 locked against upper shoulder 24 of housing 12, the upward force applied to coiled tubing actuation tool 100 is transferred to the engagement portions 134*a* of lower collet 132, which forcibly engage the lower shoulder 54 of sliding sleeve 40. Particularly, the angled surface of lower shoulder 54 engages a corresponding angled surface of each engagement portion 134*a*, resulting in a radially inward force applied to engagement portions 134*a* by lower shoulder 54. However, engagement portions 134*a* of lower collet 132 are restricted from flexing radially inwards due to the support provided by lower locking sleeve 180. Instead, the radially inwards force applied to engagement portions 134*a* result in engagement portions 134*a* radially clamping or grappling a radially outer surface of lower locking sleeve 180, restricting relative movement between lower locking sleeve 180 and the tubular engagement housing 102.

With engagement portions 134*a* of lower collet 116 clamped to lower locking sleeve 180, lower locking sleeve 180 remains stationary respective tubular engagement housing 102 as piston 150 shifts upward, compressing biasing member 184 until the lower end of lower locking sleeve 180 contacts the first lower shoulder 182. Thus, further upwards travel of piston 150 within tubular engagement housing 102 is restricted due to the engagement between the lower end of lower locking sleeve 180 and the first lower shoulder 182. However, piston 150 is allowed to travel upwards a distance sufficient such that buttons 128 no longer engage the outer surface 159 of piston 150 and are thus disposed in the radially inwards position with c-ring 130 disposed in the radially contracted position within annular groove 124, thereby locking and restricting relative movement between sliding sleeve 40 and the housing 12 of the sliding sleeve valve 10 of production zone 3*e*.

FIG. 9M illustrates coiled tubing actuation tool 100 in an eighth position where fluid flow through throughbore 108 is below the threshold level, and no force, either upwards in the direction of the heel 3*h* or downwards in the direction of the toe of wellbore 3, is applied to coiled tubing actuation tool 100. Given that in this position no force is applied against coiled tubing actuation tool 100, there is no longer a radially inwards resultant force applied against engagement portions 134*a* of lower collet 132 by the lower shoulder 54 of sliding sleeve 40. With no radially inwards force applied against engagement portions 134*a*, engagement portions 134*a* are no longer radially clamped to lower locking sleeve 180, allowing for relative movement between lower locking sleeve 180 and the tubular engagement housing 102. Thus, in the position shown in FIG. 9M, piston 150 travels further upward relative tubular engagement housing 102 until upper end 152 of piston 150 engages upper shoulder 112 of tubular engagement housing 102, restricting further upward travel of piston 150. Further, lower locking sleeve 180 is displaced upwards relative piston 150 by the biasing force applied against lower locking sleeve 180 by biasing member 186 until the upper end of lower locking sleeve 180 engages the third intermediate shoulder 178 of piston 150.

As a result, coiled tubing actuation tool 100, with engagement portions 118*a* of upper collet 116 disposed adjacent upper shoulder 52 and engagement portions 134*a* of lower collet 132 disposed adjacent lower shoulder 54 of sliding sleeve 40, may be displaced through sliding sleeve 40 in the direction of the toe of wellbore 3. In this manner, coiled tubing actuation tool 100 may be displaced into and actuate the sliding sleeve valve 10 of production zone 3*f*, and so forth, until each sliding sleeve valve 10 of well string 4 has been actuated into the open position in preparation for the hydraulic fracturing of formation 6. Further, although coiled tubing actuation tool 100 has been described above in the context of well system 1, the above description is equally applicable in the context of well system 2.

Referring collectively to FIGS. 13A-26, an embodiment of an untethered, flow transported obturating tool 200 is illustrated along with a schematic illustration of the sliding sleeve 40 of sliding sleeve valve 10 for additional clarity. Obturating tool 200 is generally configured to provide selectable fluid communication to a desired portion of a wellbore. More particularly, obturating tool 200 is configured to selectably actuate sliding sleeve valve 10 between the open position shown in FIGS. 3A-5, and the closed position shown in FIGS. 6A-8. Further, obturating tool 200 is configured to cycle an unlimited number of sliding sleeve valves 10 between the open and closed positions. The obturating tool 200 may be disposed in the bore of a completion string at the surface of a wellbore and pumped downwards through the wellbore towards the bottom of the wellbore, where the obturating tool 200 may selectively actuate one or more sliding sleeve valves 10 (which form a part of the completion string), or other sliding sleeve valves that are known in the art, as it is pumped down through the wellbore.

In the embodiment of FIGS. 13A-26, obturating tool 200 comprises a hydraulic fracturing tool configured to hydraulically fracture one or more production zones of a wellbore. Particularly, obturating tool 200 is configured to respond to pressure cycles and to land and lock against a sliding sleeve 40 of a sliding sleeve valve 10, thereby restricting fluid flow through the sliding sleeve valve 10, direct an entire fluid flow of fracturing fluid from the surface through ports 56 of the sliding sleeve valve 10, actuate the sliding sleeve valve 10 from the open position to the closed position, and unlock from the sliding sleeve valve 10 such that the obturating tool 200 may be displaced further downhole through the wellbore to another production zone to be hydraulically fractured. In this manner, obturating tool 200 comprises a top-to-bottom hydraulic fracturing tool in that obturating tool 200 is configured to hydraulically fracture a formation moving from a first or upper isolated production zone to a last or lower isolated production zone proximal the bottom or toe of the well extending through the formation.

Obturating tool 200 may be used in conjunction with coiled tubing actuation tool 100 in hydraulically fracturing a formation from a wellbore, including a wellbore having one or more horizontal or deviated sections. As described above, coiled tubing actuation tool 100 may be used to prepare the completion string for hydraulic fracturing using a hydraulic fracturing tool, such as obturating tool 200. Specifically, coiled tubing actuation tool 100 may be used first to clean the completion string, and actuate each sliding sleeve valve 10 into the open position. Following this, coiled tubing actuation tool 100 may be removed from the completion string, and obturating tool 200 may be inserted therein, where it may proceed in hydraulically fracturing each isolated production zone via sliding sleeve valves 10, moving downwards through the completion string until it reaches a terminal end thereof.

In this embodiment, obturating tool 200 is disposed coaxially with longitudinal axis 15 and includes a generally tubular housing 202, and a core 270 disposed therein. Housing 202 includes an upper end 204, a lower end 206, and a throughbore 208 extending between upper end 204 and lower end 206, where throughbore 208 is defined by a generally cylindrical inner surface 210. Housing 202 also includes a generally cylindrical outer surface 209. Housing 202 is made up of a series of segments including a first or upper segment 202*a*, intermediate segments 202*b* and 202*c*, and a lower segment 202*d*, where segments 202*a*-202*d* are releasably coupled together via a series of threaded couplers 211.

Upper segment 202*a* of housing 202 includes an annular upper groove 212 extending into outer surface 209 that houses an annular flanged centralizer 214. Centralizer 214 is formed from a flexible elastomeric material and is configured to engage an inner diameter of the completion string, including the inner surface 48 of sliding sleeve 40 to centralize obturating tool 200 as it is displaced through the completion string. Upper segment 202*a* also includes a plurality of circumferentially spaced, axially extending slots 216 defined by an upper shoulder 216*a* and a lower shoulder 216*b*. Disposed within each elongate slot 216 is a plurality of circumferentially spaced elongate first or upper engagement members or keys 218 engaging upper shoulder 216*a* and a corresponding plurality of circumferentially spaced biasing members 220 extending between a lower surface of upper keys 218 and the lower shoulder 216*b* of elongate slot 216. Biasing members 220 allows upper keys 218 to be displaced axially downwards towards lower end 206 of housing 202, enabling upper keys 218 to translate into a radially inward position off of an upper first increased diameter section 278 of outer surface 276, such that upper keys 218 are disposed axially adjacent a first lower shoulder 282.

As will be discussed further herein, each upper key 218 is configured to engage upper shoulder 52 of sliding sleeve 40 during actuation of sliding sleeve valve 10 via obturating tool 200. While in the embodiment shown in FIG. 13A upper keys 218 are shown as being radially translatable members, in other embodiments, upper keys 218 may comprise a collet, dogs, or other mechanisms known in the art configured to selectably land or abut against a shoulder of a tubular member.

Figure 13A:
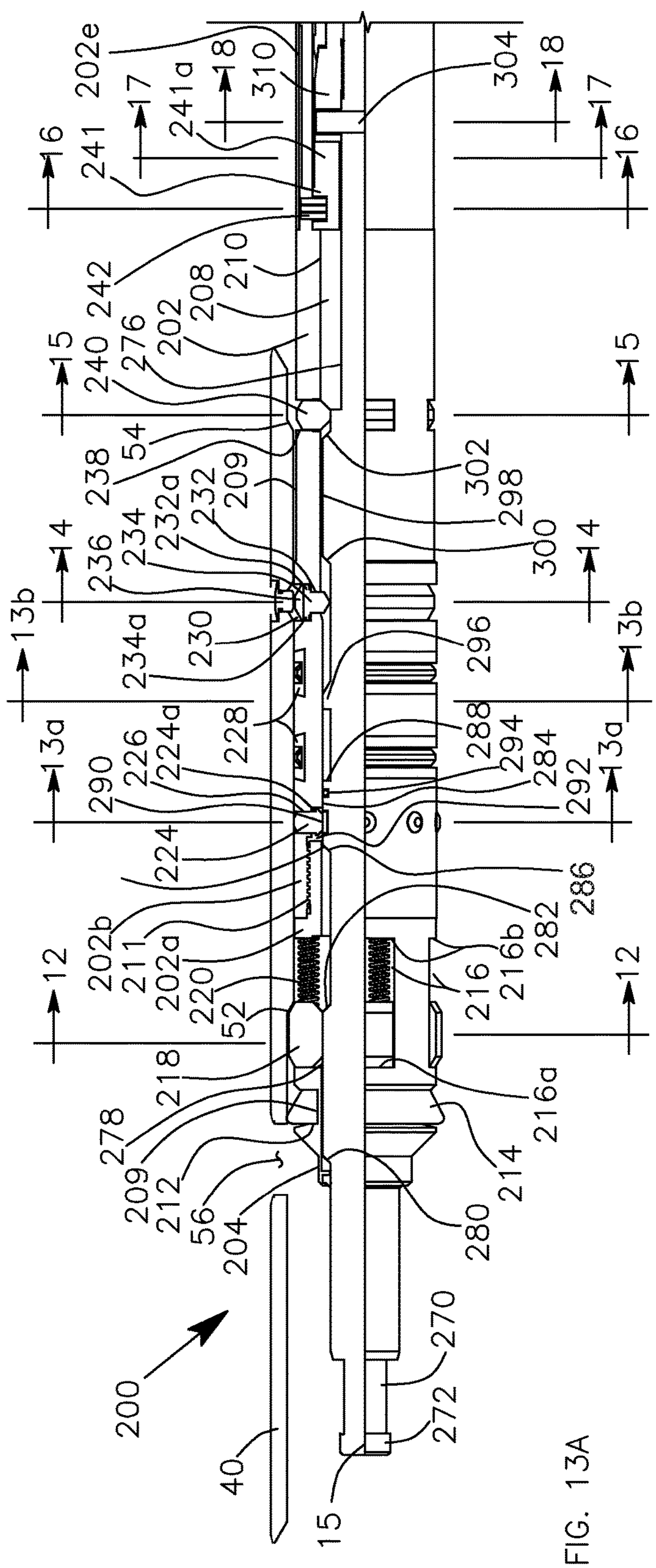
FIG. 13A is a section view of the uppermost end of an embodiment of a flow transported obturating tool for actuating the sliding sleeve valve shown in FIGS. 3A-8 between the open and closed positions in accordance with principles disclosed herein.

Intermediate segment 202*b* of housing 202 includes a plurality of circumferentially spaced radially translatable members or bore sensors 224 disposed in a corresponding first or upper plurality of cylindrical apertures 226 extending radially through intermediate segment 202*b* for engaging inner surface 48 of sliding sleeve 40. Shown particularly in FIG. 13D, each bore sensor 224 includes a radially inner flanged section 224*a* for limiting the radially outward displacement of each bore sensor 224 via engagement with inner surface 210 of housing 202, and a radially outer cylindrical body 224*b* that extends through aperture 226 in the intermediate segment 202*b*. The outer surface 209 of intermediate segment 202*b* also includes a pair of axially spaced annular seals 228 for sealing between the reduced diameter section 50 of the inner surface 48 of sliding sleeve 40 and the outer surface 209 of housing 202 to allow obturating tool 200 to actuate sliding sleeve valve 10 between open and closed positions. In the embodiment of FIG. 13A, seals 228 comprise crimp seals; however, in other embodiments seals 228 may comprise other kinds of annular seals known in the art.

Figure 13B:
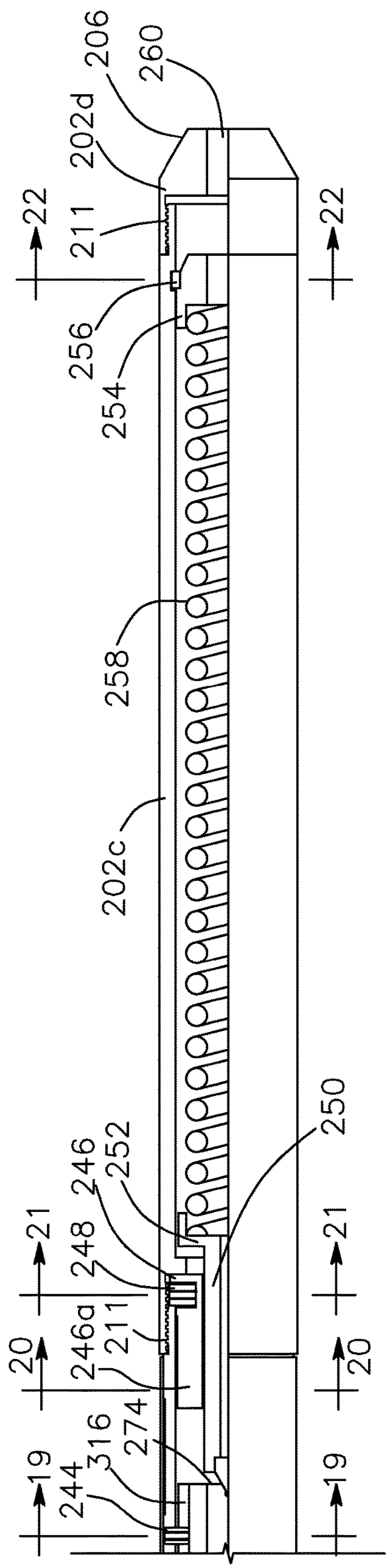
FIG. 13B is a section view of the lowermost end of the obturating tool shown in FIG. 13A.
Figure 13C:
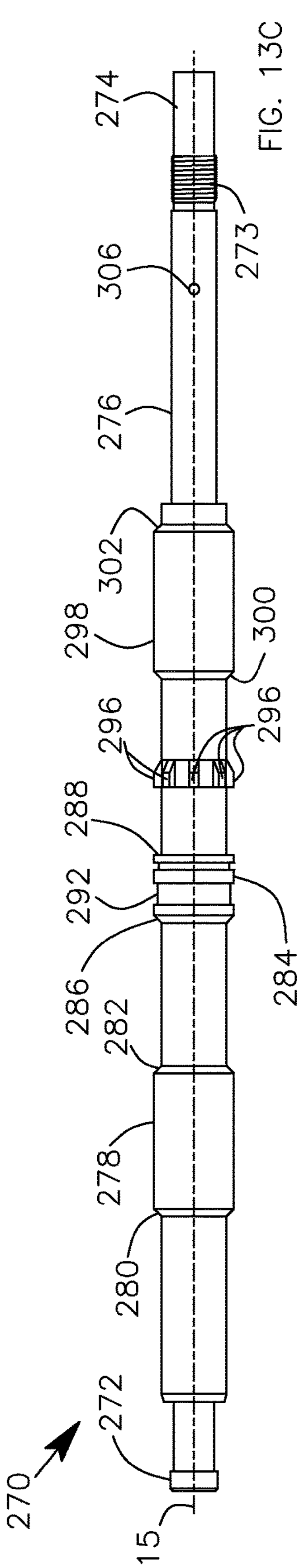
FIG. 13C is a side view of an inner core of the obturating tool shown in FIG. 13A in accordance with principles disclosed herein.
Figure 13E:
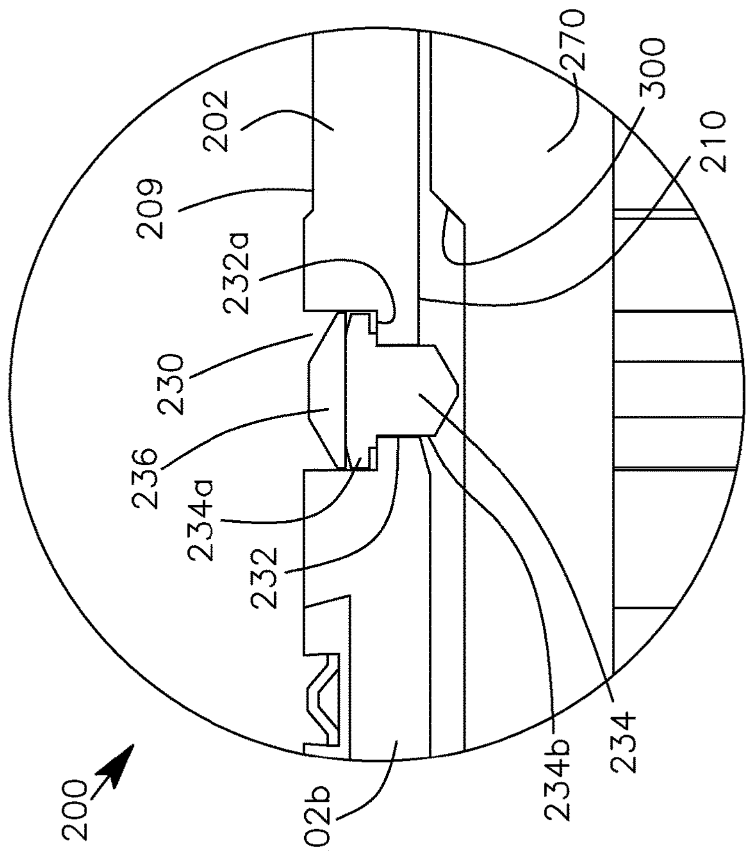
FIG. 13E is a zoomed-in view of an embodiment of a lock ring of the obturating tool shown in FIGS. 13A and 13B in accordance with principles disclosed herein.
Figure 13D:
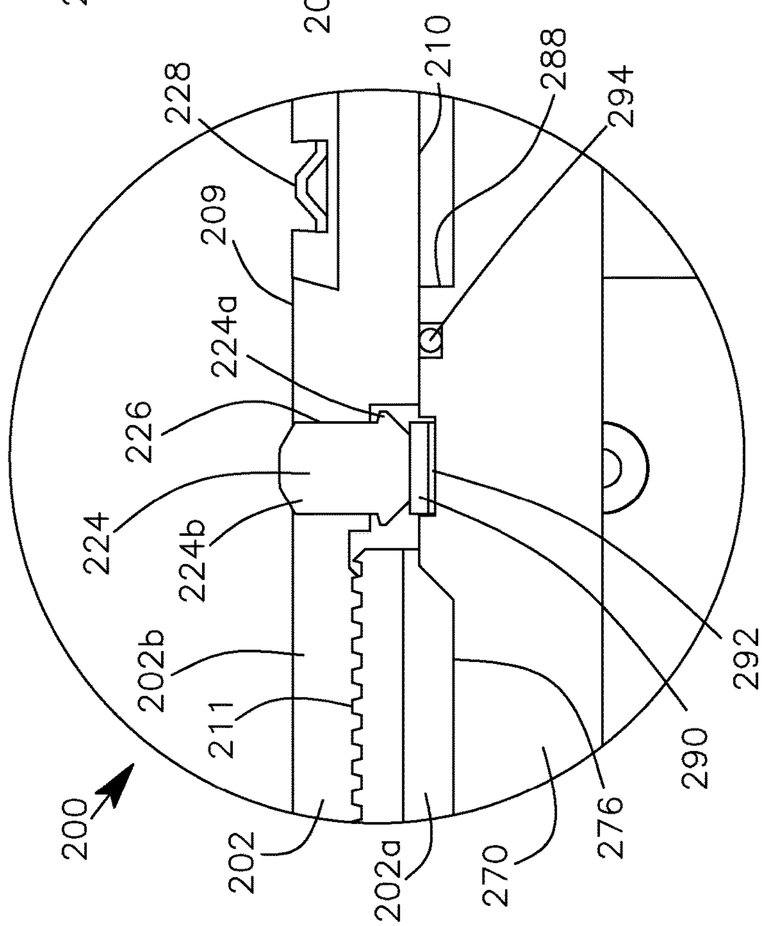
FIG. 13D is a zoomed-in view of an embodiment of a bore sensor of the obturating tool shown in FIGS. 13A and 13B in accordance with principles disclosed herein.

Shown particularly in FIG. 13E, the outer surface 209 of intermediate segment 202*b* includes an annular groove 230 extending therein and a second or lower plurality of cylindrical apertures 232 for housing a plurality of radially translatable members or buttons 234 disposed therein. Each button 234 includes an outwardly flanged section 234*a* limiting radial inward displacement of each button 234 via physical engagement with a seat 232*a* formed between annular groove 230 and the circumferentially spaced cylindrical apertures 232, and a radially inner cylindrical body 234*b* extending through aperture 232. Also disposed in annular groove 230 is a radially inwards biased annular lock ring or c-ring 236 that engages the outwardly flanged section 234*a* of each button 234. C-ring 236 is shown in FIG. 13E in a radially contracted position within annular groove 230 and is similar configured as c-ring 130 described above. Intermediate segment 202*b* of housing 202 further includes a plurality of circumferentially spaced arcuate slots 238 for housing a plurality of radially translatable second or lower engagement members or keys 240 disposed therein. As will be discussed further herein, circumferentially spaced lower keys 240 are configured to engage lower shoulder 54 of sliding sleeve 40 during actuation of sliding sleeve valve 10 via obturating tool 200. While in the embodiment shown in FIG. 13A lower keys 240 are shown as being radially translatable members, in other embodiments, lower keys 240 may comprise a collet, dogs, or other mechanisms known in the art configured to selectably land or abut against a shoulder of a tubular member.

Figure 25A:
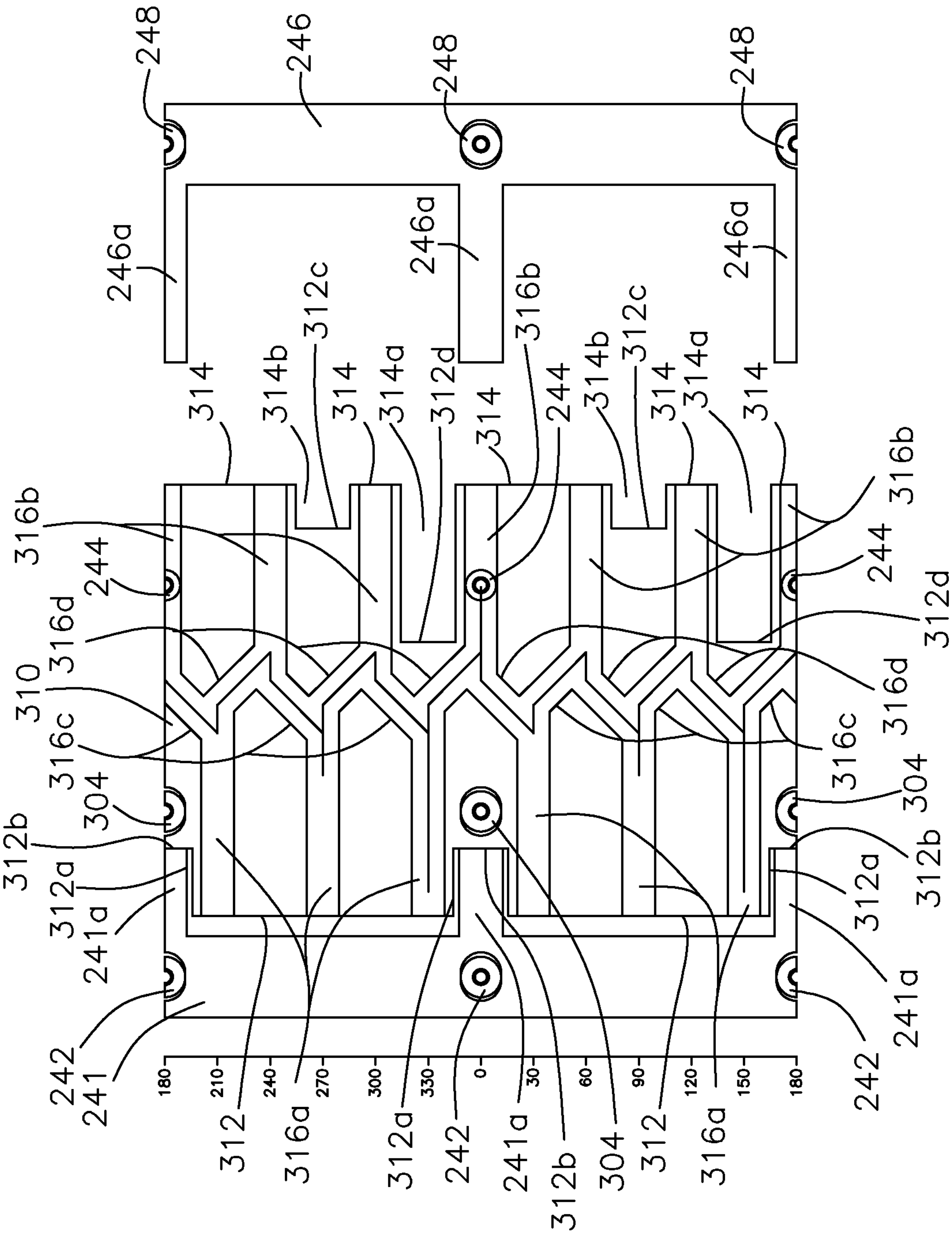
FIG. 25A is a top view of a reciprocating indexer (shown as unrolled for clarity) of the obturating tool shown in FIGS. 13A and 13B in accordance with principles disclosed herein.
Figure 25B:
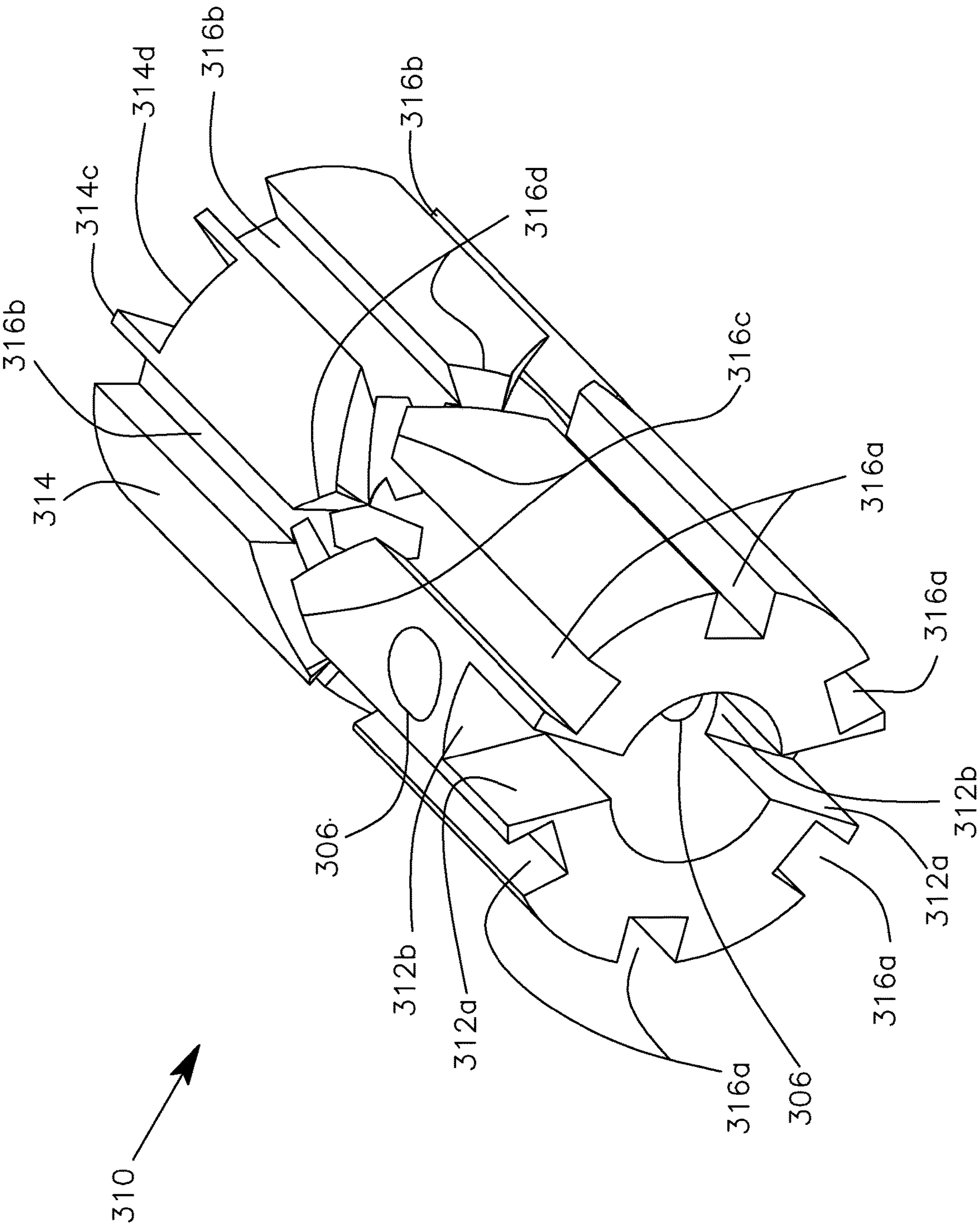
FIG. 25B is a perspective view of the reciprocating indexer shown in FIG. 25A.

Intermediate segment 202*b* of housing 202 also includes an annular upstop 241 affixed to inner surface 210 via a plurality of circumferentially spaced pins 242 that extend radially into both upstop 241 and housing 202*b*, and are retained by a sleeve 202*e*. Upstop 241 includes an annular ring having a plurality of elongate members 241*a* extending axially therefrom in the direction of the lower end 206 of housing 202. In the embodiment of FIGS. 13A, 25A, and 25B, upstop 241 includes two axially extending elongate members 241*a* circumferentially spaced approximately 180° apart; however, in other embodiments upstop 241 may include varying numbers of elongate members 241*a* circumferentially spaced at varying angles. As will be explained further herein, upstop 241 is configured to engage a reciprocating indexer 310 of the core 270 that controls the actuation of sliding sleeve valve 10 via obturating tool 200.

Intermediate segment 202*b* of housing 202 further includes circumferentially spaced pins 244 extending radially inwards from inner surface 210 for interacting with indexer 310 and an annular downstop 246 affixed to inner surface 210 via a plurality of circumferentially spaced pins 248 that extend radially into downstop 246 and housing 202. Downstop 246 includes an annular ring having a plurality of elongate members 246*a* extending axially therefrom in the direction of the upper end 204 of housing 202. In the embodiment of FIGS. 13B, 25A, and 25B, downstop 246 includes two axially extending elongate members 246*a* circumferentially spaced approximately 180° apart; however, in other embodiments downstop 246 may include varying numbers of elongate members 246*a* circumferentially spaced at varying angles. As will be explained further herein, downstop 246, along with upstop 241 and pin 244, are configured to engage indexer 310 of the core 270. Specifically, upstop 241 and downstop 246 are configured to delimit the axial movement of indexer 310, with upstop 241 delimiting or determining the maximum axial upwards displacement of indexer 310 and downstop 246 delimiting or determining the maximum axial downwards displacement of indexer 310 relative housing 202. In this manner, upstop 241 and downstop 246 may reduce the force applied against pin 244 by indexer 310 as core 270 is displaced relative housing 202.

Intermediate segment 202*c* includes a pintle 250 free to move axially respective housing 202. The relative axial movement of the pintle 250 is limited by an upper flange 252 of intermediate segment 202*c*. Intermediate segment 202*c* also includes an annular second or lower flange 254 axially fixed to housing 202 via an engagement ring 256. Pintle 250 and engagement ring 256 house a biasing member 258 extending therebetween, with the biasing member 258 providing a biasing force or pre-load against pintle 250 in the direction of the upper end 204 of housing 202. In the embodiment shown in FIG. 13B, biasing member 258 comprises a coiled spring; however, in other embodiments biasing member 258 may comprise other kinds of biasing members known in the art. Lower segment 202*d* of housing 202 includes an axial port 260 at lower end 206 of housing 202 for venting fluid within throughbore 208.

In the embodiment of FIGS. 13A-26, core 270 is disposed coaxially with longitudinal axis 15 and includes an upper end 272 that forms a fishing neck for retrieving obturating tool 200 when it is disposed in a wellbore, a lower end 274 that is engaged by an upper end of pintle 250 of housing 202, and a generally cylindrical outer surface 276. The outer surface 276 of core 270 includes upper first increased diameter section 278 forming a first upper shoulder 280 facing upper end 272 and first lower shoulder 282 facing lower end 274. When core 270 is in the position shown in FIG. 13A, circumferentially spaced upper keys 218 of housing 202 engage the upper first increased diameter section 278 of outer surface 276 proximal first lower shoulder 282.

Outer surface 276 includes a second increased diameter section 284 forming a second upper shoulder 286 facing upper end 272 and a second lower shoulder 288 facing lower end 274. Shown particularly in FIG. 13D, second increased diameter section 284 includes a radially outwards biased lock ring or c-ring 290 disposed in an annular groove 292 extending therein and an o-ring seal 294 axially spaced from c-ring 290. O-ring 294 is configured to prevent or restrict fluid flow between the outer surface 276 of core 270 and the inner surface 210 of housing 202. In the position shown in FIG. 13A of core 270 shown in FIG. 13A, the radially outwards biased c-ring 290 is disposed within annular groove 292 such that c-ring 290 does not substantially protrude from second increased diameter section 284 in response to radially inwards engagement from circumferentially spaced bore sensors 224 of housing 202. In this position, c-ring 290 may be displaced through or pass under an annular shoulder 227 of housing 202 such that core 270 may move axially relative housing 202.

As shown particularly in FIGS. 13A, 13C, 15B, and 26, outer surface 276 of core 270 also includes a plurality of circumferentially spaced protruding lugs 296 that extend radially outwards therefrom. As shown particularly in FIGS. 13C and 15B, in this embodiment core 270 includes eight circumferentially spaced lugs 296; however, in other embodiments core 270 may include varying numbers of lugs 296 circumferentially spaced at varying angles. As will be explained further herein, lugs 296 are configured to engage circumferentially spaced buttons 234 to selectively engage circumferentially spaced buttons 64 of sliding sleeve 40. Outer surface 276 of core 270 further includes a third increased diameter section or cam surface 298 forming an annular third upper shoulder 300 facing upper end 272 and an annular third lower shoulder 302 facing lower end 274. In the position of core 270 shown in FIGS. 13A and 13B, third upper shoulder 300 is disposed proximal circumferentially spaced bore sensors 224 while third lower shoulder 302 is disposed proximal circumferentially spaced lower keys 240.

As mentioned above, core 270 includes an annular indexer 310 disposed about outer surface 276 and coupled to core 270 via a threaded coupler 273 disposed on outer surface 276 and a pin 304 extending radially through an aperture 306 extending through core 270 and annular indexer 310. Specifically, threaded coupler 273 couples annular indexer 310 to core 270 while pin 304 acts to restrict relative rotation between annular indexer 310 and core 270. Thus, due to the connection provided by threaded coupler 273 and pin 304, indexer 310 and core 270 move both axially and radially in concert. The interaction between indexer 310 and pin 244 selectably controls the axial and radial movement and positioning of core 270. Specifically, indexer 310 includes a first or upper end 312 and a second or lower end 314, where upper end 312 includes two circumferentially spaced upper slots 312*a* extending axially therein to a surface 312*b* and lower end 314 includes two circumferentially spaced long lower slots 314*a* extending therein to a surface 314*d*, and two circumferentially spaced short lower slots 314*b* extending axially therein to a surface 314*c*.

Figure 26:
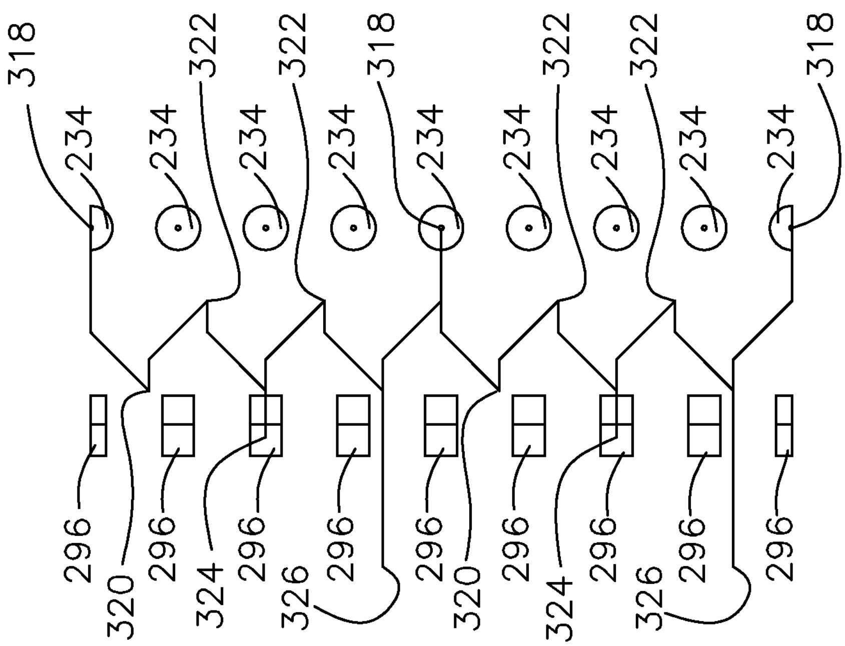
FIG. 26 is a top, schematic view of a circuit of radial translating members of the obturating tool shown in FIG. 13A in accordance with principles disclosed herein.

As shown particularly in FIGS. 25A, 25B, and 26, long lower slots 314*a* and short lower slots 314*b* are disposed alternatingly about the circumference of indexer 310. In the embodiment of FIGS. 25A, 25B, and 26, one upper slot 312*a* of upper end 312 is disposed at approximately 0° along the circumference of indexer 310 while the second upper slot 312*a* is disposed at approximately 180°. Also, long lower slots 314*a* of lower end 314 are disposed at approximately 150° and 330° while short lower slots 314*b* are disposed at approximately 90° and 270°, respectively. However, in other embodiments upper slots 312*a* of upper end 312, long lower slots 314*a*, and short lower slots 314*b* of lower end 314 may be disposed at other locations along the circumference along indexer 310. Further, in other embodiments radial upper 312*a* of upper end 312, long lower slots 314*a* and short lower slots 314*b* of lower end 314 may be alternatively spaced along the circumference of indexer 310. Shown particularly in FIG. 25B, upper slots 312*a*, long lower slots 314*a*, and short lower slots 314*b* are wedge shaped, increasing in cross-sectional width moving from a radial inner surface to a radial outer surface of upper slots 312*a*, long lower slots 314*a*, and short lower slots 314*b*.

A groove or slot 316 extends into an outer surface of indexer 310 and extends across the circumference of indexer 310. Slot 316 defines the repeating pathway of pins 244 and buttons 234, as pins 244 and buttons 234 move relative to indexer 310 during the operation of obturating tool 200. Particularly, FIG. 26 schematically illustrates the circuit of a button 234 along the outer surface 276 of core 270 during the actuation of obturating tool 200. Slot 316 generally includes a plurality of circumferentially spaced axially extending upper slots 316*a* that extend to upper end 312 and a plurality of circumferentially spaced axially extending lower slots 316*b* that extend to lower end 314. Slot 316 also includes a plurality of circumferentially spaced upper shoulders 316*c* and a plurality of circumferentially spaced lower shoulders 316*d* for guiding the rotation of indexer 310. In the embodiment shown in FIGS. 25A, 25B, and 26, indexer 310 is shown including an open slot 316 that extends across the entire circumference of indexer 310 for indexing obturating tool 200, in other embodiments, indexer 310 may comprise a closed slot, such as a j-slot, which is not circumferentially continuous and does not extend 360° across the circumference of indexer 310. For instance, indexer 310 may comprise a closed slot or j-slot in low pressure applications.

Referring to FIGS. 13A-26, core 270 can occupy particular axial positions respective housing 202 as indexer 310 is displaced axially and rotationally within housing 202. For instance, core 270 may occupy an upper-first position 318 (shown in FIG. 13F), a pressure-up second position 320 (shown in FIG. 13G), a bleed-back third position 322 (shown in FIGS. 13H and 13J), a fourth position 324 (shown in FIG. 13I) where, as will be discussed further herein, buttons 234 engage lugs 296, and unlocked fifth position 326 (shown in FIG. 13K), each of which are also illustrated schematically in FIG. 24.

As an example, obturating tool 200 may be disposed in the bore 4*b* of well string 4 and pumped downwards through the well string 4 towards the toe of wellbore 3 until the obturating tool 200 lands within the sliding sleeve valve 10 of production zone 3*e*, as shown in FIG. 1B. Specifically, obturating tool 200 is pumped through well string 4 with upper keys 218 are disposed in the radially outwards position supported on the first increased diameter section or cam surface 278 of the outer surface 276 of core 270. Further, prior to landing within the sliding sleeve valve 10 disposed in production zone 3*e*, bore sensors 224 are disposed in the radially outwards position (shown in FIG. 13D), allowing c-ring 290 to be disposed in the radially expanded position projecting from annular groove 292. With c-ring 290 disposed in the radially expanded position, relative movement of core 270 within housing 202 is restricted due to engagement between c-ring 290 and the annular shoulder 227 (shown in FIG. 13D) of housing 202.

As obturating tool 200 enters bore 18 of sliding sleeve valve 10, an annular outer shoulder of each upper key 218 lands against upper shoulder 52 of the sliding sleeve valve 10 of production zone 3*e*, arresting the downward movement of obturating tool 200 through well string 4. Further, in the upper-first position 318 shown in FIGS. 13F and 25A, pins 244 are disposed in axially extending lower slots 316*b* of slot 316 and the terminal ends of elongate members 241*a* of upstop 241 contact the surfaces 312*b* of upper slots 312*a* of indexer 310. Also, in the upper-first position 318, upper keys 218 are supported on the first increased diameter section 278 of outer surface 276, buttons 234 are axially spaced from lugs 296 and are in a radially inwards position, and lower keys 240 are axially spaced from third lower shoulder 302 and in a radially inwards position. Further, bore sensors 224 are displaced into a radially inwards position due to engagement from reduced diameter section 50 of sliding sleeve 40, disposing c-ring 290 in a radially contracted position where c-ring 290 does not project radially outwards from annular groove 292. Thus, in the first position of core 270 shown in FIG. 13F, core 270 is allowed to travel axially respective housing 202 given that c-ring 290 is in the radially contracted position, allowing c-ring 290 of core 270 to pass through the annular shoulder 227 of housing 202.

After landing against sliding sleeve 40, a pressure differential across obturating tool 200, provided by annular seals 228 of housing 202 and o-ring seal 294 of core 270, may be used to control the actuation of core 270 between positions 318, 320, 322, 324, and 326 discussed above. Particularly, the fluid pressure in well string 4 above obturating tool 200 may be increased to provide a sufficient pressure force against the upper end 272 of core 270 to shift core 270 downwards into the pressure-up second position 320 against the upwards biasing force provided by biasing member 258, shown in FIG. 13G. Further, shifting core 270 into pressure-up second position 320, indexer 310 is translated axially towards downstop 246 such that lower end 314 engages a terminal end of each elongate member 246*a*. Indexer 310 is also rotated in response to engagement between pins 244 and upper shoulders 316*c* of slot 316 such that pins 244 occupy upper slots 316*a* of slot 316.

Figures 13F, 13G, 13H, 13I, 13J, 13K:
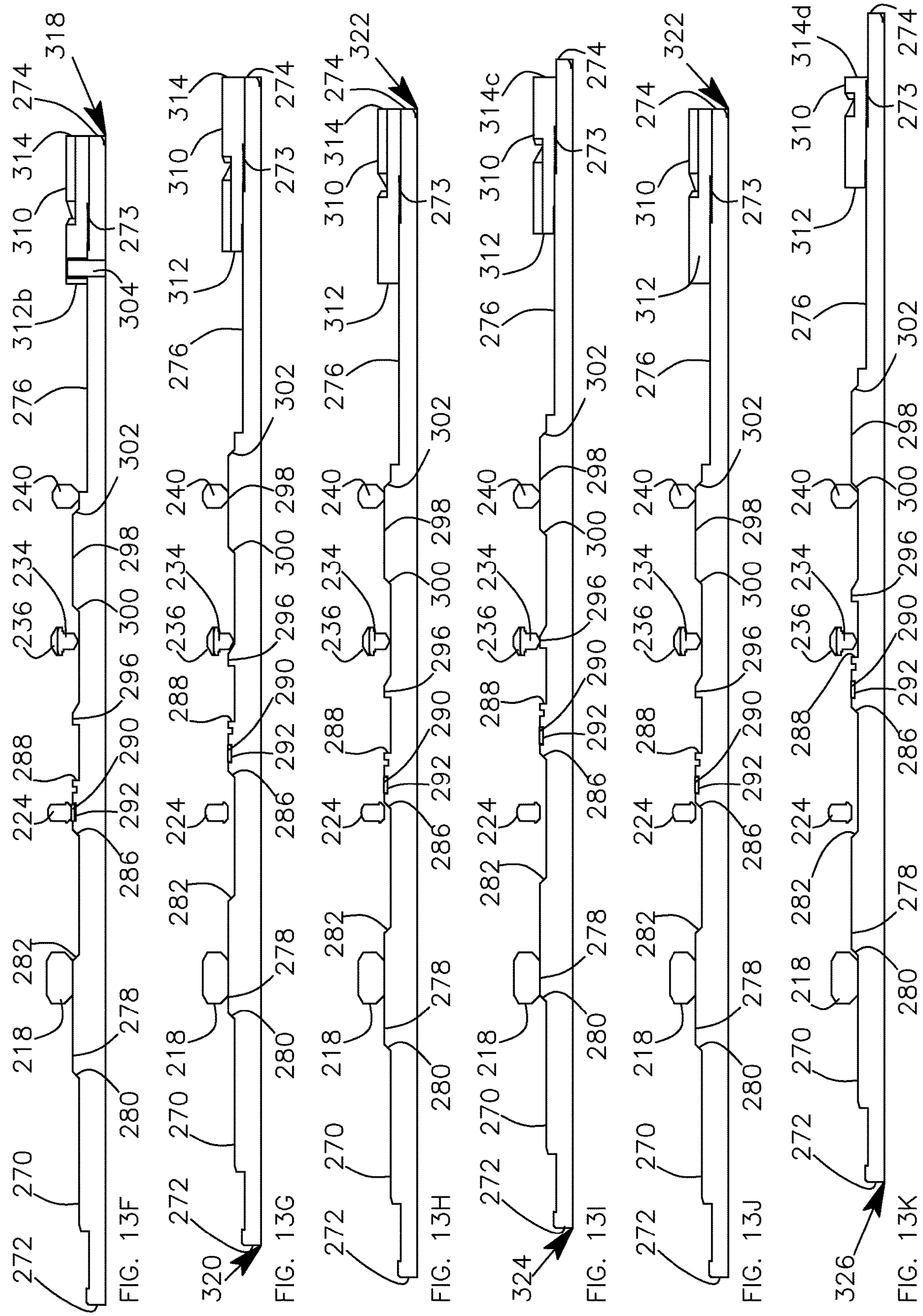
FIG. 13F is a schematic, cross-sectional view of the obturating tool of FIGS. 13A and 13B shown in a first position.
FIG. 13G is a schematic, cross-sectional view of the obturating tool of FIGS. 13A and 13B shown in a second position.
FIG. 13H is a schematic, cross-sectional view of the obturating tool of FIGS. 13A and 13B shown in a third position.
FIG. 13I is a schematic, cross-sectional view of the obturating tool of FIGS. 13A and 13B shown in a fourth position.
FIG. 13J is a schematic, cross-sectional view of the obturating tool shown in FIGS. 13A and 13B in the third position shown in FIG. 13H.
FIG. 13K is a schematic, cross-sectional view of the obturating tool shown in FIGS. 13A and 13B in a fifth position in accordance with principles disclosed herein.
Figure 16:
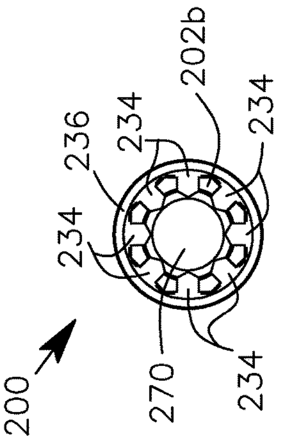
FIG. 16 is a section view along lines 14-14 of the obturating tool shown in FIG. 13A.
Figure 20:
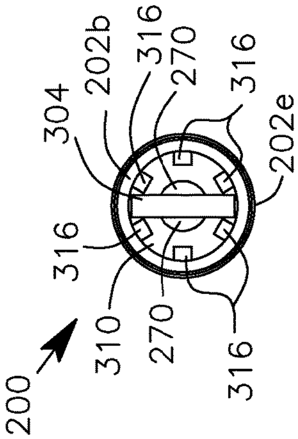
FIG. 20 is a section view along lines 18-18 of the obturating tool shown in FIG. 13A.
Figure 24:
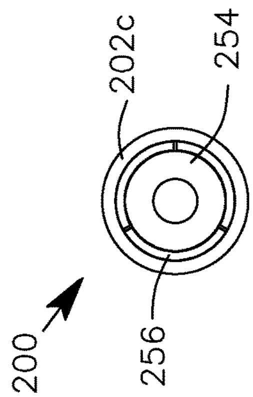
FIG. 24 is a section view along lines 22-22 of the obturating tool shown in FIG. 13B.
Figure 15B:
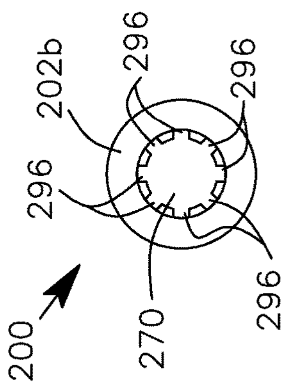
FIG. 15B is a section view along lines 13B-13B of the obturating tool shown in FIG. 13A.
Figure 19:
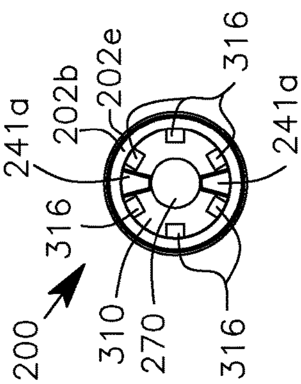
FIG. 19 is a section view along lines 17-17 of the obturating tool shown in FIG. 13A.
Figure 23:
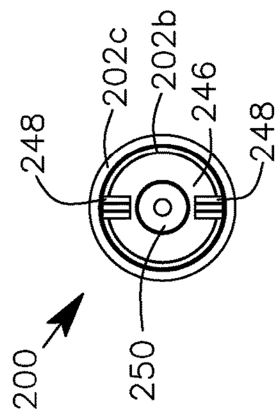
FIG. 23 is a section view along lines 21-21 of the obturating tool shown in FIG. 13B.
Figure 15A:
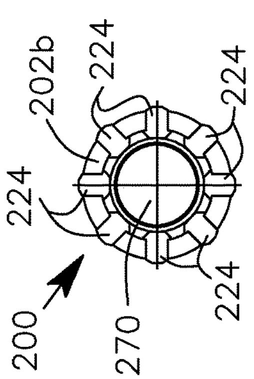
FIG. 15A is a section view along lines 13A-13A of the obturating tool shown in FIG. 13A.
Figure 18:
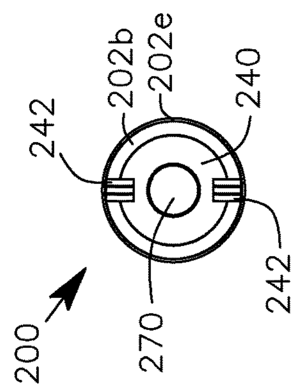
FIG. 18 is a section view along lines 16-16 of the obturating tool shown in FIG. 13A.
Figure 22:
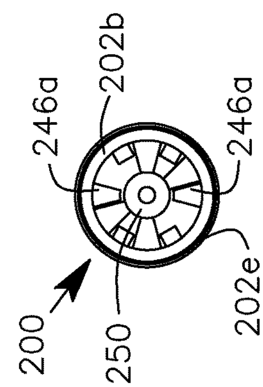
FIG. 22 is a section view along lines 20-20 of the obturating tool shown in FIG. 13B.
Figure 14:
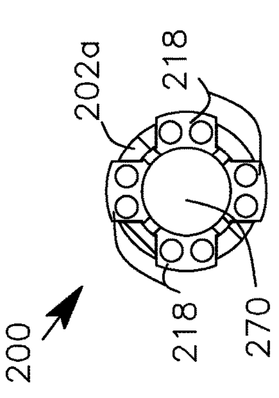
FIG. 14 is a section view along lines 12-12 of the obturating tool shown in FIG. 13A.
Figure 17:
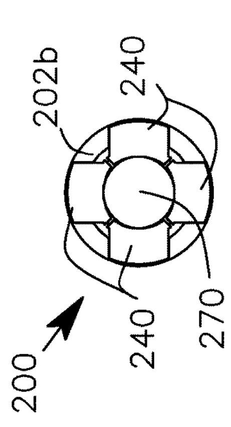
FIG. 17 is a section view along lines 15-15 of the obturating tool shown in FIG. 13A.
Figure 21:
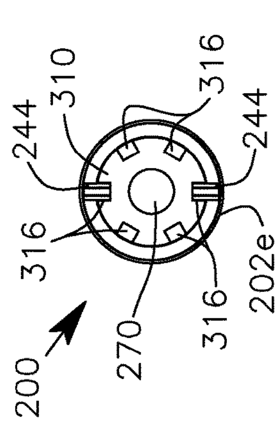
FIG. 21 is a section view along lines 19-19 of the obturating tool shown in FIG. 13B.

Also shown in FIG. 13G, core 270 is rotated and shifted downwards towards lower end 206 of housing 202, causing lower end 274 of core 270 engages an upper end of pintle 250, compressing annular biasing member 258. Further, buttons 234 are in the radially inwards position and disposed adjacent, but do not engage lugs 296. Thus, with buttons 234 in the radially inwards position, c-ring 236 does not engage buttons 64 of sliding sleeve 40, leaving sliding sleeve 40 locked against housing 12 of sliding sleeve valve 10. Lower keys 240 are supported on third increased diameter section or cam surface 298 of outer surface 276 in a radially outwards position engaging lower shoulder 54 of sliding sleeve 40, thereby axially locking obturating tool 200 to sliding sleeve valve 10.

As shown in FIG. 1B, given that sliding sleeve valve 10 of production zone 3*e* is in the open position, and in the pressure-up second position 320 of obturating tool 200 the sliding sleeve 40 remains locked to housing 12 of sliding sleeve valve 10, in this position fracturing fluid may be pumped through bore 4*b* of well string 4 through ports 30 of sliding sleeve valve 10 to form fractures 6*f* in the formation 6 at production zone 3*e* shown in FIG. 1C. In this manner, enhanced fluid communication may be provided between the formation 6 and the production zone 3*e* of wellbore 3. Further, the fracturing fluid pumped through bore 4*b* of well string 4 is restricted from flowing past the obturating tool 200 and further down well string 4 due to the sealing engagement provided by annular seals 228 of housing 202 and o-ring seal 294 of core 270. In this arrangement, the entire fluid flow of fracturing fluid from the surface is directed through ports 30 and against the inner surface 3*s* of the wellbore 3.

Once fractures 6*f* in the formation 6 have been sufficiently formed at production zone 3*e*, the core 270 may be shifted from the pressure-up second position 320 shown in FIG. 13G to the bleed-back third position 322 shown in FIG. 13H. Specifically, the fluid flow rate through bore 4*b* of well string 4 may be reduced to decrease the pressure acting on the upper end 272 of core 270 below the threshold level such that biasing member 258 may shift core 270 upwards respective housing 202 and into the bleed-back third position 322. In the bleed-back third position 322 of core 270, upper keys 218 are disposed in the radially outwards position supported on first increased diameter section 278 of outer surface 276 and in engagement with upper shoulder 52 of sliding sleeve 40. Lower keys 240 are disposed on the third increased diameter section 298 of outer surface 276 and in engagement with lower shoulder 54 of sliding sleeve 40. Also, in the bleed-back third position 322 shown in FIG. 13H, upper end 312 of indexer 310 engages a terminal end of each elongate member 241*a* of upstop 241, and pins 244 occupy lower slots 316*b* of slot 316. Further, buttons 234 remain in the radially inwards position and c-ring 236 remains in the radially contracted position such that sliding sleeve 40 remains locked to the housing 12 of sliding sleeve valve 10.

Core 270 may be shifted from the bleed-back third position 322 shown in FIG. 13H to the fourth position shown in FIG. 13I by increasing the fluid flow through bore 4*b* of well string 4, thereby increasing the fluid pressure acting against upper end 272 of core 270 to a sufficient threshold level such that core 270 is shifted downwards respective housing 202, compressing biasing member 258. In the fourth position 324 shown in FIG. 13I, the terminal ends of elongate members 246*a* of downstop 246 contact surface 314*c* of short lower slots 314*d* of indexer 310, and pins 244 occupy upper slots 316*a* of slot 316. Upper keys 218 remain supported on first increased diameter section 278 and in engagement with upper shoulder 52 of sliding sleeve 40, and lower keys 240 remain supported on third increased diameter section 298 and in engagement with lower shoulder 54 of sliding sleeve 40.

Further, buttons 234 are supported on lugs 296 in a radially outwards position. In the radially outwards position, buttons 234 engage and displace c-ring 236 into the radially expanded position where c-ring 236 displaces buttons 64 in the radially outwards position and upper c-ring 66 in the radially expanded position, thereby unlocking sliding sleeve 40 from the housing 12 of sliding sleeve valve 10 With sliding sleeve 40 unlocked from housing 12 of sliding sleeve valve 10, the fluid pressure acting on the upper end of obturating tool 200 shifts obturating tool 200, along with sliding sleeve 40 axially locked thereto, downwards until sliding sleeve valve 10 is shifted into the closed position with second end 44 of sliding sleeve 40 landed against lower shoulder 26 of housing 12. sliding sleeve valve 10 of production zone 3*e* disposed in the closed position, the core 270 of obturating tool 200 may be shifted from the fourth position 324 shown in FIG. 13I, to the bleed-back third position 322 shown in FIG. 13J (same as the third position described above in relation to FIG. 13H). Specifically, fluid flow in bore 4*b* of well string 4 may be reduced such that the fluid pressure against upper end 272 of core 270 may be decreased below the threshold level allowing biasing member 258 to shift core 270 upwards into the bleed-back third position 322. In this manner, buttons 234 are displaced axially out of engagement with lugs 296, allowing c-ring 236 to contract into the radially contracted position out of engagement with buttons 64 of sliding sleeve 40, locking sliding sleeve 40 to the housing 12 of sliding sleeve valve 10.

With core 270 disposed in the bleed-back third position 322 shown in FIG. 13J and sliding sleeve 40 locked to housing 12 of sliding sleeve valve 10, core 270 may be shifted to the unlocked fifth position 326 illustrated in FIG. 13K. Specifically, the fluid pressure acting on upper end 272 of core 270 may again be increased to the threshold level to shift core 270 downwards, compressing biasing member 258, from the bleed-back third position 322 to the unlocked fifth position 326. In the unlocked fifth position 326 shown in FIG. 13K, the terminal ends of elongate members 246*a* of downstop 246 contact surface 314*d* of long lower slots 314*a* of indexer 310, and pins 244 occupy upper slots 316*a* of slot 316. Also, buttons 234 remain in the radially inwards position and are disposed proximal second lower shoulder 288. Particularly, lugs 296 are arranged circumferentially about outer surface 276 of core 270 such that when core 270 shifts from the bleed-back third position 322 to the unlocked fifth position 326 buttons 324 may pass circumferentially between lugs 296 without engaging lugs 296.

Further, with the downwards movement of core 270 into unlocked fifth position 326, upper keys 218 are now disposed in a radially inwards position adjacent upper shoulder 280, and lower keys 240 are disposed in the radially inwards position adjacent third upper shoulder 300, unlocking obturating tool 200 from the sliding sleeve 40 of the sliding sleeve valve 10 of production zone 3*e*. Thus, the fluid pressure acting on the upper end of obturating tool 200 axially displaces obturating tool 200 through the actuated sliding sleeve valve 10 of production zone 3*e* towards the sliding sleeve valve 10 of production zone 3*f*, as illustrated in FIG. 1C, where the process described above may be repeated to hydraulically fracture the formation 6 at production zone 3*f*.

Particularly, once obturating tool 200 has been displaced through the sliding sleeve valve 10 of production zone 3*e*, the fluid pressure acting against on upper end 272 of core 270 may be reduced below the threshold level, allowing biasing member 258 to shift core 270 from the unlocked fifth position 326 shown in FIG. 13K, to the upper-first position 318 shown in FIG. 13F. As described above, in the upper-first position 318 shown in FIG. 13F, upper keys 218 are supported on the first increased diameter section 278 in the radially outwards position, allowing upper keys 218 to land against the upper shoulder 52 of the sliding sleeve 40 of the sliding sleeve valve 10 disposed in production zone 3*f*.

Once obturating tool 200 has actuated each sliding sleeve valve 10 of well string 4, and is disposed near the toe of wellbore 3, it may be retrieved and displaced upwards through the well string 4 to the surface via the fishing neck upper end 272. As obturating tool 200 is displaced upwards through the well, an upper end of each upper key 218 may land against the lower shoulder 54 of a sliding sleeve 40 of well string 4. In order for the obturating tool 200 to successfully pass upwardly through the sliding sleeve 40, upper keys 218 must be radially translated into a radially inwards position. This may be accomplished via pulling upwardly against the fishing neck upper end 272 with upper keys 218 landed against upper shoulder 54, causing upper keys 218 to be displaced axially downwards against the biasing force provided by biasing members 220 until upper keys 218 are disposed in the radially inwards position adjacent first lower shoulder 282. Further, although obturating tool 200 has been described above in the context of well system 1, the above description is equally applicable in the context of well system 2.

Figure 27A:
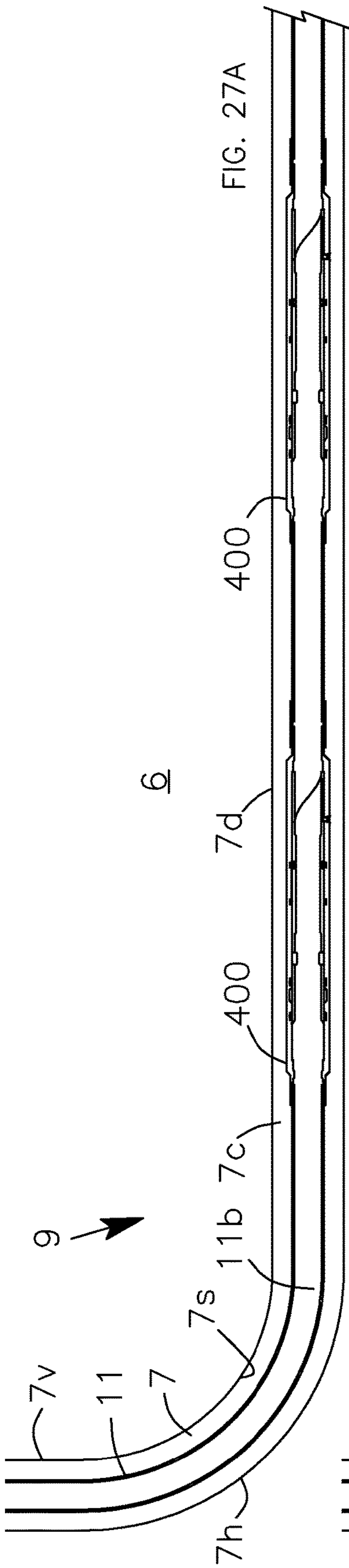
FIG. 27A is a schematic view of an embodiment of a well system having a cased wellbore in a first position in accordance with principles disclosed herein.
Figure 27B:
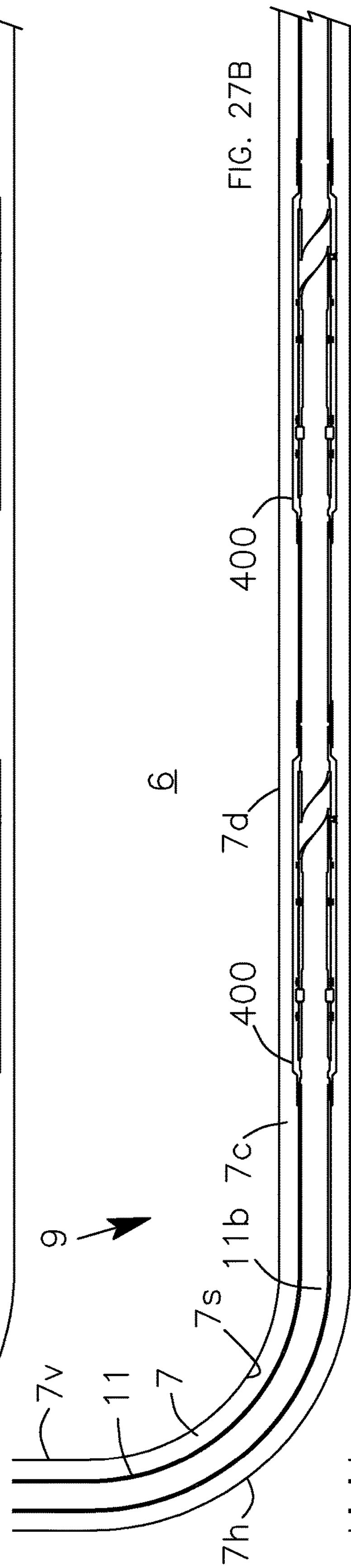
FIG. 27B is a schematic view of the well system shown in FIG. 27A in a second position.
Figure 27C:
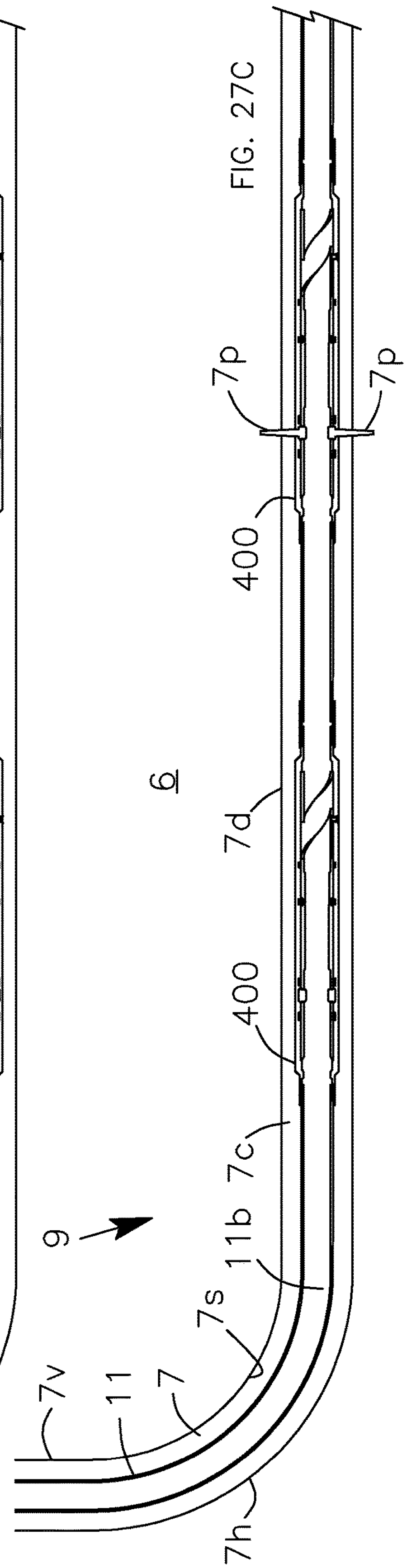
FIG. 27C is a schematic view of the well system shown in FIG. 27A in a third position.

Referring to FIGS. 27A-27C, an embodiment of a well system 9 is schematically illustrated. Well system 9 generally includes wellbore 7 (also shown in FIGS. 2A-2C) and a well string 11 disposed in wellbore 7 having a bore 11*b* extending therethrough, and a plurality of orienting subs or perforating valves 400. As will be explained further herein, unlike sliding sleeve valves 10 of well systems 1 and 2, perforating valves 400 are not ported, and thus, must be perforated using a perforating tool prior to hydraulically fracturing the formation 6. Although not shown in FIGS. 27A-27C, well string 11 includes additional perforating valves 400 extending to the toe of the deviated section 7*d* of the wellbore 7. In the embodiment of well system 9, well string 11 is cemented into position within wellbore 7 by cement 7*c* that lines the inner surface 7*s* of wellbore 7. In this arrangement, fluid communication between formation 6 and wellbore 7 is restricted by cement 7*c*.

FIG. 27A illustrates well system 9 following installation of the well string 11 within the wellbore 7, with each perforating valve 400 disposed in a closed position restricting fluid communication between bore 11*b* of well string 11 and the wellbore 7. FIG. 27B illustrates well system 9 after the bore 11*b* of well string 11 has been washed and jetted and each of the perforating valves 400 have been actuated into an open position using a coiled tubing actuation tool, such as coiled tubing actuation tool 100. Although perforating valves 400 have been actuated into the open position, fluid flow between the wellbore 7 and the bore 11*b* of well string 11 remains restricted because perforating valves 400 have not been perforated by one or more perforating tools.

FIG. 27C illustrates well system 2 following the perforation of one or more perforating valves 400, producing perforations 7*p* in the perforated perforating valves 400, cement 7*c*, and formation 6. As will be discussed further herein, one or more perforating tools are lowered into the bore 11*b* of well string 11 along a wireline until the perforating tools are disposed near the toe of wellbore 7. Once positioned near the toe of wellbore 3, the wireline is retracted at the surface and the perforating tools are displaced towards heel 7*h*. During this process, a perforating tool and an alignment tool coupled thereto will enter the perforating valve 400 nearest the toe of wellbore 7, where the alignment tool will angularly and axially position the perforating tool respective the perforating valve 400. Once the perforating tool has been properly positioned respective the lowermost perforating valve 400, the perforating tool will be actuated to produce one or more perforations 7*p* in the perforating valve 400 and cement 7*p*, thereby providing fluid communication between the wellbore 7 and the lowermost perforating valve 400. As will be discussed further herein, the lowermost perforating valve 400 may be "reshot" by one or more additional perforating tools to alter the already formed perforations 7*p* or form additional perforations 7*p* having different angular orientations (i.e., different locations along the circumference of the lowermost perforating valve 400).

In this embodiment, the process described above may be repeated for the remaining perforating valves 400 of well string 11 proceeding towards the heel 7*h* of wellbore 7, providing for fluid communication between the wellbore 7 and each perforated perforating valve 400. Once each perforating valve 400 of well string 11 has been perforated, the formation 6 of well system 9 may be hydraulically fractured using a hydraulic fracturing tool, such as obturating tool 200, to form fractures 6*f* at each perforating valve 400. In this manner, fractures 6*f* may be produced at each perforating valve 400 proceeding from the heel 7*h* to the toe of wellbore 7. In other embodiments, the process described above is repeated for the remaining perforating valves 400 of well string 11 proceeding downwards towards the toe (not shown) of wellbore 7.

Referring collectively to FIGS. 28A-29B, an embodiment of a perforating valve 400 is illustrated. Perforating valve 400 is generally configured to provide selectable fluid communication to a desired portion of a wellbore (e.g., wellbore 7). As discussed above, in a hydraulic fracturing operation a plurality of perforating valves 400 may be incorporated into a casing string cemented into place in a wellbore. In this arrangement, perforating valve 400 is configured to provide selective fluid communication at a particular location of the formation 6, thereby allowing the chosen production zone to be hydraulically fractured. Particularly, perforating valve 400 is configured to provide selectable fluid communication via perforation from a perforating tool disposed therein.

In this embodiment, perforating valve 400 has a central or longitudinal axis 405 and includes a generally tubular housing 402 having a sliding sleeve 440 and a stationary sleeve 480 disposed therein. Tubular housing 402 includes an upper box end 404, a lower pin end 406, and a throughbore 408 extending between upper box end 404 and lower pin end 406, where throughbore 408 is defined by a generally cylindrical inner surface 410. Housing 402 is made up of a series of segments including an upper segment 402*a*, intermediate segments 402*b*-402*d*, and a lower segment 402*e*, where segments 402*a*-402*e* are releasably coupled together via a series of threaded couplers 412. In order to seal the throughbore 408 from the surrounding environment, each threaded coupler 412 is equipped with a pair of o-ring seals 412*s* to restrict fluid communication between each of the segments 402*a*-402*e* that form housing 402. Also, an annular groove 414*a-d* is disposed between each pair of segments 402*a*-402*e* of housing 402. Particularly, annular groove 414*a* is disposed between upper segment 402*a* and intermediate segment 402*b*, annular groove 414*b* is disposed between intermediate segments 402*b* and 402*c*, annular groove 414*c* is disposed between intermediate segments 402*c* and 402*d*, and annular groove 414*d* is disposed between intermediate segment 20*d* and lower segment 402*e*.

The inner surface 410 of housing 402 includes a downward facing first or annular upper shoulder 416 proximal upper box end 404 and an upward facing second or annular lower shoulder 418 proximal lower pin end 406. In this embodiment, inner surface 410 of intermediate segment 402*b* also includes a thin-walled groove or indentation 420 for perforation via a perforating tool or gun. In other embodiments, inner surface 410 of intermediate segment 402*b* includes a plurality of circumferentially spaced thin wall sections for perforation via a perforating tool or gun. To seal thin-walled groove 420 following perforation and the shifting of perforating valve 400 to the closed position shown in FIGS. 29A and 29B, an annular seal 422 is disposed proximal each axial end of thin-walled groove 420. Particularly, one annular seal 422 is disposed in annular groove 414*a* located between upper segment 402*a* and intermediate segment 402*b*, and a second annular seal 422 is disposed in annular groove 414*b* located between intermediate segments 402*b* and 402*c*. Similar to annular seals 32 of sliding sleeve valve 10, in an embodiment, annular seals 422 may comprise PolyPak® seals. Lower segment 402*e* of housing 402 includes a guide pin 424 that extends radially into throughbore 446 from inner surface 410 for restricting relative rotation between housing 402 and sliding sleeve 440.

Sliding sleeve 440 is disposed coaxially within housing 402 and includes an upper end 442 and a lower end 444. Particularly, sliding sleeve 440 is disposed between upper shoulder 416 and lower shoulder 418 of the inner surface 410 of housing 402. Sliding sleeve 440 is generally tubular having a throughbore 446 extending between upper end 442 and lower end 444, where throughbore 446 is defined by a generally cylindrical inner surface 448. The inner surface 448 of sliding sleeve 440 includes a reduced diameter section or sealing surface 450 that extends circumferentially inward towards longitudinal axis 405 and forms a pair of annular shoulders: an annular upper shoulder 452 facing upper end 442 and an annular lower shoulder 454 facing lower end 444. In some embodiments, upper shoulder 452 of sliding sleeve 440 comprises a no-go shoulder. Sliding sleeve 440 also includes a plurality of circumferentially spaced ports 456 extending radially therethrough.

Figure 28A:
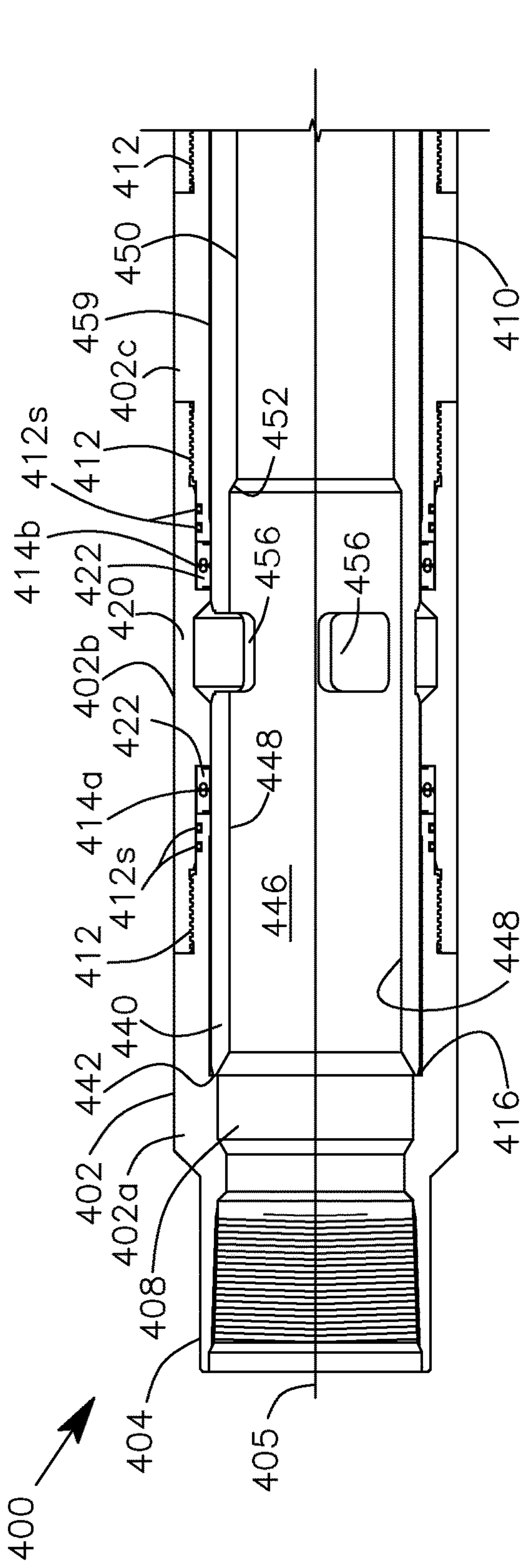
FIG. 28A is a section view of the uppermost end of an embodiment of a perforating valve, shown in an open position, in accordance with principles disclosed herein.
Figure 28B:
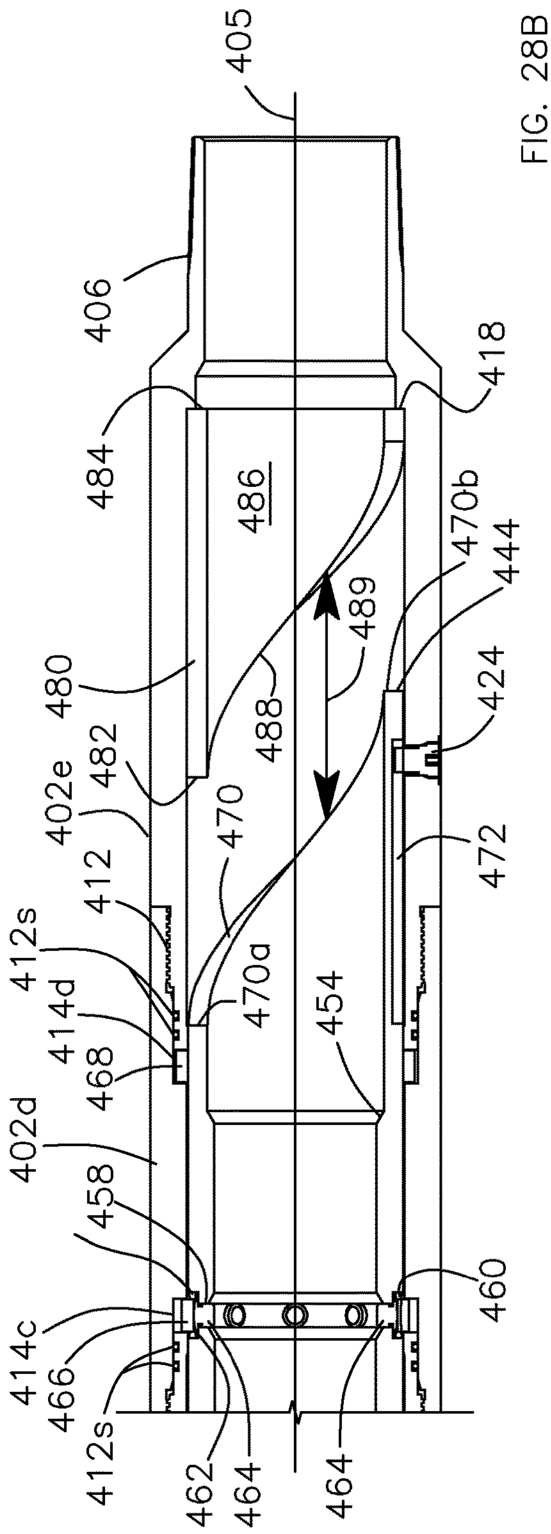
FIG. 28B is a section view of the lowermost end of the perforating valve shown in FIG. 28A.
Figure 28D:
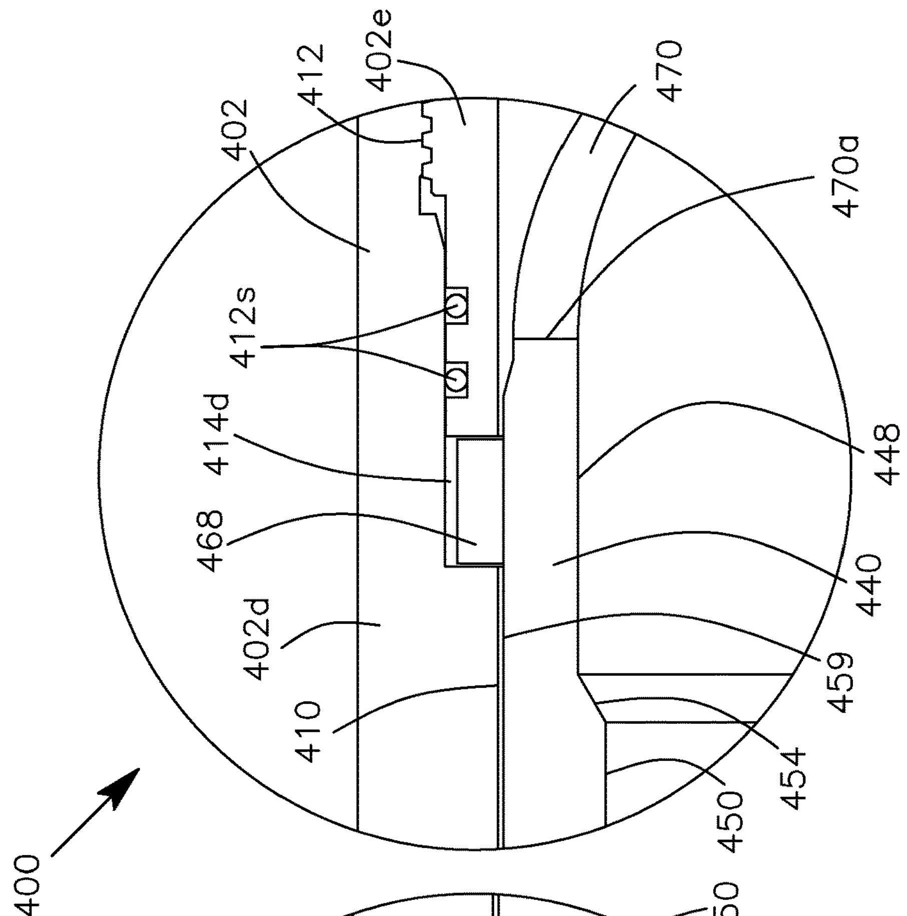
FIG. 28D is a zoomed-in view of an embodiment of a lower lock ring of the perforating valve shown in FIGS. 28A and 28B in accordance with principles disclosed herein.
Figure 28C:
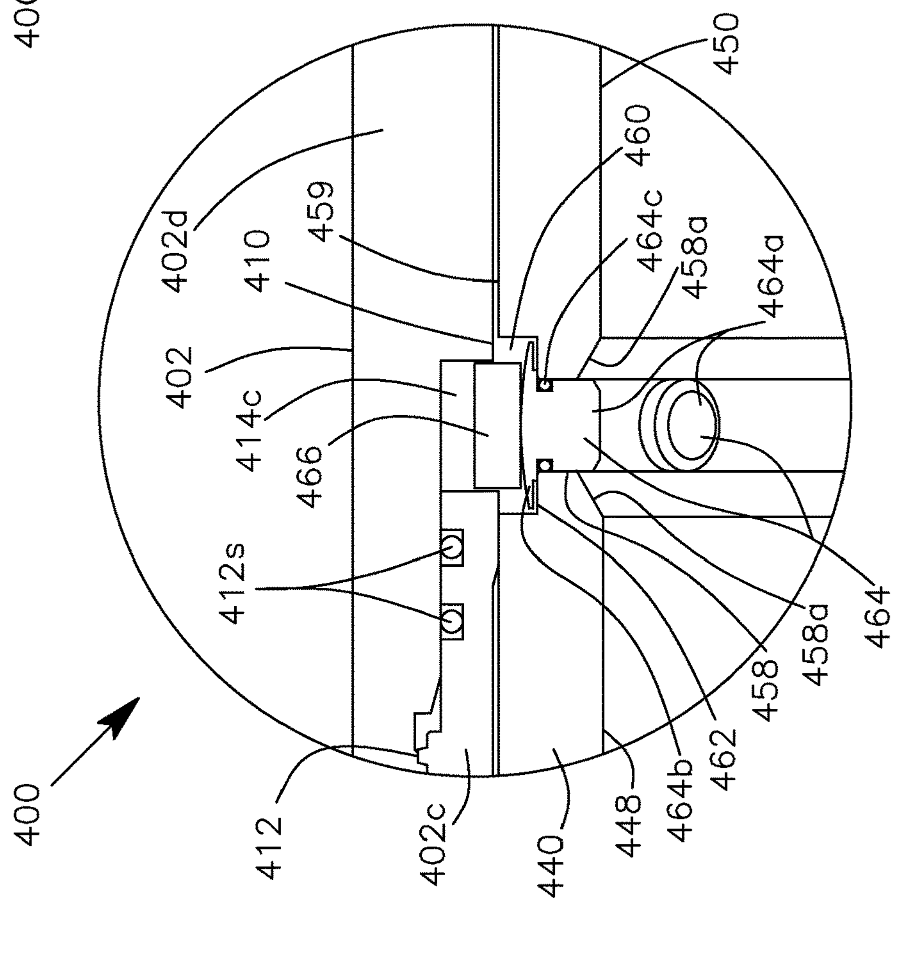
FIG. 28C is a zoomed-in view of an embodiment of an upper lock ring of the perforating valve shown in FIGS. 28A and 28B in accordance with principles disclosed herein.

As shown particularly in FIG. 28C, sliding sleeve 440 also includes a plurality of circumferentially spaced apertures 458 that extend radially through the reduced diameter section 450 of inner surface 448. Each aperture 458 is bounded by a radially outer annular groove 460 extending into a cylindrical outer surface 459 of sliding sleeve 440. The interface between each aperture 458 and the groove 460 forms a generally annular shoulder 462. Disposed within each aperture 458 is a radially translatable member or button 464 that can be radially displaced within a corresponding aperture 458. The radially inward end of each circumferentially spaced aperture 458 comprises an opening in the reduced diameter surface 450 of sliding sleeve 440 that is shorter in axial width than the corresponding keys or engagement members of tools for actuating perforating valve 400 (e.g., coiled tubing actuation tool 100 and/or obturating tool 200) for preventing the actuating keys or engagement members of the actuation or obturating tools from inadvertently engaging or becoming lodged in annular grooves 414*a*-414*d*, or other, similar grooves included in the well string 11.

Each button 464 comprises a radially inner generally cylindrical body 464*a* and a radially outer flanged portion 464*b*. Buttons 464 are shown in a radially inwards position in FIGS. 28A-29D, where engagement between flanged portion 464*b* and circular shoulder 462 restricts further radially inward displacement of button 464. Buttons 464 each include an annular seal 464*c* disposed in a groove extending radially into the body 464*a* of button 464. Seal 464*c* seals against an inner surface of aperture 458 to prevent an influx of sand or other particulates in the wellbore (e.g., wellbore 7) from entering the throughbore 446 of perforating valve 400. Also shown in FIG. 28C is a pair of annular bevels 458*a* extending between the reduced diameter section 450 of inner surface 448 and each aperture 458 to engage a corresponding member, such as a lock ring or c-ring, of an actuation or obturating tool into and out of engagement with buttons 464 of perforating valve 400. Further, the radially inwards end of body 464*a* of each button 464 is disposed radially outwards from the reduced diameter section 450 of inner surface 448, and thus, body 464*a* of each button 464 does not project into throughbore 446 respective the reduced diameter section 450.

As shown particularly in FIGS. 28C and 28D, perforating valve 400 further includes an upper lock ring or c-ring 466 disposed in the groove 414*c* located between intermediate segments 402*c* and 402*d*, and a lower lock ring or c-ring 468 disposed in the groove 414*d* located between intermediate segment 402*d* and lower segment 402*e*. Both upper c-ring 466 and lower c-ring 468 are biased radially inward towards longitudinal axis 405. Upper c-ring 466 and lower c-ring 468 are configured similarly as upper c-ring 66 and lower c-ring 68, respectively, of sliding sleeve valve 10 discussed above. Sliding sleeve 440 further includes a circumferentially extending lower helical engagement surface 470 and an axially extending groove 472 disposed in the outer surface 459 of sliding sleeve 440. Lower helical engagement surface 470 includes an upper end 470*a* proximal lower shoulder 454 and a lower end 470*b* disposed at lower end 444 of sliding sleeve 440. Guide pin 424 of housing 402 extends into groove 472, allowing relative axial movement but restricting relative rotational movement between housing 402 and sliding sleeve 440.

Perforating valve 400 further includes stationary sleeve 480, disposed coaxial with longitudinal axis 405, and having an upper end 482, a lower end 484 engaging lower shoulder 418 of housing 402, and a throughbore 486 extending therebetween. Stationary sleeve 480 further includes a circumferentially extending helical engagement surface 488 at upper end 482. Due to the rotational locking of sliding sleeve 440 provided by guide pin 424 and groove 472, lower helical engagement surface 470 of sliding sleeve 440 and helical engagement surface 488 of stationary sleeve 480 are rotationally aligned such that an axially extending axial gap 489 is formed between lower helical engagement surface 470 of sliding sleeve 440 and helical engagement surface 488 of stationary sleeve 480, where axial gap 489 is consistent across the circumference of lower helical engagement surface 470 and helical engagement surface 488, when perforating valve 400 is in the open position shown in FIGS. 28A and 28B.

As shown particularly in FIGS. 28A and 28B, perforating valve 400 includes a first or open position where the first end 42 of sliding sleeve 440 engages (or is disposed adjacent) upper shoulder 416 of housing 402 while lower end 444 is separated by axial gap 489 from the upper end 482 of stationary sleeve 480. In this arrangement, ports 456 of sliding sleeve 440 axially align with thin-walled groove 420 of housing 402, allowing for the perforation of thin-walled groove 420 via a perforating tool disposed in throughbore 408. Also, in the open position, groove 460 and apertures 458 axially align with groove 414*c*, with the flanged portion 464*b* of buttons 464 in physical engagement with an inner surface of upper c-ring 466. In this position, the radially inward bias of upper c-ring 466, disposes upper c-ring 466 in both groove 414*c* of housing 402 and groove 460 of sliding sleeve 440, thereby restricting relative axial movement between housing 402 and sliding sleeve 440.

Figure 29A:
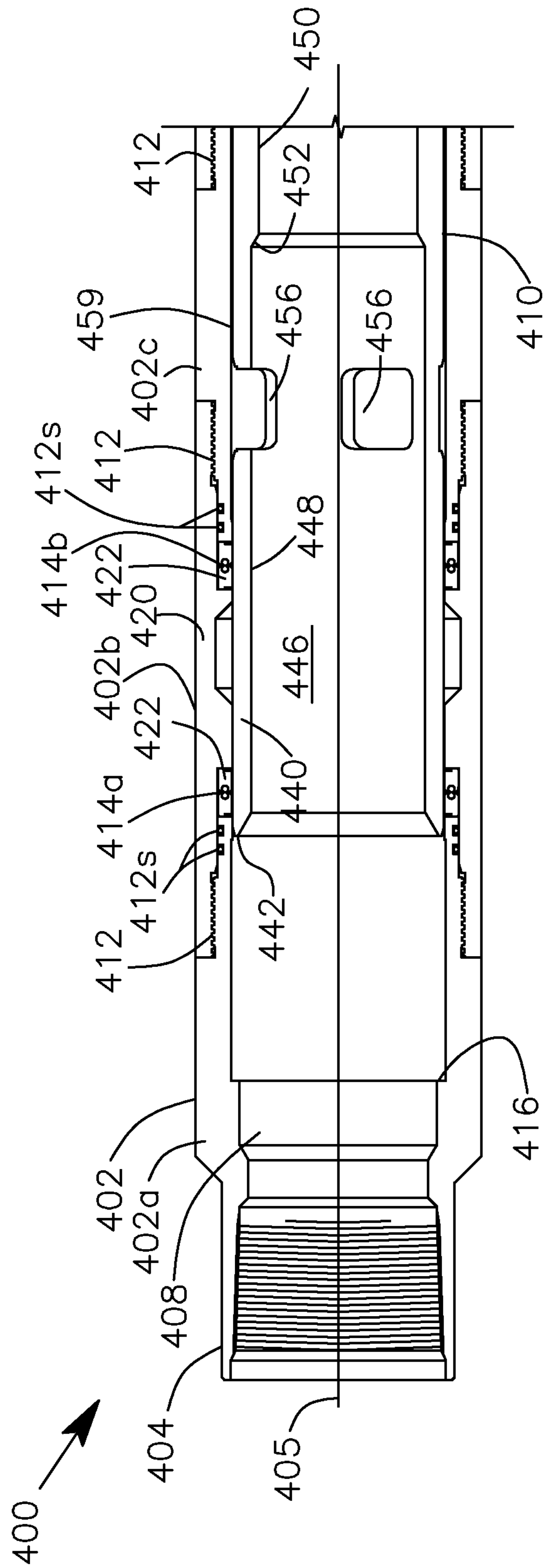
FIG. 29A is a section view of the uppermost end of the perforating valve shown in FIG. 28A, shown in a closed position.
Figure 29B:
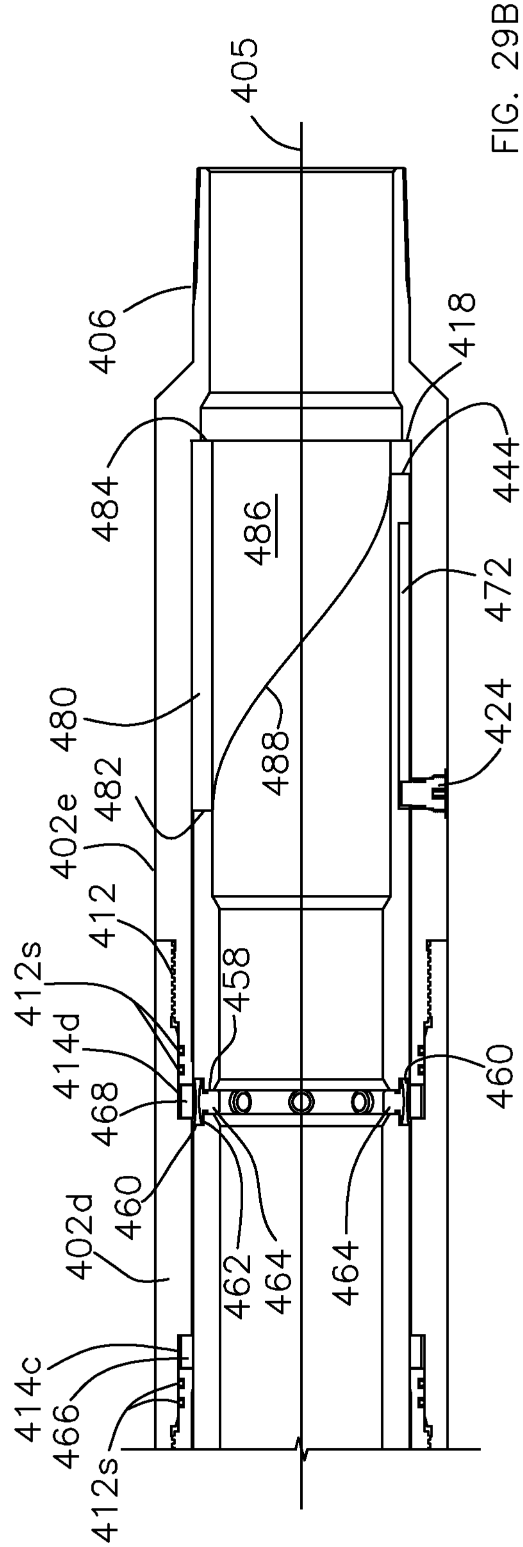
FIG. 29B is a section view of the lowermost end of the perforating valve shown in FIG. 28B, shown in a closed position.
Figure 29D:
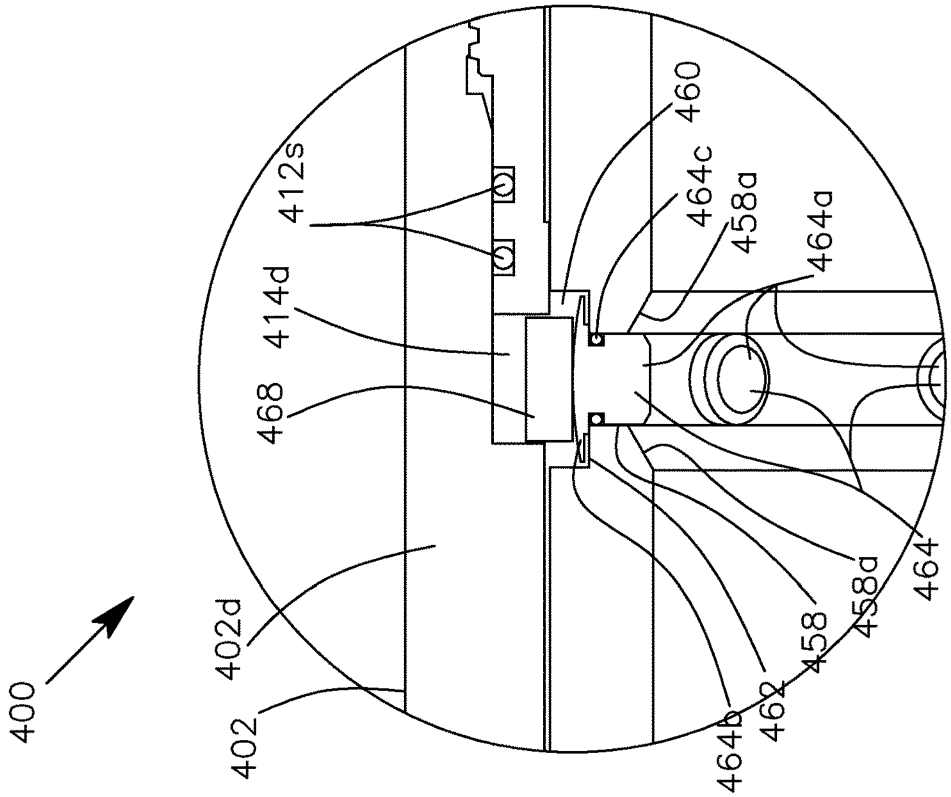
FIG. 29D is a zoomed-in view of an embodiment of a lower lock ring of the perforating valve shown in FIGS. 29A and 29B in accordance with principles disclosed herein.
Figure 29C:
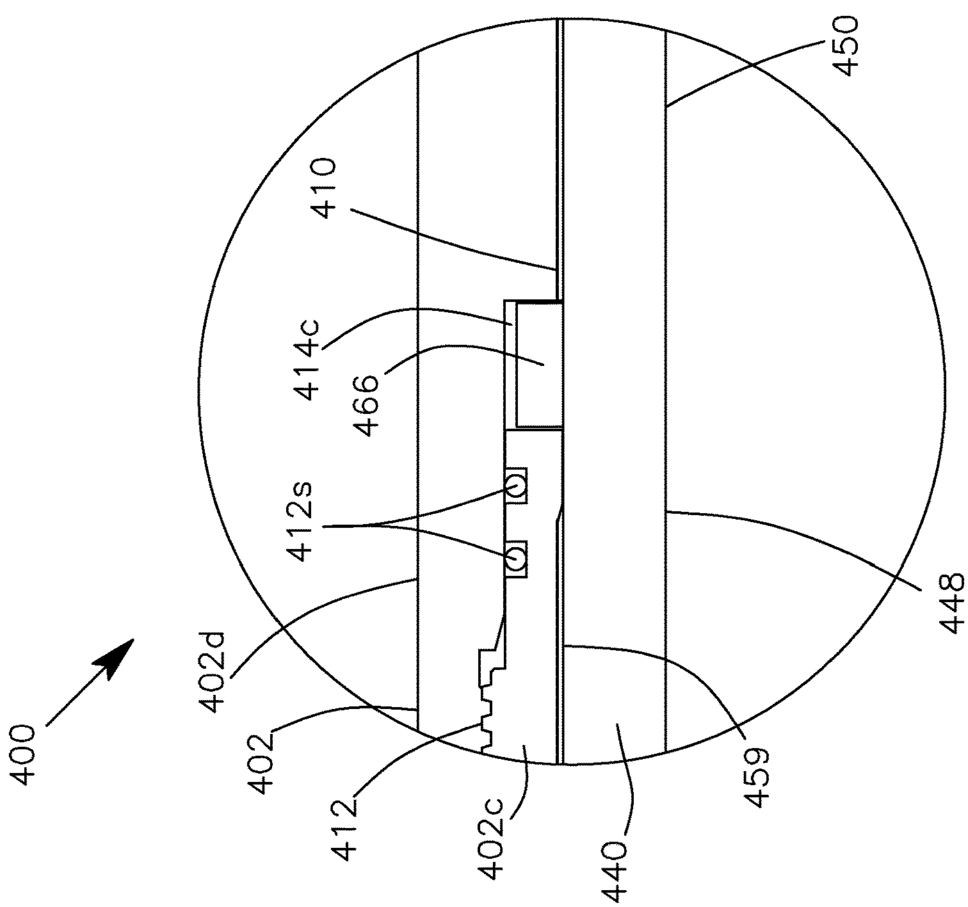
FIG. 29C is a zoomed-in view of an embodiment of an upper lock ring of the perforating valve shown in FIGS. 29A and 29B in accordance with principles disclosed herein.

Perforating valve 400 also includes a second or closed position, shown particularly in FIGS. 29A and 29B, restricting fluid communication between throughbore 408 of housing 402 and the surrounding environment (e.g., wellbore 7), even after thin-walled groove 420 of housing 402 have been perforated by a perforating tool. In the closed position the upper end 442 of sliding sleeve 440 is distal upper shoulder 416 of housing 402 while lower end 444 engages (or is disposed adjacent) upper end 482 of stationary sleeve 480. Particularly, lower helical engagement surface 470 of sliding sleeve 440 engages (or is disposed adjacent) the helical engagement surface 488 of stationary sleeve 480.

In this arrangement, ports 456 of sliding sleeve 440 do not axially align with thin-walled groove 420 of housing 402 and annular seals 422 provide sealing engagement against the outer surface 459 of sliding sleeve 440 to restrict fluid communication between thin-walled groove 420 and throughbore 408. Also, in the closed position, groove 460 and apertures 458 axially align with groove 414*d*, with the flanged portion 464*b* of buttons 464 in physical engagement with an inner surface of lower c-ring 468. In this position, the radially inward bias of lower c-ring 468 disposes lower c-ring 468 in both groove 414*d* of housing 402 and groove 460 of sliding sleeve 440, thereby restricting relative axial movement between housing 402 and sliding sleeve 440. As will be discussed further herein, perforating valve 400 may be transitioned between the open and closed positions an unlimited number of times via an actuation or obturating tool, such as coiled tubing actuation tool 100 and obturating tool 200.

Figure 30A:
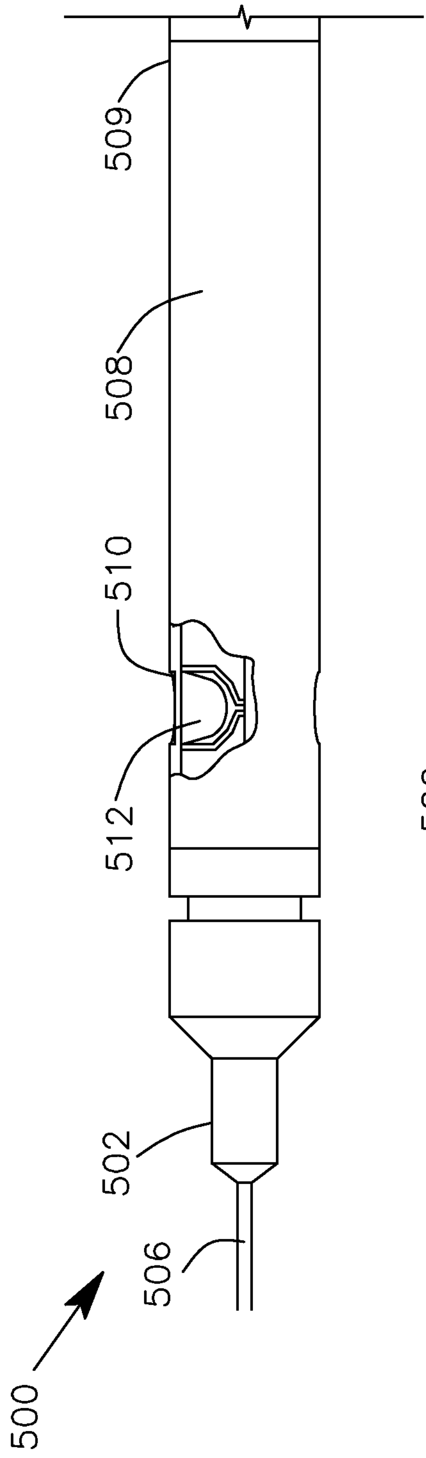
FIG. 30A is a section view of the uppermost end of an embodiment of a perforating tool in accordance with principles disclosed herein.
Figure 30B:
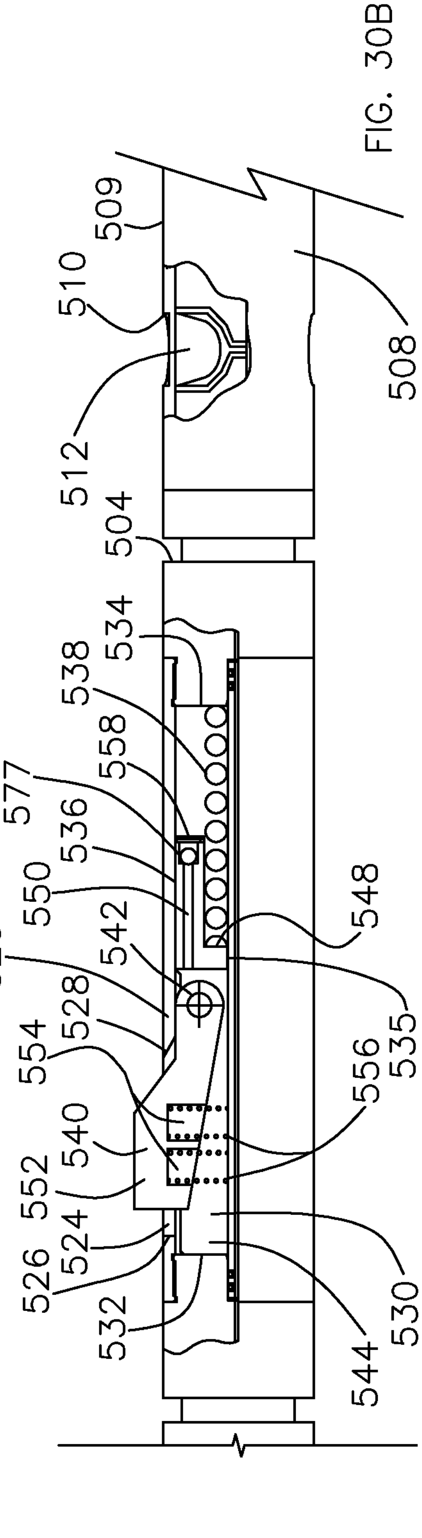
FIG. 30B is a section view of an intermediate section the perforating valve shown in FIG. 30A.

Referring collectively to FIGS. 30A and 30B, an embodiment of a perforating tool 500 is illustrated. Perforating tool 500 is generally configured to provide selectable perforation of the thin-walled groove 420 of perforating valve 400 as part of a perforation operation of casing string in a cased wellbore (e.g., wellbore 7). As discussed above, perforating tool 500 is configured to be coupled with a wireline extending into the cased wellbore. For instance, perforating tool 500 may first be displaced towards the toe of a cased wellbore, and then displaced upwards through the wellbore to selectably perforate one or more perforating valves included in a casing string of the cased wellbore.

In the embodiment of FIGS. 30A and 30B, perforating tool 500 includes an upper end 502 and a lower end 504. Upper end 502 of perforating tool 500 is coupled to a wireline 506 extending to the surface, where wireline 506 is configured to act as a conduit for the transmission of data and power between perforating tool 500 and the surface of a well site. Perforating tool 500 generally includes an axially upper perforating gun 508 and an axially lower selective engagement alignment tool 520. Perforating gun 508 generally includes a plurality of circumferentially spaced indentions 510 that extend radially into an outer cylindrical surface 509 of perforating gun 508. Disposed in each indention 510 is a shaped charge 512 for causing a controlled and radially directed explosion or combustion for perforating indentions 510 of engagement alignment tool 520 and thin-walled groove 420 of perforating valve 400. Specifically, when shaped charges 512 are configured to direct a high powered combustion radially through circumferentially spaced ports 456 of sliding sleeve 440, when perforating valve 400 is in the open position, and adjacent thin-walled groove 420, thereby perforating thin-walled groove 420. Shaped charges 512 are controlled at the surface of the well site via signals and electrical power provided by wireline 506.

Disposed axially below perforating gun 508 is selective engagement alignment tool 520, which is generally configured to selectively engage perforating valve 400 and to axially and rotationally align indentions 510 of perforating gun 508 with thin-walled groove 420 of perforating valve 400. Engagement alignment tool 520 includes a generally cylindrical outer surface 522 having an axially extending elongate slot 524 extending therethrough that is defined by an upper end 526 and a lower end 528. Engagement alignment tool 520 also comprises an inner chamber 530 having an upper end 532, a lower end 534, and a radially inner surface 535, where chamber 530 includes a floating carrier 536, an axially extending biasing member 538, and a radial engagement member, retractable key, or dog 540 pivotally coupled to carrier 536 at a pivot pin 542.

Carrier 536 includes an upper end 544, a lower end 546, a shoulder 548 proximal upper end 544, and a port 550 extending axially between upper end 544 and lower end 546. A pin 558 disposed in chamber 530 retains a sphere 557 disposed within port 550, thereby forming a check valve therein. Port 550 acts as a fluid damper for damping the impact of dog 540 against perforating valve 400. Particularly, port 550 allows for free fluid communication from the upper end 532 of chamber 530 to the lower end 534 of chamber 530, while suppressing or restricting (while not ceasing) fluid flow from the lower end 534 towards the upper end 532 of chamber 530. Biasing member 538 extends between and engages lower end 534 of chamber 530 and the shoulder 548 of carrier 536, and is configured to provide a reactive biasing force against carrier 536 in response to axial displacement of carrier 536 towards lower end 534 of chamber 530.

As mentioned above, dog 540 is pivotally coupled to carrier 536 at pivot pin 542, which is disposed at upper end 544 of carrier 536. Dog 540 generally includes a radially outwards extending flange 552 for engaging perforating valve 400 and a pair of flat bottom holes 554 that extend radially into a radially inner surface of dog 540. Extending between each flat bottom hole 554 and the radially inner surface 535 of chamber 530 is a biasing member 556 for providing a reactive biasing force against dog 540 in response to rotation of dog 540 about pivot pin 542 into chamber 530 (i.e., counter-clockwise as viewed in FIG. 30B). Thus, dog 540 of engagement alignment tool 520 is biased into a radially outwards position, shown in FIG. 30B.

Perforating tool 500 may include additional perforating guns 508 and engagement alignment tools 520 disposed axially below the engagement alignment tool 520 illustrated in FIG. 30B. In this manner, the thin-walled groove 420 of a particular perforating valve 400 may be "shot" or perforated multiple times by multiple perforating guns 508 to further enhance the perforations formed in thin-walled groove 420. Moreover, the shaped charge 512 of each perforating gun 508 may include varying performance characteristics, to further enhance the perforation of thin-walled groove 420 that have been perforated by multiple perforating guns 508 of perforating tool 500. Of course, perforating tool 500 may also be used to perforate, either once or a plurality of times using multiple perforating guns 508, a plurality of perforating valves 400 incorporated in a casing string.

As discussed above, perforating tool 500 may be used to perforate thin-walled groove 420 of perforating valve 400 such as to establish selective fluid communication between throughbore 408 of housing 402 and the surrounding environment. Specifically, as perforating tool 500 is displaced upwards (via an upwards force applied to wireline 506) towards the surface of the wellbore, upper perforating gun 508 is displaced through stationary sleeve 480 and into sliding sleeve 440, where perforating valve 400 is in the open position shown in FIGS. 28A and 28B. As upper perforating gun 508 enters sliding sleeve 440, engagement alignment tool 520 will be displaced through stationary sleeve 480, flange 552 of dog 540 will extend radially outwards as it enters axial gap 489 between sliding sleeve 440 and stationary sleeve 480, and finally, flange 552 will engage the lower helical engagement surface 470 of stationary sleeve 440.

Once flange 552 of dog 540 has landed against lower helical engagement surface 470 of sliding sleeve 440, continued upwards force applied to wireline 506 causes dog flange 552 of dog 540 to slide along lower helical engagement surface 470 until flange 552 reaches upper end 470*a*, arresting the upward axial displacement of perforating tool 500 through perforating valve 400. Further, as flange 552 of dog 540 slides along lower helical engagement surface 470 of sliding sleeve 440, dog 540 and perforating tool 500 are rotated within perforating valve 400 until shaped charge 512 of perforating gun 508 radially align with ports 456 of sliding sleeve 440 and thin-walled groove 420 of housing 402 when flange 552 lands against upper end 470*a* of lower helical engagement surface 470. In this position, shaped charge 512 of perforating gun 508 may be triggered via wireline 506 to perforate thin-walled groove 420 and establish selective fluid communication between throughbore 408 of housing 402 and the formation 6 surrounding wellbore 7.

Following perforation of thin-walled groove 420 of perforating valve 400, perforating tool 500 may be unlocked from perforated perforating valve 400 and displaced further upwards through the casing string for perforating one or more additional perforating valves 400. Specifically, to unlock perforating tool 500 after perforation of perforating valve 400, an axially upward force may be applied to wireline 506. The axial force applied to wireline 506 acts on dog 540, causing flange 552 of dog 540 to engage the upper end 470*a* of lower helical engagement surface 470. The engagement between flange 552 of dog 540 and lower helical engagement surface 470 compresses biasing member 538, axially displacing carrier 536 and dog 540 towards lower end 534 of chamber 530.

As dog 540 displaces towards lower end 534 of chamber 530, an angled or sloped surface of the flange 552 of dog 540 engages a corresponding angled or sloped surface of the lower end 528 of slot 524, thereby rotating dog 540 about pivot pin 542 into chamber 530 against the biasing force applied by biasing members 556. Dog 540 will continue to rotate about pivot pin 542 in response to engagement from lower end 528 of slot 524 until flange 552 disengages from lower helical engagement surface 470 of sliding sleeve 440, unlocking perforating tool 500 from perforating valve 400 and allowing perforating tool 500 to be displaced further uphole through the bore 11*b* of well string 11. While perforating tool 500 has been described above in conjunction with perforating valve 400, in other embodiments, perforating tool 500 may be used to perforate other valves. Further, in other embodiments perforating tool 500 may be used to perforate any tubular member disposed in a wellbore (e.g., wellbore 7), including tubular members other than perforating valves.

Perforating tool 500 may incorporate additional perforating guns 508 paired with additional engagement alignment tools 520 to perforate individual thin-walled groove 420 of perforating valve 400. Specifically, each perforating gun 508 may be configured to perforate a specific thin wall section 420 of perforating valve 400. In this manner, each specific thin wall section 420 of perforating valve 400 may shot with a perforating gun 508 possessing a shaped charge 512 having differing performance characteristics. The indentions 510 of each perforating gun 508 may be angularly aligned with a specific thin wall section 420 to be perforated via a controlled or predetermined angular distance or offset between the indention 510 and the dog 540 of the corresponding engagement alignment tool 520 disposed directly below the perforating gun 508.

Specifically, given that engagement alignment tool 520 is configured to angularly align against perforating valve 400 via engagement between dog 540 and lower helical engagement surface 470, such that dog 540 angularly aligns with upper end 470*a* of lower helical engagement surface 470, the angular offset between indentions 510 and dog 540 controls the radial positioning of the indentions 510 relative sliding sleeve 440 of perforating valve 400. For instance, if the thin wall section 420 of perforating valve 400 to be perforated by a particular perforating gun 508 is offset 30° from the upper end 470*a* of lower helical engagement surface 470, indention 510 of perforating gun 508 may be radially offset 30° (in the same angular direction as the thin wall section 420) from the dog 540 of the corresponding engagement alignment tool 520, such that upon engagement between engagement alignment tool 520 and perforating valve 400, the indention 510 of perforating gun 508 radially aligns with the specific thin wall section 420 of the perforating valve 400.

In light of the disclosure recited above, an embodiment of a method for orientating a perforating tool (e.g., perforating tool 500) in a wellbore comprises providing an orienting sub (e.g., orienting sub 400) in the wellbore, providing a perforating tool (e.g., perforating tool 500) in the wellbore, and engaging a retractable key (e.g., retractable key 540) of the perforating tool with a helical engagement surface (e.g., helical engagement surface 470) of the orienting sub to rotationally and axially align a charge (e.g., shaped charge 512) of the perforating tool with a predetermined axial and rotational location (e.g., a location in the wellbore directly adjacent indentation 420) in the wellbore. In certain embodiments, the method further comprises retracting the retractable key to allow the perforating tool to pass through the orienting sub. In certain embodiments, the method further comprises biasing the retractable key of the perforating tool into a radially expanded position to engage the retractable key with the helical engagement surface of the orienting sub.

In some embodiments, firing the charge through indentation of the orienting sub to perforate a casing disposed in the wellbore.

Figure 31A:
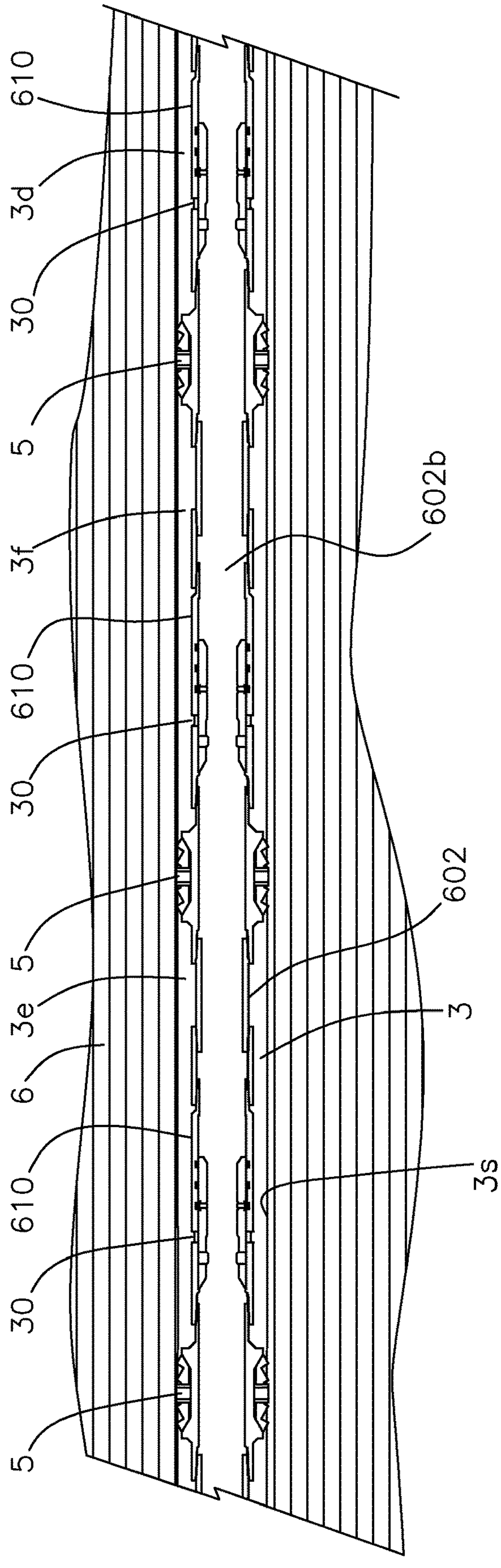
FIG. 31A is a schematic view of another embodiment of a well system having an open hole wellbore in a first position in accordance with principles disclosed herein.
Figure 31B:
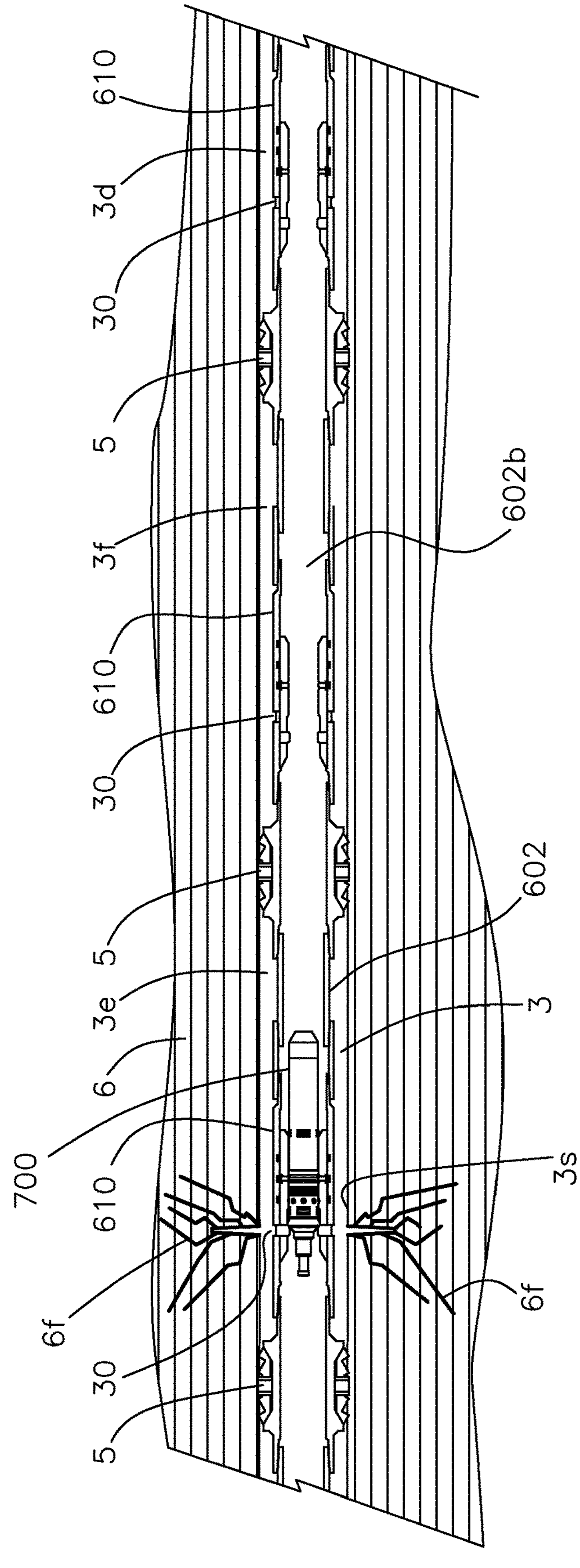
FIG. 31B is a schematic view of the well system shown in FIG. 31A in a second position.
Figure 31C:
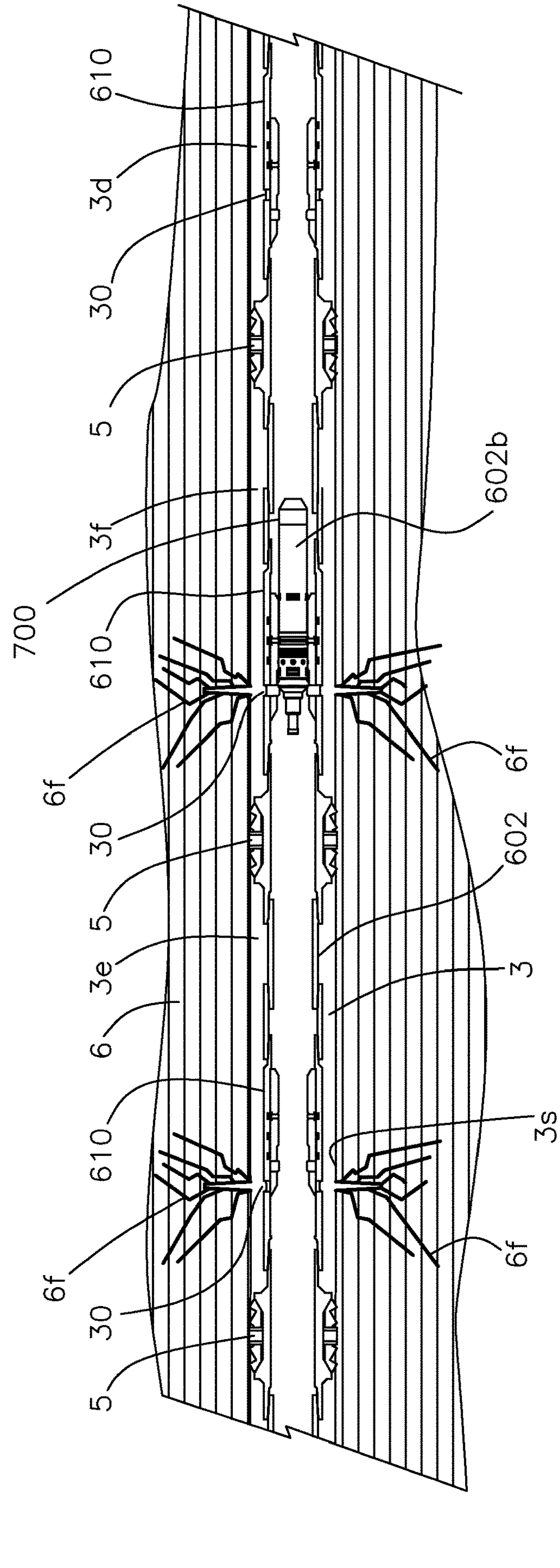
FIG. 31C is a schematic view of the well system shown in FIG. 31A in a third position.

Referring to FIGS. 31A-31C, an embodiment of a well system 600 is schematically illustrated. Well system 600 is configured similarly as well system 1 illustrated schematically in FIGS. 1A-1D, and shared features are numbered similarly. In this embodiment, well system 600 includes a well string 602 disposed in wellbore 3 having a bore 602*b* extending therethrough. Well string 602 includes a plurality of isolation packers 5 and a plurality of three-position sliding sleeve valves 610, where each three-position sliding sleeve valve 610 is disposed between a pair of isolation packers 5. Although not shown in FIGS. 31A-31C, well string 602 includes additional three-position sliding sleeve valves 610 extending to the toe of the deviated section 3*d* of the wellbore 3.

FIG. 31A illustrates well system 602 following installation of the well string 610 within the wellbore 3, with each sliding sleeve valve 10 disposed in an upper-closed position restricting fluid communication between bore 602*b* of well string 602 and the wellbore 3. FIG. 31B illustrates well system 602 following preparation for the commencement of a hydraulic fracturing operation of the formation 6. FIG. 31B also illustrates an embodiment of a three-position flow transported obturating tool 700 for hydraulically fracturing the formation 6 at each production zone (e.g., production zones 3*e*, 3*f*, etc.) of wellbore 3, as will be discussed further herein. In FIG. 31B the three-position obturating tool 700 is shown disposed within the three-position sliding sleeve valve 610 proximal the heel 3*h* (not shown) of wellbore 3 following the hydraulic fracturing of production zone 3*e*.

Unlike well system 1 illustrated in FIGS. 1A-1D, in well system 600 each three-position sliding sleeve valve 610 is disposed in the upper-closed position at the commencement of the hydraulic fracturing of wellbore 3. In this arrangement, fracturing fluids, formation fluids, and associated debris from formation 6 are restricted from flowing back into the bore 602*b* of well string 602 via the ports 30 of each three-position sliding sleeve valve 610. Particularly, during the hydraulic fracturing operation illustrated in FIG. 31B, the three-position obturating tool 700 lands within the first or uppermost three-position sliding sleeve valve 610 of production zone 3*e*, actuating the three-position sliding sleeve valve 610 from the upper-closed position to an open position, whereby hydraulic fracturing fluid may be pumped through ports 30 of three-position sliding sleeve valve 610 to hydraulically fracture the formation 6 or production zone 3*e* to produce fractures 6*f* therein. In some applications, fracturing fluid injected into the formation 6 at production zone 3*e*, as well as entrained formation fluids and associated debris, may wash back into the wellbore 3 at one or more locations along the length of wellbore 3. With the remaining three-position sliding sleeve valves 610 disposed in the upper-closed position, these fluids are restricted from flowing back into the bore 602*b* of well string 602, thereby preventing the washed back fluids from depositing debris or other contaminants in the bore 602*b* of well string 602 that could interfere with the operation of well system 600.

FIG. 31C illustrates well system 600 following the production of fractures 6*f* in formation 6 at production zone 3*f* via three-position obturating tool 700. In this arrangement, three-position obturating tool 700 has actuated the three-position sliding sleeve valve 610 of production zone 3*e* into a lower-closed position, and the three-position obturating tool 700 has actuated the three-position sliding sleeve valve 610 of production zone 3*f* from the upper-closed position to the open position, allowing for the hydraulic fracturing of formation 6 at production zone 3*f*, producing hydraulic fractures 6*f* therein. In this manner, each production zone proceeding towards the toe of wellbore 3 may be successively fractured following the fracturing of production zone 3*f*. As with well system 1, once the formation 6 at each production zone (e.g., production zones 3*e*, 3*f*, etc.) of well system 600 has been hydraulically fractured using three-position obturating tool 700, and the three-position obturating tool 700 is disposed proximal the toe of wellbore 3, the three-position obturating tool 700 may be fished and removed from the wellbore 3.

Referring to FIGS. 32A-34, an embodiment of a lockable three-position sliding sleeve valve 610 is illustrated. Three-position sliding sleeve valve 610 shares many structural and functional features with sliding sleeve valve 10 illustrated in FIGS. 3A-8, and shared features have been numbered similarly. As with sliding sleeve valve 10, three-position sliding sleeve valve 610 comprises a lockable sliding sleeve valve. In this embodiment, three-position sliding sleeve valve 610 has a central or longitudinal axis 615, a first or upper end 614, and a second or lower end 616. In this embodiment, three-position sliding sleeve valve 610 includes a generally tubular housing 612 and a sliding sleeve 630.

Housing 612 of three-position sliding sleeve valve 610 includes a bore 618 extending between first end 614 and second end 616, where bore 618 is defined by a generally cylindrical inner surface 621. Housing 612 is made up of a series of segments including a first or upper segment 612*a*, intermediate segments 12*b*-12*e*, and a lower segment 612*f*, where segments 612*a*-612*f* are releasably coupled together via threaded couplers 20, where each threaded coupler 20 is equipped with a pair of O-ring seals 20*s* to restrict fluid communication between each of the segments 612*a*-612*f* forming housing 612. Also, an annular groove 620*a*-620*e* is disposed between each pair of segments 612*a*-612*f* of housing 612. Particularly, annular groove 620*a* is disposed between upper segment 612*a* and intermediate segment 612*b*, annular groove 620*b* is disposed between intermediate segments 612*b* and 612*c*, annular groove 620*c* is disposed between intermediate segments 612*c* and 612*d*, annular groove 620*d* is disposed between intermediate segments 612*d* and 612*e*, and annular groove 620*e* is disposed between intermediate segment 612*e* and lower segment 612*f*. Ports 30 extend radially through intermediate segment 612*b* of housing 612.

In this embodiment, the inner surface 621 of housing 612 includes a first or upper landing profile or shoulder 622 disposed proximal upper end 614 and a second or lower landing profile or shoulder 624 disposed proximal lower end 616. Upper landing profile 622 includes an angled upper landing surface 622*s* while lower landing profile 624 includes an angled lower landing surface 624*s*. In some embodiments, lower landing surface 624*s* comprises a no-go shoulder. In some embodiments, lower landing profile 624 comprises a no-go landing nipple, where the term "no-go landing nipple" is defined herein as a nipple that incorporates a reduced diameter internal profile that provides positive indication of seating of a wellbore tool by preventing the wellbore tool from passing therethrough. In certain embodiments, upper landing surface 622*s* comprises a no-go shoulder and upper landing profile 622 comprises a no-go landing nipple. Landing surfaces 622*s* and 624*s* of upper landing profile 622 and lower landing profile 624, respectively, are configured to receive and lock against an actuation or obturating tool disposed in bore 618 of housing 612, as will be discussed further herein. In this embodiment, the inner surface 621 of housing 612 at upper landing profile 622 and lower landing profile 624 has a diameter that is less than the diameter of the inner surface 621 at upper end 614 and lower end 616, respectively. In this arrangement, the diameter of upper landing profile 622 and lower landing profile 624 is reduced respective an inner diameter of the well string 602. Three-position sliding sleeve valve 610 further includes a first or upper lock ring or c-ring 626*a* disposed in the annular groove 620*c* located between intermediate segments 612*c* and 612*d*, a second or intermediate lock ring or c-ring 626*b* disposed in the annular groove 620*d* located between intermediate segments 612*d* and 612*e*, and a third or lower lock ring or c-ring 626*c* disposed in the annular groove 620*e* located between intermediate segment 612*e* and lower segment 612*f* C-rings 626*a*-626*c* are configured similar to upper c-ring 66 and lower c-ring 68 of sliding sleeve valve 10 discussed above.

As shown particularly in FIGS. 32A-34, three-position sliding sleeve valve 610 includes a first or upper-closed position restricting fluid communication between bore 618 of housing 612 and the surrounding environment (e.g., wellbore 3). In the upper-closed position the first end 42 of sliding sleeve 630 engages (or is disposed adjacent) upper shoulder 24 of housing 612 while second end 44 of sliding sleeve 630 is distal lower shoulder 26. In this arrangement, ports 56 of sliding sleeve 630 do not axially align with ports 30 of housing 612 and annular seals 32 provide sealing engagement against the outer surface 59 of sliding sleeve 630 to restrict fluid communication between ports 30 and ports 56. Also, in the upper-closed position, outer groove 60 and circumferentially spaced apertures 58 axially align with annular groove 620*c* of housing 612, with buttons 64 in physical engagement with an inner surface of upper c-ring 626*a*, with upper c-ring 626*a* disposed in a radially contracted position restricting relative axial movement between housing 612 and sliding sleeve 630. In this position, sliding sleeve 630 is locked from being displaced axially within housing 612, even if an axial force is applied against sliding sleeve 630. Also in this arrangement, both intermediate c-ring 626*b* and lower c-ring 626*c* are disposed about outer surface 59 of sliding sleeve 630 in a radially expanded position.

As shown particularly in FIGS. 35A-37, three-position sliding sleeve valve 10 includes a second or open position providing fluid communication between bore 618 of housing 612 and the surrounding environment (e.g., wellbore 3). In the open position the first end 42 of sliding sleeve 630 is disposed distal upper shoulder 24 of housing 612 while second end 44 of sliding sleeve 630 is disposed distal lower shoulder 26. In this arrangement, ports 56 of sliding sleeve 630 axially align with ports 30 of housing 612, providing for fluid communication between the surrounding environment and throughbore 46 of sliding sleeve 630 (e.g., between ports 30 and 56). Also, in the open position, outer groove 60 and circumferentially spaced apertures 58 axially align with annular groove 620*d*, with buttons 64 in physical engagement with an inner surface of intermediate c-ring 626*b*, which is disposed in a radially contracted position restricting relative axial movement between housing 612 and sliding sleeve 630. Also in this arrangement, upper c-ring 626*a* and lower c-ring 626*c* are both disposed about outer surface 59 of sliding sleeve 630 in a radially expanded position.

As shown particularly in FIGS. 38A-40, three-position sliding sleeve valve 610 includes a third or lower-closed position restricting fluid communication between bore 618 of housing 612 and the surrounding environment (e.g., wellbore 3). In the lower-closed position the first end 42 of sliding sleeve 630 is disposed distal upper shoulder 24 of housing 612 while second end 44 of sliding sleeve 630 engages (or is disposed adjacent) lower shoulder 26. In this arrangement, ports 56 of sliding sleeve 630 do not axially align with ports 30 of housing 612 and annular seals 32 provide sealing engagement against the outer surface 59 of sliding sleeve 630 to restrict fluid communication between ports 30 and ports 56. Also, in the lower-closed position, outer groove 60 and circumferentially spaced apertures 58 axially align with annular groove 620*e* of housing 612, with buttons 64 in physical engagement with an inner surface of lower c-ring 626*c*, with lower c-ring 626*c* disposed in a radially contracted position restricting relative axial movement between housing 612 and sliding sleeve 630. Also in this arrangement, both upper c-ring 626*a* and intermediate c-ring 626*b* are disposed about outer surface 59 of sliding sleeve 630 in a radially expanded position. As will be discussed further herein, three-position sliding sleeve valve 610 can be transitioned between the upper-closed, open, and lower-closed positions an unlimited number of times via an appropriate actuation or obturating tool.

Referring to FIGS. 41A-45, an embodiment of a three-position coiled tubing actuation tool 650 is illustrated along with a schematic illustration of a portion of the three-position sliding valve 610 for additional clarity. Three-position coiled tubing actuation tool 650 is configured to selectably actuate three-position valve 610 between the open and lower-closed positions, and between the open and upper-closed positions, as will be discussed further herein. Further, three-position coiled tubing actuation tool 650 is configured to cycle the three-position sliding sleeve valve 610 an unlimited number of times between the open and lower-closed positions, and between the open and upper-closed positions. The three-position coiled tubing actuation tool 650 may be incorporated into a coiled tubing string displaced into a completion string (including one or more three-position sliding sleeve valves 610) extending into a wellbore as part of a well servicing operation.

Similar to coiled tubing actuation tool 100 described above, three-position coiled tubing actuation tool 650 is configured to clean and prepare the inner surface of a completion string for hydraulic fracturing using a hydraulic fracturing tool. Thus, three-position coiled tubing actuation tool 650 may be used in conjunction with a hydraulic fracturing tool, where three-position coiled tubing actuation tool 650 is used first to clean the completion string, and actuate each three-position sliding sleeve valve 610 into the upper-closed position; after which time, three-position coiled tubing actuation tool 650 may be pulled out of the wellbore, and a hydraulic fracturing tool may be inserted to hydraulically fracture each isolated production zone of the wellbore, moving from a first or upper production zone distal the bottom or toe of the well, to a last or lower production zone proximal the toe of the well.

Three-position coiled tubing actuation tool 650 shares many structural and functional features with coiled tubing actuation tool 100 illustrated in FIGS. 9A-12, and shared features have been numbered similarly. In this embodiment, three-position coiled tubing actuation tool 650 is disposed coaxially with longitudinal axis 615 and includes a generally tubular engagement housing 652 and a piston 670 disposed therein. Engagement housing 652 includes a first or upper end 654, a second or lower end 656, and a throughbore 658 extending between upper end 654 and lower end 656 defined by a generally cylindrical inner surface 660. Engagement housing 652 also includes a generally cylindrical outer surface 662. Engagement housing 652 is made up of a series of segments including a first or upper segment 652*a*, intermediate segments 652*b*-652*d*, and a lower segment 652*e*, where segments 652*a*-652*e* are releasably coupled together via threaded couplers 111.

Figure 42:
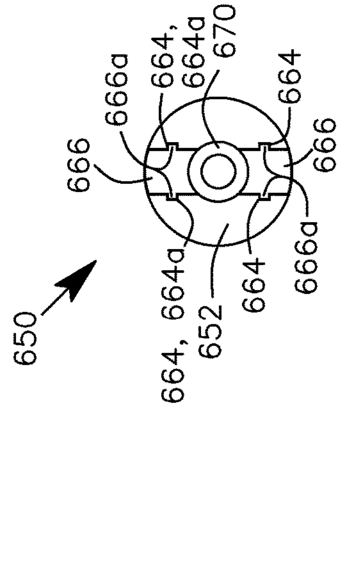
FIG. 42 is a section view along lines 42-42 of the coiled tubing actuation tool shown in FIG. 41A.
Figure 43:
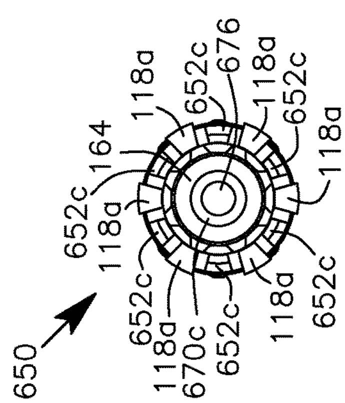
FIG. 43 is a section view along lines 43-43 of the coiled tubing actuation tool shown in FIG. 41B.
Figure 44:
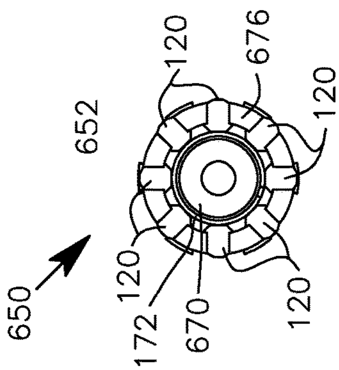
FIG. 44 is a section view along lines 44-44 of the coiled tubing actuation tool shown in FIG. 41B.
Figure 45:
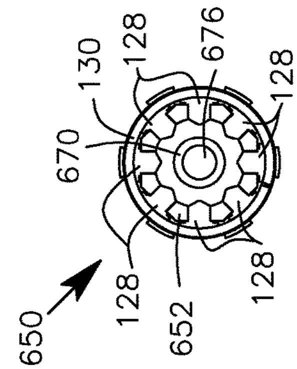
FIG. 45 is a section view along lines 45-45 of the coiled tubing actuation tool shown in FIG. 41B.

In this embodiment, intermediate segment 652*b* includes a pair of circumferentially spaced elongate slots 664, where each elongate slot 664 extends radially between inner surface 660 and outer surface 662 of engagement housing 652. Each elongate slot 664 of intermediate segment 652*b* receives and slidingly engages a corresponding locking member 666. As shown particularly in FIGS. 41A and 42, each elongate slot 664 includes a pair of angled grooves 664*a* for receiving a corresponding pair of angled tongues 666*a* of locking member 666. In this arrangement, each locking member 666 may be slidingly displaced at an angle along angled grooves 664*a*. In other words, as locking member 666 is displaced along angled grooves 664*a* of its corresponding elongate slot 664, the locking member 666 is displaced both axially (respective longitudinal axis 615) and radially between an upper-retracted position (shown in FIG. 41A) and a lower-extended position (shown in FIG. 49A). In the upper-retracted position, an inner surface of locking member 666 engages the outer surface 680 of piston 670 to restrict axially upward and radially inward movement. In the lower-extended position, a lower surface of locking member 666 engages a lower end of elongate slot 664, restricting further axially downwards and radially outwards movement. Although elongate slots 664 and corresponding locking members 666 are shown in FIG. 42 as being spaced circumferentially approximately 180 degrees apart, in other embodiments, engagement housing 652 may include any number of elongate slots 664 and corresponding locking members 666 disposed at various positions along the circumference of engagement housing 652.

In the embodiment of FIGS. 41A-45, piston 670 is disposed coaxially with longitudinal axis 615 and includes an upper end 672, a lower end 674, and a throughbore 676 extending between upper end 672 and lower end 674, where throughbore 676 is defined by a generally cylindrical inner surface 678. Piston 670 also includes a generally cylindrical outer surface 680. Piston 670 is made up of a series of segments including a first or upper segment 670*a*, intermediate segments 670*b* and 670*c*, and a lower segment 670*d*, where segments 670*a*-670*d* are releasably coupled together via threaded couplers 151.

Upper segment 670*a* of piston 670 is similar to upper segment 150*a* of the piston 150 of coiled tubing actuation tool 100, and includes an upper engagement shoulder 682. A first or upper biasing member 684 extends between and engages both the upper engagement shoulder 682 of upper segment 670*a* and an upper locking member flange 686 that is disposed about and slidingly engages intermediate segment 670*b*. As shown particularly in FIG. 41A, a lower end of upper locking member flange 686 engages an upper locking member shoulder 687 of intermediate segment 670*b*. In this arrangement, upper locking member shoulder 687 limits the downward movement of upper locking member flange 686 respective piston 670. In other words, engagement between upper locking member shoulder 687 and upper locking member flange 686 marks the lowest downward position of upper locking member flange 686 respective piston 670. Intermediate segment 670*b* also includes a lower locking member shoulder 688 that engages a lower biasing member 690. Lower biasing member 690 extends between and engages both lower locking member shoulder 688 and a lower locking member flange 692 that is disposed about and slidingly engages intermediate segment 670*b*. As shown particularly in FIG. 41A, a lower end of lower locking member flange 692 is disposed directly adjacent an intermediate locking member shoulder 691 of intermediate segment 670*b*.

As will be explained further herein, upper locking member flange 686 is configured to forcibly engage an upper end of locking member 666 while lower locking member flange 692 is configured to forcibly engage a lower end of locking member 666. Also, upper biasing member 684 is configured to provide a greater biasing or spring force than that provided by lower biasing member 690, and thus, when both upper biasing 684 and lower biasing member 690 each engage locking member 666, a resultant downwards biasing force will be applied against locking member 666, urging locking member 666 towards the lower-extended position. In this embodiment, upper biasing member 684 and lower biasing member 690 each comprise coiled springs; however, in other embodiments, upper biasing member 684 and lower biasing member 690 may each comprise other types of biasing members known in the art. In this embodiment, intermediate segment 670*b* of piston 670 also includes a lower shoulder 694 disposed at the lower end of intermediate segment 670*b*. Lower shoulder 694 of intermediate segment 670*b* is similar in function to lower shoulder 162 of the piston 150 of coiled tubing actuation tool 100, and thus, is configured to engage an upper end of upper locking sleeve 164.

Referring to FIGS. 31A and 41A-52B, in an embodiment three-position coiled tubing actuation tool 650 comprises a terminal end of a coiled tubing reel injected into the bore 602*b* of well string 602. In preparing well string 602 for hydraulic fracturing by three-position obturating tool 700, three-position coiled tubing actuation tool 650 may actuate each three-position sliding sleeve valve 610 of well string 602 from the lower-closed position shown in FIGS. 38A-40 to the open position shown in FIGS. 35A-37. Subsequently, three-position coiled tubing actuation tool 650 may be used to actuate each three-position sliding sleeve valve 610 from the open position shown in FIGS. 35A-37 to the upper-closed position shown in FIGS. 32A-34.

Figures 46A, 46B, 47A, 47B:
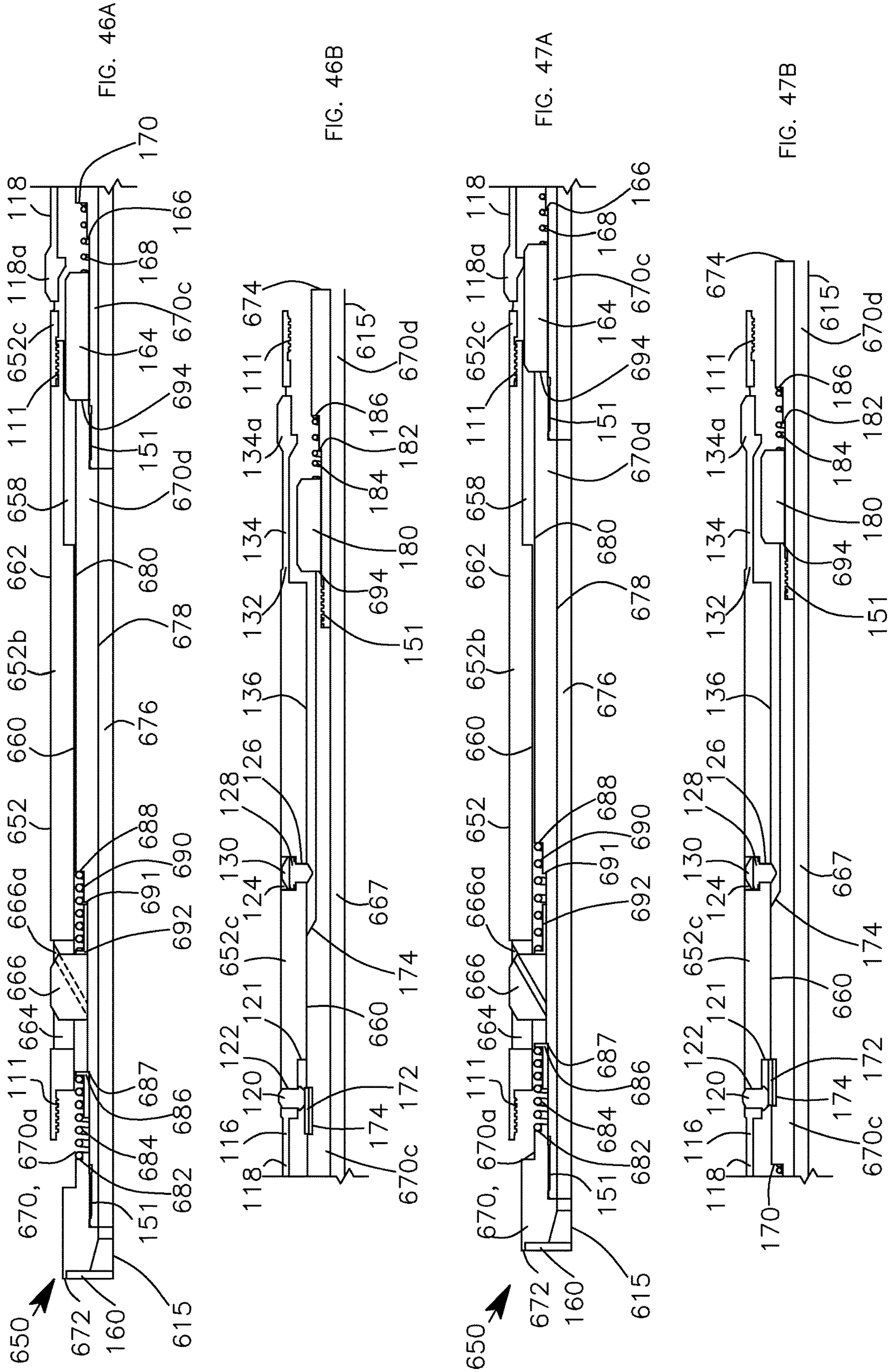
FIG. 46A is a schematic, cross-sectional view of an uppermost end of the coiled tubing actuation tool shown in FIGS. 41A-41C in a first position.
FIG. 46B is a schematic, cross-sectional view of a lowermost end of the coiled tubing actuation tool shown in FIGS. 41A-41C in the first position.
FIG. 47A is a schematic, cross-sectional view of an uppermost end of the coiled tubing actuation tool shown in FIGS. 41A-41C in a second position.
FIG. 47B is a schematic, cross-sectional view of a lowermost end of the coiled tubing actuation tool shown in FIGS. 41A-41C in the second position.

FIGS. 46A-52B illustrate the sequence of positions of three-position coiled tubing actuation tool 650 as it actuates a three-position sliding sleeve valve 610 from the lower-closed position to the open position. FIGS. 46A and 46B illustrate three-position coiled tubing actuation tool 650 in a first position similar in arrangement to the first position of coiled tubing actuation tool 100 described above and shown in FIG. 9F. Particularly, in this position, the engagement portions 118*a* of upper collet 116 and the engagement portions 134*a* of lower collet 132 are each unsupported by upper locking sleeve 164 and lower locking sleeve 180, respectively, allowing fingers 118 of upper collet 116 and fingers 134 of lower collet 132 to flex radially relative the rest of engagement housing 612. Also, locking member 666 is disposed in the upper-retracted position with the inner surface of locking member 666 engaging the outer surface 680 of intermediate segment 670*b* of piston 670. In the upper-retracted position the radially outer surface of locking member 666 is disposed flush with, or at least does not project substantially outwards from, the outer surface 662 of engagement housing 652. Further, in the first position upper locking member flange 686 is disposed distal the upper end of locking member 666 while the lower end of locking member 666 is engaged by lower locking flange 692, thereby locking or forcing locking member 666 into the upper-retracted position. Thus, in the position shown in FIGS. 46A and 46B, three-position coiled tubing actuation tool 650 may be displaced through one or more three-position sliding sleeve valves 610 of well string 602 without actuating any one of the three-position sliding sleeve valves 610.

FIGS. 47A and 47B illustrate the three-position coiled tubing actuation tool 650 in a second position similar to the second position of coiled tubing actuation tool 100 described above and shown in FIG. 9G. Particularly, in the second position the flow rate through throughbore 676 has reached a threshold level sufficient to compress biasing member 144 and shift piston 150 (including upper locking sleeve 164 and lower locking sleeve 180) downwards relative engagement housing 652, but where the three-position coiled tubing actuation tool 650 is not disposed within the reduced diameter section 50 of a sliding sleeve 630. In this position, the downwards shift of piston 670 causes upper locking sleeve 164, which is engaged against lower shoulder 694, to engage and radially support the engagement portions 118*a* of upper collect 116, preventing fingers 118 of upper collect 116 from flexing radially inwards relative the rest of tubular engagement housing 102. Also, locking member 666 remains in the upper-retracted position, where lower biasing member 690 has expanded in length in response to the downwards shift of piston 670 to maintain engagement between the lower end of locking member 666 and the lower locking member flange 692.

Figure 48A:
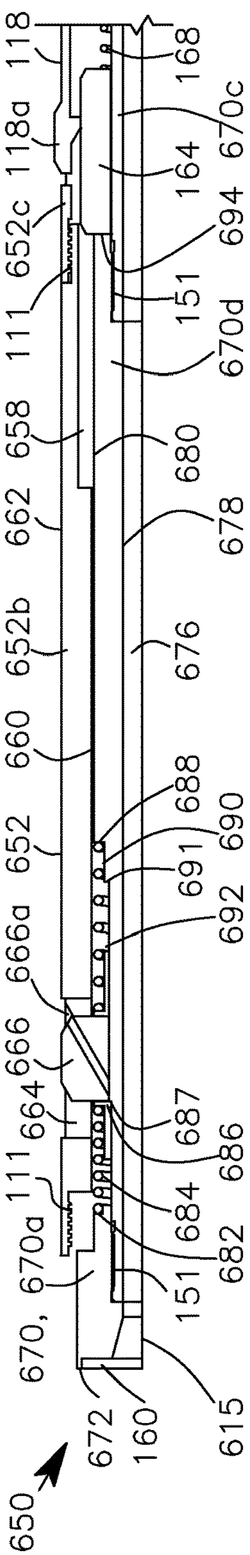
FIG. 48A is a schematic, cross-sectional view of an uppermost end of the coiled tubing actuation tool shown in FIGS. 41A-41C in a third position.
Figure 48B:
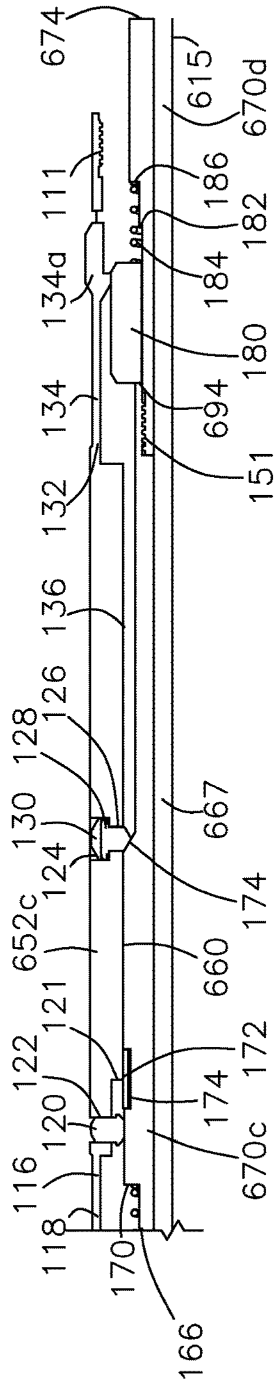
FIG. 48B is a schematic, cross-sectional view of a lowermost end of the coiled tubing actuation tool shown in FIGS. 41A-41C in the third position.

FIGS. 48A and 48B illustrate the three-position coiled tubing actuation tool 650 in a third position similar to the fourth position of coiled tubing actuation tool 100 described above and shown in FIG. 9I. Particularly, in the third position three-position coiled tubing actuation tool 650 has been displaced downwards in the direction of the toe of wellbore 3 such that it is disposed within the three-position sliding sleeve valve 610 of production zone 3*e*, and an above threshold level of fluid flow is flowed through throughbore 676. Also, bore sensors 120 are disposed within the reduced diameter section 50, and in response, have been displaced into the radially inwards position, forcing c-ring 172 fully into annular groove 174 such that c-ring 172 is disposed in a radially contracted position allowing c-ring 172 to be displaced downwards past intermediate shoulder 121 of engagement housing 652 as piston 670 shifts downwards respective engagement housing 652.

In this arrangement, engagement portions 118*a* of upper collet 116 are disposed directly adjacent upper shoulder 52 of sliding sleeve 630, and c-ring 130 is disposed directly adjacent bevel 58*a* (shown in FIG. 3C). With c-ring 130 disposed adjacent bevels 58*a, c*-ring 130 is prohibited from expanding into the radially outwards position due to physical engagement from the reduced diameter section 50 of sliding sleeve 630 restricting radially outwards expansion of c-ring 130. In turn, buttons 128 remain in the radially inwards position, preventing further downwards displacement of piston 670 relative tubular engagement housing 652 due to physical engagement between buttons 128 and second intermediate shoulder 176 of piston 670. Further, in the third position the locking member 666 remains in the upper-retracted position, with lower biasing member 690 expanding further to maintain physical engagement between lower locking member flange 692 and the lower end of locking member 666.

Figure 49A:
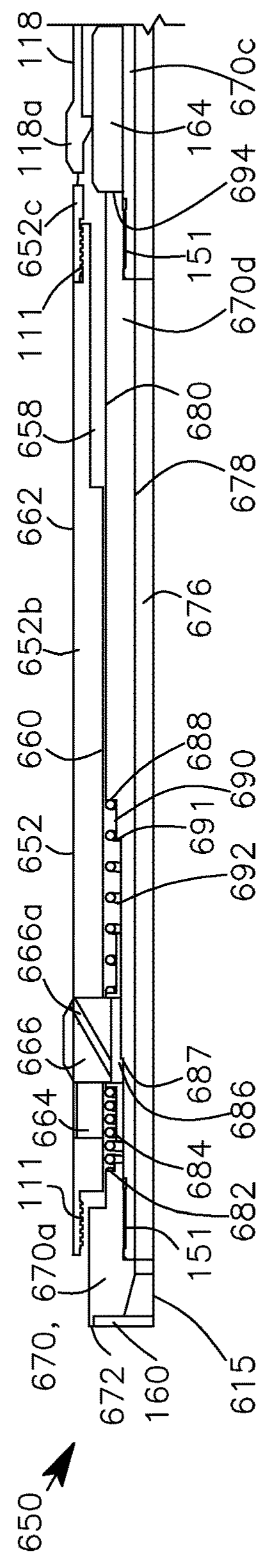
FIG. 49A is a schematic, cross-sectional view of an uppermost end of the coiled tubing actuation tool shown in FIGS. 41A-41C in a fourth position.
Figure 49B:
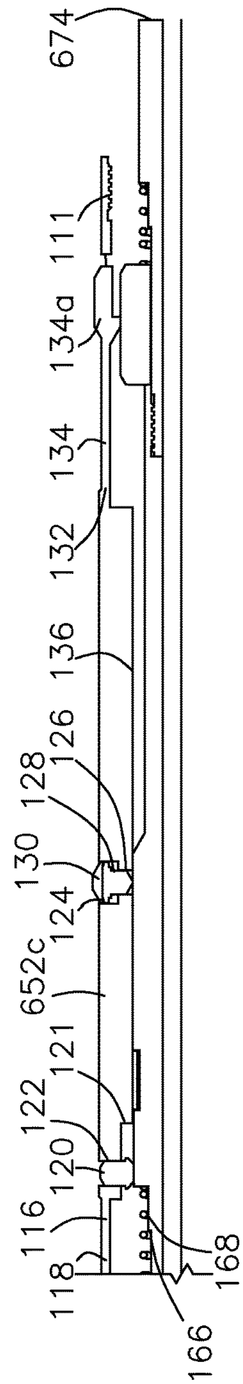
FIG. 49B is a schematic, cross-sectional view of a lowermost end of the coiled tubing actuation tool shown in FIGS. 41A-41C in the fourth position.

FIGS. 49A and 49B illustrate the three-position coiled tubing actuation tool 650 in a fourth position similar to the fifth position of coiled tubing actuation tool 100 described above and shown in FIG. 9J. Particularly, in the fourth position an above threshold level of fluid flow is flowed through throughbore 676 while grappling and unlocking sliding sleeve 630 of the three-position sliding sleeve valve 610 of production zone 3*e*. Particularly, three-position coiled tubing actuation tool 650 is positioned within sliding sleeve 630 such that the engagement portions 118*a* of upper collet 116 engage or grapple the upper shoulder 52 of sliding sleeve 630 and the engagement portions 134*a* of lower collet 132 engage or grapple the lower shoulder 54 of sliding sleeve 630. Further, in this position, c-ring 130 is axially aligned with buttons 64 of sliding sleeve 630, allowing c-ring 130 to expand into the radially outwards position in response to physical engagement from buttons 128, which are in turn engaged by the second intermediate shoulder 176 of piston 670. The radial expansion of c-ring 130 and buttons 128, urged by the physical engagement between buttons 64 and second intermediate shoulder 176 in response to the threshold level of fluid flow through throughbore 676, acts to shift piston 670 further downwards respective tubular engagement housing 652 such that engagement portions 134*a* of lower collet 132 are now fully supported or engaged by the lower locking sleeve 180.

Also, in the fourth position the locking member 666 has been shifted from the upper-retracted position to the lower-extended position in response to the further downwards shift of piston 670 respective engagement housing 652. Particularly, given the downwards shift of piston 670 the upper locking member shoulder 687 has passed beneath the inner surface of locking member 666, allowing upper locking member flange 686 to engage the upper end of locking member 666 and displace locking member 666 from the upper-retracted position to the lower-extended position where the outer surface of locking member 666 projects from the outer surface 662 of engagement housing 652. As described above, upper biasing member 684 provides a greater biasing force than lower biasing member 690, and thus, although in the fourth position lower locking member flange 692 remains in engagement with the lower end of locking member 666, the resultant downwards biasing force displaces locking member 666 into the lower-extended position.

Figure 50A:
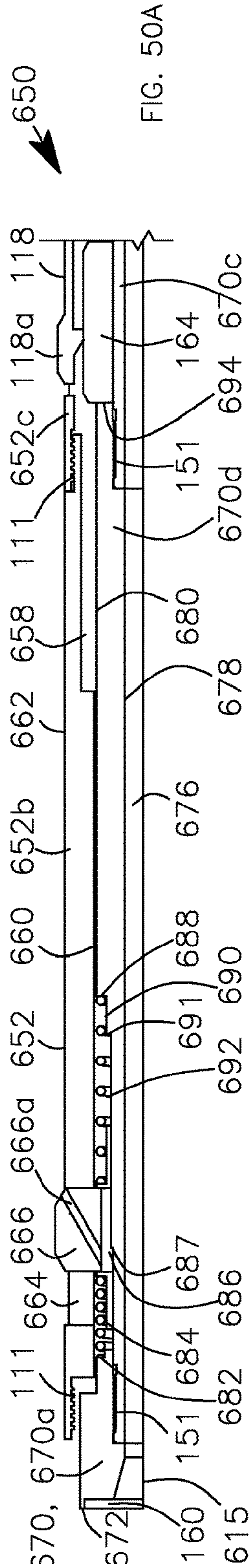
FIG. 50A is a schematic, cross-sectional view of an uppermost end of the coiled tubing actuation tool shown in FIGS. 41A-41C in a fifth position.
Figure 50B:
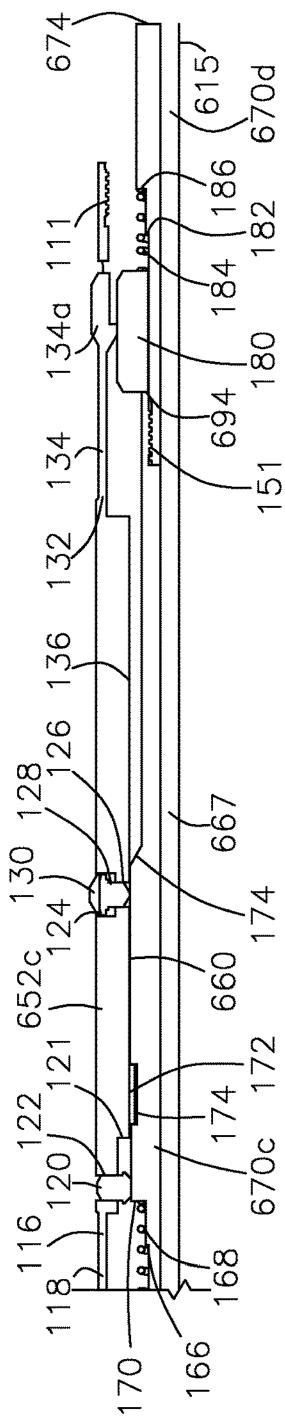

FIGS. 50A and 50B illustrate the three-position coiled tubing actuation tool 650 in a fifth position similar to the sixth position of coiled tubing actuation tool 100 described above and shown in FIG. 9K. Particularly, in the fifth position three-position coiled tubing actuation tool 650 has been displaced upwards (i.e., in the direction of heel 3*h* of wellbore 3) within the bore 602*b* of well string 602. With three-position coiled tubing actuation tool 650 locked to the sliding sleeve 630 of three-position sliding sleeve valve 610, sliding sleeve 630 is displaced upward within housing 612 of three-position sliding sleeve valve 610 by displacing the coiled tubing actuation tool 100 within bore 602*b* of well string 602. Particularly, by displacing three-position coiled tubing actuation tool 650 within bore 602*b* of well string 602 when three-position coiled tubing actuation tool 650 is in the position shown in FIGS. 50A and 50B, three-position sliding sleeve valve 610 is actuated from the lower-closed position shown in FIGS. 38A and 38B, to the open position shown in FIGS. 35A and 35B.

Figures 32A, 32B, 33, 34:
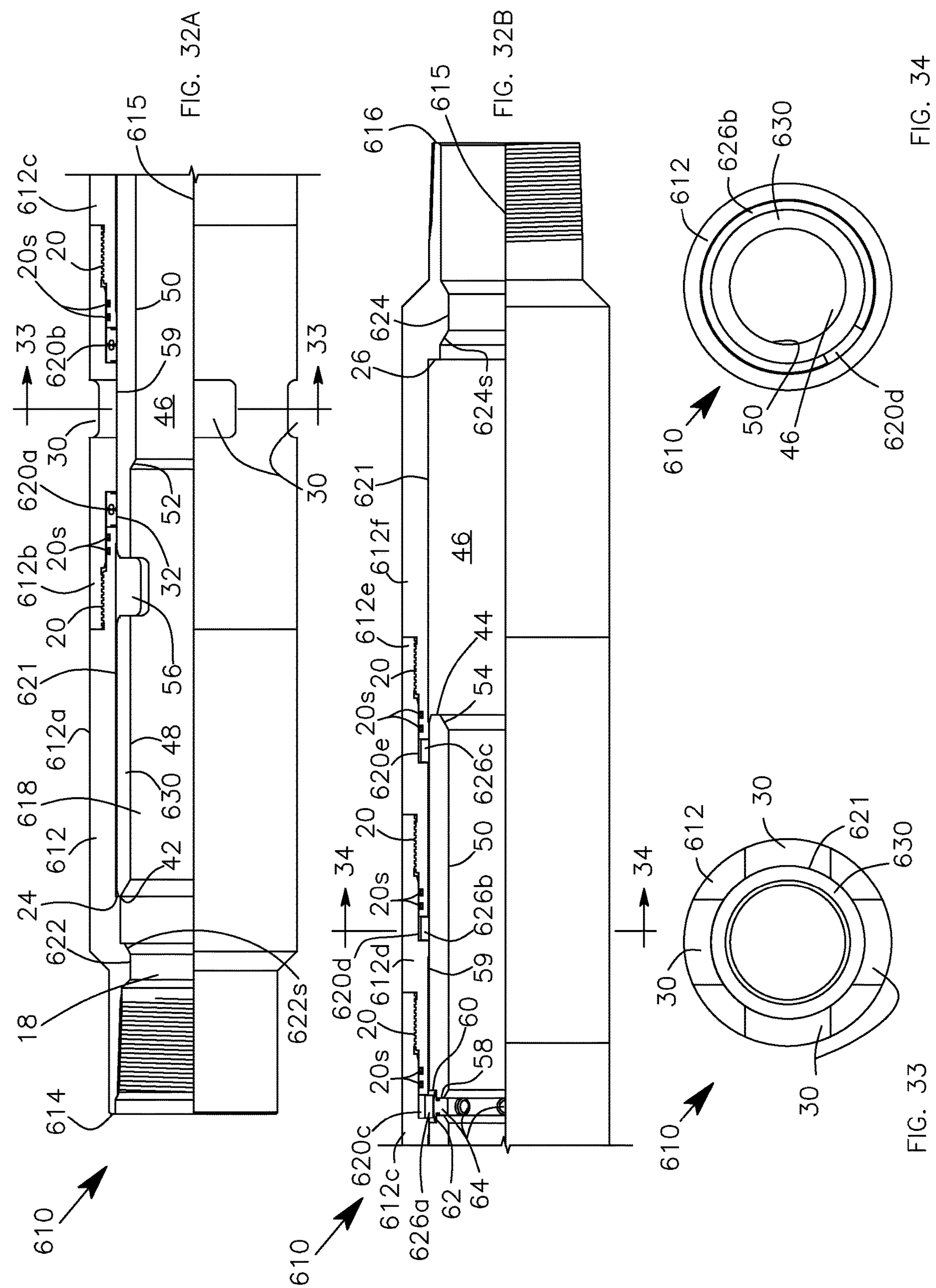
FIG. 32A is a section view of the uppermost end of an embodiment of a sliding sleeve valve, shown in an upper-closed position, in accordance with principles disclosed herein.
FIG. 32B is a section view of the lowermost end of the sliding sleeve valve shown in FIG. 32A.
FIG. 33 is a section view along lines 33-33 of the segment of the sliding sleeve valve shown in FIG. 32A.
FIG. 34 is a section view along lines 34-34 of the segment of the sliding sleeve valve shown in FIG. 32B.
Figure 32E:
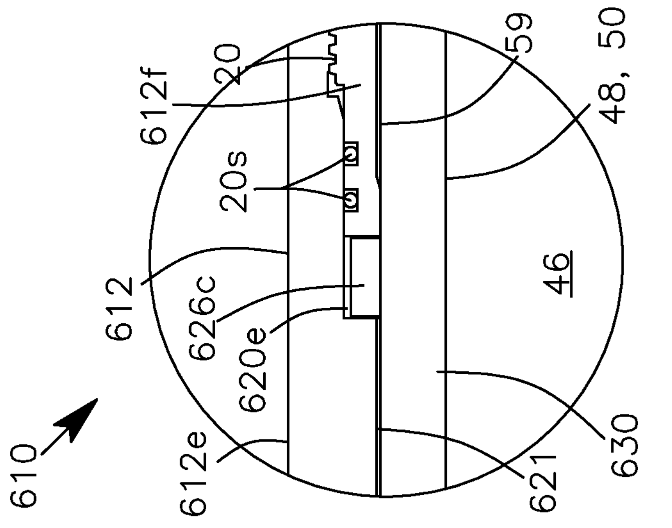
FIG. 32E is a zoomed-in view of an embodiment of a lower lock ring of the sliding sleeve valve shown in FIGS. 32A and 32B.
Figure 32D:
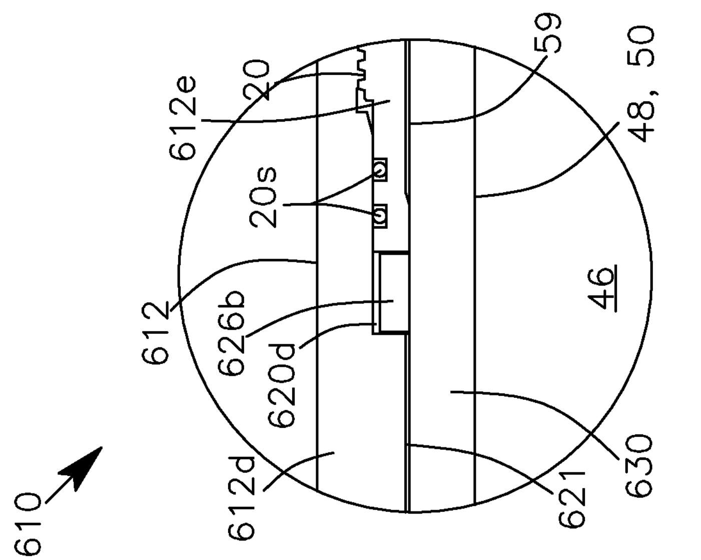
FIG. 32D is a zoomed-in view of an embodiment of a middle lock ring of the sliding sleeve valve shown in FIGS. 32A and 32B.
Figure 32C:
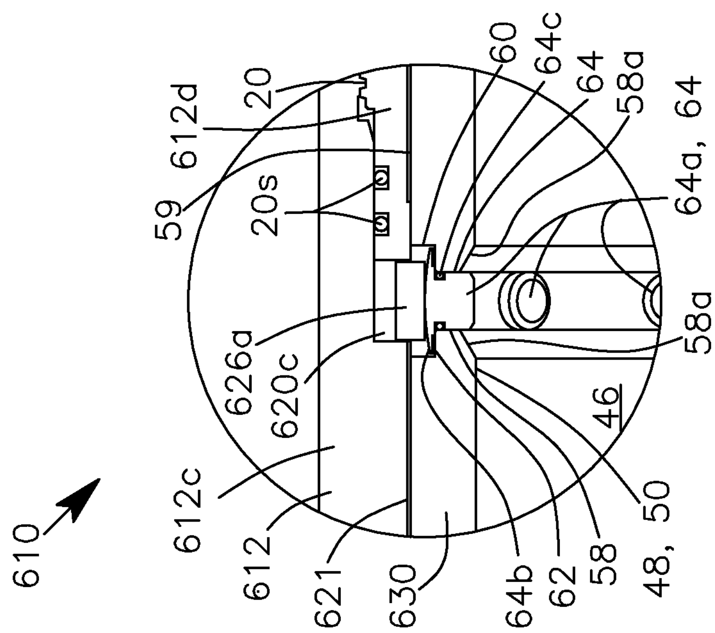
FIG. 32C is a zoomed-in view of an embodiment of an upper lock ring of the sliding sleeve valve shown in FIGS. 32A and 32B.
Figures 35A, 35B, 36, 37:
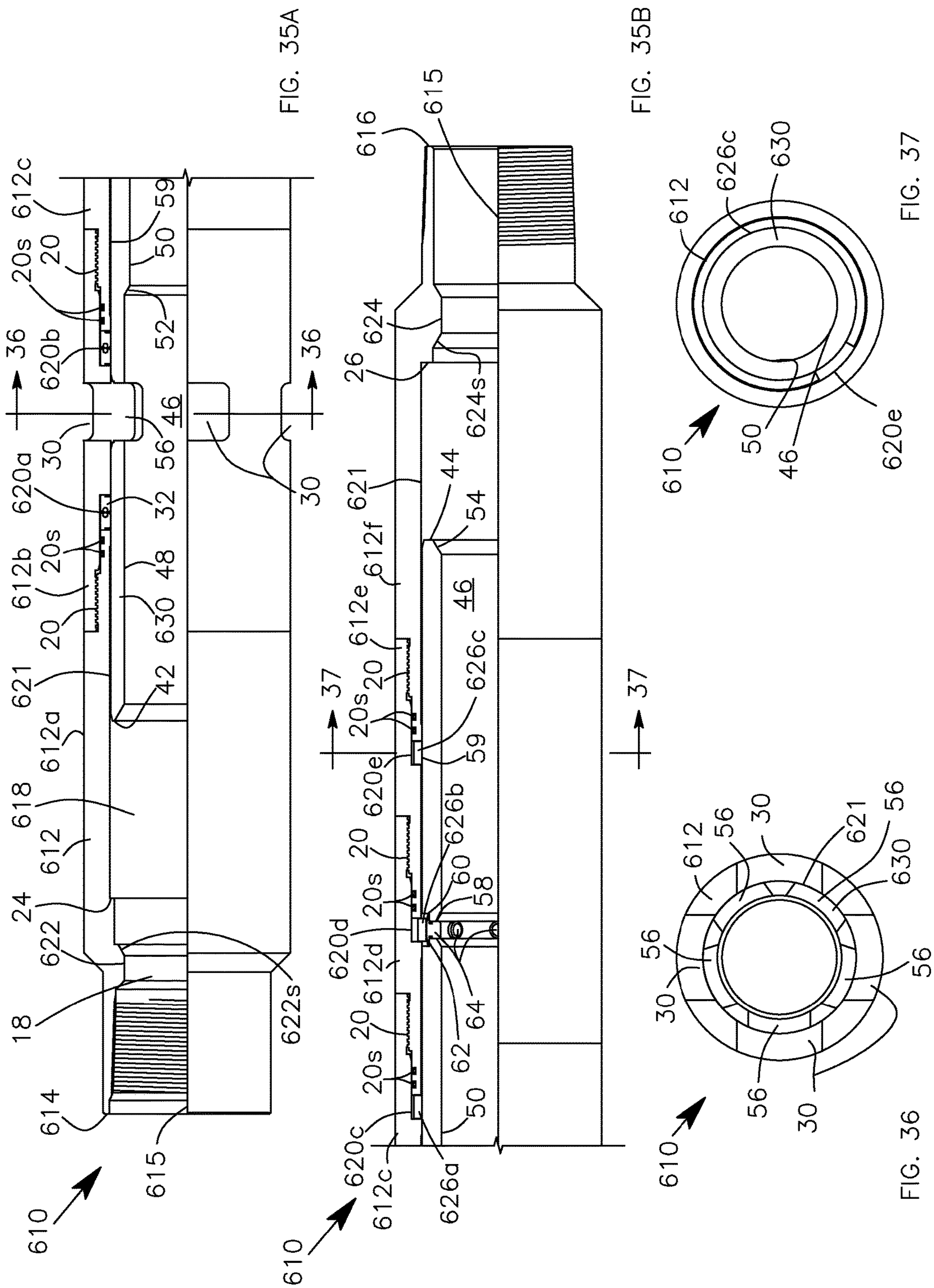
FIG. 35A is a section view of the uppermost end of the sliding sleeve valve shown in FIG. 32A, shown in an open position.
FIG. 35B is a section view of the lowermost end of the sliding sleeve valve shown in FIG. 32B, shown in an position.
FIG. 36 is a section view along lines 36-36 of the segment of the sliding sleeve valve shown in FIG. 32A.
FIG. 37 is a section view along lines 37-37 of the segment of the sliding sleeve valve shown in FIG. 32B.
Figure 35C:
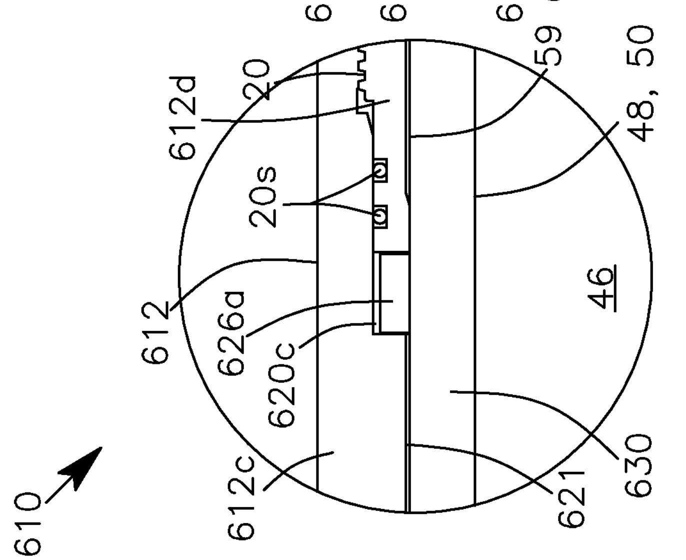
FIG. 35C is a zoomed-in view of an embodiment of an upper lock ring of the sliding sleeve valve shown in FIGS. 35A and 35B.
Figure 35D:
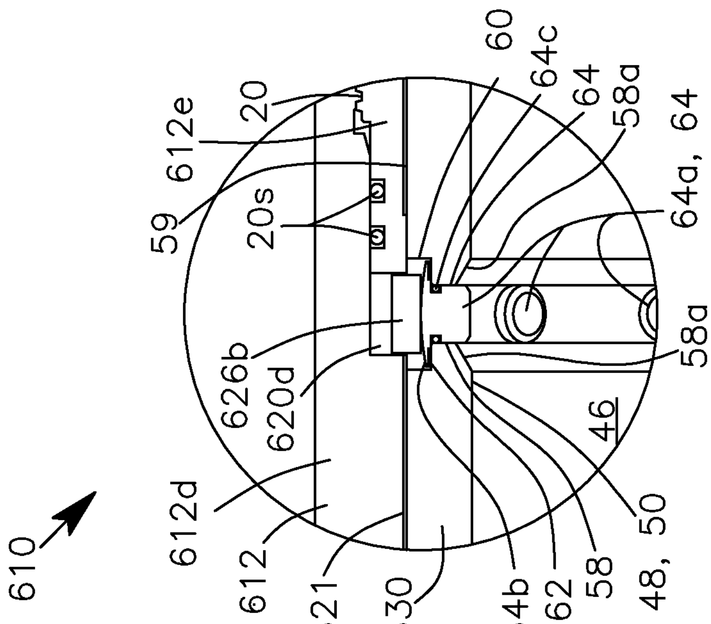
FIG. 35D is a zoomed-in view of an embodiment of a middle lock ring of the sliding sleeve valve shown in FIGS. 35A and 35B.
Figure 35E:
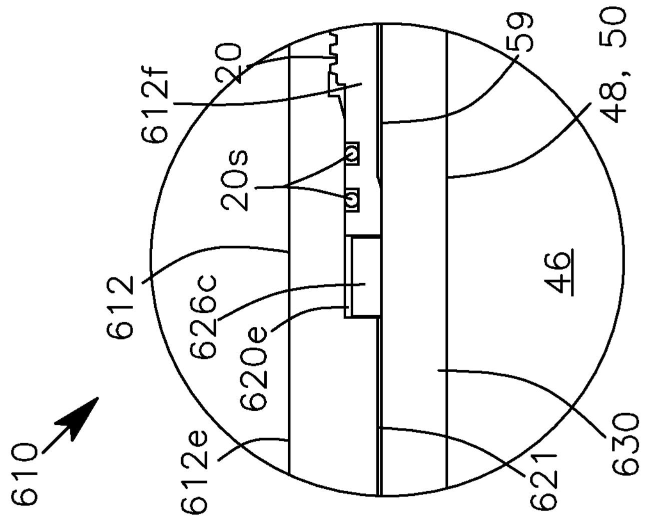
FIG. 35E is a zoomed-in view of an embodiment of a lower lock ring of the sliding sleeve valve shown in FIGS. 35A and 35B.

As three-position coiled tubing actuation tool 650 is displaced upwards through the bore 602*b* of well string 602 from the fourth position to the fifth position, the locking member 666 acts to stop or delimit the upward displacement of three-position coiled tubing actuation tool 650 and sliding sleeve 630 such that sliding sleeve 630 is not displaced further upwards, past the open position shown in FIGS. 35A and 35B to the upper-closed position shown in FIGS. 32A and 32B. Particularly, in the fifth position shown in FIGS.

50A and 50B the locking member 666, disposed in the lower-extended position, physically engages the upper landing surface 622s of the upper landing profile 622 of housing 612, restricting further upward displacement of three-position coiled tubing actuation tool 650 respective housing 612 of three-position sliding sleeve valve 610.

Figure 51A:
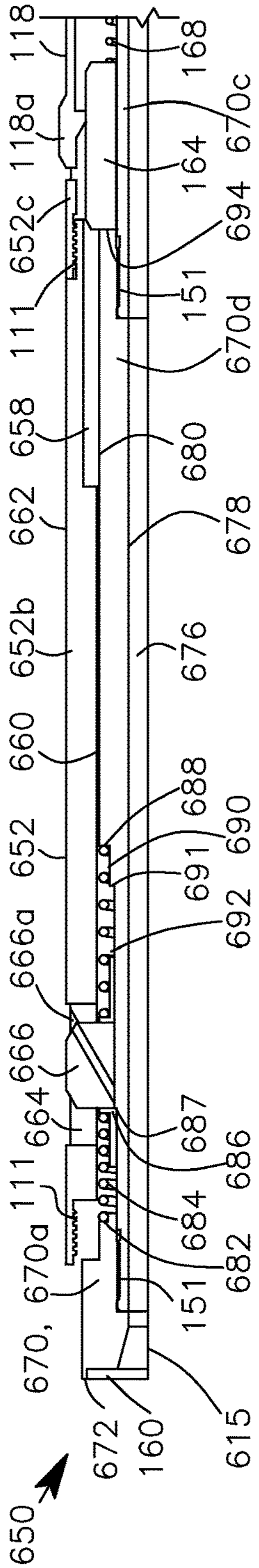
Figure 51B:
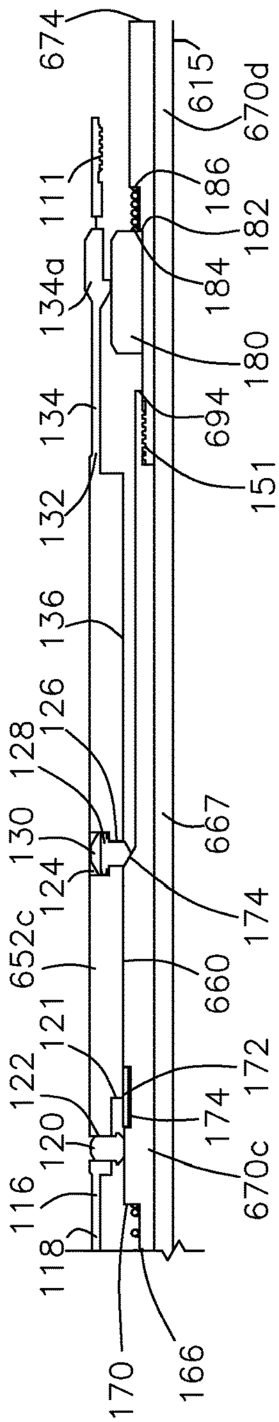
Figure 52A:
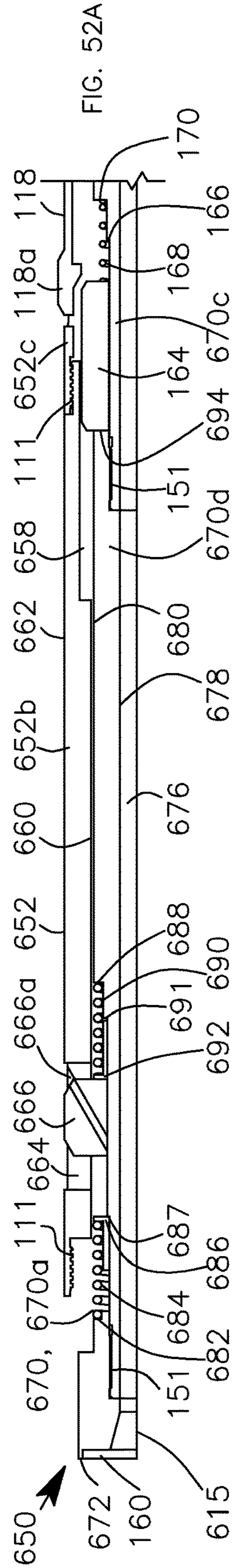
Figure 52B:
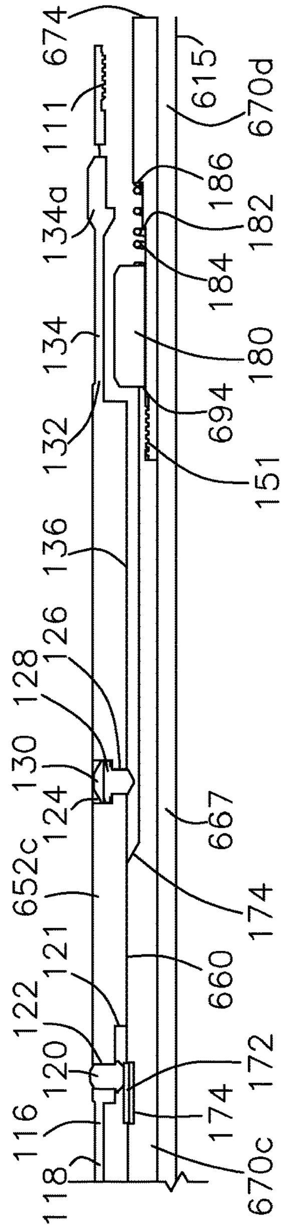

FIGS. 51A and 51B illustrate the three-position coiled tubing actuation tool 650 in a sixth position similar to the seventh position of coiled tubing actuation tool 100 described above and shown in FIG. 9L. Particularly, the sixth position of three-position coiled tubing actuation tool 650 follows the actuation of three-position sliding sleeve valve 610 from the lower-closed position to the open position, and is subsequent to the decrease of fluid flow through throughbore 676 below the threshold level, allowing biasing member 144 to maintain the upwards shifted position of piston 670 relative engagement housing 652. In this sixth position, three-position coiled tubing actuation tool 650 remains locked to sliding sleeve 630 via the upward force applied against three-position coiled tubing actuation tool 650 in the direction of the heel 3h of wellbore 3, and locking member 666 remains in physical engagement with upper landing profile 622 of housing 612. Further, in the sixth position the piston 670 is allowed to travel upwards a distance sufficient such that buttons 128 no longer engage the outer surface 680 of piston 670 and are thus disposed in the radially inwards position with c-ring 130 disposed in the radially contracted position within annular groove 124, thereby locking and restricting relative movement between sliding sleeve 630 and the housing 612 of the three-position sliding sleeve valve 610 of production zone 3e FIGS. 52A and 52B illustrate the three-position coiled tubing actuation tool 650 in a seventh position similar to the eighth position of coiled tubing actuation tool 100 described above and shown in FIG. 9M. Particularly, in the seventh position fluid flow through throughbore 676 is below the threshold level, and no force, either upwards in the direction of the heel 3h or downwards in the direction of the toe of wellbore 3, is applied to three-position coiled tubing actuation tool 650. As a result, three-position coiled tubing actuation tool 650, with engagement portions 118a of upper collet 116 disposed adjacent upper shoulder 52 and engagement portions 134a of lower collet 132 disposed adjacent lower shoulder 54 of sliding sleeve 630, may be displaced through sliding sleeve 630 in the direction of the toe of wellbore 3. In this manner, three-position coiled tubing actuation tool 650 may be displaced into and actuate the three-position sliding sleeve valve 610 of production zone 3f, and so forth, until each three-position sliding sleeve valve 610 of well string 602 has been actuated into the open position.

Prior to hydraulically fracturing the formation 6 using three-position obturating tool 700, each three-position sliding sleeve vale 610 of well string 602 is actuated from the open position shown in FIGS. 35A and 35B to the upper-closed position 32A and 32B to prevent fracturing and formation fluids from flowing back into the bore 602b of well string 602, which could interfere with the operation of well string 602. Thus, prior to displacing three-position obturating tool 700 into the bore 602 of well string 602, three-position coiled tubing actuation tool 650 may be used to actuate each three-position sliding sleeve valve 610 of well string 602 into the upper-closed position. Particularly, three-position coiled tubing actuation tool 650 may be removed from the wellbore 3, allowing personnel of well system 600 to remove the locking member 666 from three-position coiled tubing actuation tool 650. With locking member 666 removed, three-position coiled tubing actuation tool 650 is configured to actuate each three-position sliding sleeve valve 610 from the open position to the upper-closed position.

Specifically, three-position actuation tool 650 can be actuated in the manner shown and described with respect to FIGS. 48A-52B to actuate each three-position sliding sleeve valve 610 from the open position to the upper-closed position. With locking member 666 removed from three-position coiled tubing actuation tool 650, three-position coiled tubing actuation tool 650 is no longer restricted from being displaced upwards through housing 612 when three-position coiled tubing actuation tool 650 has locked to sliding sleeve 630 due to engagement between locking member 666 and the upper landing profile 622 of housing 612. Instead, three-position coiled tubing actuation tool 650 may be displaced through or within the upper landing profile 622 when three-position coiled tubing actuation tool 650 actuates from the fifth position shown in FIGS. 50A and 50B to the sixth position shown in FIGS. 51A and 51B.

Referring collectively to FIGS. 53A-65, an embodiment of a three-position obturating tool 700 is illustrated along with a schematic illustration of the sliding sleeve 630 of three-position sliding sleeve valve 630 for additional clarity. Three-position obturating tool 700 is configured to selectably actuate three-position sliding sleeve valve 610 between the upper-closed position shown in FIGS. 32A and 32B, the open position shown in FIGS. 35A and 35B, and the lower-closed position shown in FIGS. 35A and 35B. Similar to obturating tool 200 described above, the three-position obturating tool 700 may be disposed in the bore 602b of well string 602 at the surface of wellbore 3 and pumped downwards through wellbore 3 towards the heel 3h of wellbore 3, where the three-position obturating tool 700 may selectively actuate one or more three-position sliding sleeve valves 610 moving from the heel 3h of wellbore 3 to the toe of wellbore 3. In this manner, three-position obturating tool 700 may be used in conjunction with three-position coiled tubing actuation tool 650 in hydraulically fracturing a formation from a wellbore, including a wellbore having one or more horizontal or deviated sections.

As described above, three-position coiled tubing actuation tool 650 may be used to prepare well string 602 for a hydraulic fracturing operation using a hydraulic fracturing tool, such as three-position obturating tool 700. Specifically, three-position coiled tubing actuation tool 650 may be used first to clean well string 602, and actuate each three-position sliding sleeve valve 610 into the upper-closed position, as described above. Following this, three-position coiled tubing actuation tool 650 may be removed from well string 602, and three-position obturating tool 200 may be inserted therein, where three-position obturating tool 700 may proceed in hydraulically fracturing each isolated production zone via three-position sliding sleeve valves 610, moving downwards through well string 602 until it reaches a terminal end thereof.

Three-position obturating tool 700 shares many structural and functional features with obturating tool 200 described above and illustrated in FIGS. 13A-26, and shared features have been numbered similarly. In this embodiment, three-position obturating tool 700 is disposed coaxially with longitudinal axis 615 and includes a generally tubular housing 702 and a core 720 disposed therein. Housing 702 includes a first or upper end 704, a second or lower end 706, and a throughbore 708 extending between upper end 704 and lower end 706, where throughbore 708 is defined by a generally cylindrical inner surface 710. Housing 702 also includes a generally cylindrical outer surface 712 extending between upper end 704 and lower end 706. Housing 702 is made up of a series of segments including a first or upper segment 702*a*, intermediate segments 702*b* and 702*c*, and a lower segment 702*d*, where segments 702*a*-702*d* are releasably coupled together via threaded couplers 211.

Housing 702 of three-position obturating tool 700 is similar to housing 202 of obturating tool 200, with an exception that intermediate segment 702*c* of housing 702 includes a plurality of circumferentially spaced arcuate slots 714 for housing a plurality of radially translatable landing keys or engagement members 716 disposed therein. As will be discussed further herein, each landing key 716 has an outer surface for selectably landing against or physically engaging the lower landing surface 624*s* of the lower landing profile 624 of housing 612 during actuation of three-position sliding sleeve valve 610 via three-position obturating tool 700. While in the embodiment shown in FIG. 53B landing keys 716 are shown as being radially translatable members, in other embodiments, landing keys 716 may comprise a collet, dogs, or other mechanisms known in the art configured to selectably land or abut against a shoulder of a tubular member.

Core 720 of three-position obturating tool 700 is disposed coaxially with longitudinal axis 615 and includes an upper end 722 that forms a fishing neck for retrieving three-position obturating tool 700 when it is disposed in a wellbore, a lower end 724 that is engaged by an upper end of pintle 250, and a generally cylindrical outer surface 726. Core 720 of three-position obturating tool 700 is similar to core 270 of obturating tool 200, with an exception that instead of including circumferentially spaced lugs 296 for engaging buttons 234, the outer surface 726 of core 720 includes an intermediate increased diameter section or cam surface 728 forming an upper shoulder 730 facing upper end 722 and a lower shoulder 732 facing lower end 724. Intermediate increased diameter section 728 is located axially along core 720 in the same position as lugs 296, but unlike lugs 296, intermediate increased diameter section 728 has a uniformly circular cross-section.

In this embodiment, the outer surface 726 of core 720 also includes a lower increased diameter section or cam surface 734 forming an upper shoulder 736 facing upper end 722 and a lower shoulder 738 facing lower end 724. Lower increased diameter section 734 is disposed axially along core 720 between third increased diameter section 298 and pin 304. As will be discussed further herein, lower increased diameter section 734 of outer surface 726 is configured to selectably engage landing keys 716 to displace landing keys 716 between a radially inwards position (shown in FIG. 53B), and a radially outwards position (shown in FIG. 53H, for example). In the radially inwards position the outer surface of each landing key 716 is relatively flush with, or at least does not substantially project from, the outer surface 712 of housing 702, and in the radially outwards position the outer surface of each landing key 716 projects from the outer surface 712 of housing 702. Thus, in the radially outwards position landing keys 716 are configured to engage or land against lower landing profile 624 of housing 612.

Referring to FIGS. 31A-31C and 53A-53L, as with core 270 of obturating tool 200 discussed above, core 720 of three-position obturating tool 700 may occupy particular axial positions respective housing 702 as indexer 310 is displaced axially and rotationally within housing 702. For instance, core 720 may occupy: an upper-first position 740 shown in FIG. 53G that is similar to the upper-first position 318 of core 270 shown in FIG. 13F, a pressure-up second position 742 shown in FIG. 53H that is similar to the pressure-up second position 320 of core 270 shown in FIG. 13G, a bleed-back third position 744 shown in FIGS. 53I and 53K that is similar to the bleed-back third position 322 of core 270 shown in FIGS. 13H and 13J, a fourth position 746 shown in FIG. 53J that is similar to the fourth position 324 of core 270 shown in FIG. 13I, and an unlocked fifth position 748 shown in FIG. 53L that is similar to the unlocked fifth position 326 of core 270 shown in FIG. 13K.

As discussed above, when three-position obturating tool 700 is initially pumped down through bore 602*b* of well string 602, each three-position sliding sleeve valve 610 of well string 602 is disposed in the upper-closed position. In an embodiment, three-position obturating tool 700 may be pumped down the bore 602*b* of well string 602 in the upper-first position 740 (shown in FIG. 53G) until the three-position obturating tool 700 lands within the throughbore 46 of the three-position sliding sleeve valve 610 of production zone 3*e* of wellbore 3. Particularly, as three-position obturating tool 700 enters throughbore 618 of three-position sliding sleeve valve 610, an annular outer shoulder of each upper key 218 lands against upper shoulder 52 of sliding sleeve 630 of the three-position sliding sleeve valve 610 of production zone 3*e*, arresting the downward movement of three-position obturating tool 700 through well string 602. In this position, landing keys 716 are disposed in the radially inwards position proximal the lower shoulder 738 of lower increased diameter section 734.

After landing against sliding sleeve 630, a pressure differential across three-position obturating tool 700, provided by annular seals 228 of housing 702 and o-ring seal 294 of core 720, may be used to control the actuation of core 720 between positions 740, 742, 744, 746, and 748 discussed above. Particularly, the fluid pressure in well string 602 above three-position obturating tool 700 may be increased to provide a sufficient pressure force against the upper end 722 of core 720 to shift core 720 downwards into the pressure-up second position 742 shown in FIG. 53H. In the pressure-up second position 722 upper keys 218 are in the radially outwards position engaging upper shoulder 52 of sliding sleeve 630 and lower keys 240 are also in the radially outwards position engaging lower shoulder 54, thereby locking three-position obturating tool 700 to the sliding sleeve 630. Also, in the pressure-up second position 742 landing keys 716 are each in the radially outwards position with an inner surface of each landing key 716 engaging the lower increased diameter section 734 of outer surface 726.

In the pressure-up second position 722 shown in FIG. 53H, buttons 234 and c-ring 236 are each disposed in the radially outwards position engaging buttons 64 of sliding sleeve 630, thereby unlocking sliding sleeve 630 from the housing 612 of the three-position sliding sleeve valve 610 of production zone 3*e*. With sliding sleeve 630 unlocked from housing 612, the fluid pressure acting against the upper end of three-position obturating tool 700 causes sliding sleeve 630 to shift axially downwards until the outer surface of landing keys 716 lands against the lower landing surface 624*s* of the lower landing profile 624 of housing 612, thereby arresting the downwards movement of sliding sleeve 630 and the three-position obturating tool 700. Further, when landing keys 716 have landed against lower landing profile 624 of housing 612, sliding sleeve 630 is positioned such that three-position sliding sleeve valve 610 is disposed in the open position shown in FIGS. 35A and 35B. Thus, landing keys 716 are configured to position sliding sleeve 630 such that three-position sliding sleeve valve 610 is disposed in the open position when landing keys 716 engage lower landing profile 624 of housing 612.

Once landing keys 716 of three-position obturating tool 700 land against the lower landing profile 624 of housing 612, fracturing fluid may be pumped through bore 602*b* of well string 602, and through ports 30 of three-position sliding sleeve valve 610 to form fractures 6*f* in the formation 6 at production zone 3*e*, as shown in FIG. 31B. In this manner, enhanced fluid communication may be provided between the formation 6 and the production zone 3*e* of wellbore 3. As with obturating tool 200, the fracturing fluid pumped through bore 602*b* of well string 602 is restricted from flowing past the three-position obturating tool 700 and further down well string 602 due to the sealing engagement provided by annular seals 228 of housing 702 and o-ring seal 294 of core 720. In this arrangement, the entire fluid flow of fracturing fluid from the surface is directed through ports 30 and against the inner surface 3*s* of the wellbore 3.

Once fractures 6*f* in the formation 6 have been sufficiently formed at production zone 3*e*, the core 720 may be shifted from the pressure-up second position 742 shown in FIG. 53H to the bleed-back third position 744 shown in FIG. 53I. Specifically, the fluid flow rate through bore 602*b* of well string 602 may be reduced to decrease the pressure acting on the upper end 722 of core 720 below the threshold level such that biasing member 258 may shift core 720 upwards respective housing 702 and into the bleed-back third position 744. Bleed-back third position 744 of core 720 is similar to the bleed-back third position 322 of core 270 discussed above, with upper keys 218 disposed in the radially outwards position supported on increased diameter section 278 of outer surface 726 and in engagement with upper shoulder 52 of three-position sliding sleeve 630, and with lower keys 240 disposed on the third increased diameter section 298 of outer surface 726 and in engagement with lower shoulder 54 of three-position sliding sleeve 630. Also, buttons 234 and c-ring 236 are each disposed in the radially inwards position, thereby locking sliding sleeve 630 to housing 612 and locking three-position sliding sleeve valve 610 in the open-position. Further, landing keys 716 remain in the radially outwards position landed against lower landing profile 624 of housing 612.

Core 720 may be shifted from the bleed-back third position 744 shown in FIG. 53I to the fourth position shown 746 in FIG. 53J by increasing the fluid flow through bore 602*b* of well string 602, thereby increasing the fluid pressure acting against upper end 722 of core 720 to a sufficient threshold level such that core 720 is shifted downwards respective housing 702, compressing biasing member 258. Similar to the fourth position 324 of core 270 shown in FIG. 13I, in the fourth position 746 upper keys 218 remain supported on first increased diameter section 278 and in engagement with upper shoulder 52 of sliding sleeve 630, and lower keys 240 remain supported on third increased diameter section 298 and in engagement with lower shoulder 54 of sliding sleeve 630.

Figures 38A, 38B, 39, 40:
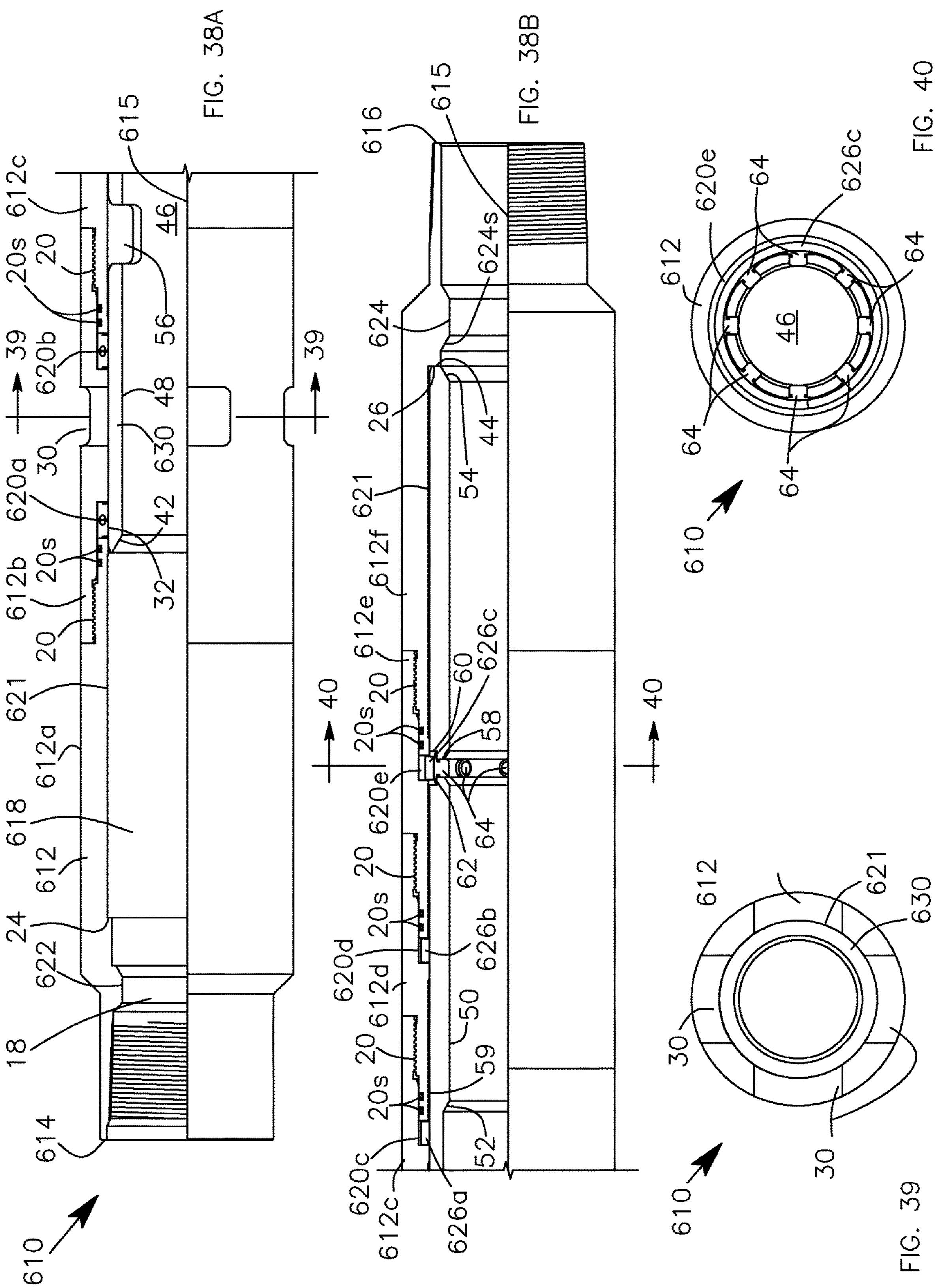
FIG. 38A is a section view of the uppermost end of the sliding sleeve valve shown in FIG. 32A, shown in a lower-closed position.
FIG. 38B is a section view of the lowermost end of the sliding sleeve valve shown in FIG. 32B, shown in a lower-closed position.
FIG. 39 is a section view along lines 39-39 of the segment of the sliding sleeve valve shown in FIG. 32A.
FIG. 40 is a section view along lines 40-40 of the segment of the sliding sleeve valve shown in FIG. 32B.
Figure 38E:
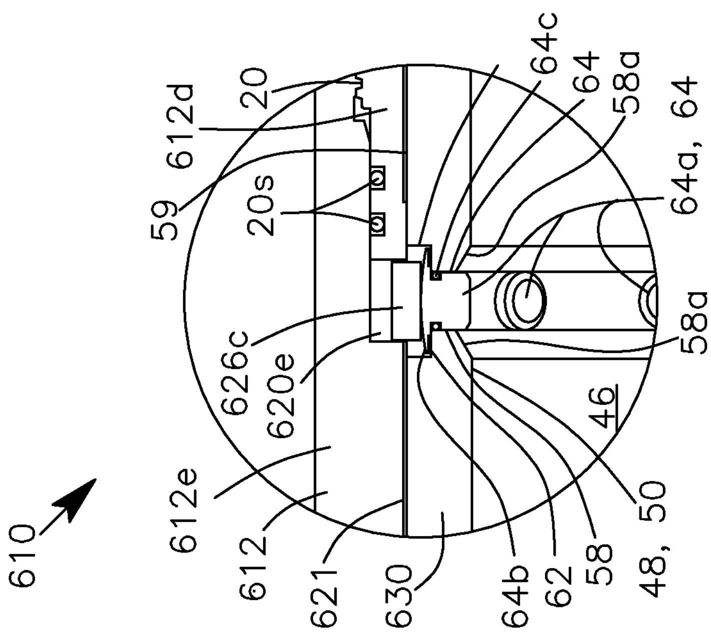
FIG. 38E is a zoomed-in view of an embodiment of a lower lock ring of the sliding sleeve valve shown in FIGS. 38A and 38B.
Figure 38D:
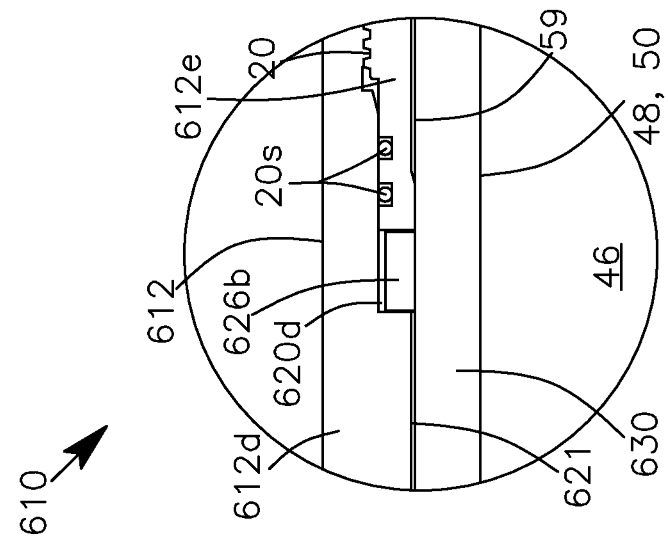
FIG. 38D is a zoomed-in view of an embodiment of a middle lock ring of the sliding sleeve valve shown in FIGS. 38A and 38B.
Figure 38C:
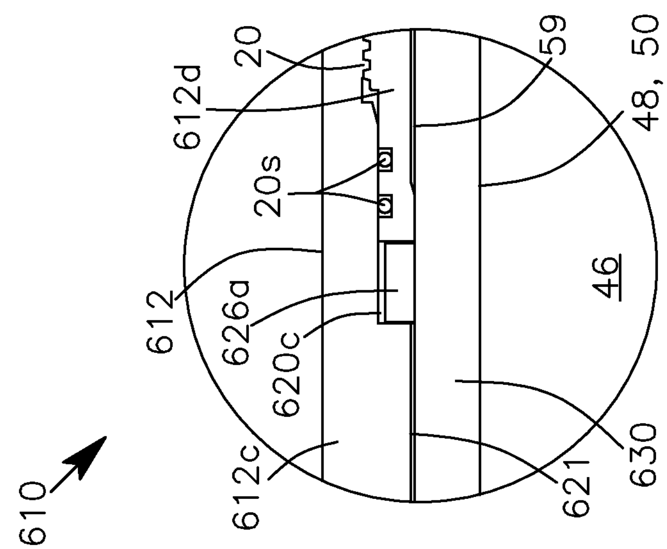
FIG. 38C is a zoomed-in view of an embodiment of an upper lock ring of the sliding sleeve valve shown in FIGS. 38A and 38B.
Figures 41A, 41B, 41C:
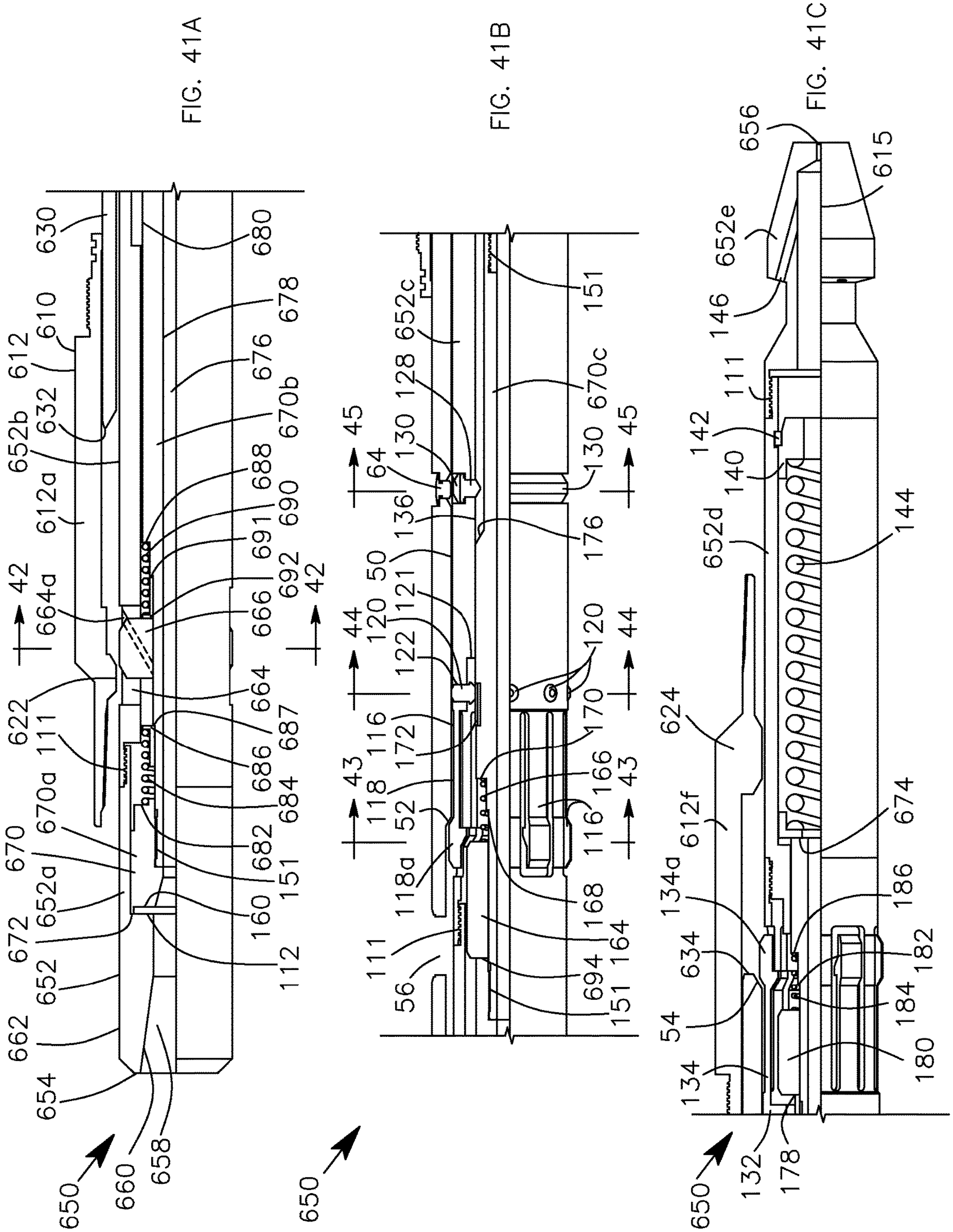
FIG. 41A is a section view of the uppermost end of an embodiment of a coiled tubing actuation tool for actuating the sliding sleeve valve shown in FIGS. 32A-40 in accordance with principles disclosed herein.
FIG. 41B is a section view of a middle section of the coiled tubing actuation tool shown in FIG. 41A.
FIG. 41C is a section view of a lowermost end of the coiled tubing actuation tool shown in FIG. 41A.
Figure 41D:
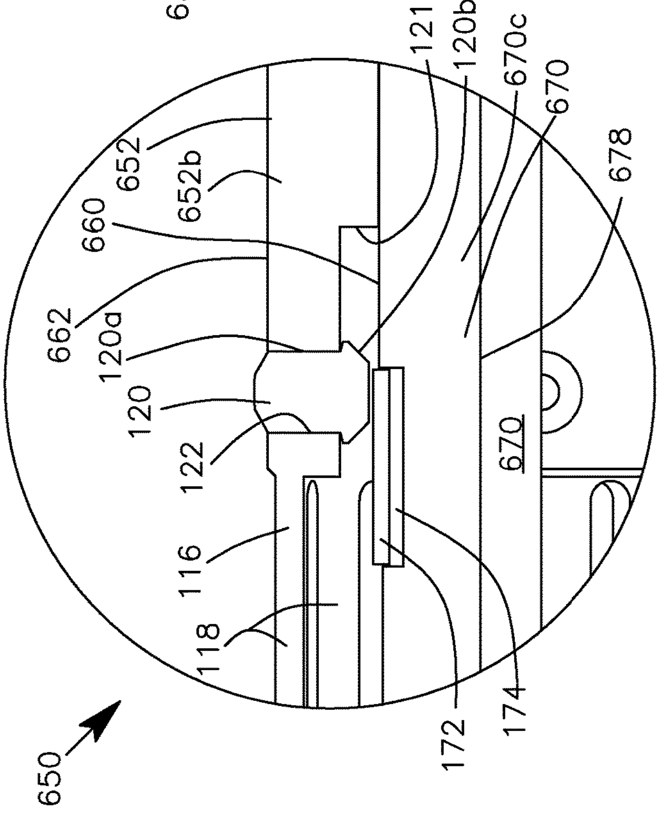
FIG. 41D is a zoomed-in view of an embodiment of a bore sensor of the coiled tubing actuation tool shown in FIGS. 41A-41C.
Figure 41E:
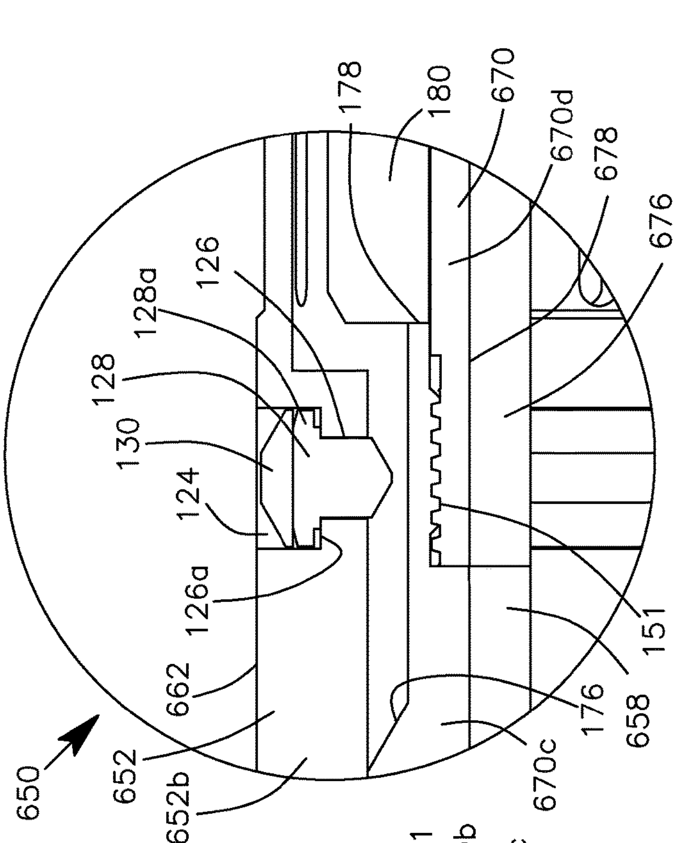
FIG. 41E is a zoomed-in view of an embodiment of a lock ring of the coiled tubing actuation tool shown in FIGS. 41A-41C.

Unlike the fourth position 324 of core 270 discussed above, in the fourth position 746 core 720 is configured to actuate sliding sleeve 630 downwards until the lower end 44 of sliding sleeve 630 engages lower shoulder 26 of the inner surface 621 of housing 612, positioning three-position sliding sleeve valve 610 in the lower-closed position shown in FIGS. 38A and 38B. Particularly, in the fourth position 746 the buttons 234 and c-ring 236 are disposed in the radially outwards position unlocking sliding sleeve 630 from housing 612. Also, in the fourth position 746 landing keys 716 are disposed in the radially inwards position proximal upper shoulder 736 of lower increased diameter section 734, disengaging landing keys 716 from the lower landing profile 624 of housing 612. With buttons 234, c-ring 236, and landing keys 716 each disposed in their respective radially inwards position, the fluid pressure acting against the upper end 722 of core 720 shifts core 720 and sliding sleeve 630 downwards until three-position sliding sleeve 610 is disposed in the lower-closed position.

Once three-position sliding sleeve valve 610 of production zone 3*e* has been shifted from the open position to the lower-closed position as described above, the three-position sliding sleeve valve 610 may be locked into the lower-closed position by shifting core 720 from the fourth position 746 back into the bleed-back third position 744. Particularly, similar to the shifting of core 720 from the fourth position 324 shown in FIG. 13I to the bleed-back third position 322 shown in FIG. 13J described above, core 720 may be shifted from the fourth position 746 shown in FIG. 53J to the bleed-back third position 744 shown in FIG. 53K by reducing the fluid pressure within bore 602*b* of well string 602 (e.g., by ceasing pumping at the surface of well system 600) above three-position obturating tool 700 to allow biasing member 258 to shift core 720 upwards until core 720 occupies the bleed-back third position 744. With core 720 now disposed in the bleed-back third position 744, buttons 234 and c-ring 236 are disposed in the radially inwards position, thereby locking sliding sleeve 630 to housing 612, and in turn, locking three-position sliding sleeve valve 610 of production zone 3*e* in the lower-closed position.

With three-position sliding sleeve sliding sleeve valve 610 locked in the lower-closed position, core 720 may be shifted from the bleed-back third position 744 shown in FIG. 53K to the unlocked fifth position 748 shown in FIG. 53L to thereby allow three-position obturating tool 700 to be pumped downwards through bore 602*b* of well string 602 until three-position obturating tool 700 lands within the three-position sliding sleeve valve 610 of production zone 3*f*. Particularly, the fluid pressure acting against the upper end 722 of core 720 may be sufficiently increased to the threshold level to compress biasing member 258 and shift core 720 downwards within housing 702 until core 720 is disposed in the unlocked fifth position 748.

Unlocked fifth position 748 of core 748 is similar to the unlocked fifth position 326 of core 270 shown in FIG. 13K, with upper keys 218 disposed in the radially inwards position adjacent upper shoulder 280, and lower keys 240 disposed in the radially inwards position adjacent third upper shoulder 300. Landing keys 716 are also each in the radially inwards position, allowing landing keys 716 to pass through lower landing profile 624 of housing 612. With upper keys 218, lower keys 240, and landing keys 716 each in the radially inwards position, three-position obturating tool 700 is unlocked from sliding sleeve 630 of the three-position sliding sleeve valve 610 of production zone 3*e*. Thus, the fluid pressure acting on the upper end of three-position obturating tool 700 axially displaces three-position obturating tool 700 through the actuated three-position sliding sleeve valve 610 of production zone 3*e* towards the three-position sliding sleeve valve 610 of production zone 3*f*, where the process described above may be repeated to hydraulically fracture the formation 6 at production zone 3*f*, as shown in FIG. 31C. Fracturing and formation fluids are restricted from flowing into three-position sliding sleeve valve 610 of production zone 3*f* with the three-position sliding sleeve valve 610 of production zone 3*f* disposed in the upper-closed position while production zone 3*e* is hydraulically fractured. Once three-position obturating tool

700 has actuated each sliding three-position sleeve valve 610 of well string 602, and is disposed near the toe of wellbore 3, the three-position obturating tool 700 may be retrieved and displaced upwards through the bore 602*b* of well string 602 to the surface via the fishing neck at the upper end 722 of core 720.

Referring collectively to FIGS. 66A-68E, an embodiment of a three-position perforating valve or orienting sub 750 is illustrated. Three-position perforating valve 750 is generally configured to provide selectable fluid communication to a desired portion of a wellbore (e.g., wellbore 7 shown in FIGS. 27A-27C), and a plurality of three-position perforating valves 750 may be incorporated into a casing string cemented into place in a cased wellbore. In this arrangement, each three-position perforating sleeve valve 750 is configured to provide selectable fluid communication at a particular location of the formation 6, thereby allowing the chosen production zone to be hydraulically fractured. For instance, three-position perforating valves 750 may be incorporated into the well string 11 of well system 2 in lieu of perforating valves 400. As with perforating valve 400 discussed above, three-position perforating valve 750 is configured to provide selectable fluid communication via perforation from a perforating tool (e.g., perforating gun 508 of perforating tool 500) disposed therein.

Three-position perforating valve 750 shares many structural and functional features with perforating valve 400 described above and illustrated in FIGS. 28A-29D, and three-position sliding sleeve valve 610 described above and illustrated in FIGS. 32A-38E, and shared features have been numbered similarly. In this embodiment, three-position perforating valve 750 has a central or longitudinal axis 755 and includes a generally tubular housing 752 having a sliding sleeve 770 and a stationary sleeve 780 disposed therein. Housing 752 includes a first or upper end 756, a second or lower end 758, and a throughbore 760 extending between upper end 756 and lower 758, where throughbore 760 is defined by a generally cylindrical inner surface 762. Housing also includes a generally cylindrical outer surface 764 extending between upper end 756 and lower end 758. Housing 752 is made up of a series of segments including an upper segment 752*a*, intermediate segments 752*b*-752*e*, and a lower segment 752*f*, where segments 752*a*-752*f* are releasably coupled together via threaded couplers 412. Also, an annular groove 754*a*-754*e* is disposed between each pair of segments 752*a*-752*f* of housing 702. In this arrangement, an annular seal 422 is disposed in annular grooves 754*a* and 754*b*, upper c-ring 626*a* is disposed in annular groove 754*c*, intermediate c-ring 626*b* is disposed in annular groove 754*d*, and lower c-ring 626*c* is disposed in annular groove 754*e*. Further, housing 752 includes upper landing profile 622 disposed proximal upper end 756 and an annular lower shoulder 766 disposed proximal lower end 758.

Sliding sleeve 770 is similar in configuration to sliding sleeve 440 discussed above and includes lower helical engagement surfacehelical engagement surface 470 at lower end 444. Stationary sleeve 780 is disposed coaxially with longitudinal axis 755 and has a first or upper end 782, and a second or lower end 784 engaging (or disposed directly adjacent) lower shoulder 766 of housing 752. Stationary sleeve 780 also includes a throughbore 786 extending between upper end 782 and lower end 784, and defined by a generally cylindrical inner surface 788. As with stationary sleeve 480 described above, stationary sleeve 780 is affixed to housing 752, and thus, does not move relative to housing 752. Also, stationary sleeve 780 includes helical engagement surfacehelical engagement surface 488 at upper end 782 and a lower landing profile 790 including an engagement surface 790*s* at lower end 784. Lower landing profile 790 of stationary sleeve 780 is similar in configuration and function to lower landing profile 624 of three-position sliding sleeve valve 610 described above.

As with three-position sliding sleeve valve 610 described above, three-position perforating valve 750 includes a first or upper-closed position (shown in FIGS. 66A-66E, a second or open position (shown in FIGS. 67A-67E), and a third or lower-closed position (shown in FIGS. 68A-68E). In the upper-closed position, a gap 792 extends between the lower helical engagement surfacehelical engagement surface 470 of sliding sleeve 770 and the helical engagement surface 480 of stationary sleeve 780, and a gap 794 extends between the lower helical engagement surface 470 and helical engagement surface 488 when three-position perforating valve 750 is in the open position, where gap 792 is greater than gap 794. Unlike three-position sliding sleeve valve 610, fluid communication between wellbore 7 and throughbore 446 of sliding sleeve 770 is not permitted when three-position perforating valve 750 is in the open position until thin-walled groove 420 is perforated with a perforating tool, such as perforating tool 500 described above. Indeed, perforating tool 500 may be used to selectably perforate thin-walled groove 420 of three-position perforating valve 750 in the same manner as the perforation of thin-walled groove 420 of perforating valve 400.

In an embodiment, following the perforating of thin walled sections 420 of each three-position perforating valve 750 of the well string via a perforating tool, each three-position perforating valve 750 is prepared for a hydraulic fracturing operation of the formation by shifting each three-position perforating valve 750 into the upper-closed position shown in FIGS. 66A-66E. The shifting of each three-position perforating valve 750 into the upper-closed position can be accomplished with three-position coiled tubing actuation tool 650 described above. Particularly, three-position perforating valves 750 may be shifted into the upper-closed position by three-position coiled tubing actuation tool 650 in a manner similar to the shifting of each three-position sliding sleeve valve 610 into the upper-closed position. In an embodiment, once each three-position perforating valve 750 is disposed in the upper-closed position, three-position obturating tool 700 is used to hydraulically fracture the formation at each production zone of the wellbore (e.g., wellbore 7), moving from the heel of the wellbore to the toe of the wellbore.

In this manner, three-position obturating tool 700 actuates each successive three-position perforating valve 750 from the upper-closed to the open position to fracture the formation at the particular production zone, and subsequently shifts the three-position perforating valve 750 to the lower-closed position, in a manner similar to the actuation of three-position sliding sleeve valves 610 via three-position obturating tool 700 described above. In this arrangement, the formation may be hydraulically fractured at each successive production zone moving towards the toe of the wellbore while fluid from the formation is restricted from flowing into the bore (e.g., bore 11*b*) of the well string (e.g., well string 11) with each three-position perforating valve 750 disposed in either the lower-closed or upper-closed positions.

Referring to FIGS. 69A-83B, an embodiment of a continuous flow, flow transported obturating tool 800 is shown. Continuous flow obturating tool 800 is configured to selectably actuate three-position sliding sleeve valve 610 between the upper-closed position shown in FIGS. 32A and 32B, the open position shown in FIGS. 35A and 35B, and the lower-closed position shown in FIGS. 35A and 35B. As with the three-position obturating tool 700 described above, the continuous flow obturating tool 800 can be disposed in the bore 602*b* of well string 602 at the surface of wellbore 3 and pumped downwards through wellbore 3 towards the heel 3*h* of wellbore 3, where continuous flow obturating tool 800 can selectively actuate one or more three-position sliding sleeve valves 610 moving from the heel 3*h* of wellbore 3 to the toe of wellbore 3. In this manner, continuous flow obturating tool 800 can be used in conjunction with three-position coiled tubing actuation tool 650 in hydraulically fracturing a formation from a wellbore, including a wellbore having one or more horizontal or deviated sections. In this embodiment, well system 600 utilizes continuous flow obturating tool 800 in lieu of three-position obturating tool 700.

As described above, in order to actuate a three-position sliding sleeve valve 610 from the open position to the lower-closed position, core 720 of three-position obturating tool 700 must be shifted to the bleed-back third position 744 via decreasing the fluid pressure acting on the upper end 722 of core 720. To sufficiently decrease the fluid pressure acting on the upper end 722 of core 720 to shift the three-position obturating tool 700 to the bleed-back third position 744, it may be necessary to cease pumping of fluid into the bore 602*b* of well string 602 at the surface of well system 600. In other words, the pumps at the surface (not shown) of well system 600 may need to be stopped or shut down to sufficiently decrease the fluid pressure acting against upper end 722 of core 720. Moreover, ceasing pumping into bore 602*b* of well string 602 to actuate three-position obturating tool 700 into the bleed-back third position 744 may increase the time required for hydraulically fracturing the formation 6, the complexity of the fracturing operation for personnel of well system 600, and wear and tear on components of well system 600, including the surface pumps. Further, the increase in time required for hydraulically fracturing formation 6 of well system 600 may increase the overall costs for fracturing formation 6.

Continuous flow obturating tool 800 is configured to actuate each three-position sliding sleeve valve 610 of well string 602 as part of a hydraulic fracturing operation without ceasing pumping of fluid into the bore 602*b* of well string 602, or the shutting down of the surface pumps of well system 600. In this manner, continuous flow obturating tool 800 allows for a continuous flow of fluid into bore 602*b* of well string 602 as continuous flow obturating tool 800 actuates each three-position sliding sleeve valve 610, and in turn, hydraulically fractures each production zone (e.g., production zones 3*e*, 3*f*, etc.) of the wellbore 3. Allowing for a continuous flow of fluid into bore 602*b* of well string 600 as the formation 6 is hydraulically fractured may decrease the overall time required for hydraulically formation 6 of well system 600. The decrease in time required for fracturing formation 6 of well system 600 may in turn reduce the overall costs for fracturing formation 6 of well system 600 via continuous flow obturating tool 800.

Continuous flow obturating tool 800 shares many structural and functional features with obturating tool 200 described above and illustrated in FIGS. 13A-26, and three-position obturating tool 700 described above and illustrated in FIGS. 53A-65, and shared features have been numbered similarly. In this embodiment, continuous flow obturating tool 800 has a central or longitudinal axis 805 and includes a generally tubular housing 802, a core 860 disposed therein, an actuation assembly 880, and an electronics module 950. Housing 802 includes a first or upper end 804, a second or lower end 806, and a throughbore 808 extending between upper end 804 and lower end 806, where throughbore 808 is defined by a generally cylindrical inner surface 810. Housing 802 also includes a generally cylindrical outer surface 812 extending between upper end 804 and lower end 806. Housing 802 is made up of a series of segments including a first or upper segment 802*a*, intermediate segments 802*b*-802*f*, and a lower segment 802*g*, where segments 802*a*-802*g* are releasably coupled together via threaded couplers 211. An annular seal 816 seals between the lower end of intermediate segments 802*d* and the upper end of intermediate segment 802*e*, and another annular seal 816 seals between the lower end of intermediate segment 802*e* and the upper end of intermediate segment 802*f*. Also, the lower end of intermediate segment 802*c* includes a downwards facing annular shoulder 814. Further, lower segment 802*g* of housing 802 includes a throughbore 807 extending axially therethrough.

In this embodiment, intermediate segment 802*b* of housing 802 includes an annular upstop 811 coupled to intermediate segment 802*b* via a plurality of circumferentially spaced pins 809 that extend radially into both upstop 811 and intermediate segment 802*b* of housing 802 and are retained by sleeve 202*e* disposed about intermediate segment 802*b*. Upstop 811 comprises an annular ring having a plurality of elongate members 813 extending downwards therefrom. In this embodiment, upstop 811 includes three axially extending elongate members 813 circumferentially spaced approximately 120° apart; however, in other embodiments upstop 811 may include varying numbers of elongate members 813 circumferentially spaced at varying angles. As will be explained further herein, upstop 811 is configured to engage an annular indexer 821 coupled to core 860 and configured to control the actuation of continuous flow obturating tool 800.

Intermediate segment 802*b* of also includes an annular downstop 817 coupled to intermediate segment 802*b* via a plurality of circumferentially spaced pins 815 (shown in FIGS. 83A and 83B) that extend radially into both downstop 817 and intermediate segment 802*b* of housing 802 and are retained by sleeve 202*e* disposed about intermediate segment 802*b*. Downstop 817 is axially spaced from upstop 811 within intermediate segment 802*b* such that indexer 821 is disposed axially between upstop 811 and downstop 817.

Intermediate segment 802*b* of housing 802 further includes circumferentially spaced pins 819 extending radially inwards from the inner surface 810 of intermediate segment 802*b* for interacting with indexer 821. In this embodiment, three pins 819 are circumferentially spaced approximately 120° apart; however, in other embodiments intermediate segment 802*b* may include varying numbers of pins 819 circumferentially spaced at varying angles. As will be explained further herein, upstop 811, downstop 817, and pins 819, are each configured to engage indexer 821 of the core 860. Specifically, upstop 811 and downstop 817 are configured to delimit the axial movement of indexer 821 within intermediate segment 802*b*, with upstop 811 delimiting the maximum axial upwards displacement of indexer 821 relative housing 802, and downstop 817 delimiting the maximum axial downwards displacement of indexer 821 relative housing 802. In this manner, upstop 811 and downstop 817 reduce the force applied against pins 819 by indexer 821 as core 860 is axially displaced relative housing 802.

Core 860 of continuous flow obturating tool 800 is disposed coaxially with longitudinal axis 805 and includes an upper end 862 that forms a fishing neck for retrieving continuous flow obturating tool 800 when it is disposed in a wellbore, and a lower end 864. In this embodiment, core 860 includes a throughbore 866 extending between upper end 862 and lower end 864 that is defined by a cylindrical inner surface 868. Core 860 also includes a generally cylindrical outer surface 870 extending between upper end 862 and lower end 864. Instead of the pintle 250 discussed above with respect to three-position obturating tool 700, core 860 is coupled with an annular flange 872 via a pair of radially offset pins 874 that restrict relative axial movement between core 860 and flange 872. Flange 872 is disposed about core 860 and is configured to engage an upper end of biasing member 258 such that an upward biasing force from biasing member 258 is transferred to core 860. Core 860 also includes a pair of axially extending slots or flat surfaces 876 proximal lower end 864.

As mentioned above, core 860 includes an annular indexer 821 disposed about outer surface 870 and coupled to core 860 via threaded coupler 273 and pin 304. The interaction between indexer 821 and pin 819 selectably controls the axial and radial movement and positioning of core 860 within housing 802. As shown particularly in FIG. 83A, indexer 821 includes a first or upper end 823 and a second or lower end 825, where upper end 823 includes three circumferentially spaced upper slots 823*a* extending axially therein to an engagement surface 823*b*. Shown particularly in FIG. 76, upper slots 823*a* are wedge shaped, increasing in cross-sectional width moving from a radial inner surface to a radial outer surface of upper slots 823*a*.

A groove or slot 827 is disposed in an outer surface of indexer 821 and extends across the circumference of indexer 821. Slot 827 defines the repeating pathway of pins 819, as pins 819 move relative to indexer 821 during the operation of continuous flow obturating tool 800. Slot 827 generally includes a plurality of circumferentially spaced axially extending upper slots 827*a* that extend to upper end 823 and a plurality of circumferentially spaced axially extending lower slots 827*b* that extend to lower end 825. Slot 827 also includes a plurality of circumferentially spaced upper shoulders 827*c*, a plurality of circumferentially spaced first lower shoulders 827*d*, and a plurality of circumferentially spaced second lower shoulders 827*e* for guiding the rotation of indexer 821, and in turn, core 860. In this embodiment, indexer 821 is shown including an open slot 827 that extends across the entire circumference of indexer 821 for indexing continuous flow obturating tool 800; however, in other embodiments, indexer 821 may comprise a closed slot, such as a j-slot, which is not circumferentially continuous and does not extend 360° across the circumference of indexer 821. For instance, indexer 821 may comprise a closed slot or j-slot in low pressure applications.

Actuation assembly 880 is configured to actuate core 870 within housing 802 of continuous flow obturating tool 800. In this embodiment, actuation assembly 880 generally includes a first or upper piston 882, a second or intermediate piston 900, a pressure bulkhead 912, a third or lower piston 918, and a pair of solenoid valves 930. Upper piston 882 is generally cylindrical and includes a first or upper bore 884 extending into upper piston 882 from an upper surface thereof and terminating at a terminal end 884*a*, and a second or lower bore 886 extending into upper piston 882 from a lower surface thereof. Upper bore 884 of upper piston 882 receives the lower end 864 of core 860. The lower end 864 of core 860 is moveably coupled to upper piston 882 via a pair of radially offset pins 888 that slidably engage the flat surfaces of the slots 876 of core 860. As shown particularly in FIGS. 69C and 81, core 860 may move axially relative upper piston 882 with each pin 888 disposed in a corresponding slot 876. An upper end 876*a* of each slot 876 defines the maximum upward displacement of core 860 respective upper piston 882, and a lower end 876*b* of each slot 876 defines the maximum downward displacement of core 860 respective upper piston 860.

In this embodiment, upper piston 882 includes an annular seal 883 disposed in an inner surface of upper bore 884 to sealingly engage the outer surface 870 of core 860, and an annular seal 885 disposed in an outer surface of upper piston 882 to sealingly engage the inner surface 810 of intermediate segment 802*d*. Upper piston 882 also includes an annular shoulder 890 disposed on the outer surface of upper piston 882. Shoulder 814 of intermediate segment 802*c* is configured to physically engage shoulder 890 of upper piston 882 to limit the maximum upward displacement of upper piston 882 within housing 802. A piston tube 894 extends from a lower end of upper piston 882, where piston tube 894 includes a throughbore 896 disposed therein and in fluid communication with upper bore 884.

In this embodiment, intermediate piston 900 is slidably disposed in intermediate segment 802*e* and has a first or upper end 902, a second or lower end 904, and a throughbore 906 extending between upper end 902 and lower end 904. Upper end 902 of intermediate piston 900 has a smaller outer diameter than lower end 904, thereby forming an annular shoulder 908 between upper end 902 and lower end 904. A stop ring 910 coupled to an inner surface of intermediate segment 802*e* at the upper end thereof is configured to engage shoulder 908 and thereby limit the maximum upward displacement of intermediate piston 900 in intermediate segment 802*e*. Throughbore 906 allows for the passage of piston tube 894 therethrough. Intermediate piston 900 includes an annular seal 903 disposed in an outer surface thereof proximal lower end 904 and configured to sealingly engage the inner surface of intermediate segment 802*e*. Intermediate piston 900 also includes an annular seal 905 in an inner surface of throughbore 906 at upper end 902 and configured to sealingly engage an outer surface of piston tube 894. In this arrangement, a first chamber 895 is formed between annular seal 885 of upper piston 882 and annular seals 903 and 905 of intermediate piston 900. In an embodiment, first chamber 895 is pre-filled with fluid (e.g. hydraulic fluid, etc.) before continuous flow obturating tool 800 is pumped into the bore 602*b* of well string 602.

In this embodiment, pressure bulkhead 912 is generally cylindrical and includes a throughbore 914 extending between an upper end and a lower end of pressure bulkhead 912, where throughbore 914 allows for the passage of piston tube 894 therethrough. Pressure bulkhead 912 is disposed in intermediate segment 802*e* and is affixed to the inner surface of intermediate segment 802*e* via a snap ring 916 such that pressure bulkhead 914 may not move axially relative intermediate segment 802*e*. Pressure bulkhead 912 includes an annular seal 913 disposed in an outer surface of pressure bulkhead 912 and configured to sealingly engage the inner surface of intermediate segment 802*e*. Pressure bulkhead 912 also includes an annular seal 915 disposed in an inner surface of throughbore 914 and configured to sealingly engage the outer surface of pressure tube 894. In this arrangement a second chamber 911 is formed between the annular seals 903 and 905 of intermediate piston 900 and the annular seals 913 and 915 of pressure bulkhead 912. In an embodiment, second chamber 911 is pre-filled with fluid (e.g. hydraulic fluid, etc.) before continuous flow obturating tool 800 is pumped into the bore 602*b* of well string 602.

Lower piston 918 is generally cylindrical and is slidably disposed in intermediate segment 802*e*. In this embodiment, lower piston 918 includes a throughbore 920 extending between an upper end and a lower end of lower piston 918, where throughbore 920 allows for the passage of piston tube 894 therethrough. Lower piston 918 includes an annular seal 919 disposed in an outer surface of lower piston 918 and configured to sealingly engage the inner surface of intermediate segment 802*e*. Lower piston 918 also includes an annular seal 921 disposed in an inner surface of throughbore 920 and configured to sealingly engage the outer surface of pressure tube 894. In this arrangement, a third chamber 917 is formed between the annular seals 913 and 915 of pressure bulkhead 912 and the annular seals 919 and 921 of lower piston 918.

In this embodiment, the inner surface 810 of intermediate segment 802*e* includes a reduced diameter section 818 for receiving a lower end of the piston tube 894 extending from upper piston 884. An annular seal 819 is disposed in the reduced diameter section 818 for sealingly engaging against the outer surface of piston tube 894. In this arrangement, the portion of throughbore 808 of housing 802 defined by reduced diameter section 818 is in fluid communication with upper bore 884 of upper piston 882, and in turn, with throughbore 866 of core 860. Also, a fourth chamber 923 is formed between the annular seals 919 and 921 of lower piston 918 and the annular seal 819 of reduced diameter section 818.

As shown particularly in FIGS. 69D and 82, extending axially into the lower end of intermediate section 802*e* is a first or solenoid chamber 820*a*, and a second solenoid chamber 820*b*, where each solenoid chamber 820*a* and 820*b* receives a corresponding solenoid valve 930. Each solenoid chamber 820*a* and 820*b* is radially offset from the longitudinal axis 805 of continuous flow obturating tool 800. In this embodiment, solenoid chambers 820*a* and 820*b* are circumferentially spaced approximately 180° apart; however, in other embodiments solenoid chambers 820*a* and 820*b* may be circumferentially spaced at varying angles. In this embodiment, a lower fluid conduit 822*a* extends between fourth chamber 923 and solenoid chamber 820*a* to fluidically couple fourth chamber 923 and solenoid chamber 820*a*. Similarly, a lower fluid conduit 822*b* extends between fourth chamber 923 and solenoid chamber 820*b*. In this arrangement, lower fluid conduits 822*a* and 822*b* each extend radially through a wall of intermediate segment 802*e*. Also, an upper fluid conduit 824*a* extends between second chamber 911 and solenoid chamber 820*a* to fluidically couple second chamber 911 and solenoid chamber 820*a*. An upper conduit 824*b* extends between first chamber 895 and solenoid chamber 820*b* to fluidically couple first chamber 895 and solenoid chamber 820*b*. In this arrangement, upper fluid conduits 824*a* and 824*b* each extend axially through a wall of intermediate segment 802*e*. Intermediate segment 820*e* also includes a vent conduit 826 that radially extends through a wall of intermediate segment 820*e* and fluidically couples third chamber 917 with the bore 602*b* of well string 602.

In this embodiment, each solenoid valve 930 generally includes a coil 932, a cylinder 934, a biasing member 936, and a piston 938. Particularly, the cylinder 934 of the solenoid valve 930 received in solenoid chamber 820*a* is threadably coupled to an inner surface of solenoid chamber 820*a* while the cylinder 934 of the solenoid valve 930 received in solenoid chamber 820*b* is threadably coupled to an inner surface of solenoid chamber 820*b*. The cylinder 934 of each solenoid valve 930 includes an annular seal 935 configured to sealingly engage the inner surface of the corresponding solenoid chamber 820*a* and 820*b*. The piston 938 of each solenoid valve 930 is slidably disposed within the corresponding cylinder 934 and includes a receptacle 940 disposed at an upper end of piston 938, where receptacle 940 extends radially into piston 938 and receives a ball 942 disposed therein. Piston 938 of each solenoid valve 930 comprises a magnetic material and includes an air filled chamber configured decrease the density of piston 938 such that the density of the piston 938 of each solenoid valve 930 is roughly equivalent to the density of the fluid disposed in first chamber 895 and second chamber 911.

The piston 938 of each solenoid valve 930 also includes a radially extending flange 943 disposed distal the upper end of piston 938, where flange 943 is configured to physically engage a corresponding annular shoulder 820*s* of the respective solenoid chamber 820*a* and 820*b* for limiting the maximum upward displacement of piston 938 within housing 802. The biasing member 936 of each solenoid valve 930 extends between flange 943 of piston 938 and an upper end of cylinder 934, and is configured to apply an upwards biasing force against piston 938 such that flange 943 engages the shoulder 820*s* of the respective solenoid chamber 820*a* and 820*b*. The ball 942 of each solenoid valve 930 may be installed in the respective solenoid chamber 820*a* and 820*b* via a pair of corresponding radial bores that are sealed via a pair of endcaps 828 (one endcap 828 for each radial bore) that threadably connect with intermediate segment 802*e*.

Each solenoid valve 930 includes a first or closed position where the flange 943 of piston 938 engages the shoulder 820*s* of the corresponding solenoid chamber 820*a* and 820*b* in response to the biasing force provided by biasing member 936, and a second or open position (shown in FIG. 88C) where piston 938 is displaced axially downwards such that flange 943 is disposed distal the shoulder 820*s* of the corresponding solenoid chamber 820*a* and 820*b*. Particularly, in the closed position the ball 942 disposed in receptacle 940 is aligned with a corresponding lower fluid conduit 822*a* and 822*b* of the respective solenoid chamber 820*a* and 820*b*. Thus, when the solenoid valve 930 of solenoid chamber 820*a* is in the closed position, ball 942 restricts fluid communication between solenoid chamber 820*a* and lower fluid conduit 822*a*, and in turn, fourth chamber 923. Similarly, when the solenoid valve 930 of solenoid chamber 820*b* is in the closed position, ball 942 restricts fluid communication between solenoid chamber 820*b* and lower fluid conduit 822*b*, and in turn, fourth chamber 923.

Further, when the solenoid valve 930 of solenoid chamber 820*a* is in the open position, ball 942 is displaced downwards within receptacle 940 as piston 938 is displaced downwards, misaligning ball 942 with lower fluid conduit 822*a* and thereby providing for fluid communication between solenoid chamber 820*a* and fourth chamber 923. Similarly, when the solenoid valve 930 of solenoid chamber 820*b* is in the open position, ball 942 is misaligned with lower fluid conduit 822*b*, thereby providing for fluid communication between solenoid chamber 820*b* and fourth chamber 923. Solenoid valves 930 are each actuated between the closed and open positions in response to energization of their respective coil 932. Particularly, when the coil 932 of each solenoid valve 930 is energized (i.e., electrical current passes through coil 932) a magnetic force is imparted by coil 932 to piston 938 in the downwards direction opposing the upwards biasing force provided by biasing member 936. In this manner, the magnetic force provided by coil 932 displaces piston 938 downwards such that solenoid valve 930 is disposed in the open position.

The energization of the coil 932 of each solenoid valve 930 is controlled by the electronics module 950 disposed within intermediate segment 802*f* of housing 802. In this embodiment, electronics module 950 is disposed in an atmospheric chamber 952 and includes a first or upper pressure transducer 960, a second or lower pressure transducer 962, a power source 964, a processor 966, a memory 968, and an antenna 970. Power source 964 is configured to provide electrical power to solenoid valves 930 and the electrical components of electronics module 950. Processor 966 is configured to send and receive electrical signals to control the operation of solenoid valves 930 and the electrical components of electronics module 950.

An upper conduit 954 fluidically couples upper pressure transducer 960 with the throughbore 896 of piston tube 894, which is in fluid communication with the throughbore 866 of core 860. Atmospheric chamber 952 is sealed from the remainder of throughbore 808 of housing 802 via the annular seals 816 disposed between intermediate segment 802*f* and lower segment 802*g*, and the annular seals 935 of each solenoid valve 930. In this arrangement, upper pressure transducer 960 is configured to measure the pressure of fluid disposed in the bore 602*b* of well string 602 above seals 228 of intermediate segment 802*b*, which sealingly engage the inner surface of bore well string 602. A lower conduit 956 fluidically couples lower pressure transducer 962 with the throughbore 807 of the lower segment 802*g* of housing 802. In this arrangement, lower pressure transducer 962 is configured to measure the pressure of fluid disposed in the bore 602*b* of well string 602 below seals 228 of intermediate segment 802*b*. The pressure measurements made by upper pressure transducer 960 and lower pressure transducer 962 are stored or logged on memory 968. Antenna 970 is configured to wirelessly transmit and receive signals between electronics module 950 and other electronic components.

In an embodiment, antenna 970 is configured to transmit the pressure measurements recorded on memory 968 to an external electronic component. For instance, upper pressure transducer 960 and lower pressure transducer 962 may be used to measure fluid pressure in bore 602*b* of well string 602 during a hydraulic fracturing operation of well system 600 utilizing continuous flow obturating tool 800, and these pressure measurements recorded on memory 968 may be wirelessly transmitted via antenna 970 to an external electronic component once the hydraulic fracturing operation has been completed and continuous flow obturating tool 800 has been removed or fished from wellbore 3. In this arrangement, well logging data stored on memory 968 may be communicated to an external electronic component without disassembling continuous flow obturating tool 800. In this embodiment, antenna 970 comprises a Bluetooth® antenna; however, in other embodiments, antenna 970 may comprise other antennas configured for wirelessly transmitting signals, such as an inductive coupler. Further, in other embodiments, electronics module 950 may not include an antenna for wirelessly communicating signals. In this embodiment, memory 968 of electronics module 950 is also configured to store instructions for controlling the actuation of actuation assembly 880, as will be discussed further herein. Although in this embodiment electronics module 950 is described as including upper pressure transducer 960, lower pressure transducer 962, power supply 964, processor 966, memory 968, and antenna 970, in other embodiments, electronics module 950 may comprise other components. For instance, in an embodiment, electronics module 950 may comprise an analog timer for controlling the actuation of actuation assembly 880. The analog timer may be either mechanical or electrical in configuration.

Referring to FIGS. 83A-88C, similar to core 720 of three-position obturating tool 700 discussed above, core 860 of continuous flow obturating tool 800 may occupy particular axial positions respective housing 802 as indexer 821 is displaced axially and rotationally within housing 802. For instance, core 860 may occupy: an upper-first position 982 shown in FIGS. 84A-84C that has similarities with the upper-first position 740 of core 720 shown in FIG. 53G, a pressure-up second position 984 shown in FIGS. 85A-85C that has similarities with the pressure-up second position 742 of core 720 shown in FIG. 53H, a pressure-down third position 986 shown in FIGS. 86A-86C that has similarities with the bleed-back third position 744 of core 720 shown in FIGS. 53I and 53K, a fourth position 988 shown in FIGS. 87A-87C that has similarities with the fourth position 746 of core 720 shown in FIG. 53*j*, and an unlocked fifth position 990 shown in FIGS. 88A-88C that has similarities with the unlocked fifth position 748 of core 720 shown in FIG. 53L.

As shown schematically in FIG. 83B, pins 819 of indexer 821 also occupy different positions in slot 827 as core 860 is displaced within housing 802. Particularly, pins 819 occupy: a first position 819*a* disposed in lower slots 827*b* corresponding to the upper-first position 982 of core 860, a second position 819*b* corresponding to the pressure-up second position 984 of core 860, a third position 819*c* disposed in lower slots 827*b* corresponding to the pressure-down third position 986 of core 860, a fourth position 819*d* corresponding to the fourth position 988 of core 860, and a fifth position 819*e* disposed in upper slots 827*a* corresponding to the unlocked fifth position 990 of core 860.

Similar to the utilization of three-position obturating tool 700 discussed above, when continuous flow obturating tool 800 is initially pumped down through bore 602*b* of well string 602, each three-position sliding sleeve valve 610 of well string 602 is disposed in the upper-closed position. In this embodiment, continuous flow obturating tool 800 is pumped down the bore 602*b* of well string 602 in the upper-first position 982 until continuous flow obturating tool 800 lands within the throughbore 46 of the three-position sliding sleeve valve 610 of production zone 3*e*. In the upper-first position 982, upper keys 218 and bore sensors 224 are each disposed in the radially outwards position, while c-ring 236, buttons 234, lower keys 240, and landing keys 716 are each disposed in the radially inwards position. Also, pins 819 of indexer are disposed in first position 819*a* and the elongate members 813 of upstop 811 engage the corresponding engagement surfaces 823*b* of upper slots 823*a*. Further, the solenoid valves 930 of solenoid chambers 820*a* and 820*b* are each in the closed position, restricting fluid communication between solenoid chambers 820*a* and 820*b* with fourth chamber 923. As continuous flow obturating tool 800 enters throughbore 618 of three-position sliding sleeve valve 610, an annular outer shoulder of each upper key 218 lands against upper shoulder 52 of sliding sleeve 630 of the three-position sliding sleeve valve 610 of production zone 3*e*, arresting the downward movement of continuous flow obturating tool 800 through well string 602.

In this embodiment, after landing against sliding sleeve 630, a pressure differential across continuous flow obturating tool 800, provided by annular seals 228 of housing 802 and o-ring seal 294 of core 860, is used to control the actuation of core 860 between upper first position 982 and pressure-up second position 984. Particularly, the fluid pressure in well string 602 above continuous flow obturating tool 800 may be increased via pumps (not shown) at the surface of well system 600 to provide a sufficient pressure force or hydraulic fracturing pressure against the upper end 862 of core 860 to shift core 860 downwards into the pressure-up second position 984 shown in FIGS. 85A-85C. As core 860 is displaced axially within housing 802 when shifting from the upper first position 982 to the pressure-up second position 984, pins 819 engage upper shoulders 827*c*, thereby rotating core 860 until pins 819 are disposed in second position 819*b* with core 860 disposed in the pressure-up second position 984. In shifting to the pressure-up second position 984, core 860 continues to be displaced downwards until lower end 864 of core 860 engages the terminal end 884*a* of the upper bore 884 of upper piston 882, which arrests the downward movement of core 860.

In the pressure-up second position 984, upper keys 218 are in the radially outwards position engaging upper shoulder 52 of sliding sleeve 630 and lower keys 240 are also in the radially outwards position engaging lower shoulder 54, thereby locking continuous flow obturating tool 800 to the sliding sleeve 630. Also, in the pressure-up second position 984, landing keys 716 are each in the radially outwards position with an inner surface of each landing key 716 engaging the lower increased diameter section 734 of the outer surface 870 of core 860. Further, each solenoid valve 930 remains in the closed position.

In the pressure-up second position 984, buttons 234 and c-ring 236 are each disposed in the radially outwards position engaging buttons 64 of sliding sleeve 630, thereby unlocking sliding sleeve 630 from the housing 612 of the three-position sliding sleeve valve 610 of production zone 3*e*. With sliding sleeve 630 unlocked from housing 612, the fluid pressure acting against the upper end of continuous flow obturating tool 800 causes sliding sleeve 630 to shift axially downwards until the outer surface of landing keys 716 lands against the lower landing surface 624*s* of the lower landing profile 624 of housing 612, thereby arresting the downwards movement of sliding sleeve 630 and continuous flow obturating tool 800. Further, when landing keys 716 have landed against lower landing profile 624 of housing 612, sliding sleeve 630 is positioned such that three-position sliding sleeve valve 610 is disposed in the open position shown in FIGS. 35A and 35B. Once landing keys 716 of continuous flow obturating tool 800 land against the lower landing profile 624 of housing 612, fracturing fluid may be pumped through ports 30 of three-position sliding sleeve valve 610 to form fractures 6*f* in the formation 6 at production zone 3*e*, as shown in FIG. 31B. In this arrangement, the entire fluid flow of fracturing fluid from the surface of well system 600 is directed through ports 30 and against the inner surface 3*s* of the wellbore 3.

While the formation 6 is being fractured at production zone 3*e* with continuous flow obturating tool 800, it is possible that due to equipment failure of a component of well system 600 (e.g., failure of the surface pumps, etc.), or some other exigency, that the hydraulic fracturing pressure directed against the upper end of continuous flow obturating tool 800 may be inadvertently decreased below the threshold level of fluid pressure sufficient to compress biasing member 258 and maintain core 860 in the pressure-up second position 984. Alternatively, in some situations it may be desirable to decrease the pressure in well string 602 while fracturing the formation 6 at production zone 3*e*.

In the event of a decrease of fluid pressure above continuous flow obturating tool 800 below the fracturing pressure, core 860 will shift from the pressure-up second position 984 shown in FIGS. 85A-85C to the pressure-down third position shown in FIGS. 86A-86C. As core 860 is displaced axially within housing 802, pins 819 of indexer 821 are displaced through slot 827 and engage first lower shoulders 827*d* until pins 819 are disposed in third position 819*e* and core 860 is disposed in the pressure-down third position 986. In the pressure-down third position 986, upper keys 218 are disposed in the radially outwards position in engagement with upper shoulder 52 of three-position sliding sleeve 630, and lower keys 240 are disposed in the radially outwards position in engagement with lower shoulder 54 of three-position sliding sleeve 630. Also, buttons 234 and c-ring 236 are each disposed in the radially inwards position, thereby locking sliding sleeve 630 to housing 612 and locking three-position sliding sleeve valve 610 in the open-position. Further, landing keys 716 remain in the radially outwards position landed against lower landing profile 624 of housing 612, and the solenoid valve 930 of each solenoid chamber 820*a* and 820*b* remain in the closed position.

Once it is desired to shift continuous flow obturating tool 800 back to the pressure-up second position 984 to continue hydraulically fracturing the formation 6 at production zone 3*e*, the fluid pressure acting against the upper end of continuous flow obturating tool 800 may be increased to the hydraulic fracturing pressure sufficient to compress biasing member 258 and axially displace core 860 in housing 802. As core 860 is axially displaced in housing 802, pins 819 are displaced through slot 827 and engage second lower shoulders 827*e*, rotating core 860 until pins 819 are disposed in second position 819*b* and core 860 is disposed in pressure-up second position 984.

In this embodiment, electronics module 950 is configured to control the actuation of core 860 from the pressure-up second position 984 to the fourth position 988. Particularly, electronics module 950 is programmed to include a timer set for a predetermined fracturing time, and the timer of electronics module 950 is initiated in response to the pressure acting on the upper end 862 of core 860 being increased to the fracturing pressure sufficient to actuate core 860 into the pressure-up second position 984, where the pressure acting on upper end 862 of core 860 is measured in real-time by upper pressure transducer 960. Thus, once the bore 602*b* of wellbore 602 has been pressurized to the fracturing pressure, the timer of electronics module 950 begins counting down to zero from the predetermined fracturing time, and upon reaching zero, electronics module 950 actuates core 860 from the pressure-up second position 984 to the fourth position 988.

The fracturing time of the timer programmed into electronics module 950 is set for the period of time desired for fracturing the formation 6 at each production zone (e.g., production zones 3*e*, 3*f*, etc.). Thus, the fracturing time may be altered depending upon the particular application. Further, multiple fracturing times may be stored on the memory 968 such that the formation 6 at each production zone is fractured for different predetermined periods of time. In other words, the formation 6 at production zone 3*e* may be hydraulically fractured for a first fracturing time, while the formation 6 at production zone 3*f* may be hydraulically fractured at a second fracturing time. In this manner, core 860 is actuated from the pressure-up second position 984 to the fourth position 988 without ceasing the pumping of fluid (i.e., shutting down the pumps at the surface of well system 600) into the bore 602*b* of well string 602. Instead of ceasing pumping of fluid into bore 602*b* of well string 602 to actuate core 860 from the pressure-up second position 984, core 860 is actuated by actuation assembly 880 as controlled by electronics module 950.

Moreover, in this embodiment, the countdown of the timer is suspended in the event that the pressure acting on the upper end 862 of core 860 falls below the fracturing pressure sufficient to maintain core 860 in the pressure-up second position 984, and resumed once the pressure acting on upper end 862 returns to the fracturing pressure sufficient to shift core 860 back into the pressure-up second position 984. For instance, if the fracturing time is set for one hour, and thirty minutes following the initiation of the timer the pressure acting on upper end 862 is reduced below the fracturing pressure, the timer will be suspended with thirty minutes remaining. The timer will remain at thirty minutes until the pressure in bore 602*b* of well string 602 is increased to the fracturing pressure, and at that time, the timer resumes counting down to zero from thirty minutes, and upon reaching zero, the electronics module 950 automatically actuates core 860 from the pressure-up second position 984 to the fourth position 988.

Although in this embodiment electronics module 950 is programmed with a timer for controlling the actuation of core 860 from the pressure-up second position 984 to the fourth position 988, in other embodiments, electronics module 950 may trigger the actuation of core 860 into the fourth position 988 in response to a decrease in pressure acting on the upper end 862 of core 860. For instance, once the formation 6 has been sufficiently fractured at production zone 3*e*, personnel of well system 600 may reduce the rate of fluid flow into bore 602*b* of well string 602, thereby decreasing the pressure acting against upper end 862 of core 860. The decrease in pressure is measured in real-time by upper pressure transducer 960, and in response to the measurement of the decreased pressure, electronics module 950 actuates core 860 from the pressure-up second position 984 to the fourth position 988. Alternatively, in other embodiments, electronics module 950 may be configured to actuate core 860 from the pressure-up second position 984 to the fourth position 988 in response to pressure measurements from the upper pressure transducer 960 and lower pressure transducer 962. For instance, electronics module 950 may comprise an algorithm or model configured to actuate core 860 in response to measurements from pressure transducers 960 and 962. In still other embodiments, electronics module 950 may actuate core 860 in response to an actuation signal received by antenna 970 from an external source.

In this embodiment, once the timer of electronics module 950 reaches zero, electronics module 950 actuates the solenoid valve 930 of solenoid chamber 820*b* from the closed to the open position by energizing coil 932. With solenoid valve 930 of solenoid chamber 820*b* in the open position, fluid communication is provided between fourth chamber 923 and solenoid chamber 820*b*. With the lower end of upper piston 882 applying pressure received from core 860 against the fluid disposed in first chamber 895, first chamber 895 is at a higher pressure than fourth chamber 923 prior to the actuation of solenoid valve 930 into the open position. With solenoid valve 930 of solenoid chamber 820*b* in the open position, first chamber 895 is placed in fluid communication with fourth chamber 923 via upper conduit 824*b*, causing fluid disposed in first chamber 895 to flow through upper conduit 824*b* into solenoid chamber 820*b*, and from solenoid chamber 820*b* into fourth chamber 923. The flow of fluid into fourth chamber 923 from solenoid chamber 820*b* displaces lower piston 918 axially upwards towards pressure bulkhead 912, thereby venting fluid disposed in third chamber 917 into the bore 602*b* of well string 602 via vent conduit 826. Because vent conduit 826 is disposed below seals 228, third chamber 917 is not in fluid communication with the portion of bore 602*b* disposed above seals 228, and thus, third chamber 917 is not exposed to the fluid pressure acting against the upper end 862 of core 860.

With fluid communication established between first chamber 895 and fourth chamber 923, pressure within first chamber 895 decreases, allowing upper piston 882 to displace downwards until a lower end of upper piston 882 engages the upper end 902 of intermediate piston 900, arresting the downward movement of upper piston 882. Upper piston 882 displaces downwards in response to engagement from the lower end 864 of core 860, where the fracturing pressure within bore 602*b* above seals 228 continues to act against the upper end 862 of core 860. Intermediate piston 900 is prevented from being displaced downwards in response to the engagement from upper piston 882 by the fluid pressure within second chamber 911. The downward displacement of upper piston 882 allows core 860 to be displaced downwards in housing 802 in response to the pressure acting against upper end 862, with lower end 864 maintaining engagement against the terminal end 884*a* of the upper bore 884 of upper piston 882. As core 860 is displaced downwards in housing 802, pins 819 of indexer 821 are displaced through slot 827, engaging upper shoulders 827*c* and thereby rotating core 860 until pins 819 are in disposed in fourth position 819*d* and core 860 is disposed in fourth position 988.

As described above, when shifting core 860 from the pressure-up second position 984 to the fourth position 988, fluid may flow continuously into bore 602*b* of well string 602. In an embodiment, the flow rate of fluid into bore 602*b* of well string 602 may be decreased upon shifting core 860 from the pressure-up second position 984 to the fourth position 988 to prevent damaging continuous flow obturating tool 800 once continuous flow obturating tool 800 has unlocked from, and is displaced through, the three-position sliding sleeve valve 610 of production zone 3*e* towards the three-position sliding sleeve valve 610 of production zone 3*f*.

In the fourth position 988 of core 860, upper keys 218 remain supported on first increased diameter section 278 and in engagement with upper shoulder 52 of the sliding sleeve 630 of three-position sliding sleeve valve 610, and lower keys 240 remain supported on third increased diameter section 298 and in engagement with lower shoulder 54 of sliding sleeve 630. Also, in the fourth position 988, buttons 234 and c-ring 236 are disposed in the radially outwards position unlocking sliding sleeve 630 from housing 612. Further, in the fourth position 988 landing keys 716 are disposed in the radially inwards position proximal upper shoulder 736 of lower increased diameter section 734, disengaging landing keys 716 from the lower landing profile 624 of housing 612. With buttons 234, c-ring 236, and landing keys 716 each disposed in their respective radially inwards position, the fluid pressure acting against the upper end 862 of core 860 shifts core 860 and sliding sleeve 630 downwards until three-position sliding sleeve 610 is disposed in the lower-closed position.

Once three-position sliding sleeve valve 610 of production zone 3*e* has been shifted from the open position to the lower-closed position as described above, the three-position sliding sleeve valve 610 may be locked into the lower-closed position by shifting core 860 from the fourth position 988 back into the unlocked fifth position 990. Moreover, shifting core 860 from the fourth position 988 to the unlocked fifth position 990 also unlocks continuous flow obturating tool 800 from sliding sleeve 630, allowing the pressure acting against the upper end of continuous flow obturating tool 800 to displace continuous flow obturating tool 800 through bore 602*b* of well string 602 until continuous flow obturating tool 800 exits bore 618 of the three-position sliding sleeve valve 610 of production zone 3*e*.

Particularly, in this embodiment, electronics module 950 is configured to actuate the solenoid valve 930 of solenoid chamber 820*a* after a predetermined period of time following the actuation of the solenoid valve 930 of solenoid chamber 820*b*. The predetermined period of time between the actuation of solenoid valves 930 is configured to allow core 860 to complete the process of shifting from pressure-up second position 984 to the fourth position 988. Alternatively, in other embodiments, electronics module 950 may actuate the solenoid valve 930 of solenoid chamber 820*a* in response to pressure measurements taken by upper pressure transducer 960 and/or lower pressure transducer 962, or signals received by antenna 970.

With solenoid valve 930 of solenoid chamber 820*a* in the open position, fluid communication is provided between fourth chamber 923 and solenoid chamber 820*a*. With the lower end 904 of second piston 900 applying pressure received upper piston 882 to the fluid disposed in second chamber 911, second chamber 911 is at a higher pressure than fourth chamber 923 prior to the actuation of solenoid valve 930 into the open position. With solenoid valve 930 of solenoid chamber 820*a* in the open position, second chamber 911 is placed in fluid communication with fourth chamber 923 via upper conduit 824*a*, causing fluid disposed in second chamber 911 to flow through upper conduit 824*a* into solenoid chamber 820*a*, and from solenoid chamber 820*a* into fourth chamber 923. The flow of fluid into fourth chamber 923 from solenoid chamber 820*a* displaces lower piston 918 axially upwards towards pressure bulkhead 912, thereby venting fluid disposed in third chamber 917 into the bore 602*b* of well string 602 via vent conduit 826.

With fluid communication established between second chamber 911 and fourth chamber 923, pressure within second chamber 911 decreases, allowing intermediate piston 900 to displace downwards until a lower end of intermediate piston 900 engages the upper end of pressure bulkhead 912, arresting the downward movement of intermediate piston 900. Particularly, intermediate piston 900 displaces downwards in response to engagement from upper piston 882, which is engaged in turn by core 860, where the fracturing pressure within bore 602*b* above seals 228 continues to act against the upper end 862 of core 860. The downward displacement of intermediate piston 900 allows core 860 to be displaced downwards in housing 802 in response to the pressure acting against upper end 862. As core 860 is displaced downwards in housing 802, pins 819 of indexer 821 are displaced through slot 827, engaging upper shoulders 827*c* and thereby rotating core 860 until pins 819 are in disposed in fifth position 819*e* and core 860 is disposed in the unlocked fifth position 990.

In the unlocked fifth position 990 of core 860, upper keys 218 are disposed in the radially inwards position adjacent upper shoulder 280, and lower keys 240 disposed in the radially inwards position adjacent third upper shoulder 300. Landing keys 716 are also each in the radially inwards position, allowing landing keys 716 to pass through lower landing profile 624 of housing 612. With upper keys 218, lower keys 240, and landing keys 716 each in the radially inwards position, continuous flow obturating tool 800 is unlocked from sliding sleeve 630 of the three-position sliding sleeve valve 610 of production zone 3*e*. Thus, the fluid pressure acting on the upper end of continuous flow obturating tool 800 axially displaces continuous flow obturating tool 800 through the actuated three-position sliding sleeve valve 610 of production zone 3*e* towards the three-position sliding sleeve valve 610 of production zone 3*f*.

Once continuous flow obturating tool 800 has unlocked from sliding sleeve 630, the pressure acting against the upper end 862 of core 860 is reduced as continuous flow obturating tool 800 is allowed to pass through bore 602*b* of well string 602. Particularly, the pressure acting against upper end 862 of core 860 is reduced below the threshold pressure sufficient to compress biasing member 258, thereby allowing biasing member 258 to displace core 860 axially upwards in housing 802. As core 860 is displaced upwards in housing 802, pins 819 of indexer 821 are displaced through slot 827, engaging first lower shoulders 827*d* and thereby rotating pins 819 and core 860 until pins 819 are disposed in first position 819*a* and core 860 is disposed in the upper-first position 982. Also, as core 860 is displaced upwards in housing 802, the volume in first chamber 895 expands, reducing the pressure in first chamber 895 and causing fluid disposed in fourth chamber 923 to flow into solenoid chamber 820*b*, and from solenoid chamber 820*b* to first chamber 895. Further, the reduction in pressure in first chamber 895, which acts against the upper end 902 of intermediate piston 900, causes the pressure in second chamber 911 to reduce in turn. The reduction of pressure in second chamber 911 causes fluid disposed in fourth chamber 923 to flow into solenoid chamber 820*a*, and from solenoid chamber 820*a* to second chamber 911. Once first chamber 895 and second chamber 911 have fully re-filled with fluid, the coil 932 of each solenoid valve 930 is de-energized by electronics module 950, thereby actuating each solenoid valve 930 into the closed position. In an embodiment, electronics module 950 is configured to actuate solenoid valves 930 into the closed position after a predetermined period of time following the actuation of core 860 into the unlocked fifth position 990.

With core 860 disposed in upper-first position 982, continuous flow obturating tool 800 is configured to land within the throughbore 618 of the three-position sliding sleeve valve 610 of production zone 3*f*, where the steps described above may be repeated to hydraulically fracture the formation 6 at production zone 3*f* When continuous flow obturating tool 800 has actuated each sliding three-position sleeve valve 610 of well string 602, and is disposed near the toe of wellbore 3, the continuous flow obturating tool 800 may be retrieved and displaced upwards through the bore 602*b* of well string 602 to the surface via the fishing neck at the upper end 862 of core 860.

Referring to FIGS. 89A-90, an embodiment of a lockable three-position sliding sleeve valve 1000 is illustrated. Three-position sliding sleeve valve 1000 shares many structural and functional features with sliding sleeve valve 610 illustrated in FIGS. 32A-40, and shared features have been numbered similarly. As with sliding sleeve valve 610, three-position sliding sleeve valve 1000 comprises a lockable sliding sleeve valve including a first or upper-closed position, a second or open position (shown in FIGS. 89A-90), and a third or lower-closed position. Sliding sleeve valves 1000 may be used in well systems, such as well system 600, in lieu of, or in conjunction with, sliding sleeve valves 610. In this embodiment, sliding sleeve valve 1000 has a central or longitudinal axis 1005 and generally includes a generally tubular housing 1010 and a sliding sleeve 1030.

Housing 1010 of three-position sliding sleeve valve 1000 includes a bore 1012 extending between a first or upper end 1014 and a second or lower end 1016, where bore 1012 is defined by a generally cylindrical inner surface 1018. In this embodiment, the inner surface 1018 of housing 1010 includes axially spaced shoulders 24, 26, and landing profiles 622, 624 defining landing surfaces 622*s*, 624*s*, respectively. In addition, housing 1010 of sliding sleeve valve 1000 includes a plurality of circumferentially spaced ports 1020 extending radially therein. Ports 1020 of housing 1010 are narrower in axial length than the ports 30 of the housing 612 of sliding sleeve valve 610, thereby providing housing 1010 with a relatively reduced axial length between terminal ends 1014 and 1016. Ports 1020 are axially flanked by a pair of annular seal assemblies 1022 disposed in the inner surface 1018 of housing 1010. Inner surface 1018 further includes three axially spaced annular grooves 1024*a*-1024*c* (moving axially from upper end 1014 towards lower end 1016). Each annular groove 1024*a*-1024*c* receives a radially inwards biased lock ring or c-ring 1026*a*-1026*c* received therein. A pair of annular seal assemblies 1028 axially flank annular grooves 1024*a*-1024*c* such that one assembly 1028 is disposed in inner surface 1018 between ports 1020 and annular groove 1024*a* while the second assembly 1028 is disposed between annular groove 1024*c* and lower shoulder 26.

Sliding sleeve 1030 of sliding sleeve valve 1000 includes a bore 1032 extending between a first or upper end 1034 and a second or lower end 1036, where bore 1032 is defined by a generally cylindrical inner surface 1038. In the embodiment shown in FIGS. 89A-90, sliding sleeve 1030 includes circumferentially spaced ports 1038 extending radially therein, where ports 1038 have a narrower axial length than ports 56 of the sliding sleeve 630 of sliding sleeve valve 610. Sliding sleeve 1030 also includes a generally cylindrical outer surface 1040 including an annular groove 1042 extending therein and axially aligned with ports 1038. In this arrangement, annular groove 1042 assists in providing fluid communication between ports 1038 of sliding sleeve 1030 and ports 1020 of housing 1010, irrespective of the relative angular orientation between sliding sleeve 1030 and housing 1010. In the embodiment shown, the inner surface 1038 of sliding sleeve 1030 includes an annular groove 1044 disposed therein and disposed axially adjacent upper shoulder 52. In this configuration, annular groove 1044 defines a landing shoulder or profile 1046. As will be discussed further herein, landing profile 1046 is configured to engage a radially actuatable key or engagement member of an actuation or obturating tool, along with upper shoulder 52, to selectively lock sliding sleeve 1030 to the actuation or obturating tool.

Referring to FIGS. 91A-96D, another embodiment of a flow transported obturating tool 1100 is shown. Obturating tool 1100 is configured to selectably actuate three-position sliding sleeve valve 1000 between the upper-closed, open (shown in FIGS. 89A-90), and lower-closed positions. Similar to obturating tools 700 and 800 described above, the obturating tool 1100 can be disposed in the bore 602*b* of well string 602 at the surface of wellbore 3 and pumped downwards through wellbore 3 towards the heel 3*h* of wellbore 3, where obturating tool 1100 can selectively actuate one or more three-position sliding sleeve valves 1000 moving from the heel 3*h* of wellbore 3 to the toe of wellbore 3. Obturating tool 1100 shares many structural and functional features with obturating tools 700 and 800 described above, and shared features have been numbered similarly. In the embodiment shown in FIGS. 91A-95D, obturating tool 1100 has a central or longitudinal axis and generally includes a generally tubular housing 1102, a core or cam 1140 disposed therein, and an actuation assembly 1180 configured to control the actuation of core 1140 within housing 1102.

Housing 1102 includes a first or upper end 1104, a second or lower end 1106, and a bore 1108 extending between upper end 1104 and lower end 1106, where bore 1108 is defined by a generally cylindrical inner surface 1110. Housing 1102 also includes a generally cylindrical outer surface 1112 extending between upper end 1104 and lower end 1106. Housing 1102 is made up of a series of segments including a first or upper segment 1102*a*, intermediate segments 1102*b*-1102*e*, and a lower segment 1102*f*, where segments 1102*a*-1102*f* are releasably coupled together via threaded couplers. In this embodiment, an annular seal 1116 seals between the lower end of intermediate segments 1102*c* and the upper end of intermediate segment 1102*d*, another annular seal 1116 seals between the lower end of intermediate segment 802*d* and the upper end of intermediate segment 1102*e*, and a third annular seal 1116 seals between the lower end of intermediate segment 1102*e* and lower segment 1102*f*.

In the embodiment shown, upper segment 1102*a* of housing 1102 includes a plurality of circumferentially spaced first slots 1118, each receiving a first key 218 therein, and a plurality of circumferentially spaced second slots 1120, each receiving a second key 240 therein, where first slots 1118 and second slots 1120 axially overlap. As shown particularly in FIG. 92, first slots 1118 and second slots 1120 are arcuately spaced from each other about the circumference of housing 1102. The axial overlapping of first keys 218 and second keys 220, converse to the axially spaced arrangement of keys 218 and 240 in obturating tools 700 and 800 described above, provides housing 1102 with a relatively reduced axial length. In this embodiment, slots 714 of intermediate segment 1102*b* each receive a radially translatable landing key or engagement member 1122, where landing keys 1122 provide similar functionality to the landing keys 716 of obturating tools 700 and 800 described above. In addition, intermediate segment 1102*d* includes a releasable cap 1124 for providing access to an indexing mechanism of core 1140. The inner surface 1112 of intermediate segment 1102*e* includes a plurality of circumferentially spaced grooves 1126 (shown particularly in FIG. 94) disposed therein. Further, the inner surface 1112 of upper segment 1102*a* includes an annular shoulder 1128 extending radially inwards therein.

Core 1140 of obturating tool 1100 is disposed coaxially with the longitudinal axis of housing 1102 and includes an upper end 1142 that forms a fishing neck for retrieving obturating tool 1100 when it is disposed in a wellbore, and a lower end 1144. In this embodiment, core 1140 includes a throughbore 1146 extending between upper end 1142 and lower end 1144 that is defined by a cylindrical inner surface 1148. Core 1140 also includes a generally cylindrical outer surface 1150 extending between upper end 1142 and lower end 1144. In the embodiment shown in FIGS. 91A-95D, core 1140 comprises a first or upper segment 1140*a* and a second or lower segment 1140*b*, where segments 1140*a* and 1140*b* are releasably connected at a shearable coupling 1152. Shearable coupling 1152 includes an annular seal 1154 to seal throughbore 1146 and a shear member or ring 1156 to releasably couple upper segment 1140*a* with lower segment 1140*b*. In this configuration, relative axial movement is restricted between segments 1140*a* and 1140*b* until shear ring 1156 is sheared in response to the application of an upwards force on the upper end 1142 of core 1140. Shear ring 1154 shears upon the application of a sufficient or threshold force on upper end 1142, permitting upper segment 1140*a* of core 1140 to travel upwards through the bore 1108 of housing 1102 until upper shoulder 280 of core 1140 engages annular shoulder 1128 of housing 1102. With upper shoulder 280 engaging or disposed directly adjacent shoulder 1128, upper segment 1140*a* of core 1140 is disposed in a release position with keys 218, 240 and landing keys 1122 each disposed in a radially inwards or retracted position, permitting obturating tool 1100 to be displaced upwards through the wellbore (via a fishing line or other mechanism) to the surface for retrieval.

In the embodiment shown, the first increased diameter section 278 of the outer surface 1150 of core 1140 includes an annular groove 1158 extending therein which receives the plurality of second keys 240 when core 1140 is in a first or run-in position shown in FIGS. 91A-94, disposing second keys 240 in a radially inwards or retracted position. However, the axial width of annular groove 1158 is sized such that first keys 218, which include a greater axial width than second keys 240, are not permitted to be received therein. Also, in this embodiment, the second increased diameter section 284 includes an angled or frustoconical lower shoulder 1160.

An annular sliding piston 1162 is disposed in the bore 1108 of intermediate section 1102*c* of housing 1102 and includes a radially outer annular seal 1159 in sealing engagement with inner surface 1112 and a radially inner annular seal 1161 in sealing engagement with the outer surface 1150 of core 110. In this arrangement, a sealed chamber 1163 is formed between sliding piston 1162 and a lower terminal end of bore 1108 at lower end 1116 of housing 1102. In some embodiments, sealed chamber 1163 is filled with a hydraulic fluid for facilitating operation of actuation assembly 1180, with the sealed hydraulic fluid maintained at lower wellbore pressure (i.e., pressure in the wellbore below annular seals 228) via the transference of pressure of lower wellbore pressure to sealed chamber 1163 by sliding piston 1162 while maintaining sealed chamber 1163 free from debris and other particulates located in the wellbore.

In the embodiment shown, core 1140 includes an annular indexer 1164 for assisting actuation assembly 1180 in the actuation of obturating tool 1100, as will be discussed further herein. Indexer 1164 includes a circumferentially extending groove 1166 disposed on the outer surface 1150 thereof, with pin 819 received within groove 1166. In addition, indexer 1164 includes a pair of axially extending atmospheric chambers 1168 sealed from chamber 1163 via a pair of annular seals 1170. Each atmospheric chamber is filled with a compressible fluid or gas (e.g., air) at or near atmospheric pressure. Disposed in each atmospheric chamber 1168 is an axially extending biasing pin 1174 mounted to an annular carrier 1172 disposed directly adjacent the upper end of intermediate segment 1102*d* of housing 1102, where engagement therebetween restricts downwards axial travel of carrier 1172 and pins 1174 within the bore 1108 of housing 1102. In some embodiments, one or more thrust bearings are mounted adjacent carrier 1172 to receive thrust loads applied against carrier 1172 by pressurized hydraulic fluid disposed in sealed chamber 1163. In addition, indexer 1164 includes a pair of annular seals 1176 to seal the throughbore 1146 of core 1140 from the sealed chamber 1163.

Given that the terminal end of each atmospheric chamber 1168 only receives a relatively low pressure, while the lower end of indexer 1164 fully receives the relatively higher pressure of fluid disposed in sealed chamber 1163, a near constant pressure or biasing force is applied against indexer 1164 and core 1160 in the direction of the upper end of obturating tool 1100. Thus, in this arrangement, atmospheric chambers 1168 and corresponding biasing pins 1174 comprise a biasing member for applying a near constant biasing force against core 1140 irrespective of the relative axial positions of core 1140 and housing 1102. In other words, even as core 1140 travels downwards within bore 1108 of housing 1102, resulting in biasing pins 1172 extending axially further outwards from atmospheric chambers 1168, the biasing force applied against core 1140 remains substantially the same. Particularly, the arrangement of atmospheric chambers 1168 and biasing pins 1174 produces a biasing force on core 1140 equivalent to pressure differential between chambers 1168 and 1163, multiplied by the cross-sectional area of the atmospheric chambers 1168.

As shown particularly in the zoomed-in view of FIG. 95, in this embodiment, actuation assembly 1180 generally includes a cylindrical valve block or body 1182, a first valve assembly 1220*a*, and a second valve assembly 1220*b*. Valve body 1182 includes a first or upper end 1184, a second or lower end 1186, and a generally cylindrical outer surface 1188 extending between ends 1184 and 1186. The upper end 1184 of valve body 1182 includes an upper receptacle 1190 for receiving the lower end 1144 of core 1140. In this embodiment, receptacle 1190 includes a first radial port 1192, a second radial port 1194, and an annular seal 1196 in sealing engagement the outer surface 1150 of core 1140. Valve body 1182 additionally includes a pair of generally cylindrical first and second upper bores 1198 and 1200 that extend axially into valve body 1182 from upper end 1184. First upper bore 1198 corresponds to first valve assembly 1220*a* while second upper bore 1200 corresponds to second valve assembly 1220*b*. Further, valve body 1182 includes a pair of generally cylindrical first and second lower bores 1202 and 1204 that extend axially into valve body 1182 from lower end 1186, with first lower bore 1202 corresponding to first valve assembly 1220*a* and second lower bore 1204 corresponding to second valve assembly 1220*b*.

In the embodiment shown, valve body 1182 includes a flow conduit 1206 extending between the first upper bore 1198 and the lower end 1186 of valve body 1182. In addition, valve body 1182 includes a release conduit 1208 (shown partially in FIGS. 91C and 95) for providing fluid communication between an upper section 1165 of sealed chamber 1163 and a lower section 1167 of chamber 1163, where upper section 1165 extends axially above valve body 1182 while lower section 1167 extends axially above valve body 1182. A check valve comprising an obturating member or ball 1210 disposed on a seat formed in release conduit 1208 and biased into position via a biasing member 1212 restricts fluid communication from lower section 1167 to upper section 1165. Thus, the selective sealing engagement provided by ball 1210 only permits fluid from upper section 1165 to lower section 1167, as will be discussed further herein. In this embodiment, valve body 1182 includes a first radial port 1214 extending between outer surface 1188 and the first lower bore 1202 and a second radial port 1216 extending between outer surface 1188 and second lower bore 1204, where ports 1214 and 1216 are each disposed in a releasable cap. The outer surface 1188 of valve body 1182 includes a plurality of axially spaced annular seals, including a first or upper seal 1218*a*, a second or intermediate seal 1218*b*, and a third or lower seal 1218*c*. First radial port 1214 is disposed axially between intermediate seal 1218*b* and lower seal 1218*c* while second radial port 1216 is disposed axially between upper seal 1218*a* and intermediate seal 1218*b*.

In the embodiment shown, valve assemblies 1220*a* and 1220*b* each generally include an upper housing 1222, a piston assembly 1240, and a check valve assembly 1270.

The upper housing 1222 of first valve assembly 1220*a* is received within and couples with an upper end of first upper bore 1198 while the upper housing 1222 of second valve assembly 1220*b* is received within and couples with an upper end of second upper bore 1200. The upper housing 1222 of each valve assembly 1220*a* and 1220*b* comprises a first or upper chamber 1224 and a second or lower chamber 1226, where upper chamber 1224 is in fluid communication with the upper section 1165 of sealed chamber 1163 via a port extending therein while lower chamber 1226 is in fluid communication with fluid disposed above obturating tool 1100 in the wellbore via the throughbore 1146 of core 1140, radial ports 1192 and 1194 of valve body 1182, and radial ports disposed in each upper housing 1222. Chambers 1224 and 1226 are sealed from each other and from fluid disposed in first and second upper bores 1198 and 1200 of valve body 1182 via a plurality of annular seals 1228. Additionally, the upper housing 1222 of valve assemblies 1220*a* and 1220*b* includes a biasing member 1230 received within upper chamber 1224 for providing a biasing force against the corresponding piston assembly 1240 in the direction of the lower end 1186 of valve body 1182. In certain embodiments, the biasing member 1230 of the first valve assembly 1220*a* provides a substantially greater biasing force than the biasing member 1230 of second valve assembly 1220*b*.

In this embodiment, the piton assembly 1240 of valve assemblies 1220*a* and 1220*b* generally includes a piston member 1242 and a flapper assembly 1250 coupled to a lower end of the piston member 1242 and disposed in upper bores 1198 and 1200, respectively. The piston member 1242 of each valve assembly 1220*a* and 1220*b* includes an annular shoulder 1244 disposed in the lower chamber 1226 of the corresponding upper housing 1222. In this arrangement, the annular shoulder 1244 of piston member 1242 receives a pressure force from the upper wellbore fluid disposed in lower chamber 1226. Thus, when the pressure of the upper wellbore fluid is greater than the pressure of fluid disposed in the upper section 1165 of sealed chamber 1163, a pressure force is applied against the piston assembly 1240 in the direction of the upper end of the upper housing 1222, thereby acting against or resisting the biasing force applied by biasing member 1230. The flapper assembly 1250 of the piston assembly 1240 of each valve assembly 1220*a* and 1220*b* includes a flapper 1252 pivotably coupled to a lower terminal end of the corresponding piston member 1244, where the flapper 1252 includes an axially extending upper surface 1254, an axially extending lower surface 1256, and a radially extending shoulder 1258 disposed therebetween. Additionally, an inwardly biased lock ring or c-ring 1260 is disposed about the flapper 1252 to bias the flapper 1252 radially inwards.

The check valve assembly 1270 of first valve assembly 1220*a* is slidably disposed in the first lower bore 1202 of valve body 1182 while the check valve assembly 1270 of the second valve assembly 1220*b* is slidably disposed in the second lower bore 1204. In the embodiment shown, the check valve assembly 1270 of each valve assembly 1220*a* and 1220*b* includes a check valve housing 1272 comprising a stem 1274 extending axially upwards towards flapper assembly 1250, and a ball or obturating member 1276 disposed in the check valve housing 1272. In addition, the check valve assembly 1270 of each valve assembly 1220*a* and 1220*b* includes a biasing member 1278 for applying a biasing force against check valve housing 1272 in the direction of the upper end 1184 of valve body 1182. Additionally, each valve assembly 1220*a* and 1220*b* includes an annular plug 1280 is coupled to valve body 1182 and disposed axially between the flapper assembly 1250 and check valve assembly 1270. The upper end of each plug 1280 includes a generally frustoconical surface 1282 for engaging the terminal end of the corresponding flapper 1252. In this arrangement, the biasing member 1278 of the check valve assembly 1270 of first valve assembly 1220*a* biases check valve housing 1272 into an upper position with ball 1276 restricting fluid communication from first lower bore 1202 and first radial port 1214. Similarly, the biasing member 1278 of the check valve assembly 1270 of second valve assembly 1220*b* biases check valve housing 1272 into an upper position with ball 1276 restricting fluid communication from second lower bore 1204 and second radial port 1216.

FIGS. 91A-95 illustrate obturating tool 1100 in the run-in position as obturating tool 1100 is pumped through the wellbore. In this position, first keys 218 are in the radially outwards position while buttons 234, second keys 240, and landing keys 1122 are in the radially retracted position while valve body 1182 of actuation assembly 1180 is disposed in a first or upper position in the sealed chamber 1163. Upon entering the reduced diameter section 46 of the sliding sleeve 1030 of a sliding sleeve valve 1000 (where valve 1000 is disposed in the upper-closed position), bore sensors 224 are actuated into the radially inner position, unlocking core 1140 from housing 1102. Obturating tool 1100 continues to travel through sliding sleeve 1030 until first keys 218 engage the upper shoulder 52 of the sliding sleeve 1030, restricting further downward travel of obturating tool 1100. Once obturating tool 1100 has landed within sliding sleeve 1030 with first keys 218 engaging upper shoulder 52, upper wellbore pressure (i.e., fluid pressure above obturating tool 1100) is increased, causing core 1140 to travel downwards through the bore 1108 of housing 1102 until annular lower seal 1218*c* of valve body 1182 is disposed axially below grooves 1126, thereby allowing annular lower seal 1218*c* to seal against the inner surface 1112 of housing 1102.

The sealing engagement between annular lower seal 1218*c* and the inner surface 1112 of housing 1102 seals the lower section 1167 of sealed chamber 1163, creating a hydraulic lock therein that restricts further downwards travel of valve body 1182 and core 1140, disposing valve body 1182 in a second position lower than the upper position. With valve body 1182 disposed in the second position, second keys 240, buttons 234, and landing keys 1122 are each actuated into the radially outwards position, thereby unlocking sliding sleeve 1030 from the housing 1010 of sliding sleeve valve 1000. In this position obturating tool 1100 is locked to sliding sleeve 1030 with first keys 218 engaging upper shoulder 52 of sliding sleeve 1030 and second keys 240 engaging landing profile 1046. The increased fluid pressure acting against the upper end of obturating tool 1100 acts to shift obturating tool 1100 and sliding sleeve 1030 locked thereto downwards through housing 1010 until the landing keys 1122 engage the lower landing profile 624 of housing 1010, arresting further downward travel of obturating tool 1100 and sliding sleeve 1030 and disposing sliding sleeve 1030 in the open position shown in FIGS. 89A-90.

With sliding sleeve valve 1000 disposed in the open position, the formation adjacent sliding sleeve valve 1000 may be hydraulically fractured as the upper wellbore fluid pressure is increased to a hydraulic fracturing pressure as fluid is flowed into the formation via ports 1020 in housing 1010. As the formation adjacent sliding sleeve valve 1000 is fractured, the fracturing pressure in the upper wellbore is transmitted to the lower chamber 1226 of the upper housing

1222 of first and second valve assemblies 1220_a_ and 1220_b_. The fracturing fluid pressure in both lower chambers 1226 acts against the annular shoulder 1244 of each piston member 1242, causing the piston member 1242 of each valve assembly 1220_a_ and 1220_b_ to shift into an upwards position against the biasing force provided by biasing member 1230, as shown in FIG. 96B. The upwards travel of each piston member 1242 allows the stem 1274 of the check valve assembly 1270 of each valve assembly 1220_a_ and 1220_b_ to engage the lower surface 1256 of the corresponding flapper 1252.

Once the formation surrounding sliding sleeve valve 1000 is sufficiently fractured, the pumps flowing fluid into the wellbore are stopped and upper wellbore pressure is allowed to decline. Once the upper wellbore pressure has declined a sufficient degree to a first threshold pressure, the biasing member 1230 of the first valve assembly 1220_a_ displaces the piston member 1242 of the first valve assembly 1220_a_ downwards towards the lower end 1186 of valve body 1182. In some embodiments, upper wellbore pressure does not need to substantially equalize with the lower wellbore pressure (i.e., the fluid pressure below obturating tool 1100) before the biasing member 1230 of the first valve assembly 1220_a_ displaces piston member 1242 downwards, and thus, a significant pressure differential may remain between the upper and lower wellbore pressures when the piston member 1242 of the first valve assembly 1220_a_ is shifted downwards. In this manner, the amount of time between the cessation of hydraulic fracturing and the actuation of first valve assembly 1220_a_, and obturating tool 1100 in-turn, may be reduced.

As the piston member 1242 of the first valve assembly 1220_a_ travels downwards, the upper end of the stem 1274 of the housing 1272 of check valve assembly 1270 engages the shoulder 1258 of flapper 1252, causing check valve housing 1252 of first valve assembly 1220_a_ to be displaced axially downwards in concert with piston member 1242 against the biasing force provided by biasing member 1278. With the check valve housing 1252 of the first valve assembly 1220_a_ displaced axially downwards in the first lower bore 1202 of valve body 1182, ball 1276 is displaced from first port 1214, allowing for fluid communication between first lower bore 1202 and first port 1214. The establishment of fluid communication between first lower bore 1202 and first port 1214 eliminates the hydraulic lock in the lower section 1167 of sealed chamber 1163, allowing fluid to flow from lower section 1167 into upper section 1165 via grooves 1126. With hydraulic lock in lower section 1167 eliminated, valve body 1182 and core 1140 are permitted to travel further axially downwards through the bore 1108 of housing 1102.

Core 1140 and valve body 1182 travel downwards through bore 1108 of housing 1102 until the annular intermediate seal 1218_b_ passes below grooves 1126, allowing annular intermediate seal 1218_b_ to seal against the inner surface 1112 of housing 1102 and create a hydraulic lock in the lower section 1167 of sealed chamber 1163, restricting further downward travel of core 1140 and valve body 1182, disposing valve body 1182 in a third position. With valve body 1182 disposed in the third position, landing keys 1122 are actuated into the radially retracted position, allowing the remaining differential between the upper and lower wellbore pressures to displace obturating tool 1100 and sliding sleeve 1030 further downwards through housing 1010 until the lower end 1036 of sliding sleeve 1030 engages the lower shoulder 26 of housing 1010, disposing sliding sleeve valve 1000 in the lower-closed position.

With sliding sleeve valve 1000 disposed in the lower-closed position, the upper wellbore fluid pressure may be bled down to further reduce the differential between the upper and lower wellbore pressures. Once the upper wellbore pressure has been reduced a sufficient degree to a second threshold pressure, lower than the first threshold pressure, the biasing force provided by the biasing member 1230 of the second valve assembly 1220_b_ overcomes the fluid pressure acting against the annular shoulder 1244 of the piston member 1242 of the second valve assembly 1220_b_, causing the piston member 1242 to travel axially downwards towards the lower end of 1186 of valve body 1182, as shown particularly in FIG. 96C. Similar to the actuation of first valve assembly 1220_a_ described above, the actuation of second valve assembly 1220_b_ causes the check valve housing 1252 of the second valve assembly 1220_b_ to shift downwards, providing for fluid disposed in lower section 1167 of sealed chamber 1163 to flow into upper section 1165 via second port 1216 and grooves 1126 thereby eliminating the hydraulic lock in lower section 1167. As discussed above, the biasing member 1230 of the second valve assembly 1220_b_ provides less biasing force than the biasing member 1230 of the first valve assembly 1220_a_. For this reason, the second valve assembly 1220_b_ does not actuate (i.e. provide for fluid flow from lower section 1167 to upper section 1163) until the upper wellbore pressure is reduced to the second threshold pressure, which is less than the first threshold pressure. Allowing the upper wellbore pressure to be further reduced to the second threshold pressure prior to releasing obturating tool 1100 from the sliding sleeve 1030 of sliding sleeve valve 1000 reduces the acceleration of obturating tool 1100 upon release, and thereby reduces the likelihood of damaging obturating tool 1100 or other equipment following the release of obturating tool 1100 from sliding sleeve valve 1000.

With hydraulic lock in the lower section 1167 of the sealed chamber 1163 eliminated, core 1140 and valve body 1182 are permitted to travel further downwards until the annular upper seal 1218_a_ of valve body 1182 is disposed below the grooves 1126, sealing lower section 1167 and arresting the downward displacement of core 1140 and valve body 1182 with valve body 1182 disposed in a fourth position. When valve body 1182 is disposed in the fourth position, first keys 218, second keys 240, and buttons 234 are each actuated into the radially retracted position, thereby locking sliding sleeve 1030 to the housing 1010 of sliding sleeve valve 1000 and releasing or unlocking obturating tool 1100 from sliding sleeve 1030. In this position, the remaining differential between the upper and lower wellbore pressures displaces obturating tool 1100 from sliding sleeve valve 1000 and further down through the wellbore until the obturating tool 1100 reaches the next sliding sleeve valve 1000. Following the release of obturating tool 1100 from siding sleeve 1030, the differential between the upper and lower wellbore pressures is substantially reduced or equalized, permitting the upwards biasing force provided by atmospheric chambers 1168 and biasing pins 1174 to shift core 1140 and valve body 1182 axially upwards into the run-in position shown in FIGS. 91A-95.

In addition, in response to the equalization of the upper and lower wellbore fluid pressures, the biasing members 1230 of both first and second valve assemblies 1220_a_ and 1220_b_ displace their corresponding piston members 242 further downwards until the lower terminal end of each flapper 1252 engages the frustoconical surface 1282 of the corresponding plug 1280, as shown particularly in FIG. 96D. Engagement between each flapper 1252 and its corresponding plug 1280 causes flapper 1252 to outwardly pivot against inwardly biased c-ring 1260, permitting the stem 1274 of the corresponding check valve housing 1272 to slide past shoulder 1258 and engage the upper surface 1256 of flapper 1252, thereby resetting first and second valve assemblies 1220*a* and 1220*b*. Further, as valve body 1182 travels axially upwards through the bore 1108 of housing 1102, fluid disposed in the upper section 1165 of sealed chamber 1163 is communicated to lower section 1167 via grooves 1126, first and second ports 1214 and 1216, and corresponding first and second lower bores 1202 and 1204. Additionally, fluid in upper section 1165 flows to lower section 1167 via release conduit 1208, with ball 1210 displaced off of its corresponding seat in response to the fluid flow from upper section 1165 to lower section 1167. Thus, release conduit 1208 provides additional flow area for fluid flowing from upper section 1165 to lower section 1167, reducing the time required for valve body 1182 to return to the first or run-in position from the lowermost fourth position.

As described above, core 1140 and valve body 1182 are not required to travel upwards through bore 1108 of housing 1102 until core 1140 and valve body 1182 are "reset" or returned to their initial run-in position. Thus, instead of relying upon indexer 1164 to control the actuation of core 1140, actuation assembly 1180 controls the actuation of core 1140. Instead, indexer 1164 is configured to hold or maintain the position of core 1140 and valve body 1182 in the event that upper wellbore pressure is lost. Thus, indexer 1164 prevents valve body 1182 from returning to the first position unless valve body 1182 is disposed in the fourth position described above.

Referring to FIGS. 97A-100, an embodiment of a three-position sliding sleeve valve 1300 is shown. Three-position sliding sleeve valve 1300 shares features with sliding sleeve valve 1000 illustrated in FIGS. 89A-90, and shared features have been numbered similarly. As with sliding sleeve valve 1000, three-position sliding sleeve valve 1300 includes a first or upper-closed position (shown in FIGS. 97A and 97B), a second or open position, and a third or lower-closed position. Sliding sleeve valve 1300 may be used in well systems, such as well system 600, in lieu of, or in conjunction with, other sliding sleeve valves disclosed herein. Additionally, unlike sliding sleeve valve 1000, sliding sleeve valve 1300 does not comprise a lockable sliding sleeve valve, as will be discussed further herein.

Sliding sleeve valve 1300 has a central or longitudinal axis 1305 and generally includes a tubular housing 1302 and a sleeve 1340 slidably disposed therein. In the embodiment shown in FIGS. 97A-100, housing 1302 of sliding sleeve valve 1300 includes a bore 1304 extending between a first or upper end 1306 and a second or lower end 1308, where bore 1304 is defined by a generally cylindrical inner surface 1310. The inner surface 1310 of housing 1302 includes a first or upper shoulder 1312 and a second or lower shoulder 1314 axially spaced from upper shoulder 1312. In some embodiments, lower shoulder 1314 comprises a no-go shoulder. Upper shoulder 1312 defines the maximum upward travel of sleeve 1340 within housing 1302 and lower shoulder 1314 defines the maximum downwards travel of sleeve 1340 within housing 1302. Additionally, in this embodiment lower shoulder 1314 comprises a landing profile including a no-go shoulder for engaging an actuation or obturating tool for actuating sliding sleeve valve 1300 between the upper-closed, open, and lower-closed positions.

The inner surface 1310 of housing 1302 additionally includes an annular upstop shoulder 1315 disposed proximal lower end 1308 of housing 1302. In certain embodiments, upstop shoulder 1315 comprises a no-go shoulder. A reduced diameter section or sealing surface 1316 extends axially between lower shoulder 1314 and upstop shoulder 1315. Sealing surface 1316 includes an inner diameter that is less than the inner diameter of the tubing or string (e.g., well string 4 of FIG. 1A) to which sliding sleeve valve 1300 is coupled. Additionally, sealing surface 1316 is configured to be sealingly engaged by an actuation or obturating tool such that a pressure differential may be established between the portion of bore 1304 proximal upper end 1306 and the portion of bore 1304 proximal lower end 1308. The inner surface 1310 of housing 1302 also includes an elongate pin slot 1318 that extends axially from upper shoulder 1312. A pair of seals or debris barriers 1320 are disposed in pin slot 1318, with one seal 1320 disposed at each terminal end of pin slot 1318.

As shown particularly in FIG. 99, a plurality of laterally extending (i.e., extending orthogonally relative longitudinal axis 1305) shear grooves 1322 are disposed in the inner surface 1310 of housing 1302 and extend through pin slot 1318. Particularly, shear grooves 1322 extend entirely through housing 1302, from inner surface 1310 to an outer surface of housing 1302. In this embodiment, each shear groove 1322 includes a pair of laterally extending shear pins 1324 (shown in FIGS. 97A and 99 as 1324*a*, 1324*b*, 1324*c*, and 1324*d*) biased into physical engagement via a pair of corresponding biasing members 1326, and a pair of retaining plugs 1328 threadably connected to opposing terminal ends of the shear groove 1322 to retain the shear pin 1324 and corresponding biasing members 1326 into position.

Particularly, the uppermost shear groove 1322 includes a pair of upper shear pins 1324*a*, intermediate shear grooves 1322 include intermediate pairs of shear pins 1324*b* and 1324*c*, and the lowermost shear groove 1322 includes a lowermost pair of shear pins 1324*d*. An inner terminal end 1325 of each shear pin 1324 (e.g., shear pins 1324*a*-1324*d*) remains in engagement with the terminal end 1325 of the corresponding shear pin 1324 (e.g., the corresponding shear pin 1324*a*-1324*d*) at the centerline of pin slot 1318. A plurality of axially spaced annular debris channels 1330 extend into the inner surface 1310 and through pin slot 1318. Debris channels 1330 are configured to receive and retain debris created by the shearing of each corresponding pair of shear pins 1324 in response to the actuation of sliding sleeve valve 1300 between the upper-closed, open, and lower-closed positions. Housing 1302 further includes a plurality of circumferentially spaced ports 1332 flanked by a pair of annular seal assemblies 1022, where ports 1332 are axially spaced from pin slot 1018.

In the embodiment shown in FIGS. 97A-100, sleeve 1340 of sliding sleeve valve 1300 includes a bore 1342 extending between a first or upper end 1344 and a second or lower end 1346, where bore 1342 is defined by a generally cylindrical inner surface 1348. Sleeve 1340 also includes an outer surface 1349 extending axially between upper end 1344 and lower end 1346. The inner surface 1348 of sleeve 1340 includes an annular engagement groove 1350 for interfacing with an actuation or obturating tool for actuating sliding sleeve valve 1300 between the upper-closed, open, and lower-closed positions. Particularly, engagement groove 1350 includes a first or upper engagement shoulder 1352 and a second or lower engagement shoulder 1354 axially spaced upper engagement shoulder 1352. As will be discussed further herein, lower engagement shoulder 1354 is configured to be engaged by an actuation or obturating tool to shift sleeve 1340 towards the lower end 1308 of housing 1302 while upper engagement shoulder 1352 is configured to be engaged by an actuation or obturating tool to shift sleeve 1340 towards the upper end 1306 of housing 1302.

Additionally, sleeve 1340 includes a plurality of circumferentially spaced ports 1356 extending radially through sleeve 1340. Ports 1356 are located axially on engagement groove 1350 such that ports 1356 are axially spaced from both upper engagement shoulder 1352 and lower engagement shoulder 1354. Ports 1356 are configured to provide fluid communication between bore 1342 of sleeve 1340 and the ports 1332 of housing 1302 when sliding sleeve valve 1300 is disposed in the open position, and to restrict fluid communication between bore 1342 of sleeve 1340 and ports 1332 of housing 1302 when sliding sleeve valve 1300 is positioned in either the upper-closed (shown in FIGS. 97A and 97B) or the lower-closed positions. Sleeve 1340 of sliding sleeve valve 1300 further includes an engagement pin 1358 positioned proximal upper end 1344 and projecting radially outwards from outer surface 1349 of sleeve 1340.

As shown particularly in FIGS. 97A and 98, engagement pin 1358 is slidably received within pin slot 1318. As will be discussed further herein, in response to a threshold axially directed force applied against sleeve 1340 sufficient to shear corresponding pairs of shear pins 1324 (e.g., shear pin pairs 1324*a*-1324*d*) via engagement pin 1358, allowing sleeve 1340 to be axially displaced through bore 1304 of housing 1302. In this manner, shear pins 1324*a*-1324*d* are configured to retain sleeve 1340 of sliding sleeve valve 1300 in one of a plurality of predefined axial positions within housing 1302, where sleeve 1340 may only transition between those predefined axial positions in response to the application of the threshold axial force. In this embodiment, engagement pin 1358 may be disposed between debris barrier 1320 and shear pins 1324*a*, corresponding to the upper-closed position of sliding sleeve valve 1300, between shear pins 1324*b* and 1324*c*, corresponding to the open position of sliding sleeve valve 1300, and between shear pins 1324*d* and debris barrier 1320, corresponding to the lower-closed position of sliding sleeve valve 1300. Thus, shear pins 1324*a*-1324*d* are configured to retain or hold sleeve 1340 in one of the predetermined axial positions respective housing 1302 without locking sleeve 1340 to housing 1302 and thus requiring the engagement of a key or engagement member to unlock sleeve 1340 from housing 1302 prior to displacing sleeve 1340 through housing 1302.

Referring to FIGS. 101A-106, an embodiment of a three-position sliding sleeve valve 1400 is shown. Three-position sliding sleeve valve 1400 shares features with sliding sleeve valve 1300 illustrated in FIGS. 97A-100, and shared features have been numbered similarly. As with sliding sleeve valve 1300, three-position sliding sleeve valve 1400 includes a first or upper-closed position (shown in FIGS. 101A and 101B) a second or open position, and a third or lower-closed position. Sliding sleeve valves 1400 may be used in well systems, such as well system 600, in lieu of, or in conjunction with, other sliding sleeve valves disclosed herein.

Sliding sleeve valve 1400 has a central or longitudinal axis 1405 and generally includes a tubular housing 1402 and a sleeve 1440 slidably disposed therein. In the embodiment shown in FIGS. 101A-106, housing 1402 of sliding sleeve valve 1400 includes a bore 1404 extending between a first or upper end 1406 and a second or lower end 1408, where bore 1404 is defined by a generally cylindrical inner surface 1410. Housing 1402 includes a generally cylindrical receptacle 1412 extending radially into inner surface 1410 and a port 1414 aligned with receptacle 1412. Receptacle 1412 of housing 1402 is configured to receive a first seal member 1462 of a closure valve or assembly 1460. Receptacle 1412 also includes an annular biasing member 1416 configured to bias first seal member 1462 radially inwards into sealing engagement with a second seal member 1470 of seal assembly 1460, as will be discussed further herein. In this embodiment, biasing member 1416 comprises a wave spring; however, in other embodiments, biasing member 1416 may comprise other biasing members or mechanisms known in the art. Similar to housing 1302 of sliding sleeve valve 1300, housing 1402 of sliding sleeve valve 1400 includes pin slot 1318, shear grooves 1322, corresponding pairs of biased shear pins 1324*a*-1324*d*, and debris channels 1330.

In the embodiment shown in FIGS. 101A-106, sleeve 1440 of sliding sleeve valve 1400 includes a bore 1442 extending between a first or upper end 1444 and a second or lower end 1446, where bore 1442 is defined by a generally cylindrical inner surface 1448. Sleeve 1440 also includes an outer surface 1449 extending axially between upper end 1444 and lower end 1446. The outer surface 1449 of sleeve 1440 includes an axially extending carrier slot 1452 disposed therein for receiving the second seal member 1470 of seal assembly 1460. In this arrangement, first seal member 1462 is coupled or affixed to housing 1402 while second seal member 1470 is coupled or affixed to sleeve 1440. Thus, sleeve 1440 acts as a carrier for second seal member 1470. Additionally, an annular debris barrier or seal 1454 is disposed in outer surface 1449 of sleeve 1440 proximal lower end 1446.

Seal assembly 1460 of sliding sleeve valve 1400 is configured to control fluid communication between port 1414 of housing 1402 and bore 1442 of sleeve 1440. In the embodiment shown in FIGS. 101A-106, first seal member 1462 comprises a generally cylindrical seal cap 1460 having a central bore 1464 and an annular sealing surface 1466. In this configuration, bore 1464 of seal cap 1460 is in fluid communication with port 1414 of housing 1402. In this embodiment, seal cap 1460 comprises a hard metal, such as beryllium copper; however, in other embodiments seal cap 1460 may comprise other materials. In the embodiment shown in FIGS. 101A-106, second seal member 1470 comprises an elongate seal member 1470 that is not disposed about the longitudinal axis 1405 of sliding sleeve valve 1400. Instead, elongate seal member 1470 is disposed within a wall of housing 1402, or in other words, within an increased internal diameter section of housing 1402 extending axially between upper shoulder 1312 and lower shoulder 1314 of housing 1402. Elongate seal member 1470 comprises a centrally disposed port 1472 extending radially therethrough and a planar sealing surface 1474 in sealing engagement with the sealing surface 1466 of seal cap 1462. In this embodiment, elongate seal member 1470 also comprises a hard metal, such as beryllium copper; however, in other embodiments elongate seal member 1470 may comprise other materials.

In the configuration described above, a metal-to-metal seal is formed between the sealing surface 1466 of seal cap 1462 and the sealing surface 1474 of the elongate seal member 1470 of seal assembly 1460. In some embodiments, sealing surfaces 1466 and 1474 comprise high precision machined surfaces. In certain embodiments, sealing surfaces 1466 and 1474 comprise coated surfaces for additional resiliency. As described above, biasing member 1416 biases sealing surface 1466 of seal cap 1462 into sealing engagement with sealing surface 1474 of elongate seal member 1470. Given that elongate seal member 1470 is coupled to sleeve 1400 of sliding sleeve valve 1400, seal assembly 1460 may be actuated into an open position providing for fluid communication therethrough by displacing sleeve 1440 through the bore 1404 of housing 1402 and actuating sliding sleeve valve 1400 into the open position. Additionally, seal assembly 1460 comprises an offset seal assembly 1460 that is disposed within a wall of housing 1402 and is not disposed around the longitudinal axis or centerline 1405 of sliding sleeve valve 1400.

Referring to FIGS. 107A-113, another embodiment of a flow transported obturating tool 1500 is shown. Obturating tool 1500 is configured to selectably actuate both sliding sleeve valve 1300 and sliding sleeve valve 1400 between their respective upper-closed, open, and lower-closed positions. Similar to obturating tool 1100 described above, the obturating tool 1500 may be disposed in the bore 602*b* of well string 602 at the surface of wellbore 3 and pumped downwards through wellbore 3 towards the heel 3*h* of wellbore 3, where obturating tool 1500 can selectively actuate one or more sliding sleeve valves 1300 or 1400 moving from the heel 3*h* of wellbore 3 to the toe of wellbore 3. Obturating tool 1500 shares many structural and functional features with obturating tool 1100 described above, and shared features have been numbered similarly. In the embodiment shown in FIGS. 107A-113, obturating tool 1500 has a central or longitudinal axis and generally includes a generally tubular housing 1502, and a core or cam 1540 disposed therein. Additionally, obturating tool 1500 includes the actuation assembly 1180 of obturating tool 1100 described above for controlling the actuation of core 1540 within housing 1502.

Housing 1502 of obturating tool 1500 includes a first or upper end 1504, a second or lower end 1506, and a bore 1508 extending between upper end 1504 and lower end 1506, where bore 1508 is defined by a generally cylindrical inner surface 1510. Housing 1502 also includes a generally cylindrical outer surface 1512 extending between upper end 1504 and lower end 1506. Housing 1502 is made up of a series of segments including a first or upper segment 1502*a*, intermediate segments 1502*b*-1502*e*, and a lower segment 1502*f*, where segments 1502*a*-1502*f* are releasably coupled together via threaded couplers. In this embodiment, upper segment 1502*a* of housing 1502 includes a debris barrier or seal 1518 configured to wipe debris or other materials from the inner surface of a bore of a well string (e.g., well string 602) through which obturating tool 1500 is pumped.

Additionally, upper segment 1502*a* of housing 1502 includes a plurality of circumferentially spaced upper slots 1520 that each receive a corresponding sleeve or carrier key or engagement member 1522 therein. Each carrier key 1522 is radially translate within its respective upper slot 1520 between a radially retracted position (shown in FIG. 107B) and a radially expanded position respective housing 1502. Additionally, each carrier key 1522 includes a retainer 1524 extending therethrough and configured to prevent carrier keys 1522 from inadvertently falling out of their respective upper slots 1520. Particularly, each retainer 1524 extends laterally through its respective carrier key 1522 within the corresponding upper slot 1520, where the longitudinal length of the retainer 1524 is greater than the lateral or circumferential width of the upper slot 1520, thereby presenting an interference that prevents retainer 1524 from being ejected from upper slot 1520.

In the embodiment shown in FIGS. 107A-113, intermediate segment 1502*b* of housing 1502 includes a plurality of circumferentially spaced closing slots 1526, where each closing slot 1526 includes a closing key or engagement member 1528 disposed therein that is translatable between a radially retracted position (shown in FIG. 107B) and a radially expanded position respective housing 1502. Additionally, intermediate segment 1502*b* includes a plurality of circumferentially spaced fracturing slots 1530, where each fracturing slot 1530 includes a fracturing key or engagement member 1532 disposed therein that is translatable between a radially retracted position and a radially expanded position (shown in FIG. 107B) respective housing 1502. Further, intermediate segment 1502*b* additionally includes a plurality of circumferentially spaced landing slots 1534, where each landing slot 1534 includes a landing key or engagement member 1536 disposed therein that is translatable between a radially retracted position (shown in FIG. 107B) and a radially expanded position respective housing 1502. As with the closing keys 1528 of upper segment 1502*a*, the keys 1528, 1532, and 1536 of intermediate segment 1502*b* each include retainers 1524 for preventing keys 1528, 1532, and 1536 from being inadvertently lost or ejected from their respective slots. In this embodiment, intermediate segment 1502*b* includes bore sensors 224 and seals 228. Additionally, intermediate segment 1502*b* includes a plurality of circumferentially spaced upstop slots 1538, where each upstop slot 1538 includes an upstop key or engagement member 1539 disposed therein that is translatable between a radially retracted position and a radially expanded position (shown in FIG. 107B) respective housing 1502. Additionally, upstop keys 1539 include retainers 1524 for preventing upstop keys 1539 from being inadvertently ejected from corresponding upstop slots 1538.

Core 1540 of obturating tool 1500 is disposed coaxially with the longitudinal axis of housing 1502 and includes an upper end 1542 that forms a fishing neck for retrieving obturating tool 1500 when it is disposed in a wellbore, and a lower end 1544. In this embodiment, core 1140 includes a throughbore 1546 extending between upper end 1542 and lower end 1544 that is defined by a cylindrical inner surface 1548. Core 1540 also includes a generally cylindrical outer surface 1550 extending between upper end 1542 and lower end 1544. In this embodiment, core 1540 comprises an upper segment of a core or cam where the lower end 1544 of core 1540 is coupled to lower segment 1140*b* at shearable coupling 1152. A lower end of lower segment 1140*b* is coupled with actuation assembly 1180, as described above with respect to obturating tool 1100. In this embodiment, the maximum outer diameter (i.e., when they are disposed in the radially expanded position) of each of the translatable keys (i.e., keys 1522, 1528, 1532, 1536, and 1539) of intermediate segment 1502*b*, is less than an inner diameter of the tubing or string through which obturating tool 1500 is pumped. In this manner, the keys of intermediate segment 1502*b* may be allowed to expand and/or retract during pumping of obturating tool 1500 without becoming jammed against an inner surface of the tubing or string through which the obturating tool 1500 is pumped.

In the embodiment shown in FIGS. 107A-113, the outer surface 1550 of core 1540 includes an annular sleeve groove 1552 extending radially therein, which is disposed directly adjacent an upper expanded diameter section or cam surface 1554. Outer surface 1550 additionally includes a first intermediate expanded diameter section or cam surface 1556 axially spaced from upper expanded diameter section 1554. Disposed axially between upper expanded diameter section 1554 and first intermediate expanded diameter section 1556 is an annular sleeve groove 1558 and an annular closing key groove 1560, where sleeve groove 1558 is disposed directly adjacent a lower end of upper expanded diameter section 1554 and closing key groove 1560 is disposed directly adjacent an upper end of first intermediate expanded diameter section 1556. In this embodiment, closing key groove 1560 has a greater outer diameter than sleeve groove 1558.

In the embodiment shown, the outer surface 1550 of core 1540 additionally includes second intermediate expanded diameter section or cam surface 1562, and an annular fracturing groove 1564 extending axially between first intermediate expanded diameter section 1556 and second intermediate expanded diameter section 1562. Outer surface 1550 includes a third intermediate expanded diameter section or cam surface 1566 axially spaced from second intermediate expanded diameter section 1562 by an annular landing groove 1568. Landing groove 1568 has a shorter axial length than the axial length of either closing key 1528 or fracturing key 1532, allowing landing groove 1568 to pass radially underneath keys 1528 and 1532 when core 1540 is displaced through housing 1502 without allowing keys 1528 and 1532 to actuate into a radially retracted position. In this embodiment, third intermediate expanded section 1566 of outer surface 1550 includes c-ring 290 and seal 294. Further, outer surface 1550 of core 1540 includes a lower expanded diameter section or cam surface 1570 and an annular upstop groove 1572 that extends axially between third intermediate expanded diameter section 1566 and lower expanded diameter section 1570.

Given that obturating tool 1500 includes actuation assembly 1180, obturating tool 1500 is operated in a similar manner as obturating tool 1100 described above. Particularly, obturating tool 1500 is initially pumped into a string, such as well string 602, with core 1540 disposed in an initial or run-in position as shown in FIGS. 107A and 107B. In the run-in position, fracturing keys 1532 and landing keys 1536 are each disposed in the radially expanded position while carrier keys 1522, closing keys 1528, and upstop keys 1539 are each disposed in the radially retracted position. In an embodiment, obturating tool 1500 is pumped through the string until it enters the bore 1304 of the housing 1302 of the uppermost sliding sleeve valve 1300 (disposed in the upper-closed position) of the string. Obturating tool 1500 continues to travel through the bore 1304 of housing 1302 until landing keys 1536 physically engage lower shoulder 1314 of housing 1302, preventing further downward travel of obturating tool 1500 through sliding sleeve valve 1300. Additionally, as landing keys 1536 engage lower shoulder 1314, seals 224 sealingly engage sealing surface 1316 of housing 1302 and buttons 224 also engage lower shoulder 1314, actuating buttons 224 from the radially expanded position to the radially retracted position, thereby retracting c-ring 290 into annular groove 292 and axially unlocking core 1540 from housing 1502 of obturating tool 1500.

Once obturating tool 1500 has landed within sliding sleeve valve 1300 with landing keys 1536 engaging lower shoulder 1314, upper wellbore pressure (i.e., fluid pressure above obturating tool 1500) is increased, causing core 1540 to be displaced axially downwards through housing 1502 until annular lower seal 1218*c* of valve body 1182 is disposed axially below grooves 1126 (disposing valve body 1182 of actuation assembly 1180 in the second position), restricting further axial travel of core 1540 through housing 1502 with core 1540 disposed in a second or fracking position. In the fracking position, landing keys 1536 are retracted into landing groove 1568 and out of physical engagement with lower shoulder 1314, while carrier keys 1522 are actuated into the radially expanded position disposed on upper expanded diameter section 1554. In this position, carrier keys 1522 are disposed within engagement groove 1350 of the sleeve 1340 of sliding sleeve valve 1300.

With landing keys 1536 disposed in the radially retracted position, obturating tool 1500 is permitted to travel further downwards through sliding sleeve valve 1300 (in response to the pressure differential acting across obturating tool 1500) until fracking keys 1532, still disposed in the radially expanded position, physically engage lower shoulder 1314 of sliding sleeve valve 1300 to arrest further downward travel of obturating tool 1500 through sliding sleeve valve 1300. Additionally, as obturating tool 1500 begins to travel through sliding sleeve valve 1300, carrier keys 1522 physically engage lower engagement shoulder 1354 of the engagement groove 1350 of sleeve 1340. The axially directed force applied to sleeve 1340 via the engagement between lower engagement shoulder 1354 and carrier keys 1522 causes sleeve 1340 to travel axially downwards through the bore 1304 of the housing 1302 of sliding sleeve valve 1300. As sleeve 1340 travels downwards through housing 1302, engagement pin 1358 shears the inner terminal end 1325 of each shear pin 1324*a* and each shear pin 1324*b*, with engagement pin 1358 coming to rest between shear pins 1324*b* and 1324*c*.

Following the displacement of engagement pin 1358 through pin slot 1318 as core 1540 travels towards the fracking position, biasing members 1326 bias sheared shear pins 1324*a* and 1324*b* towards the centerline of pin slot 1318. In this manner, the inner terminal ends 1325 of sheared shear pins 1324*a* and shear pins 1324*b* physically reengage at the centerline of pin slot 1318. Thus, biasing members 1326 allow sheared shear pins 1324*a* and 1324*b*, as well as shear pins 1324*c* and 1324*d*, to be reused a finite number of times depending upon the axial length of shear pins 1324*a*-1324*d* and the width of engagement pin 1358. Thus, sliding sleeve valve 1300 may be actuated between the upper-closed, open, and lower-closed positions multiple times before shear pins 1324*a*-1324*d* lose their functionality of retaining sleeve 1340 in the predetermined axial positions within housing 1302 that correspond with the upper-closed, open, and lower-closed positions.

With sliding sleeve valve 1300 disposed in the open position, the formation adjacent sliding sleeve valve 1300 may be hydraulically fractured as the upper wellbore fluid pressure is increased to a hydraulic fracturing pressure as fluid is flowed into the formation via ports 1332 in housing 1302. Once the formation surrounding sliding sleeve valve 1300 is sufficiently fractured, the pumps flowing fluid into the wellbore are stopped and upper wellbore pressure is allowed to decline to the first threshold pressure, allowing the valve body 1182 of actuation assembly 1180 of obturating tool 1500 to transition to the third position, which in-turn allows core 1540 to travel further axially downwards through housing 1502. As core 1540 shifts downwards through housing 1502, closing keys 1528 are actuated into the radially expanded position as they are disposed over first intermediate expanded diameter section 1556. Following the radial expansion of closing keys 1528, fracturing keys 1532 are permitted to retract into the radially retracted position as they are disposed over the annular fracturing groove 1564.

With closing keys 1528 actuated into the radially expanded position and fracturing keys 1532 actuated into the radially retracted position, in response to the pressure differential acting across obturating tool 1500, engagement between carrier keys 1522 and the lower engagement shoulder 1354 of sleeve 1340 cause sleeve 1340 and obturating tool 1500 to be displaced axially downwards through housing 1302 until the lower end 1346 of sleeve 1340 engages lower shoulder 1314 of housing 1302, arresting the downwards travel of sleeve 1340 within housing 1302 with sliding sleeve valve 1300 disposed in the lower-closed position. Additionally, closing keys 1528 engage lower shoulder 1314 to support obturating tool 1500 within sliding sleeve valve 1300. As sleeve 1340 travels through housing 1302, engagement pin 1358 shears the inner terminal ends 1325 of shear pins 1324*c* and 1324*d*, which are biased back into engagement via biasing members 1326. Additionally, as sliding sleeve valve 1300 is actuated from the upper-closed position to the open position, and from the open position to the lower-closed position, upstop keys 1539 remain in the radially expanded position to prevent obturating tool 1500 from washing uphole out of sliding sleeve valve 1300 in response to the inadvertent loss of the pressure differential applied across obturating tool 1500.

Following the actuation of sliding sleeve valve 1300 into the lower-closed position, upper wellbore pressure is further reduced to the second threshold pressure until valve body 1182 of actuation assembly 1180 is permitted to actuate into the fourth position, which in-turn allows core 1540 to travel further axially downwards through housing 1502. As core 1540 shifts downwards through housing 1502, carrier keys 1522 are permitted to retract into the radially retracted position as they are disposed over sleeve groove 1552. Following the retraction of carrier keys 1522, closing keys 1528 are permitted to retract into the radially retracted position as they are disposed over closing key groove 1560. Additionally, upstop keys 1539 also retract into the radially inwards position as they are disposed over upstop groove 1572. With carrier keys 1522 and closing keys 1528 each disposed in the radially retracted position, carrier keys 1522 are disengaged from lower engagement shoulder 1354 of sleeve 1340 while closing keys 1528 are disengaged from lower shoulder 1314 of housing 1302, permitting obturating tool 1500 to be pumped or displaced further down the string to the next sliding sleeve valve 1300 as obturating tool 1500 resets to the run-in position.

Although obturating tool 1500 is described above with respect to sliding sleeve valve 1300, the same operations described above regarding obturating tool 1500 may be performed with sliding sleeve valve 1400. Further, if it becomes necessary to 'fish' out obturating tool 1500 from the string in which it is disposed, obturating tool 1500 may be extracted via the use of a fishing line attached to the upper end 1542 of core 1540. The application of an axially upwards directed force to core 1540 by the fishing line causes shearable coupling 1152 to shear, allowing core 1540 to be displaced axially upwards through housing 1502 until each key 1522, 1528, 1532, 1536, and 1539 is disposed in the radially retracted position with core 1540 disposed in a release position. In this release position, carrier keys 1522 are permitted to enter landing groove 1568 of core 1540 to allow for their radial retraction.

Referring to FIGS. 114-116, an embodiment of a two-position sliding sleeve valve 1600 is shown. Two-position sliding sleeve valve 1600 shares features with sliding sleeve valve 1300 illustrated in FIGS. 97A-100, and shared features have been numbered similarly. As with sliding sleeve valve 1300, sliding sleeve valve 1600 does not comprise a lockable sliding sleeve valve. However, unlike sliding sleeve valve 1300, sliding sleeve valve 1600 comprises a two-position sliding sleeve valve including an upper-closed position (shown in FIG. 114) and a lower-open position. Thus, in this embodiment the closed position of sliding sleeve valve 1600 is above or uphole from the open position. Sliding sleeve valve 1600 may be used in well systems, such as well system 600, in lieu of, or in conjunction with, other sliding sleeve valves disclosed herein.

Sliding sleeve valve 1600 has a central or longitudinal axis 1605 and generally includes a tubular housing 1602 and a sleeve 1640 slidably disposed therein. In the embodiment shown in FIGS. 114-116, housing 1602 of sliding sleeve valve 1600 includes a bore 1604 extending between a first or upper end 1606 and a second or lower end 1608, where bore 1604 is defined by a generally cylindrical inner surface 1610. The inner surface 1610 of housing 1602 includes a seal or debris barrier 1612 positioned proximal upper shoulder 1312. The inner surface 1610 of housing 1602 also includes an elongate pin slot 1614 that is similar in function and configuration to pin slot 1318 of sliding sleeve valve 1318, but is axially spaced from both upper shoulder 1312 and lower shoulder 1314.

In this embodiment, pin slot 1614 includes a seal or debris barrier 1612 at an upper terminal end thereof and a pair of axially spaced, laterally extending shear grooves 1322. Each shear groove includes a pair of opposed shear pins 1616 (labeled as 1616*a* and 1616*b* in FIGS. 114 and 116) that are configured similarly as shear pins 1324*a*-1324*d* of sliding sleeve valve 1300, with each shear pin 1616 including an inner terminal end 1618 (shown in FIG. 116). Particularly, a first or upper shear groove 1322 includes a first or upper pair of laterally extending shear pins 1616*a*, where the terminal ends 1618 of the pair of shear pins 1616*a* are biased into physical engagement or contact via biasing members 1326 and retained within shear groove 1322 via a pair of retaining plugs 1328. Similarly, a second or lower shear groove 1322 includes a second or lower pair of laterally extending shear pins 1616*b*, where the terminal ends 1618 of the pair of shear pins 1616*b* are biased into physical engagement or contact via biasing members 1326 and retained within shear groove 1322 via a pair of retaining plugs 1328.

In the embodiment shown in FIGS. 114-116, sleeve 1640 of sliding sleeve valve 1600 includes a bore 1642 extending between a first or upper end 1644 and a second or lower end 1646, where bore 1642 is defined by a generally cylindrical inner surface 1648. Sleeve 1640 also includes an outer surface 1649 extending axially between upper end 1644 and lower end 1646. Sleeve 1640 includes an annular engagement profile or ridge 1650 that extends radially inwards from inner surface 1648. Ridge 1650 includes a first or upper shoulder 1652 and a second or lower shoulder 1654 axially spaced from upper shoulder 1652. Similar to sleeve 1340 of sliding sleeve valve 1300 discussed above, sleeve 1640 includes engagement pin 1358 for physically engaging and shearing the pair of shear pins 1616*a* and 1616*b* when sliding sleeve valve 1600 is actuated between the upper-closed and lower-open positions.

Referring to FIGS. 117A-122, another embodiment of a flow transported obturating tool 1700 is shown. Obturating tool 1700 is configured to selectably actuate sliding sleeve valve 1600 between its respective upper-closed and lower-closed positions. Similar to obturating tool 1500 described above, the obturating tool 1700 may be disposed in the bore 602*b* of well string 602 at the surface of wellbore 3 and pumped downwards through wellbore 3 towards the heel 3*h* of wellbore 3, where obturating tool 1700 can selectively actuate one or more sliding sleeve valves 1600 moving from the heel 3*h* of wellbore 3 to the toe of wellbore 3. Obturating tool 1700 shares structural and functional features with obturating tool 1500 described above, and shared features have been numbered similarly.

In the embodiment shown in FIGS. 117A-122, obturating tool 1700 has a central or longitudinal axis and generally includes a generally tubular housing 1702, a carrier 1740 disposed in the housing 1702, and a core or cam 1770 disposed in the housing 1702 and carrier 1740. Housing 1702 of obturating tool 1700 includes a first or upper end 1704, a second or lower end 1706, and a bore 1708 extending between upper end 1704 and lower end 1706, where bore 1708 is defined by a generally cylindrical inner surface 1710. Housing 1702 also includes a generally cylindrical outer surface 1712 extending between upper end 1704 and lower end 1706. Housing 1702 is made up of a series of segments coupled together at threaded joints, including a first or upper segment 1702*a*, intermediate segments 1702*b*-1702*e*, and a lower segment 1702*f*.

In this embodiment, upper segment 1702*a* of housing 1702 includes bore sensors 224 and seals 228. Additionally, upper segment 1702*a* includes a plurality of circumferentially spaced upper slots 1714 each receiving a corresponding downstop key or engagement member 1716 therein. Each downstop key 1716 is radially translate within its respective upper slot 11714 between a radially retracted position and a radially expanded position (shown in FIG. 117A) respective housing 1702. Further, upper segment 1702*a* includes a plurality of circumferentially spaced lower slots 1718 each receiving a corresponding upstop key or engagement member 1720 disposed therein that is translatable between a radially retracted position (shown in FIG. 117A) and a radially expanded position respective housing 1702.

Intermediate segment 1702*b* of housing 1702 includes a pair of axially spaced ports 1722 for providing fluid communication between the surrounding environment (e.g., the wellbore) and a well chamber 1724 formed in the bore 1708 of housing 1702, as will described further herein. Intermediate segment 1702*b* also includes a pair of hydraulic biasing members or springs (only one is shown in FIG. 117A) each comprising a cylinder 1726 affixed to intermediate segment 1702*b* and a piston 1730 slidably disposed in the cylinder 1726. Particularly, cylinder 1726 includes a first or upper end 1726*a* and a second or lower end 1726*b*. Upper end 1726*a* of cylinder 1726 includes a seal 1728 for sealingly engaging an outer surface of piston 1730 while lower end 1726*b* is open to well chamber 1724. Piston 1732 of the hydraulic spring includes a seal 1732 for sealingly engaging an inner surface of cylinder 1726. The sealing engagement provided by seals 1728 and 1732 divide cylinder 1726 into an atmospheric chamber 1734 extending between the upper end 1726*a* of cylinder 1726 and the piston 1730, and a hydrostatic chamber 1736 that is in fluid communication with well chamber 1724. In this embodiment, atmospheric chamber 1734 is filled with a compressible fluid or gas (e.g., air) at or near atmospheric pressure. An upper terminal end of piston 1730 is in physical engagement with carrier 1740 to bias carrier 1740 upwards axially away from the lower end 1706 of housing 1702. Specifically, the pressure differential created between atmospheric chamber 1734 and hydrostatic chamber 1736 (which receives hydrostatic pressure) creates an axially upwards directed biasing force, similar to the operation of the atmospheric chambers 1168 of the obturating tool 1100 described above.

Intermediate segment 1702*c* of housing 1702 includes sliding piston 1162 as described above with respect to obturating tool 1100. Intermediate segment 1702*d* includes atmospheric chambers 1168 as described above with respect to obturating tool 1100. However, unlike obturating tool 1100, obturating tool 1700 does not include an indexing mechanism, such as indexer 1164 of obturating tool 1100. Thus, obturating tool 1700 is configured to actuate sliding sleeve valve 1600 between upper-closed and lower-open positions without the assistance provided by an indexing mechanism, as will be discussed further herein. Intermediate segment 1702*e* of housing 1702 includes an actuation assembly 1800 including a valve body 1802 and first valve assembly 1220*a*, where valve body 1802 includes a first or upper end 1804 and a second or lower end 1806. Actuation assembly 1800 is similar in configuration to the actuation assembly 1180 of obturating tool 1100 except that actuation assembly only includes first valve assembly 1220*a* and does not include second valve assembly 1220*b*; instead, valve body 1802 of actuation assembly 1800 includes a plug 1808. Additionally, because actuation assembly 1800 does not include second valve assembly 1220*b*, valve body 1802 of actuation assembly 1800 does not include upper seal 1218*a*, and only includes intermediate seal 1218*b* and lower seal 1218*c*. The operation of actuation assembly 1800 will be discussed in greater detail below in relation to the operation of obturating tool 1700.

In the embodiment shown in FIGS. 117A-122, carrier 1740 of obturating tool 1700 includes a first or upper end 1742, a second or lower end 1744, and a bore 1746 extending between upper end 1742 and lower end 1744, where bore 1746 is defined by a generally cylindrical inner surface 1748. Carrier also includes a generally cylindrical outer surface 1750 extending between upper end 1742 and lower end 1744. Carrier 1740 includes debris barrier 1518 and a plurality of circumferentially spaced carrier slots 1752 that each receive a corresponding compound carrier key or engagement member 1754 received therein, where each carrier key 1754 is radially translate within its respective carrier slot 1752 between a radially retracted position and a radially expanded position (shown in FIG. 117A) respective carrier 1740. Carrier key 1754 includes an arcuate upper shoulder 1756 and a retractable pin or lower shoulder 1758 that is disposed within a slot extending through carrier key 1754. Particularly, lower shoulder 1758 extends axially at an angle from the longitudinal axis of obturating tool 1700 and is radially translatable within its respective slot between a radially retracted position and a radially expanded position (shown in FIG. 117A) respective carrier key 1754. The lower shoulder 1758 of each carrier key 1754 is biased into the radially expanded position by a biasing member 1760 received within the corresponding slot of the carrier key 1754. Additionally, carrier keys 1754, as well as downstop keys 1716, and upstop keys 1720 each include a retainer 1524 for retaining keys 1754, 1716, and 1720 in their respective slots.

Carrier 1740 includes a plurality of circumferentially spaced and axially extending elongate slots 1762, each of which are rotationally aligned with a corresponding downstop key 1716. Elongate slots 1762 allow for relative axial movement between housing 1702 and carrier 1740, as will be discussed further herein. In this embodiment, the outer surface 1750 of carrier 1740 includes an annular carrier groove 1764 disposed at lower end 1744, where carrier groove 1764 is configured to receive upstop keys 1720 when upstop keys 1720 are disposed in their radially retracted position. The outer surface 1750 of carrier 1740 additionally includes seal 294, annular groove 292, and c-ring 290 when c-ring 290 is disposed in the radially retracted position. The lower end 1744 of carrier 1740 is physically engaged by a terminal end of each piston 1730 to bias carrier 1740 into an axially upwards position, as described above.

In the embodiment shown in FIGS. 117A-122, core 1770 of obturating tool 1700 includes a first or upper end 1772, a second or lower end 1774, and a bore 1776 extending between upper end 1772 and lower end 1774. Core 1770 also includes a generally cylindrical outer surface 1776 extending between upper end 1772 and lower end 1774. Outer surface 1776 of core 1740 includes a first or annular upper groove 1778, a second or annular intermediate groove 1780, and a third or annular lower groove 1782, where grooves 1778, 1780, and 1782 are axially spaced from each other. Core 1770 includes a first or upper cam surface 1784 and a second or lower cam surface 1786 axially spaced from upper cam surface 1784, where upper cam surface 1784 and lower cam surface 1786 each extend radially outwards from outer surface outer surface 1776. Particularly, upper cam surface 1784 extends axially between upper groove 1778 and intermediate groove 1780 while lower scam surface 1786 extends axially between intermediate groove 1780 and lower groove 1782. Additionally, outer surface 1776 of core 1770 includes a seal 1788 for sealingly engaging the inner surface 1748 of carrier 1740. In this arrangement, well chamber 1724 of obturating tool 1700 extends between an upper end defined by seals 194 and 1788 and a lower end defined by seals 1159 and 1161 of sliding piston 1162. In this embodiment, core 1770 comprises an upper segment of a core or cam where the lower end 1774 of core 1770 is coupled to lower segment 1140*b* at shearable coupling 1152.

As described above, obturating tool 1700 is configured to actuate one or more sliding sleeve valves 1600 disposed in a wellbore. Particularly, obturating tool 1500 is initially pumped into a string, such as well string 602, with core 1770 and carrier 1740 each disposed in a first or run-in position as shown in FIG. 117A. In the run-in position, carrier keys 1754 are disposed in the radially expanded position in engagement with upper cam surface 1784 of core 1770, downstop keys 1716 are disposed in the radially expanded position in engagement with lower cam surface 1786, and upstop keys 1720 are disposed in the radially retracted position within carrier groove 1764. Additionally, carrier 1740 is disposed in an upper position with downstop keys 1716 disposed directly adjacent or in physical engagement with the lower terminal end of slot 1762. In an embodiment, obturating tool 1700 is pumped through the string until it enters the bore 1604 of the housing 1602 of the uppermost sliding sleeve valve 1600 (disposed in the upper-closed position) of the string.

Obturating tool 1700 continues to travel through the bore 1604 of housing 1602 until downstop keys 1716 physically engage lower shoulder 1314 of housing 1502, preventing further downward travel of obturating tool 1700 through sliding sleeve valve 1600. Additionally, as downstop keys 1716 engage lower shoulder 1314, seals 224 sealingly engage sealing surface 1316 of housing 1602 and buttons 224 also engage lower shoulder 1314, actuating buttons 224 from the radially expanded position to the radially retracted position, thereby retracting c-ring 290 into annular groove 292 and axially unlocking carrier 1740 from housing 1702 of obturating tool 1700. Further, prior to engaging lower shoulder 1314 of housing 1602, downstop keys 1716, which have a lesser outer diameter than the inner diameter of ridge 1640, pass through ridge 1650 of sleeve 1640.

Once obturating tool 1700 has landed within sliding sleeve valve 1600 with downstop keys 1716 engaging lower shoulder 1314, upper wellbore pressure (i.e., fluid pressure above obturating tool 1700) is increased, causing the hydraulic pressure force applied to the upper end 1742 of carrier 1740 to overcome the biasing force applied to the lower end 1744 of carrier by pistons 1730 and shift carrier 1740 downwards and further into the bore 1708 of housing 1702, from a first or run-in position to a second position. The downwards axial displacement of carrier 1740 relative to both housing 1702 and core 1770 radially shifts upstop keys 1720 from the radially retracted position to the radially expanded position as they are ejected from carrier groove 1764, where upstop keys 1720 are positioned proximal, but downhole from upstop shoulder 1315 of the housing 1602 of sliding sleeve valve 1600. The actuation of upstop keys 1720 into the radially expanded position prevents obturating tool 1700 from washing uphole and out of the bore 1604 of housing 1602 via physical engagement between upstop keys 1720 and upstop shoulder 1315.

Following the radial expansion of upstop keys 1720, the continued downwards displacement of carrier 1740 causes carrier keys 1754 to grapple to and lock against the ridge 1650 of the sleeve 1640 of sliding sleeve valve 160. Particularly, as carrier 1740 is displaced through the bore 1642 of sleeve 1640 the lower shoulder 1758 of each carrier key 1754 retracts radially inwards into its respective slot in response to engagement from upper shoulder 1652, allowing lower shoulder 1758 to pass axially through ridge 1650. As carrier 1740 continues to travel through bore 1642 of sleeve 1640, lower shoulder 1758 radially expands as it exits ridge 1650 and is disposed directly adjacent or physically engages lower shoulder 1654. Additionally, the downwards movement of carrier 1740 through bore 1642 is arrested when upper shoulder 1756 of each carrier key 1754 physically engages the upper shoulder 1652 of ridge 1654. In this position, upper shoulder 1756 supports upper shoulder 1652 of ridge 1650 while lower shoulder 1758 supports lower shoulder 1654, restricting relative axial movement between carrier 1740 of obturating tool 1700 and sleeve 1640 of sliding sleeve valve 1600.

With carrier 1740 of obturating tool 1700 grappled or locked to sleeve 1640 of sliding sleeve valve 1600, fluid pressure applied to the upper end of obturating tool 1700 is continuously increased, causing sleeve 1640 to travel axially downwards through the bore of housing 1604 (in response to engagement from upper shoulder 1756 of each carrier key 1754) until the lower end 1646 of sleeve 1640 engages lower shoulder 1314 of housing 1602, which arrests the downward travel of sleeve 1640 through bore 1604 with sliding sleeve valve 1600 disposed in the lower-open position. As sleeve 1640 travels downwardly through bore 1604, engagement pin 1358 engages and shears both the upper pair of shear pins 1616*a* and the lower pair of shear pins 1616*b*. The terminal ends 1618 of both the upper pair of shear pins 1616*a* and the lower pair of shear pins 1616*b* are biased back into engagement via their corresponding pairs of biasing members 1326. Further, during the continued increase of fluid pressure applied to the upper end of obturating tool 1700, core 1770 is prevented from travelling axially downwards through the bore 1708 of housing 1702 due to hydraulic lock formed in the lower section 1167 of sealed chamber 1163. Thus, unlike obturating tool 1500, a hydraulic lock is formed in the lower section 1167 of sealed chamber 1163 when core 1770 of obturating tool 1700 is disposed in the run-in position.

With sliding sleeve valve 1600 disposed in the lower-open position, the formation adjacent sliding sleeve valve 1600 may be hydraulically fractured as the upper wellbore fluid pressure is increased to a hydraulic fracturing pressure as fluid is flowed into the formation via ports 1332 in housing 1602. Once the formation surrounding sliding sleeve valve 1600 is sufficiently fractured, the pumps flowing fluid into the wellbore are stopped and upper wellbore pressure is allowed to decline until the biasing force provided by pistons 1730 against the lower end 1744 of carrier 1740 overcomes the pressure force applied to the upper end 1742 of carrier 1742 to shift carrier 1740 axially upwards through the bore 1604 of housing 1602 along with sleeve 1640, which travels upwards through bore 1604 until the upper end 1644 of sleeve 1640 engages the upper shoulder 1312 of housing 1602, thereby shearing shear pins 1616*a* and 1616*b* and returning sliding sleeve valve 1600 to the upper-closed position. However, carrier 1740 is prevented from returning to its original run-in position due to the physical engagement between the lower shoulder 1758 of each carrier key 1754 and the lower shoulder 1654 of ridge 1650.

Following the return of sliding sleeve valve 1600 to the upper-closed position, fluid pressure is bled off at the surface to further decrease the fluid pressure applied to the upper end of obturating tool 1700 to a first threshold pressure, actuating first valve assembly 1220*a* of actuation assembly 1800 and thereby releasing the hydraulic lock formed in the lower section 1167 of sealed chamber 1163. In response to the release of the hydraulic lock within lower section 1167 of sealed chamber 1163, core 11700 is displaced axially downwards relative housing 1702 and carrier 1740 until intermediate seal 1218*b* is displaced axially below grooves 1126, allowing intermediate seal 1218*b* to sealingly engage the inner surface 1710 of the intermediate section 1702*e* of housing 1702 and re-form a hydraulic lock within the lower section 1167 of sealed chamber 1163, thereby restricting further downwards axial travel of core 1770 through the bore 1708 of housing 1702.

In this second or lower position of core 1770, carrier keys 1754 are actuated into the radially retracted position within upper groove 1778 and downstop keys 1716 are actuated into the radially retracted position within intermediate groove 1780. With carrier keys 1754 disposed in the radially retracted position, carrier keys 1754 are unlocked from ridge 1650 and are permitted to travel therethrough. Additionally, with downstop keys disposed in the radially retracted position, downstop keys 1716 are unlocked from the lower shoulder 1314 of housing 1602, thereby releasing housing 1702 of obturating tool 1700 from the housing 1602 of sliding sleeve valve 1600. With carrier keys 1754 released from sleeve 1640 and downstop keys 1716 released from housing 1602, obturating tool 1700 is released from sliding sleeve valve 1600 and is flow transported to the next succeeding sliding sleeve valve 1600 positioned in the string. Following the release of obturating tool 1700 from the sliding sleeve valve 1600, carrier 1740 is permitted to travel axially upwards relative housing 1702 via the biasing force provided by pistons 1730 until carrier 1740 is disposed in the run-in position with upstop keys 1720 disposed in the radially retracted position within carrier groove 1764.

During the operation of obturating tool 1700, if it becomes necessary to ‘fish’ out obturating tool 1700 from the string in which it is disposed, obturating tool 1700 may be extracted via the use of a fishing line attached to the upper end 1772 of core 1770. The application of an axially upwards directed force to core 1770 by the fishing line causes shearable coupling 1152 to shear, allowing core 1770 to be displaced axially upwards through housing 1702 until carrier keys 1754 and downstop keys 1716 are each disposed in the radially retracted position with core 1770 disposed in a release position. In this release position, carrier keys 1754 are disposed in intermediate groove 1780 of core 1770 and downstop keys 1716 are disposed in lower groove 1782.

It should be understood by those skilled in the art that the disclosure herein is by way of example only, and even though specific examples are drawn and described, many variations, modifications and changes are possible without limiting the scope, intent or spirit of the claims listed below.

What is claimed is:

1. A valve for use in a wellbore, comprising:

a housing comprising a housing port;

a slidable closure member disposed in a bore of the housing and comprising a first end, a second end opposite the first end, a closure member port, and an inner surface comprising an annular shoulder positioned between the first end and the second end and facing the first end; and a seal disposed in the housing;

wherein the closure member comprises a first position in the housing where fluid communication is provided between the closure member port and the housing port, and a second position axially spaced from the first position where fluid communication between the closure member port and the housing port is restricted;

wherein, in response to sealing of the bore of the housing and engaging the annular shoulder of the closure member by an untethered obturating member engaging a radial bore restricting shoulder of the housing, the closure member is configured to actuate from the first position to the second position.

2. The valve of claim 1, wherein the closure member comprises a sleeve.

3. The valve of claim 1, wherein the closure member comprises a third position in the housing axially spaced from the first position and the second position where fluid communication between the closure member port and the housing port is restricted.

4. The valve of claim 3, wherein the first position of the closure member is disposed axially between the second position and the third position.

5. The valve of claim 3, wherein, in response to sealing of the bore of the housing by the untethered obturating member engaging the shoulder of the housing, the closure member is configured to actuate from the third position to the first position.

6. The valve of claim 3, wherein:

fluid communication is provided between a central passage of the closure member and the housing port when the closure member is in the first position; and fluid communication is restricted between the central passage of the closure member and the housing port when the closure member is in the second position and the third position.

7. The valve of claim 1, wherein the shoulder of the housing is configured to physically engage the obturating member such that the obturating member maintains sealing engagement with the seal as the closure member is actuated from the first position to the second position.

8. The valve of claim 1, wherein an inner surface of the housing comprises the seal.

9. The valve of claim 1, wherein the inner surface of the closure member comprises the seal.

10. The valve of claim 1, further comprising a first lock ring disposed radially between the housing and the closure member, wherein the first lock ring comprises a first position permitting relative axial movement between the housing and the closure member, and a second position radially spaced from the first position that restricts relative axial movement between the housing and the closure member in both a first direction and a second direction opposite the first direction.

11. The valve of claim 10, wherein the closure member comprises a radially translatable actuator configured to actuate the first lock ring between the first position and the second position.

12. The valve of claim 10, wherein, when the first lock ring is disposed in the second position, the closure member is locked in the first position.

13. The valve of claim 10, further comprising a second lock ring disposed radially between the housing and the closure member and axially spaced from the first lock ring, wherein the second lock ring comprises a first position permitting relative axial movement between the housing and the closure member, and a second position radially spaced from the first position that restricts relative axial movement between the housing and the closure member in both the first and second directions.

14. The valve of claim 13, wherein, when the second lock ring is disposed in the second position, the closure member is locked in the second position.

15. The valve of claim 10, further comprising:

a third lock ring disposed radially between the housing and the closure member and axially spaced from the first lock ring and the second lock ring, wherein the third lock ring comprises a first position permitting relative axial movement between the housing and the closure member, and a second position radially spaced from the first position that restricts relative axial movement between the housing and the closure member in both the first and second directions;

wherein the closure member comprises a third position in the housing axially spaced from the first position and the second position where fluid communication between the closure member port and the housing port is restricted;

wherein, when the third lock ring is disposed in the second position, the closure member is locked in the third position.

16. The valve of claim 1, wherein the shoulder of the housing comprises a no-go shoulder.

17. A valve for use in a wellbore, comprising:

a housing comprising a housing port; and a slidable closure member disposed in a bore of the housing and comprising a central passage and a closure member port;

wherein the closure member comprises a first position in the housing where fluid communication is provided between the central passage of the closure member and the housing port, a second position axially spaced from the first position where fluid communication between the central passage of the closure member and the housing port is restricted, and a third position axially spaced from the first position and the second position where fluid communication between the central passage of the closure member and the housing port is restricted;

wherein the first position of the closure member is disposed axially between the second position and the third position.

18. The valve of claim 17, wherein:

an inner surface of the closure member comprises a first shoulder and a second shoulder axially spaced from the first shoulder;

in response to physical engagement between an obturating member and the first shoulder, relative axial movement between the obturating member and the closure member is restricted in a first direction; and in response to physical engagement between the obturating member and the second shoulder, relative axial movement between the obturating member and the closure member is restricted in a second direction opposite the first direction.

19. The valve of claim 18, wherein:

the inner surface of the closure member comprises a sealing surface disposed axially between the first shoulder and the second shoulder; and in response to sealing of the bore of the housing by the obturating member sealingly engaging the sealing surface, the closure member is configured to actuate from the first position to the second position.

20. The valve of claim 17, further comprising:

a sealing surface disposed in the bore of the housing;

wherein, in response to sealing of the bore of the housing by the obturating member sealingly engaging the sealing surface, the closure member is configured to actuate from the third position to the first position;

wherein an inner surface of the housing comprises a first shoulder;

wherein, when the closure member is actuated from the third position to the first position, the first shoulder is configured to physically engage the obturating member to prevent actuation of the closure member from the first position to the second position.

21. The valve of claim 17, wherein the closure member comprises a sleeve.

22. A valve for use in a wellbore, comprising:

a housing comprising a housing port;

a slidable closure member disposed in a bore of the housing and comprising a closure member port; and a seal disposed in the housing;

wherein the closure member comprises a first position in the housing where fluid communication is provided between a central passage of the closure member and the housing port, and a second position axially spaced in a first direction from the first position where fluid communication between the central passage of the closure member and the housing port is restricted;

wherein, in response to sealing of the bore of the housing by an untethered obturating member engaging a shoulder disposed in the housing that in the first direction extends radially inwards, the closure member is configured to actuate from the first position to the second position.

23. The valve of claim 22, wherein the closure member comprises a sleeve.

24. The valve of claim 22, wherein the closure member comprises a third position in the housing axially spaced in a second direction, opposite the first direction, from the first position and the second position where fluid communication between the central passage of the closure member and the housing port is restricted.

25. The valve of claim 24, wherein the first position of the closure member is disposed axially between the second position and the third position.

26. The valve of claim 24, wherein, in response to sealing of the bore of the housing by the untethered obturating member engaging the shoulder, the closure member is configured to actuate from the third position to the first position.

27. The valve of claim 22, wherein the shoulder is configured to physically engage the obturating member such that the obturating member maintains sealing engagement with the seal as the closure member is actuated from the first position to the second position.

28. The valve of claim 27, wherein the shoulder extends radially inwards from an inner surface of the housing.

29. The valve of claim 27, wherein the shoulder extends radially inwards from an inner surface of the closure member.

30. The valve of claim 22, wherein an inner surface of the housing comprises the seal.

31. The valve of claim 22, further comprising a first lock ring disposed radially between the housing and the closure member, wherein the first lock ring comprises a first position permitting relative axial movement between the housing and the closure member, and a second position radially spaced from the first position that restricts relative axial movement between the housing and the closure member in both a first direction and a second direction opposite the first direction.

32. The valve of claim 31, wherein the closure member comprises a radially translatable actuator configured to actuate the first lock ring between the first position and the second position.

33. The valve of claim 31, wherein, when the first lock ring is disposed in the second position, the closure member is locked in the first position.

34. The valve of claim 31, further comprising a second lock ring disposed radially between the housing and the closure member and axially spaced from the first lock ring, wherein the second lock ring comprises a first position permitting relative axial movement between the housing and the closure member, and a second position radially spaced from the first position that restricts relative axial movement between the housing and the closure member in both the first and second directions.

35. The valve of claim 34, wherein, when the second lock ring is disposed in the second position, the closure member is locked in the second position.

36. The valve of claim 31, further comprising:

a third lock ring disposed radially between the housing and the closure member and axially spaced from the first lock ring and the second lock ring, wherein the third lock ring comprises a first position permitting relative axial movement between the housing and the closure member, and a second position radially spaced from the first position that restricts relative axial movement between the housing and the closure member in both the first and second directions;

wherein the closure member comprises a third position in the housing axially spaced from the first position and the second position where fluid communication between the closure member port and the housing port is restricted;

wherein, when the third lock ring is disposed in the second position, the closure member is locked in the third position.

37. A valve for use in a wellbore, comprising:

a housing comprising a housing port; and a slidable closure member disposed in a bore of the housing and comprising a central passage and a closure member port, wherein the closure member comprises a first end, a second end opposite the first end, and an inner surface comprising an annular shoulder positioned between the first end and the second end and facing the first end;

wherein the closure member comprises an open position in the housing where fluid communication is provided between the central passage of the closure member and the housing port, a first closed position axially spaced from the open position where fluid communication between the central passage of the closure member and the housing port is restricted, and a second closed position axially spaced from the open position and the first closed position where fluid communication between the central passage of the closure member and the housing port is restricted;

wherein, in response to engaging the annular shoulder of the closure member by an untethered obturating member engaging a radial bore restricting shoulder of the housing, the closure member is configured to actuate in a first axial direction from the first closed position to the open position.

38. The valve of claim 37, wherein the first position of the closure member is disposed axially between the second position and the third position.

39. The valve of claim 37, wherein:

the shoulder of the closure member comprises a first shoulder and the inner surface of the closure member comprises a second shoulder axially spaced from the first shoulder;

in response to physical engagement between an obturating member and the first shoulder, relative axial movement between the obturating member and the closure member is restricted in a first direction; and in response to physical engagement between the obturating member and the second shoulder, relative axial movement between the obturating member and the closure member is restricted in a second direction opposite the first direction.

40. The valve of claim 37, wherein in response to engaging the annular shoulder of the closure member by the untethered obturating member engaging the radial bore restricting shoulder of the housing, the closure member is configured to actuate in the first axial direction from the open position to the second closed position.

* * * * *